(12) United States Patent
Hirakuni et al.

(10) Patent No.: US 7,225,630 B2
(45) Date of Patent: Jun. 5, 2007

(54) REFRIGERATING CYCLE APPARATUS, AIR CONDITIONING APPARATUS, THROTTLE DEVICE AND FLOW CONTROLLER

(75) Inventors: Satoshi Hirakuni, Tokyo (JP); Yoshihiro Sumida, Tokyo (JP); Hiroaki Makino, Tokyo (JP); Atushi Mochiduki, Tokyo (JP); Shigeki Onishi, Tokyo (JP); Yoshihiro Tanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 360 days.

(21) Appl. No.: 10/923,145

(22) Filed: Aug. 23, 2004

(65) Prior Publication Data

US 2005/0061027 A1 Mar. 24, 2005

Related U.S. Application Data

(62) Division of application No. 10/239,178, filed as application No. PCT/JP01/00639 on Jan. 31, 2001.

(51) Int. Cl.
*F25B 1/00* (2006.01)
*F25B 41/00* (2006.01)
*F25B 49/00* (2006.01)

(52) U.S. Cl. .............. 62/197; 62/222; 62/511; 236/92 B

(58) Field of Classification Search .............. 62/197, 62/217, 222, 511; 236/92 B
See application file for complete search history.

(56) References Cited

U.S. PATENT DOCUMENTS

| 2,576,610 | A | * | 11/1951 | Kunzog ................ 138/41 |
| 2,720,756 | A | | 10/1955 | Stebbins |
| 3,150,502 | A | | 9/1964 | Tucker |
| 3,270,756 | A | * | 9/1966 | Dryden ................ 137/13 |
| 3,808,830 | A | * | 5/1974 | Atkinson et al. ........ 62/217 |
| 3,815,379 | A | | 6/1974 | Scherer et al. |
| 4,150,696 | A | | 4/1979 | Meier et al. |
| 4,311,020 | A | | 1/1982 | Tobin et al. |
| 5,097,866 | A | | 3/1992 | Shapiro-Baruch |
| 5,906,225 | A | | 5/1999 | Stark et al. |

FOREIGN PATENT DOCUMENTS

| JP | 57-108568 | 7/1982 |
| JP | 58-158276 | 10/1983 |
| JP | 1-26469 | 5/1989 |
| JP | 5-141813 | 6/1993 |
| JP | 6-207764 | 7/1994 |
| JP | 6-241534 | 8/1994 |
| JP | 7-146032 | 6/1995 |
| JP | 7-294042 | 11/1995 |
| JP | 7-332794 | 12/1995 |

(Continued)

Primary Examiner—Marc Norman
(74) Attorney, Agent, or Firm—Oblon, Spivak, McClelland, Maier & Neustadt, P.C.

(57) ABSTRACT

In a refrigerating cycle incorporating a second flow controller having a throttle section, which is composed of an inlet noise eliminating space 19, an inlet side porous permeable member 20 communicating in a refrigerant flow direction, an orifice 23, an outlet side foamed metal 25, and an outlet noise eliminating space 27, and a multi-directional valve, a gas/liquid two-phase refrigerant is caused to pass through the throttle section.

25 Claims, 62 Drawing Sheets

FOREIGN PATENT DOCUMENTS

| | | |
|---|---|---|
| JP | 9-145196 | 6/1997 |
| JP | 10-131681 | 5/1998 |
| JP | 11-51514 | 2/1999 |
| JP | 11-190560 | 7/1999 |
| JP | 11-325655 | 11/1999 |
| JP | 11-351706 | 12/1999 |
| JP | 2000-346493 | 12/2000 |
| JP | 2000-346495 | 12/2000 |

\* cited by examiner

→ : REFRIGERANT FLOW DIRECTION  (a)

(b)

VAPOR REFRIGERANT

LIQUID REFRIGERANT

———— : CONVENTIONAL SECOND FLOW CONTROLLER
----- : SECOND FLOW CONTROLLER OF THE EMBODIMENT

FREQUENCY (a)

(b)

(a)

(a)

(a)

(b)

(a)                (b)

(a)

(b)

← FLOW DIRECTION IN COOLING
←--- FLOW DIRECTION IN HEATING

208b : ROTATIONAL SHAFT
(CONNECTED TO DRIVE UNIT)

← FLOW DIRECTION IN COOLING
◄--- FLOW DIRECTION IN HEATING

REFRIGERATING CYCLE APPARATUS, AIR CONDITIONING APPARATUS, THROTTLE DEVICE AND FLOW CONTROLLER

BACKGROUND ART

The present invention relates to a refrigerating cycle apparatus that has a throttle structure suitable to control a refrigerant flow and that is suitable to control a two-phase refrigerant, and further relates to an air conditioning apparatus that improves temperature and humidity controllability in a cooling or heating operation, reduces refrigerant flow noise, and improves comfort with respect to room temperature and humidity and noise. Further, the present invention relates to a low noise throttle device or a low noise flow controller that has a simple structure and high reliability and reduces fluid flow noise.

Conventional air conditioning apparatuses use a variable capacitance type compressor such as an inverter, and the like to cope with the fluctuations of an air conditioning load, and the rotational frequency of the compressor is controlled according to the magnitude of the air conditioning load. However, when the number of rotations of the compressor is reduced in a cooling operation, an evaporating temperature also increases, thus a problem arises in that the dehumidifying capacity of an evaporator is reduced or an evaporating temperature exceeds the dew point temperature in a room and dehumidification cannot be executed.

The following air conditioning apparatus is devised as a means for improving the dehumidifying capacity in a cooling low capacitance operation. FIG. 97 shows a refrigerant circuit diagram of a conventional air conditioning apparatus shown in Japanese Unexamined Patent Application Publication No. 11-51514, and FIG. 98 shows a sectional view of an ordinary throttle valve provided in FIG. 97. In the figure, numeral 1 denotes a compressor, 2 denotes a four-way valve, 3 denotes an outdoor heat exchanger, 4 denotes a first flow controller, 5 denotes a first indoor heat exchanger, 6 denotes a second flow controller, and 7 denotes a second indoor heat exchanger, and these components are sequentially connected through pipes and constitute a refrigerating cycle. Next, operation of the conventional air conditioning apparatus will be described below. In a cooling operation, the refrigerant ejected from the compressor 1 passes through the four-way valve 2, is condensed and liquefied in the outdoor heat exchanger 3, is reduced in pressure by a throttle device 11 because the two-way valve 12 of the first flow controller 4 is closed, is evaporated and gasified in the indoor heat exchanger 5, and returns to the compressor 1 again through the four-way valve 2. Further, in a heating operation, the refrigerant ejected from the compressor 1 passes through the four-way valve 2 inversely to the cooling operation, is condensed and liquefied in the outdoor heat exchanger 5, is reduced in pressure by the main throttle device 11 because the two-way valve 12 of the first flow controller 4 is closed, is evaporated and gasified in the outdoor heat exchanger 3, and returns to the compressor 1 again through the four-way valve 2.

In contrast, in a dehumidifying operation, the main throttle device 11 of the first flow controller 4 is closed, and the first indoor heat exchanger 5 is operated as a condenser, that is, as a reheater and the second indoor heat exchanger 7 is operated as an evaporator by opening the 2-way valve 12 and controlling the flow amount of the refrigerant by the second flow control valve 6. Thus, the indoor air is heated in the first indoor heat exchanger 5, whereby it is possible to execute a dehumidifying operation in which a decrease in the room temperature is small.

In the conventional air conditioning apparatuses as described above, since a flow control valve having an orifice is usually used as the second flow control valve disposed in an indoor unit, large refrigerant flow noise is produced when the refrigerant passes through the orifice and the indoor environment is deteriorated thereby. In particular, since the inlet of the second flow control valve is filled with a gas/liquid two-phase refrigerant in the dehumidifying operation, a problem arises in that the refrigerant flow noise is increased.

As a countermeasure for the refrigerant flow noise of the second flow control valve in the dehumidifying operation, Japanese Unexamined Patent Application Publication No. 11-51514 discloses such an arrangement that an orifice-like throttle flow path composed of a plurality of cut grooves 31 and a valve disc 17 is disposed in the valve of a valve seat 18 of a second flow control valve 6 of FIG. 98. Note that numeral 16 denotes an electromagnetic coil for moving the valve disc 17, 31 denotes a plurality of groove-like cut-outs cut in the opening 18 of a pipe acting as the valve seat and forming orifice-like throttle flow paths. This countermeasure for the refrigerant flow noise is devised to continuously flow the gas/liquid two-phase refrigerant through the plurality of orifice-like flow paths. However, there is a problem that this arrangement is not effective because the number of flow paths that can be disposed from processing point view is limited and the refrigerant flow noise is increased. As a result, an additional countermeasure of providing a noise insulating material and a damping material around the second flow controller 6 is required, so that a problem arises in that the cost is increased, and an installation performance and a cycle performance are deteriorated.

In contrast, in a flow controller used in an air conditioning apparatus shown in Japanese Unexamined Patent Application Publication No. 7-146032, porous members 32 acting as filters are disposed upstream and downstream of a throttle to reduce refrigerant flow noise as shown in the sectional view of FIG. 99. However, the porous members 32 are disposed at positions separated from a throttle section, so that they cannot continuously supply a gas/liquid two-phase refrigerant effectively to the throttle section, and thus a problem arises in that refrigerant flow noise is increased.

Further, FIG. 100 shows a sectional view of the arrangement of a flow controller used in an air conditioning apparatus disclosed in Japanese Unexamined Patent Application Publication No. 10-131681. Honeycomb pipes 37 acting as noise eliminators 36 each having holes communicating both the ends thereof are disposed upstream and downstream of a throttle to reduce refrigerant flow noise. FIG. 101 shows a sectional view of the honeycomb pipe. Since the area of each hole formed in the pipe is too small for a refrigerant to pass therethrough, a problem arises in that the hole is liable to be clogged by foreign materials flowing in a refrigerating cycle and the performance of the flow controller is lowered by a drop of the flow amount of the refrigerant. Further, another problem arises in that the refrigerant cannot be flowed without the occurrence of pressure loss because no bypass is formed for the throttle section.

DISCLOSURE OF THE INVENTION

An object of the present invention, which was made to solve the above problems, is to provide a refrigerating cycle apparatus and an air conditioning apparatus using a throttle device and a flow controller that can greatly reduce refrigerant flow noise and are not clogged by foreign materials in a cycle. Another object of the present invention is to provide a low noise and reliable refrigerating cycle apparatus. Another object of the present invention is to provide a low noise throttle device and flow controller. Another object of the present invention is to provide a reliable throttle device and flow controller that are not clogged by foreign materials. Another object of the present invention is to provide a less expensive apparatus having a simple structure. Another object of the present invention is to provide an apparatus that needs not select any particular mounting direction or orientation and has good workability. Another object of the present invention is to provide an easy-to-use air conditioning apparatus. Further, another object of the present invention is to increase the controllability of temperature and humidity in respective cooling, dehumidifying, heating operations in an air conditioning apparatus making use of the heat of condensation in a refrigerating cycle as a heat source for heating the room air to thereby realize a reheating/dehumidifying operation regardless of a cooling season and a heating season. These objects are realized by the inventions stated in claims.

BEST MODE FOR CARRYING OUT THE INVENTION

Embodiment 1

Figure 1:
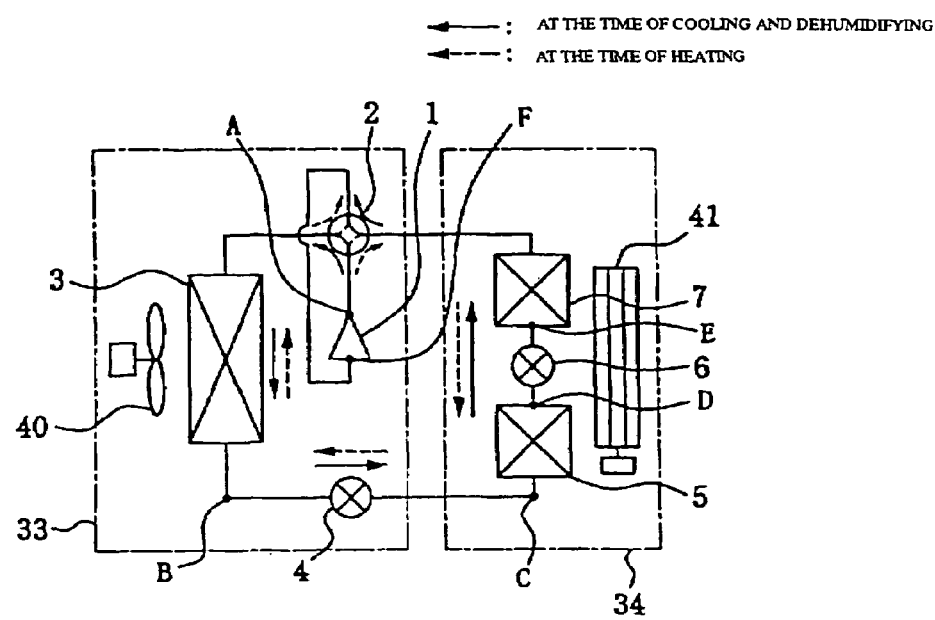
FIG. 1 is a refrigerant circuit diagram of an air conditioning apparatus according to an embodiment 1 of the present invention.

FIG. 1 is a refrigerant circuit diagram of an air conditioning apparatus showing an example of an embodiment of the present invention, wherein the same components as those of the conventional apparatus are denoted by the same reference numerals. In the figure, numeral 1 denotes a compressor, 2 denotes a flow-path switching means, for example, a 4-way valve for switching a refrigerant flow between a cooling operation and a heating operation, 3 denotes an outdoor heat exchanger, 4 denotes a first flow controller, 5 denotes a first indoor heat exchanger, 6 denotes a second flow controller, and 7 denotes a second indoor heat exchanger, and these components are sequentially connected to each other through pipes and constitute a refrigerating cycle. Further, an outdoor unit 33 contains an outdoor fan 40 attached to the outdoor heat exchanger 3, and an indoor unit 34 contains an indoor fan 41 attached to the two indoor heat exchangers. A mixed refrigerant R410A composed of R32 mixed with R125 is used as a refrigerant of this refrigerating cycle, and alkylbenzene oil is used as ice machine oil.

Figure 2:
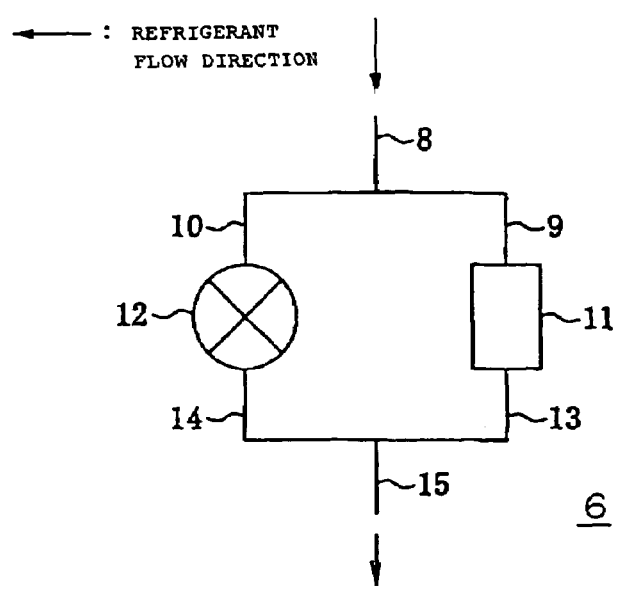
FIG. 2 is a view showing the arrangement of a throttle device according to the embodiment 1 of the present invention.
Figure 3:
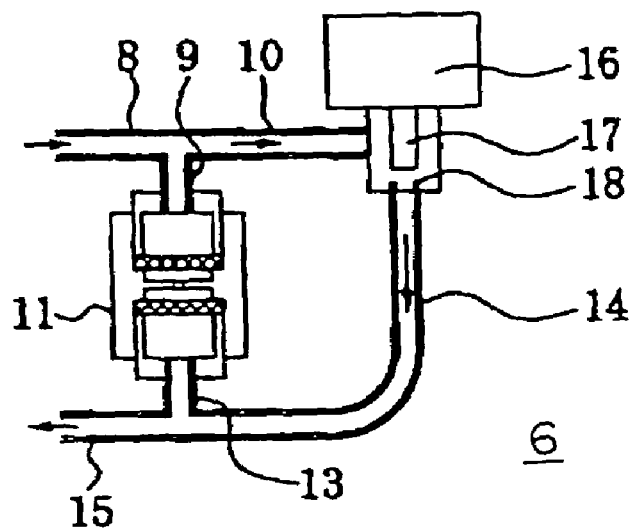
FIG. 3 depicts a sectional views showing the arrangement and operation of the throttle device according to the embodiment 1 of the present invention.
Figure 3:
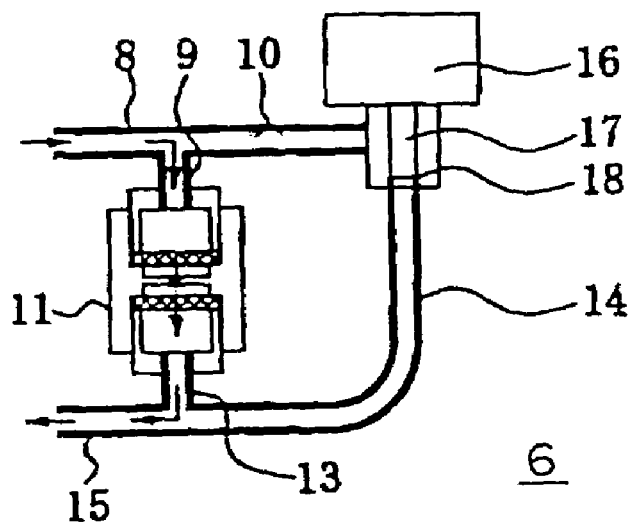

FIG. 2 is a view showing the arrangement of the second flow controller 6 of the air conditioning apparatus shown in FIG. 1, wherein numeral 8 denotes a pipe for connecting the first indoor heat exchanger 5 to the second flow controller 6, 11 denotes a throttle device, 12 denotes a two-way valve, 15 denotes a pipe for connecting the second flow controller 6 to the second indoor heat exchanger, 9 denotes a pipe for connecting the pipe 8 to the throttle device 11, 10 denotes a pipe for connecting the pipe 8 to the two-way valve 12, 13 denotes a pipe for connecting the throttle device 11 to a pipe 15, and 14 denotes a pipe for connecting the two-way valve 12 to the pipe 15. The second flow controller 6 is composed of the two-way valve 12 connected in parallel to the throttle device 11 through the pipes. Further, FIG. 3 depicts sectional views of the second flow controller 6 shown in FIG. 2 showing the operation thereof, wherein (a) shows an operating state of the second flow controller 6 in a cooling operation or a heating operation, and (b) shows an operating state of the second flow controller 6 in a reheating/dehumidifying operation. In the figure, numeral 16 denotes an electromagnetic coil, 17 denotes a valve disc, and 18 denotes a valve seat.

Figure 4:
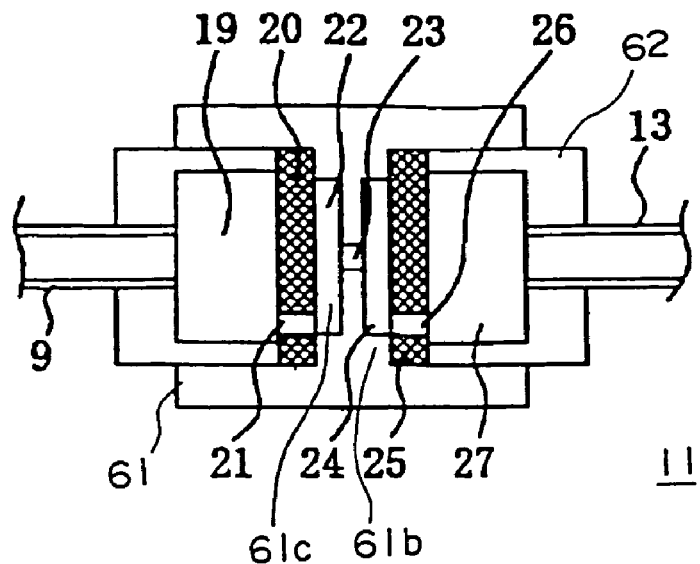
FIG. 4 is a detailed enlarged view of a throttle section according to the embodiment 1 of the present invention.
Figure 5:
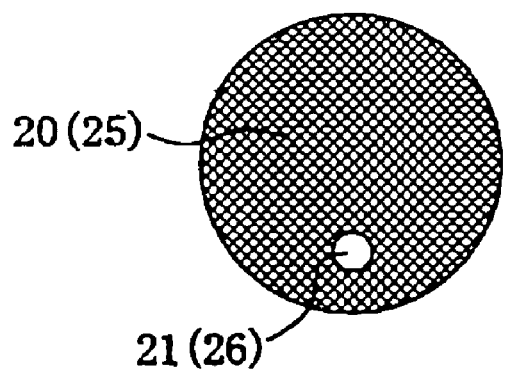
FIG. 5 is an enlarged view of a porous permeable member according to the embodiment 1 of the present invention.

FIG. 4 is a sectional view in enlargement of the throttle device 11 of the second flow controller 6, wherein 19 denotes an inlet noise eliminating space, 20 denotes a foamed metal disposed on an inlet side, 21 denotes a bypass flow path (through hole) disposed in the inlet side foamed metal, 23 denotes an orifice for performing throttling through a small diameter flow path; 22 denotes a space between the inlet side foamed metal 20 and the orifice 23, 25 denotes an outlet side foamed metal, 24 denotes a space between the orifice 23 and the outlet side foamed metal 25, 26 denotes a bypass flow path (through hole) disposed in the outlet side foamed metal 25, and 27 denotes an outlet side noise eliminating space. Reference numeral 61 denotes a main body with a thickness formed into a cylindrical shape, a polygonal shape, a disc shape, or the like and having the through hole 23 of a small diameter acting as the orifice, and 62 denotes presser members inserted into the main body 61 and having flow paths, for example, pipes for communicating the inside spaces 19 and 26 thereof with the outside. The foamed metals 20 and 25 as the porous permeable members disposed at the inlet and outlet of the orifice 23 have the same shape, and FIG. 5 shows a sectional view of them in a flow direction. Each foamed metal is composed of the porous permeable member in its entirety. When each foamed metal has vent holes (vent holes on the surface and in the inside of the porous member through which a fluid can pass) having a diameter set to 100 micrometers or more, a flow noise reducing effect can be obtained thereby. In the embodiment, the diameter of the vent holes is set to 500 micrometers and the porosity thereof is set to 92±6% in consideration of the influence of clogging. When the bypass flow path 21 (26) defined through the foamed metal 20 (25) is arranged as a through hole located at one position where it is not superimposed on the orifice 23 and its diameter is equal to or larger than the minimum diameter of 100 μm of the vent holes, it can obtain an action as a bypass, and thus reliability can be improved by preventing the occurrence of clogging of the foamed metals. In this embodiment, a through hole having a diameter of 2 mm is provided. The foamed metal is made by coating metal powder or alloy powder on urethane foam, burning and eliminating the urethane foam by subjecting it to a heat treatment, and molding the remaining metal into a three-dimensional lattice shape. Ni (nickel) is used as the material of the foamed metal. Cr (chromium) may be plated on the nickel to increase its strength.

Since the pipe 13 acting as a flow path is disposed on a linear line with respect to the refrigerant flow direction of the main body 61, nothing acting as resistance exists in the path from the porous permeable member 20 to the orifice 23. Further, in the main body 61, ring-shaped positioning projections 61b are disposed before and behind the orifice 23 acting as the throttle path in the flow direction so as to define a predetermined gap 61c between the orifice 23 and the porous permeable members 20. The area through which the fluid (refrigerant) passes through the porous permeable members 20 can be largely and effectively utilized by the existence of the predetermined gaps 61c, whereby even if foreign matters are mixed in the fluid (refrigerant), durability to clogging due to foreign matters can be improved. Further, the provision of the positioning projections 61b permits the porous permeable members 20 and the presser members 62 to be positioned easily and reliably, whereby an assembling performance can be improved.

The ring-shaped positioning projections 61b have an inside diameter set to 10 mm to 20 mm. Further, the inside diameter of the orifice 23 is set to 0.5 mm to 2 mm and the length of the orifice 23 is set to 1 mm to 4 mm; and the dimension of the orifice is determined within the above ranges according to a necessary amount of throttling of the fluid (refrigerant). The amount of projection of the positioning projections 61b is set such that the gaps 61c between the porous permeable members 20 and orifice 23 are set within the range of 5 mm or less. In an experiment, a noise reducing effect could be obtained when the gaps 61c were set within the above range.

The porous permeable members 20 are positioned in the refrigerant (fluid) flow direction by being abutted against the ring-shaped positioning projections 61b. Further, the porous permeable member 20 is fixed in the state in which it is pressed against the ring-shaped positioning projection 61b side by the presser member 62 having the flow path 13 on the surface thereof opposite to that on the orifice 23 side. The presser member 62 has the space 19, which has an inside diameter larger than the inside diameter of the flow path 13 and a predetermined length, is inserted into and joined to the main body 61, and also fixes the porous permeable member in place 20. A foamed metal composed of Ni, Ni—Cr, or stainless steel, which has vent holes whose average diameter is set from about 100 μm to 500 μm and has a thickness of about 1 mm to 10 mm, is used for the porous permeable members 20. Further, the main body 61 and the presser members 62 are made by cutting or forging metal such as copper, brass, aluminum, stainless steel, or the like.

Figure 7:
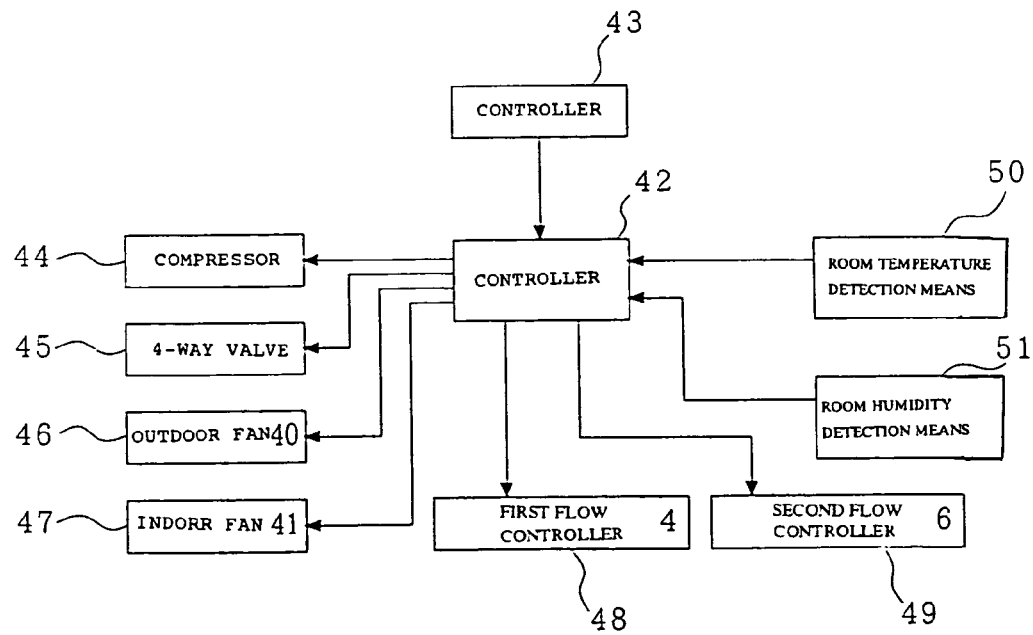
FIG. 7 is a block diagram showing the arrangement of an overall controller according to the embodiment 1 of the present invention assembled in the air conditioning apparatus.

FIG. 7 shows a block diagram of an overall controller assembled in the air conditioning apparatus. The controller 42 is composed of a microprocessor, and the like. When an operation mode signal for setting an operating state of the air conditioning apparatus, a target temperature signal, a target humidity signal, an air flow selecting signal, an operation start/stop signal, and the like are applied to the controller 42 from a remote controller 43 disposed at a location near to, for example, an inhabitant, the controller 42 controls the compressor 1, the 4-way valve 2, the outdoor fan 40, the indoor fan 41, the first flow controller 4, and the second flow controller 6, while monitoring the outputs from a room temperature sensing means 50 and a room humidity sensing means 51. Reference numeral 44 denotes a compressor control means for making the operating frequency of the compressor 1 variable, 45 denotes a 4-way valve control means for switching the 4-way valve 2, 46 denotes an outdoor fan control means for changing the number of revolutions of the outdoor fan 40, 47 denotes an indoor/outdoor fan control means for changing the number of revolutions of the indoor fan 40, 48 denotes a first flow controller control means for controlling the opening/closing of the valve of the first flow controller, and 49 denotes a second flow controller control means for controlling the opening/closing of the valve of the second flow controller.

Next, operation of the refrigerating cycle of the air conditioning apparatus according to this embodiment will be described. In FIG. 1, solid arrows show the refrigerant flow in a cooling operation. The cooling operation is divided into an ordinary cooling operation corresponding to a case in which both the air conditioning sensible heat load and the air conditioning latent heat load in a room are high at start, in summer, and the like and a dehumidifying operation corresponding to a case in which the latent heat load is large while the air conditioning sensible heat load is low as in an intermediate season, a rainy season, and the like. In the ordinary cooling operation, the two-way valve of the second flow controller 6 is put into an open state by the second flow controller control means 49 for controlling the opening/closing of the valve of the second flow controller that receives a command from the controller 42, and the refrigerant is connected from the first indoor heat exchanger to the second indoor heat exchanger with almost no pressure loss.

At this time, a high temperature and high pressure vapor refrigerant ejected from the compressor 1 operating at the number of revolutions corresponding to an air conditioning load passes through the 4-way valve 2, is condensed and liquefied in the outdoor heat exchanger 3, reduced in pressure in the first flow controller 4, and changed to a low pressure two-phase refrigerant, which flows into the first indoor heat exchanger 5 and is evaporated and gasified therein, passes through the second flow controller 6 without a large pressure loss, is evaporated and gasified again in the second indoor heat exchanger 7, and returns to the compressor 1 through the 4-way valve 2 again as a low pressure vapor refrigerant.

The first flow controller 4 is controlled by the first flow controller control means 48 for controlling the opening and closing of the valve of the first flow controller such that the degree of superheat of the refrigerant at, for example, the intake of the compressor 1 is 10° C. In this refrigerating cycle, heat is drawn from the inside of the room by evaporating the refrigerant in the indoor heat exchanger 5, and the inside of the room is cooled by releasing the heat drawn from the inside of the room to the outside thereof by condensing the refrigerant in the outdoor heat exchanger 3.

Figure 6:
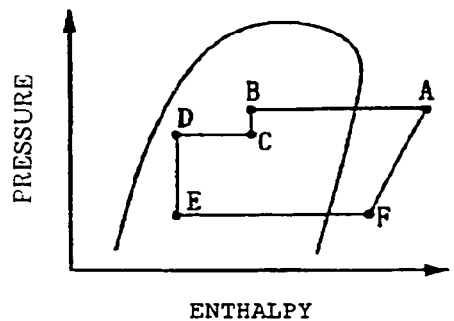
FIG. 6 is a pressure-enthalpy graph according to the embodiment 1 of the present invention showing an operating state in a cooling/dehumidifying operation.

Next, the operation in dehumidification will be explained using a pressure-enthalpy graph shown in FIG. 6. Note that the alphanumeric characters shown in FIG. 6 correspond to those shown in FIG. 1. In the dehumidifying operation, the two-way valve 12 of the second flow controller 6 is closed in response to a command from the controller 42.

At this time, the high pressure and high temperature vapor refrigerant (point A) ejected from the compressor 1 operating at the number of revolutions corresponding to the air conditioning load passes through the 4-way valve 2, exchanges heat with the outside air in the outdoor heat exchanger 3 and is condensed so as to be made into a condensed gas/liquid two-phase refrigerant (point B). The high pressure two-phase refrigerant is somewhat reduced in pressure in the first flow controller 4 and flows into the first indoor heat exchanger 5 as an intermediate pressure gas/liquid two-phase refrigerant (point C). The intermediate pressure gas/liquid two-phase refrigerant flowed into the first indoor heat exchanger 5 exchanges heat with the indoor air, and is further condensed (point D). The gas/liquid two-phase refrigerant ejected from the first indoor heat exchanger flows into the second flow controller 6.

In the second flow controller 6, since the two-way valve 12 is closed, the refrigerant flows from the inlet pipe 8 of the second flow controller into the throttle device 11 through the connecting pipe 9. In the throttle device 11, the refrigerant from the connecting pipe 9 is reduced in pressure in the orifice 23 through the inlet noise eliminating space 19, the inlet side foamed member 20, and the space 22 between the inlet side foamed member 20 and the orifice 23, and is made into a low pressure gas/liquid two-phase refrigerant, which flows into the second indoor heat exchanger 7 (point E) sequentially passing through the space 24 between the orifice 23 and the outlet side foamed metal 25, the outlet side foamed metal 25, the outlet side noise eliminating space 27, and the connecting pipe 13. It is sufficient that the thickness in the refrigerant flow direction of the foamed metals disposed at the inlet and the outlet of the orifice be 1 mm or more from the view point of flow noise reduction effect and the processing easiness thereof, and the thickness is set to about 3 mm in this embodiment. Further, the inside diameter of the orifice is set to 1 mm and the thickness thereof is set to about 3 mm. The refrigerant having flowed into the second indoor heat exchanger 7 is evaporated by removing the sensible and latent heat of indoor air. The low pressure vapor refrigerant ejected from the second indoor heat exchanger returns to the compressor 1 again through the 4-way valve 2. Since the indoor air is heated in the first indoor heat exchanger 5 and cooled and dehumidified in the second indoor heat exchanger 7, it is possible to execute the dehumidification while preventing the reduction in the room temperature.

Note that, in the dehumidifying operation, it is possible to control a blowing-out temperature in a wide range by controlling the heat exchange amount of the outdoor heat exchanger 3 by adjusting the rotational frequency of the compressor 1 and the number of revolutions of the outdoor fan 40 of the outdoor heat exchanger 3 and by controlling the heating amount of the indoor air heated by the first indoor heat exchanger 5. It is also possible to control the heating amount of the indoor air heated by the first indoor heat exchanger 5 by controlling the condensing temperature of the first indoor heat exchanger by controlling the degree of opening of the first flow controller 4 and the number of revolutions of the indoor fan 41. Further, the second flow controller 6 is controlled such that the degree of superheat of the intake refrigerant of the compressor is set to, for example, 10° C.

In the throttle device 11 of this embodiment 1, a throttling process is composed of the orifice 23. Since the foamed metals arranged as the porous permeable members are disposed on the inlet side and the outlet side of the orifice 23, and the spaces 19 and 27 capable of obtaining a noise eliminating effect are disposed upstream of the inlet side foamed metal 20 and downstream of the outlet side foamed metal 25, respectively, refrigerant flow noise produced when the gas/liquid two-phase refrigerant passes can be greatly reduced.

Figure 8:
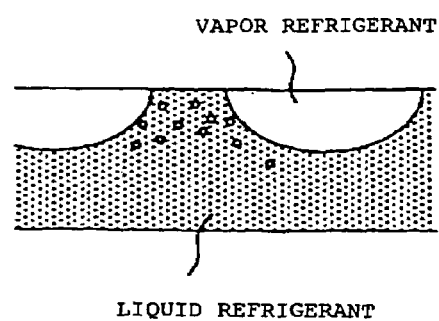
FIG. 8 is a view showing a flow mode of a refrigerant at the inlet of the throttle section according to the embodiment 1 of the present invention.

When a gas/liquid two-phase refrigerant passes through an ordinary orifice type flow controller, large refrigerant flow noise is produced before and behind the orifice when the refrigerant flows therethrough. In particular, when the gas/liquid two-phase refrigerant flows in a slag flow mode, large refrigerant flow noise is produced upstream of the orifice. This is due to the fact that when the flow mode of the gas/liquid two-phase refrigerant is the slag flow, a vapor refrigerant intermittently flows in a flow direction as shown in FIG. 8 depicting the flow of the refrigerant, and when vapor slags or vapor bubbles having a size larger than an orifice flow path pass through the flow path of a throttle section, the vapor slags or vapor bubbles upstream of the flow path of the orifice are broken and vibrated and that since a vapor refrigerant and a liquid refrigerant alternately pass through the orifice, the speed of the refrigerant is fast when the vapor refrigerant passes and slow when the liquid refrigerant passes, and the pressure of the refrigerant upstream of the throttle section is fluctuated thereby. Further, in a conventional second flow controller 6, since outlet flow paths are disposed at one to four positions at the outlet of the controller 6, a refrigerant is made into a high speed gas/liquid two-phase stream at an outlet and collides against a wall surface, whereby an orifice main body and an outlet flow path are vibrated at all times and generate noise. Further, large jet stream noise is produced by the turbulence and swirl generated by the high speed gas/liquid two-phase jet stream at the outlet(s).

The gas/liquid two-phase refrigerant and the liquid refrigerant flowing into the orifice 23 of the throttle device 11 shown in FIG. 4 are rectified when they pass through the countless number of the fine vent holes of the inlet side foamed member 20. As a result, vapor slags (large bubbles) in a slag flow, and the like, in which a gas and a liquid flow intermittently, are made into small bubbles, and the flowing state of the refrigerant is made into a uniform gas/liquid two-phase flow (a state in which a vapor refrigerant and a liquid refrigerant are mixed well). Accordingly, the vapor refrigerant and the liquid refrigerant pass through the orifice 23 at the same time, whereby the speed of the refrigerant is not fluctuated, and the pressure thereof is not also fluctuated. Further, since the flow paths formed inside of the porous permeable member such as the inlet side-foamed metal 20 are arranged intricately, the porous permeable member has such an effect that the pressure of the refrigerant is fluctuated repeatedly in the porous member and made constant with a part thereof converted into thermal energy. Thus, even if a pressure fluctuation is caused in the orifice 23, the porous permeable member has an effect of absorbing it and is unlike to transmit the influence of the pressure fluctuation to upstream of the orifice. Further, the flow speed of the refrigerant as a high speed gas/liquid two-phase jet stream downstream of the orifice 23 is sufficiently reduced in the inside of the outlet side foamed metal 25 and uniformly distributed. Accordingly, the high speed gas/liquid two-phase jet stream does not collide against a wall surface and no large swirl is produced in the stream, whereby jet stream noise can be also reduced.

Further, the inlet noise eliminating space 19 disposed on the inlet side of the throttle device 11 can reduce pressure fluctuations having a low frequency that cannot be suppressed by the inlet side foamed metal 20. Since the outlet noise eliminating space 27 is also disposed on the outlet side of the throttle device 11 likewise, it can reduce pressure fluctuations having a low frequency that cannot be suppressed by the outlet side foamed metal 25. Further, the porous permeable member 20 is disposed at a position on an approximate linear line with respect to the inlet inside space 19 and the outlet inside space 27 disposed in an approximate linear state with respect to the refrigerant flow direction in the main body 61. Accordingly, since the flow path from the porous permeable member 20 to the orifice 23 acting as the throttle path is formed approximately linearly and further it is arranged to reduce its resistance in a simple structure, the flow state of the refrigerant having passed through the porous permeable member 20 is made into a uniform gas/liquid two-phase flow (a state in which a vapor refrigerant is mixed well with a liquid refrigerant), and further the refrigerant can pass through the throttle path (orifice) 23 while maintaining the uniform gas/liquid two-phase flow (the state in which the vapor refrigerant is mixed well with the liquid refrigerant), whereby the speed of the refrigerant is not fluctuated, the pressure thereof is not also fluctuated, and noise is unlike to be produced. Further, the porous permeable member 20 is assembled in such a manner that it is abutted against the positioning projections 61b and then pressed by the presser member 62 so as to be sandwiched between the presser member 62 and the positioning projections 61b. At this time, the presser member 62 is fixed to the main body 61 by press fitting, shrinkage fit, welding, or the like. Therefore, the porous permeable member 20 can be simply and positively positioned when it is assembled, and thus a less expensive throttle device whose assembly time is reduced and whose reliability is improved can be obtained. Further, since the structure of the throttle device is simple, it is possible to obtain a throttle device at low cost. Further, a countermeasure, which is required in a conventional apparatus, for winding a noise insulating material and a damping material around a throttle device is not necessary, and thus a less expensive refrigerating cycle apparatus can be obtained.

As a result, the cost can be reduced because the countermeasure required in the convention apparatus for winding the noise insulating material and the damping material around the throttle device 6 is unnecessary, and further the recycling performance of the air conditioning apparatus can be improved. Note that since the problem of the refrigerant flow noise due to the gas/liquid two-phase refrigerant described above is not limited to the air conditioning apparatus and is a general problem common to general refrigerating cycles such as a refrigerator, and the like, the same effect can be obtained by widely applying the throttle device of this embodiment to these general refrigerating cycles.

The flow characteristics (the relationship between the flow rate of refrigerant and a pressure loss) of the second flow controller 6 in the cooling/dehumidifying operation can be adjusted by adjusting the diameter of the orifice 23, the length of flow path of the orifice through which the refrigerant passes, and the number of the orifices. That is, when a certain amount of refrigerant is flowed with a small pressure loss, it is sufficient to increase the diameter of the orifice, to decrease the length of the flow path thereof, or to use a plurality of the orifices. Inversely, when a certain amount of the refrigerant is flowed with a large pressure loss, it is sufficient to decrease the diameter of the orifice 23, to increase the length of the flow path thereof, or to use a single orifice. The shape of the orifice such as the diameter and the length of flow path thereof is optimally designed in the design of equipment.

Note that, while the foamed metal has been described as the element for the porous permeable members used on the outlet and the inlet sides of the orifice in the embodiment, the same effect can be obtained even if ceramics, sintered metal, foamed resin, metal wire netting, and the like are used as the element.

Figure 12:
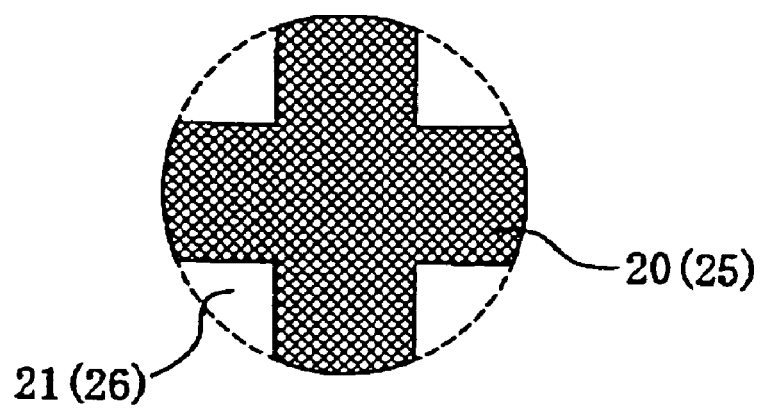
FIG. 12 is a detailed enlarged view of the porous permeable member showing another example of the throttle device according to the embodiment 1 of the present invention.
Figure 13:
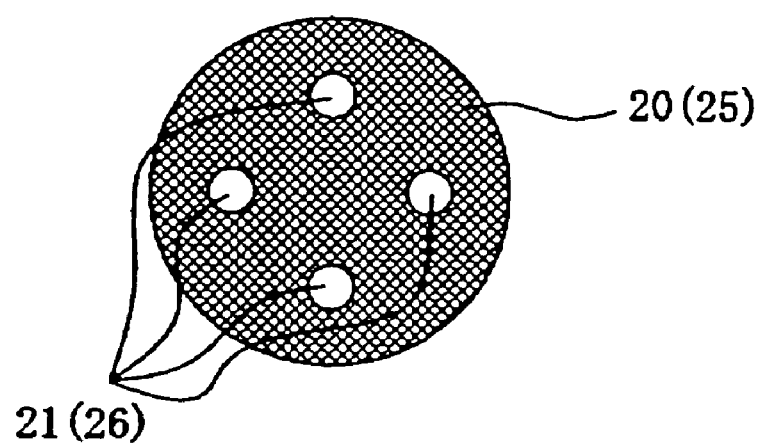
FIG. 13 is a detailed enlarged view of the porous permeable member showing another example of the throttle device according to the embodiment 1 of the present invention.

Further, since the bypass paths (through holes) 21 and 26 are formed through the inlet side foamed metal 20 and the outlet side foamed metal 25, respectively, at the positions where they are not superimposed on the orifice 23, even if the inlet and outlet side foamed metals 20 and 25 are clogged with foreign materials in the refrigerating cycle, it is possible to prevent the reduction of the performance of the throttle device 11 caused by the clogging. Further, since the space 22 is formed between the inlet side foamed metal 20 and the orifice 23, and the space 24 is formed between the orifice 23 and the outlet side foamed metal 25, almost all the portions of the foamed metals actuate as refrigerant flow paths, whereby a function as the throttle device can be maintained. Since the inlet and outlet side foamed metals 20 and 25 have sufficient reliability as the throttle device, it is possible to provide a sufficiently reliable air conditioning apparatus. While the bypass flow path described in this embodiment is formed into the cylindrical shape and located at one position, the present invention is not limited thereto, and the same effect can be obtained even by a cut-out shaped bypass flow path or a plurality of cylindrical bypass flow paths as shown in FIGS. 12 and 13.

Figure 9:
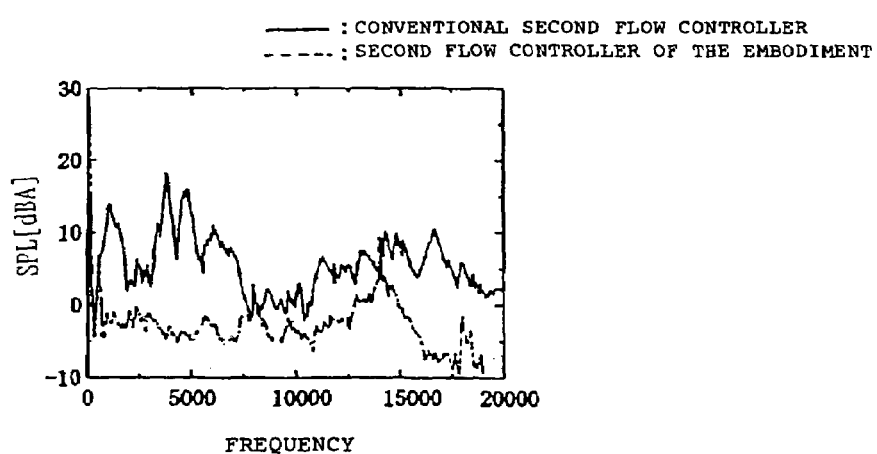
FIG. 9 is a graph showing the noise characteristics of the throttle device according to the embodiment 1 of the present invention.

FIG. 9 shows the results of measurements of the frequency characteristics of noise produced by a conventional throttle device and those of noise produced by the throttle device of this embodiment. In the figure, the abscissa shows the frequency (Hz) and the ordinate shows the sound pressure (SPL, dBA). Further, the dotted line shows the second flow controller of this embodiment, and the solid line shows the conventional second flow controller. It can be found that the sound pressure level of the second flow controller of this embodiment is reduced as compared with the conventional device over the entire frequency range. In particular, it can be found that a great sound pressure level reduction effect can be obtained in the range of from 2000 Hz to 7000 Hz that is well audible to human ears.

Next, an operation control method of the air conditioning apparatus of this embodiment will be described. A preset temperature and humidity, for example, are set for the air conditioning apparatus when it is operated in order to set a temperature and humidity environment preferred by an inhabitant in a room. Note that the inhabitant may directly input the respective set values of the preset temperature and humidity from the remote controller 43 of the indoor unit. Further, an optimum temperature and humidity value table, which is determined for respective inhabitants who are sensitive to the heat and cold, to children, to elderly persons, and the like, may be stored in the remote controller of the indoor unit so that they can directly input any stored optimum value. Further, the indoor unit 34 is provided with sensors for detecting the temperature and humidity of the intake air of the indoor unit to detect the room temperature and humidity.

When the air conditioning apparatus is started, the difference between a preset temperature and the current intake air temperature of the room and the difference between a preset humidity and the current intake air humidity of the room are calculated as a temperature difference and a humidity difference, respectively, and the rotational frequency of the compressor 1, the number of revolutions of the outdoor fan, the number of revolutions of the indoor fan, the degree of throttle opening of the first flow control valve 4, and the opening/closing of the second flow control valve 6 of the air conditioning apparatus are controlled such that these differences are finally brought to zero or within the predetermined values. At this time, when the temperature and humidity differences are controlled to zero or within the predetermined values, the air conditioning apparatus is controlled giving priority to the temperature difference over the humidity difference.

That is, when both the temperature and humidity differences are large at the start of the air conditioning apparatus, the controller instructs to set the valve disc 17 of the two-way valve 12 of the second flow control valve 6 at an open position, as shown in FIG. 3(a). Since the refrigerant passing through the second flow controller has almost no pressure loss, neither the cooling capacity nor the cooling efficiency is reduced. As described above, the second flow controller 6 is set to the open state, and the air conditioning apparatus is operated first such that the temperature difference in the room is preferentially set to zero or within the predetermined value in an ordinary cooling operation. When the cooling capacity of the air conditioning apparatus agrees with the heat load of the room and the temperature difference is set to zero or within the predetermined value, the humidity difference is detected. When the humidity difference is set to zero or within the predetermined value at this time, the operation of the air conditioning apparatus will be continued as it is.

When the temperature difference is set to zero or within the predetermined value and the humidity difference at the time still has a large value, the valve disc 17 of the second flow control valve 6 is set to the position where it is in intimate contact with the valve seat 18, as shown in FIG. 3(b). As described above, the operation of the air conditioning apparatus is switched to a cooling/dehumidifying operation by throttling the second control valve 12. In the cooling/dehumidifying operation, the heating amount of the first indoor heat exchanger 5 is controlled such that the temperature difference in the room can be maintained at zero or within the predetermined value as well as the cooling/dehumidifying amount of the second indoor heat exchanger 7 is controlled such that the humidity difference is set to zero or within the predetermined value. The control of the heating amount of the first indoor heat exchanger 5 is adjusted by the number of revolutions of the outdoor fan of the outdoor heat exchanger 3, the degree of opening of the first flow control valve 4, and the like. Further, the cooling/dehumidifying amount of the second indoor heat exchanger 7 is controlled by the rotational frequency of the compressor 1, the number of revolutions of the indoor fan of the indoor unit 34, and the like. As described above, it is possible in this embodiment to control the temperature and humidity environment in a room to an optimum state according to the preference of an inhabitant by switching the refrigerant circuit between the ordinary cooling operation and the cooling/dehumidifying operation according to the load of the room in the cooling operation. Further, even if the state of phase of the refrigerant passing through the throttle device and the mixing ratio of gas and liquid in the refrigerant are changed by the change of modes such as cooling, dehumidifying, heating, and the like and the change of an air conditioning load, the refrigerant can stably flow through the throttle section 11 with low noise.

While alkylbenzene oil that is unlike to be dissolved in the refrigerant is used as ice machine oil in this embodiment, foreign matters that are not dissolved in the refrigerant and foreign materials that are dissolved in the ice machine oil exist in the refrigerating cycle. Thus, the reliability of the throttle section to clogging can be improved because when these foreign materials are deposited on the foamed metals as the porous permeable members, the ice machine oil that is unlike to be dissolved in the refrigerant has an effect of cleaning the foreign materials when it passes through the foamed metals.

Further, when ice machine oil that is easily dissolved in the refrigerant is used, even if the compressor stops in a state in which the ice machine oil is deposited on the foamed metals, it is possible to clean the deposited ice machine oil with the refrigerant when the compressor starts next, thereby reliability can be improved.

The heating operation of the air conditioning apparatus of the present invention will be described below. The refrigerant circuit constituting the air conditioning apparatus is the same as that shown in, for example, FIG. 1, so that the arrangement of the second flow controller 6 is the same as that shown in FIG. 3, and the detailed structure of the throttle device 11 is the same as that shown in FIG. 4. In FIG. 1, the flow of the refrigerant in the heating is shown by the broken arrows. In an ordinary heating operation, the controller instructs to set the valve disc 17 of the two-way valve 12 of the second flow control valve 6 in the open position, as shown in FIG. 3(*a*).

At this time, the high temperature and high pressure vapor refrigerant ejected from the compressor 1 flows into the second indoor heat exchanger 7 and into the first indoor heat exchanger 5 through the 4-way valve 2, exchanges heat with the indoor air, and is condensed and liquefied. Note that since the pipe 8 is connected to the pipe 15 through a large opening area as shown in FIG. 3(*a*), almost no pressure loss is caused in the refrigerant when it passes through the valve, and thus no decrease in the heating capacity and efficiency is caused by the pressure loss. The high pressure liquid refrigerant ejected from the first indoor heat exchanger 5 is reduced in pressure by the first flow controller 4 and made into a gas/liquid two-phase refrigerant, which exchanges heat with the outside air in the outdoor heat exchanger 3 and is evaporated. The low pressure vapor refrigerant ejected from the outdoor heat exchanger 3 returns to the compressor 1 again through the 4-way valve 2. The degree of opening of the first flow control valve 4 in the ordinary heating operation is controlled such that the degree of superheat of the refrigerant at the outlet of the outdoor heat exchanger 3 is set to, for example, 5° C.

Next, operation of the air conditioning apparatus in a heating/dehumidifying operation will be explained in correspondence to the alphanumeric characters shown in FIG. 1. In the heating/dehumidifying operation, the controller instructs to cause the valve disc 17 of the two-way valve 12 of the second flow control valve 6 to be in intimate contact with the valve seat 18, as shown in FIG. 3(*b*). At this time, the high temperature and pressure vapor refrigerant ejected from the compressor 1 (point A) flows into the second indoor heat exchanger 7 through the 4-way valve 2, exchanges heat with the indoor air, and is condensed (point E). The high pressure liquid refrigerant or the gas/liquid two-phase refrigerant flows into the second flow control valve 6.

Since the valve disc 17 of the two-way valve 12 is in intimate contact with the valve seat 18 in the second flow control valve 6 as shown in FIG. 3(*b*), the high pressure liquid refrigerant or the gas/liquid two-phase refrigerant flows into the throttle device 11 through the second flow path connecting pipe 13, is reduced in pressure and expanded in the orifice 23, and made into a low pressure gas/liquid two-phase refrigerant, which flows into the first indoor heat exchanger 5 through the pipes 9 and 8 (point D). The saturation temperature of the refrigerant flowed into the second indoor heat exchanger 5 is equal to or less than the dew point of the indoor air, and the refrigerant is evaporated by drawing the sensible heat and the latent heat of the indoor air (point C). The low pressure gas/liquid two-phase refrigerant ejected from the first indoor heat exchanger 5 flows into the first flow control valve 4, is further reduced in pressure, flows into the outdoor heat exchanger 3, exchanges heat with the outside air, and is evaporated. The low pressure vapor refrigerant ejected from the outdoor heat exchanger 4 returns to the compressor 1 again through the 4-way valve 2.

In the heating/dehumidifying operation, since the indoor air is heated in the second indoor heat exchanger 7 as well as cooled and dehumidified in the first indoor heat exchanger 5, it is possible to dehumidify the room while heating it. Further, in the heating/dehumidifying operation, it is possible to control a blowing-out air temperature in a wide range by controlling the heat exchange amount of the outdoor heat exchanger 3 by adjusting the rotational frequency of the compressor 1 and the number of revolutions of the fan of the outdoor heat exchanger 3 and by controlling the heating amount of the indoor air heated by the first indoor heat exchanger 5. Further, it is also possible to control the dehumidifying amount of the indoor air dehumidified by the first indoor heat exchanger 5 by controlling the evaporating temperature of the first indoor heat exchanger 5 by adjusting the degree of opening of the first flow control valve 4 and the number of revolutions of the indoor fan. The degree of opening of the second flow control valve 6 is controlled such that the degree of supercooling of the refrigerant at the outlet of the second indoor heat exchanger 7 is set to, for example, 10° C.

As described above, this embodiment employs the second flow control valve in which the orifice 23 of the throttle device 11 is sandwiched between the foamed metals, which permits the dehumidifying operation during heating as well as can prevent the occurrence of refrigerant flow noise in the heating/dehumidifying operation, whereby a comfortable space can be realized as to a temperature and humidity environment and noise.

Next, an example of a specific heating operation control method of the air conditioning apparatus will be described. As already described with reference to FIG. 7, the preset temperature, the preset humidity, the intake air temperature, and the intake humidity have been input to the air conditioning apparatus. The air conditioning apparatus carries out a high temperature air blowing-out operation for a predetermined period of time, for example, five minutes at the start of heating and then shifts to the ordinary heating operation. Thereafter, switching between the ordinary heating operation and the heating/dehumidifying operation is controlled according to the temperature difference and the humidity difference in the room.

At the start of heating operation, the compressor 1 is started by putting the valve disc 17 of the two-way valve 12 or the second flow control valve 6 into a throttled state in which the valve disc 17 comes into intimate contact with the valve seat 18, as shown in FIG. 3(*b*). At this time, the evaporating temperature of the first indoor heat exchanger 5 is controlled to become equal to an intake air temperature by adjusting the number of revolutions of the fan of the outdoor heat exchanger 3, the degree of opening of the first flow control valve 4, and the like such that the cooling and dehumidifying capacity in the first indoor heat exchanger 5 is set to zero. When the five minutes as the predetermined period of time from the start of the compressor have passed, the air conditioning apparatus shifts to the ordinary heating operation by setting the second flow control valve 6 in the open state, as shown in FIG. 3(*a*).

At this time, the rotational frequency of the compressor 1, the number of revolutions of the indoor fan, and the number of revolutions of the outdoor fan are adjusted such that the temperature difference is set to zero or within the predetermined value. When the temperature difference is set to zero or within the predetermined value by the ordinary heating operation, the humidity difference is detected. When the humidity difference is zero or within the predetermined value or when humidifying is necessary even if the humidity difference is equal to or larger than the predetermined value, the ordinary heating operation is continued. In contrast, when the humidity difference is zero or equal to or larger than the predetermined value and dehumidifying is necessary, the heating/dehumidifying operation is carried out by setting the second flow control valve 6 in the throttled state, as shown in FIG. 3(*b*).

In the heating/dehumidifying operation, the heating amount of the second indoor heat exchanger 7 is controlled such that the temperature difference in the room can be maintained at zero or within the predetermined value as well as the cooling/dehumidifying amount of the first indoor heat exchanger 5 is controlled such that the humidity difference is set to zero or within the predetermined value. The heating amount of the second indoor heat exchanger 7 is controlled by the rotational frequency of the compressor 1, the number of revolutions of the fan of the indoor unit 22, and the like. Further, the control of the cooling/dehumidifying amount of the first indoor heat exchanger 5 is adjusted by the number of revolutions of the fan of the outdoor heat exchanger 3, the degree of opening of the first flow control valve 4, and the like.

As described above, it is possible in this embodiment to control the temperature and humidity environment in the room to an optimum state according to the preference of an inhabitant by selectively switching the refrigerant circuit to the heating high/temperature air blowing-out operation, the ordinary heating operation, and the heating/dehumidifying operation according to the operating time in the heating operation and the load of the room.

Figure 10:
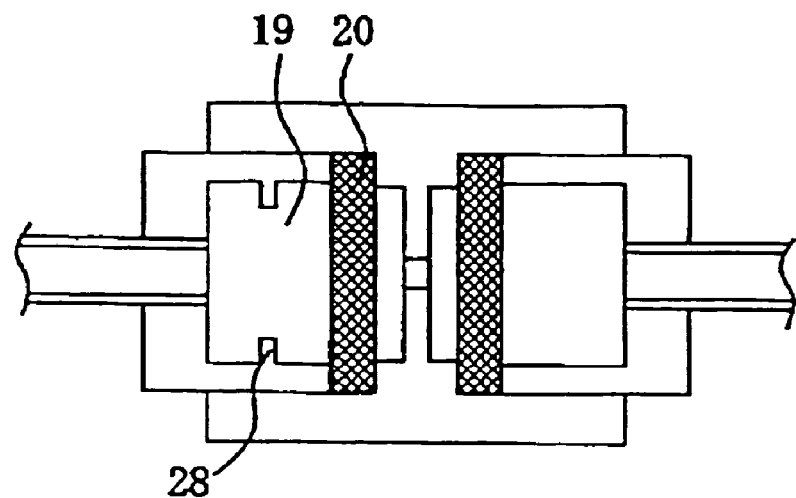
FIG. 10 is a detailed enlarged view of another example of the throttle device according to the embodiment 1 of the present invention.

FIG. 10 is a detailed sectional view showing the structure of another throttle device 11 of the second flow control valve 6 in the air conditioning apparatus of the present invention, wherein the constitutional components that are the same as or similar to those shown in FIG. 4 are denoted by the same reference numerals, and the duplicate description thereof is omitted. In this example, a convex block 28 is disposed around the inside of the inlet noise eliminating space 19.

When the convex block 28 is formed in the inlet noise eliminating space as shown in this structure, a stagnating flow portion of the refrigerant is formed before and behind the convex block 28 as compared with the inlet noise eliminating space 19 formed as exemplified in FIG. 4. Thus, it is possible to cause foreign materials flowing in the refrigerating cycle to stay in the stagnating flow portion so as to prevent them from depositing on the inlet foamed metal 20, which can more improve the reliability of the air conditioning apparatus. While this embodiment describes the convex block for forming the stagnating portion, the present invention is not limited thereto, and any arrangement such as a concave groove may be employed as long as it forms the stagnating portion in the flow of the refrigerant.

Figure 11:
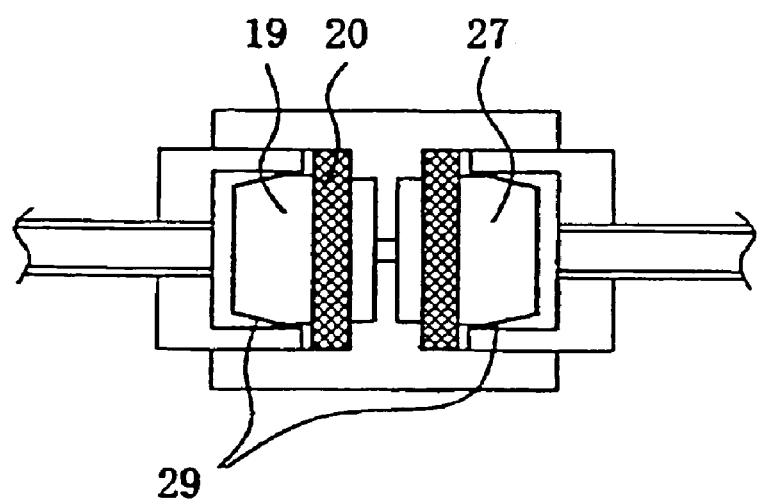
FIG. 11 is a detailed enlarged view of another example of the throttle device according to the embodiment 1 of the present invention.

FIG. 11 is a detailed sectional view showing another structure of the throttle device 11 in the second flow control valve 6 of the air conditioning apparatus of the present invention, wherein the constitutional components that are the same as or similar to those shown in FIG. 4 are denoted by the same reference numerals, and the duplicate description thereof is omitted. In this structure, strainers 29 each composed of a woven metal wire are disposed in the inlet and outlet noise eliminating spaces 19 and 27. The average pore diameter of the strainers is set smaller than the average pore diameter of 500 micrometers of the inlet and outlet side foamed metals 20 and 25.

The provision of the strainer 29 composed of the woven metal wire in the inlet noise eliminating space as shown in this embodiment can more reliably prevent the deposit of the foreign materials in the refrigerating cycle on the inlet side foamed metal 20 as compared with the provision of the convex block 28 in the inlet noise eliminating space shown in FIG. 10. As a result, the second flow controller having more improved reliability can be obtained, whereby a reliable air conditioning apparatus can be realized.

In the above description, R410A is used as the refrigerant of the air conditioning apparatus. The refrigerant R410A is an ozone-friendly HFC refrigerant suitable for the conservation of global environment. Further, R410A has a smaller pressure loss than that of R22 used conventionally as the refrigerant. This is because it has a larger refrigerant vapor density and thus a slow flow speed. Accordingly, R310A is a refrigerant that makes it possible to reduce the size of the vent holes of the porous members used in the throttle device of the second flow control valve 6, whereby a greater refrigerant flow noise reducing effect can be obtained.

The refrigerant used in the air conditioning apparatus is not limited to R410A, and R407C, R404A, and R507A that are the HFC refrigerants may be used. Further, R32 alone, R152a alone, a mixed refrigerant of R32/R124a, and the like that are HFC refrigerants having a small global warming coefficient may be used from the view point of preventing global warming. Further, HC refrigerants such as propane, butane, isobutene, etc., natural refrigerants such as ammonia, carbon dioxide, ether, and the like, and mixed refrigerants thereof may be used. In particular, propane, butane, isobutene, and mixed refrigerants thereof have an operating pressure smaller than that of R410A and thus have a small pressure difference between a condensing pressure and an evaporating pressure, which makes it possible to increase the inside diameter of an orifice, thereby reliability to clogging can be more improved.

Note that while the second flow controller composed of the combination of the throttle device and the two-way valve has been described above, the present invention is not limited to the two-way valve, and the second flow controller may use a multidirectional valve, for example, a 3-way valve, by which the same effect can be obtained. As a method of using the 3-way valve in this case, it is possible to include a refrigerant circuit in which a diverted flow path is connected to the outlet side pipe of the second indoor heat exchanger, in addition to the flow path connected in parallel with the throttle device so that the diverted flow path bypasses a refrigerant as a means for reducing the dehumidifying capacity depending upon air conditioning load conditions.

The refrigerating cycle apparatus of the present invention having the refrigerating cycle in which the compressor, the condenser, the flow controller, and the evaporator are circularly connected, respectively, is provided with the throttle device and the orifice connected in parallel with each other, wherein the orifice has the porous permeable members communicating in the refrigerant flow direction in the flow path thereof. Since the gas/liquid two-phase refrigerant is caused to pass through the orifice in this arrangement, there can be obtained an effect of preventing the occurrence of refrigerant flow noise by preventing the breakage of vapor refrigerant slags and refrigerant bubbles to thereby reduce noise and further prevent the clogging due to foreign materials in the cycle.

Since the refrigerating cycle apparatus of the present invention includes the orifice in the throttle flow path, an effect of stably adjusting the flow amount of refrigerant can be obtained. Since the refrigerating cycle apparatus is provided with the porous permeable member at least one of upstream and downstream of the orifice in the refrigerant flow direction, there can be obtained an effect of reducing refrigerant flow noise and jet stream noise produced upstream of the orifice by making the size of the vapor slags and the vapor bubbles finer and by making the gas/liquid two-phase refrigerant uniform. Since the spaces are formed between the orifice and the porous permeable members, an effect of effectively preventing the clogging of the throttle device can be obtained. Since the pore diameter of the porous permeable members is set to 100 µm or more, an effect of reducing the refrigerant flow noise and preventing clogging can be obtained. Further, since the thickness of the porous permeable member in the refrigerant flow direction is set to 1 mm or more, an effect of reducing the refrigerant flow noise, preventing the clogging and ensuring a simplified working can be obtained. Further, since at least one through hole having a diameter of at least 100 µm is formed through each of the porous permeable members, an effect of preventing the clogging and improving reliability can be obtained.

Since the refrigerating cycle apparatus of the present invention is provided with the filter disposed at least one of upstream of the porous permeable member disposed upstream of the orifice and downstream of the porous permeable member disposed downstream of the orifice, the clogging of the upstream or downstream side porous permeable member can be prevented, whereby an effect of more improving reliability can be obtained. Since the stagnating portion is disposed upstream of the porous permeable member, the clogging of the upstream side porous permeable member can be prevented, and thus an effect of more improving reliability can be obtained. Since the space is disposed at least one of upstream of the porous permeable member disposed upstream of the orifice and downstream of the porous permeable member disposed downstream of the orifice, there can be obtained an effect of reducing the refrigerant flowing noise produced upstream or downstream of the orifice. Since the refrigerant is composed of the non-azeotropic refrigerant, it is possible to stably control the flow resistance of the refrigerant with low noise and to pass it even if the phase state of the refrigerant changes to various states of a liquid, gas, and two-phase, and thus an effect of stabilizing the refrigerating cycle can be obtained. Since the refrigerant having the vapor density larger than that of R22 is used, an effect of reducing the size of the throttle device can be obtained. Since the refrigerant is composed of the hydrocarbon refrigerant, the inside diameter of the orifice of the throttle section can be increased, and thus an effect of improving reliability can be obtained. Since the multidirectional valve is closed in the reheating/dehumidifying operation, an effect of dehumidifying the room without reducing the room temperature can be obtained. Since the ice machine oil that is easily dissolved in the refrigerant is used, even if foreign matters in the cycle, which are not dissolved in the refrigerant and are dissolved in the ice machine oil, deposit on the porous permeable members, they can be cleaned with the ice machine oil, and thus an effect of improving reliability with respect to clogging can be obtained. Further, since the ice machine oil that is unlike to be dissolved in the refrigerant is used, even if the ice machine oil deposits on the porous permeable members while the compressor is at stop, the deposited ice machine oil can be cleaned with the refrigerant when the compressor is started, and thus an effect of improving reliability can be obtained.

In the air conditioning apparatus of the present invention having the refrigerating cycle in which the compressor, the outdoor heat exchanger, the first flow controller, the first indoor heat exchanger, the second flow controller, and the second indoor heat exchanger are circularly connected, the second flow controller is composed of the throttle device composed of the multidirectional valve and the orifice connected in parallel with each other, and the orifice has the porous permeable members communicating in the refrigerant flow direction in the flow path thereof. Accordingly, there can be obtained an effect of preventing the occurrence of refrigerant flow noise, reducing noise, and further preventing the clogging due to foreign materials in the cycle by causing the gas/liquid two-phase refrigerant to pass through the orifice and by preventing the breakage of vapor refrigerant slags and refrigerant bubbles. Since the controller for using the throttle device as the refrigerant flow path in the operation for reducing the latent heat factor is provided, there can be obtained an effect of reducing the refrigerant flow noise and thereby ensuring the comfortable room space even if the gas/liquid two-phase refrigerant is passed through the orifice. Since the controller for using the throttle device as the refrigerant flow path in the cooling or dehumidifying as well as heating operations is provided, there can be obtained an effect of executing comfortable dehumidification while effectively reducing refrigerant flow noise even if the phase state of the refrigerant is changed by the difference of operation modes. Since the controller for using the throttle device as the refrigerant flow path when the heating operation starts is provided, there can be obtained an effect of executing comfortable heating with an enhanced feeling of quick heating by increasing the temperature of blowing-out air. Further, since the controller for using the throttle section as the refrigerant flow path when the difference between a preset temperature and a room temperature is equal to or larger than a predetermined value in the heating operation is provided, it is possible to blow out high temperature air when the room temperature is sufficiently lower than the preset temperature. Accordingly, there can be obtained an effect of executing comfortable heating without giving a feeling of cold draft.

Figure 14:
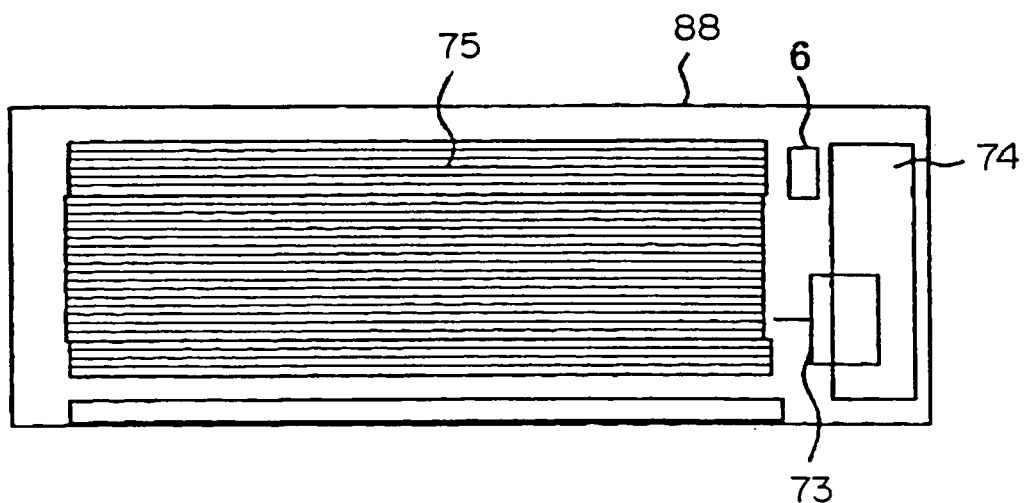
FIG. 14 is a front elevational view of an indoor machine, from which a front cover is removed, according to the embodiment 1 of the present invention.
Figure 15:
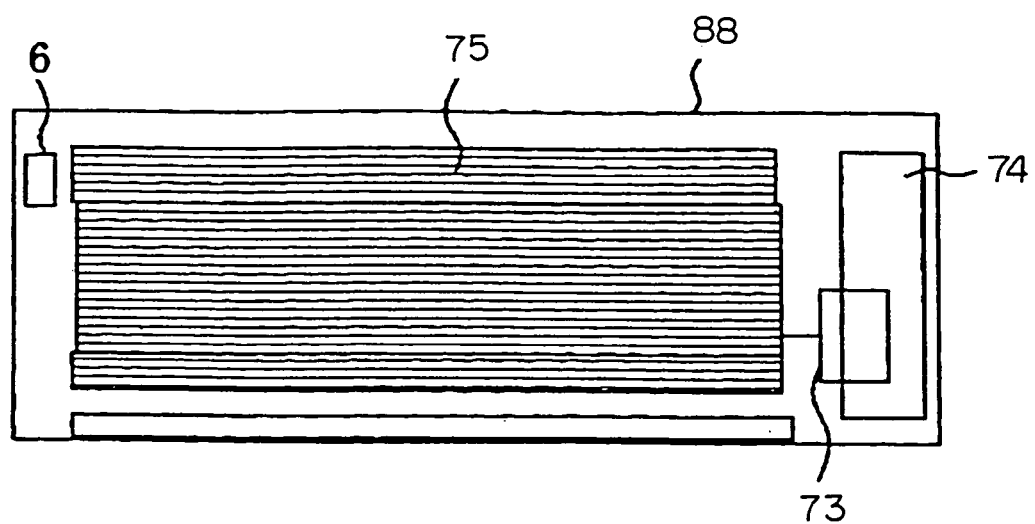
FIG. 15 is a front elevational view of the indoor machine, from which the front cover is removed, according to the embodiment 1 of the present invention.
Figure 16:
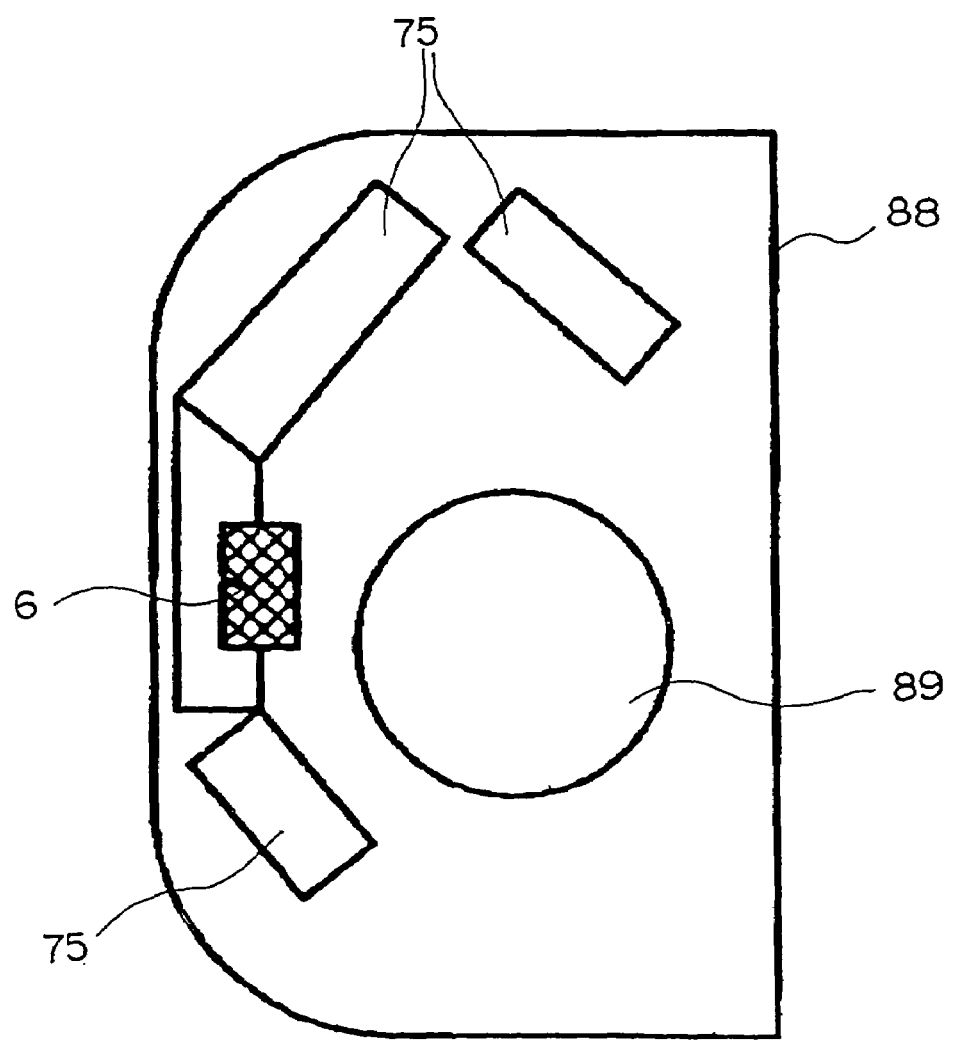
FIG. 16 is a sectional view of the indoor machine according to the embodiment 1 of the present invention.
Figure 17:
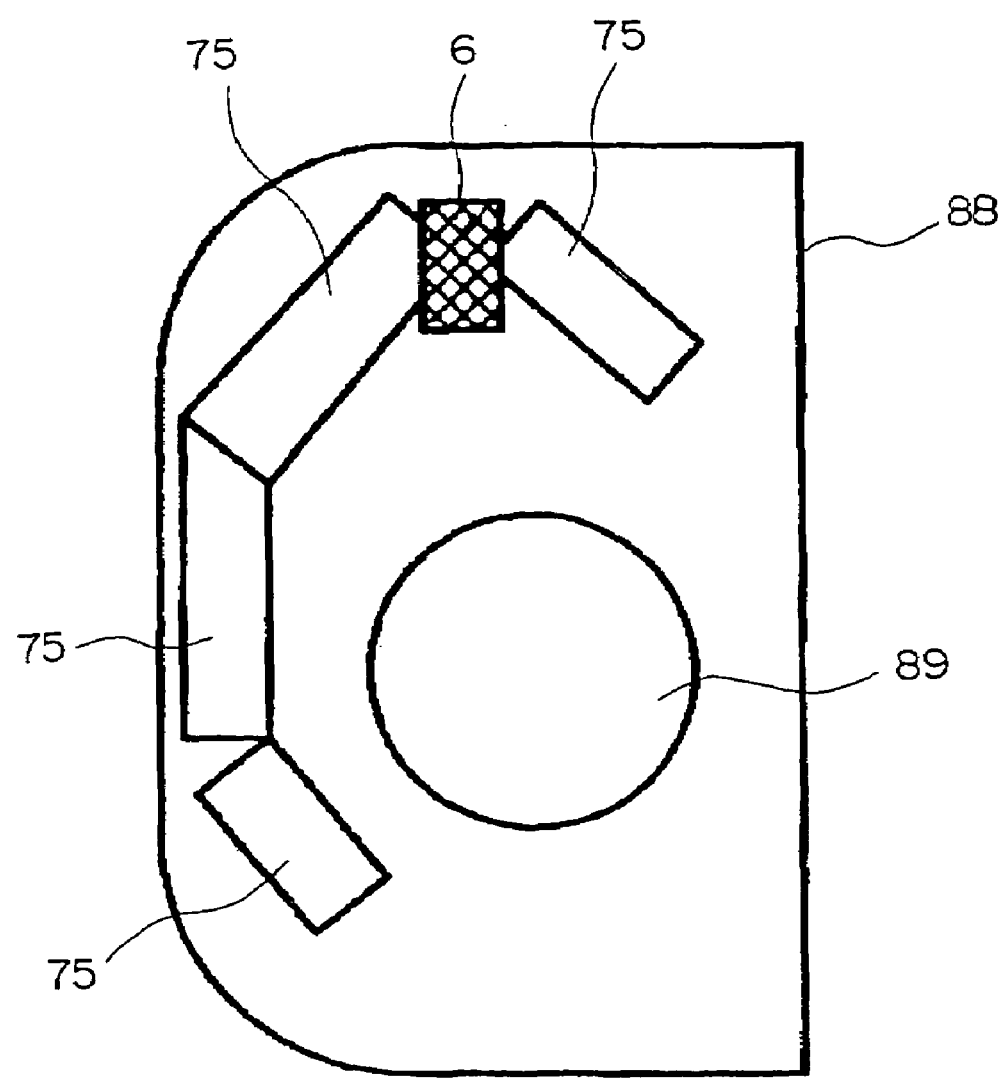
FIG. 17 is a sectional view of the indoor machine according to the embodiment 1 of the present invention.
Figure 18:
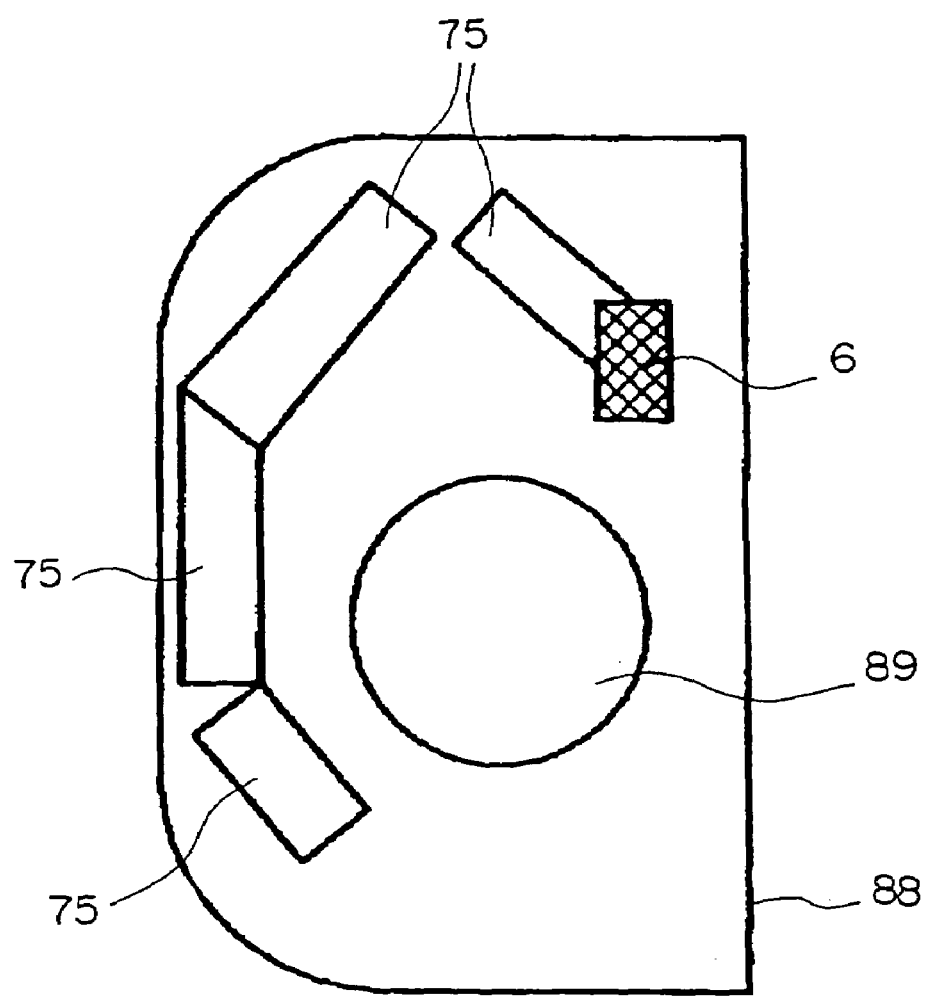
FIG. 18 is a sectional view of the indoor machine according to the embodiment 1 of the present invention.

FIGS. 14 and 15 are front elevational views of an indoor machine, from which a front cover is removed, of the refrigerating cycle apparatus, for example, an air conditioning apparatus, wherein numeral 6 denotes the second flow controller described above, 75 denotes a heat exchanger showing the first indoor heat exchanger 5 or the second indoor heat exchanger 7 disposed in the indoor machine, 74 denotes the controller described in FIG. 7, 73 denotes a fan motor for driving the fan of the indoor machine, and 88 denotes a cabinet as the outside enclosure of the indoor machine. Further, FIGS. 16, 17, and 18 are sectional views of the indoor machine of the air conditioning apparatus.

In the figures, 75 denotes the heat exchanger, 89 denotes a fan, and 88 denotes the cabinet of the indoor machine. When the throttle device 11 in the second flow controller 6 described in the present invention is disposed in the indoor machine, it can be disposed in the space between the heat exchanger 75 and the fan motor 73, the space between the heat exchanger 75 and the controller 74, and the like in the inside of the cabinet 88 of the indoor machine when viewed at a front position of the cabinet 88, as shown in FIG. 14. Further, when viewed at a position on the cross section of the cabinet 88, the throttle device 11 can be disposed on a front surface portion as shown in FIG. 16, on an upper portion of the cabinet 88 as shown in FIG. 17, on a rear side of the cabinet as shown in FIG. 18, and the like. That is, the throttle device of the embodiment can be disposed in any space without the need of any noise insulating material because it operates at low noise. Further, as shown in FIG. 15, the throttle device 11 can be disposed in the space between the heat exchanger 25 and the cabinet 88. The positions where it can be disposed are the same as those of FIGS. 16 to 18.

Further, since the throttle device 11 of the present invention operates with low noise, no noise absorbing material is necessary, and thus it can be disposed in any other unused space of the indoor machine of the air conditioning apparatus. Further, the throttle device 11 may be disposed in any direction, that is, horizontally, approximately at right angles, obliquely, and the like, with respect to the flow direction of the fluid (refrigerant). When the throttle device 11 is disposed approximately at right angles or obliquely, the fluid (refrigerant) may flow upward from a lower side or downward from an upper side.

Figure 19:
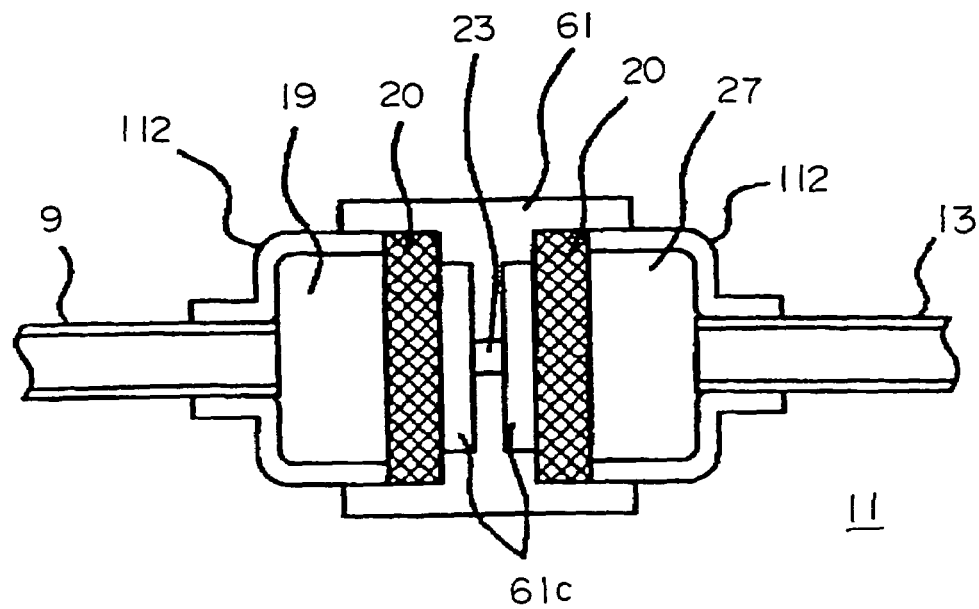
FIG. 19 is a sectional view of the throttle device according to the embodiment 1 of the present invention.

Further, presser members 112 shown in FIG. 19 may be used. FIG. 19 is a sectional view of the throttle device 11 showing an example of another structure. In the figure, numeral 112 denotes the presser members 112 which are made by press molding or drawing with the portions thereof connected to pipes being formed by burring. Since the portions of the presser members 112 connected to the pipes 9 and 13 are subjected to the burring, the presser members can be easily made by a press or the like, and thus, the throttle device can be obtained at low cost. Note that while the throttle device has been mainly described by diving it into the inlet side and the outlet side for the purpose of convenience, the throttle device is also described by using the same material and the same structure by denoting the porous permeable members by 20 and the predetermined space by 61c, for example, in consideration of a case in which the flow of refrigerant is inversed. Further, the expression that the orifice 23 has a function as a flow path or a passage for executing throttling by a small hole is also used.

Figure 20:
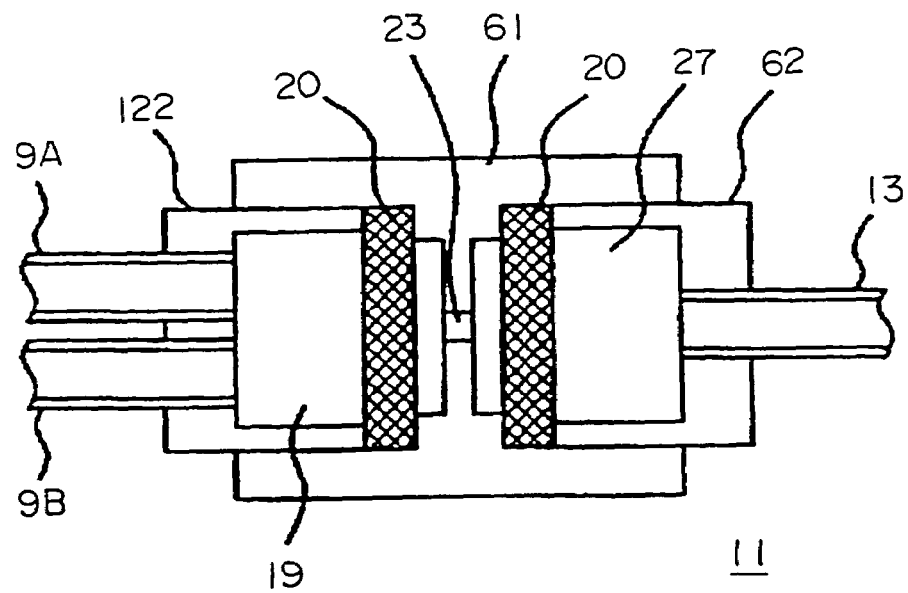
FIG. 20 is a sectional view of the throttle device according to the embodiment 1 of the present invention.
Figure 21:
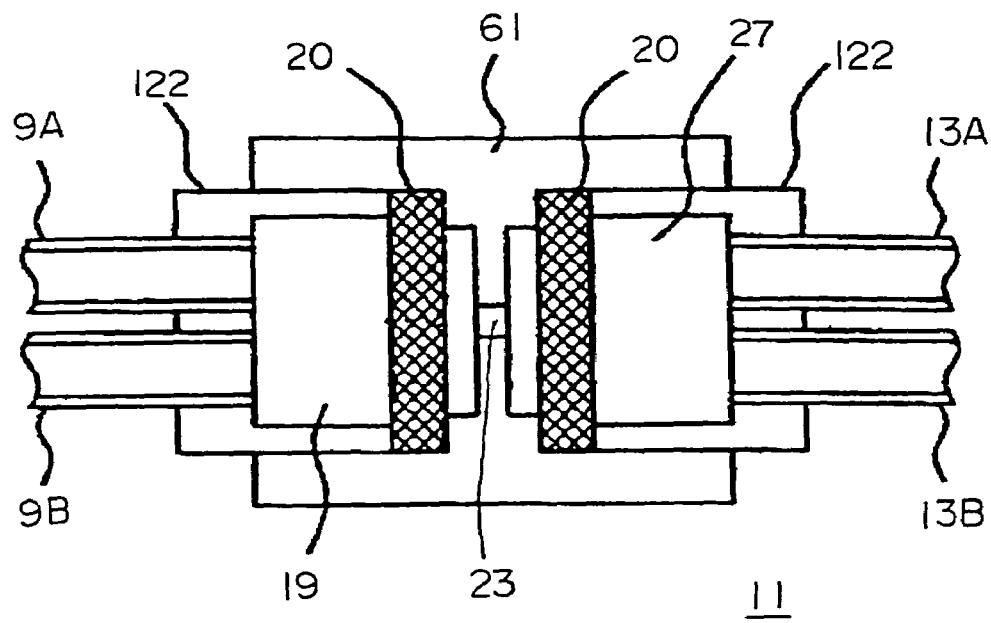
FIG. 21 is a sectional view of the throttle device according to the embodiment 1 of the present invention.

FIGS. 20 and 21 show sectional views of the throttle device 11 showing examples of another structures. In FIG. 20, numeral 122 denotes presser members to which the pipes 9A and 9B and the pipe 13 acting as flow paths are connected approximately in parallel with the flow direction of the main body 61. Further, in FIG. 21, the pipes 9A and 9B and the pipes 13A and 13B acting as flow paths are connected approximately in parallel with the flow direction of the main body 61. While the connecting pipes 9 and 13 are connected to the presser members 62 and 112 at each one position of the inlet and the outlet thereof, they may be connected thereto at two positions of the inlets and one position of the outlet as shown in FIG. 20 or at each two positions of the inlets and the outlets as shown in FIG. 21.

The pipes 9A, 9B, 13A, and 13B are connected to the spaces 19 and 27 in the insides of the presser members 122 approximately in parallel with the fluid (refrigerant) flow direction in the main body 61, and the throttle path 23 communicates with the pipes 9A, 9B, 13A, and 13B. Further, the connecting pipes may be connected from a plurality of positions of two or more positions on both the inlet and outlet sides. Further, the porous permeable members 20 are sandwiched between the presser members 62, or the like and the positioning projections 61b and pressed against and fixed to the main body 61 by the presser member 62, or the like in the fluid (refrigerant) flow direction in the main body. With the above arrangement, even if the heat exchanger has a plurality inlet pipes and outlet pipes, they can be connected to the throttle device 11 of the throttle device 6 as they are, which can reduce a processing and assembling time because it is not necessary to purposely arrange the respective inlet pipes and outlet pipes as a single inlet and outlet, respectively.

Figure 22:
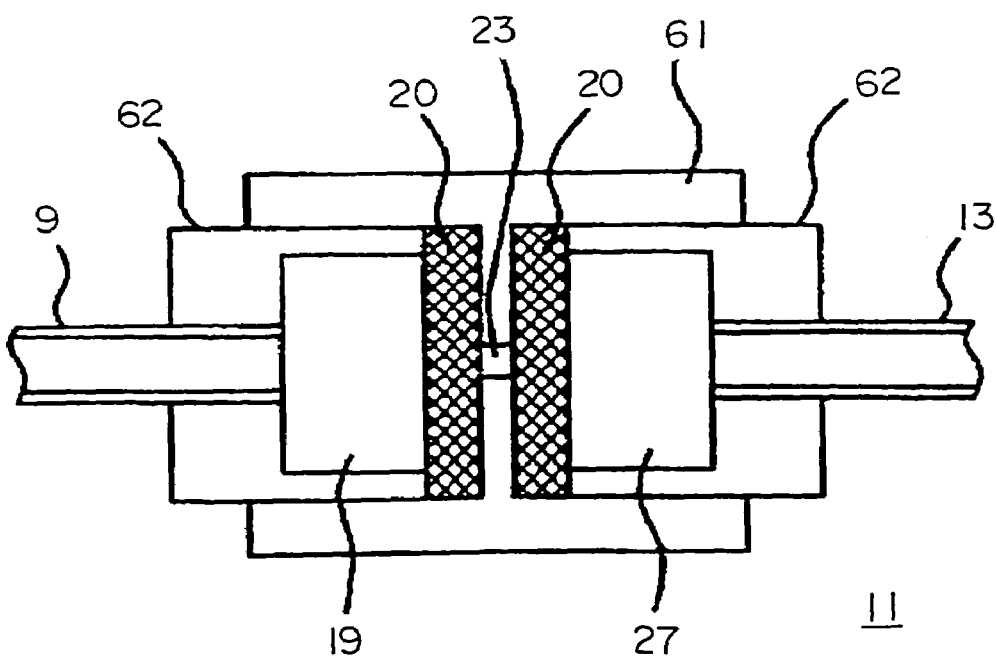
FIG. 22 is a sectional view showing an example of the throttle device according to the embodiment 1 of the present invention when no predetermined gap is provided.

Further, the same effect can be obtained even if the porous permeable members 20 are not formed into a disc shape but are formed into a polygonal shape. In this case, the same effect can be obtained even if the main body 61 and the presser members 62, 112, and 122 are not formed into a cylindrical shape but formed into a polygonal cylindrical shape. Further, while the predetermined gap 61c is defined between the orifice 23 and each porous permeable member 20, it may be omitted. FIG. 22 is a sectional view showing an example of the throttle device when the predetermined gap 61c is not defined. When the predetermined gap (the predetermined gap 61c described in FIG. 4) is not defined between the orifice 23 and each porous permeable member 20 as shown in FIG. 22, it is not necessary to provide the positioning projections 61b, and thus a less expensive throttle device can be obtained. Further, while the present invention has been described with reference to the case in which the throttle device 11 is applied to the second flow controller, it is needless to say that the same effect can be obtained even if it is applied to the first flow controller 4.

Figure 23:
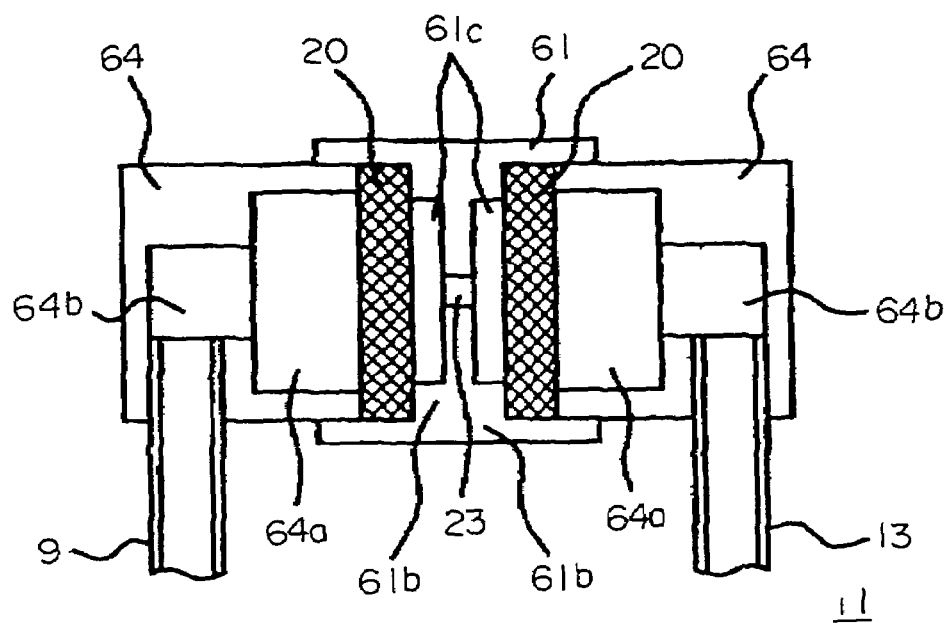
FIG. 23 is a sectional view of the throttle device according to the embodiment 1 of the present invention.

FIGS. 23, 24, 25, and 26 are sectional views of the throttle device having another structures, wherein the same components are denoted by the same reference numerals and the description thereof is omitted. In FIG. 23, 20 denotes the porous permeable members, 61 denotes the main body having the through hole of a small diameter acting as the orifice 23 and formed into, for example, a disc shape or a columnar shape, 64 denotes the presser members inserted into the main body 61 from the fluid (refrigerant) flow direction side in the main body 61 and having inner spaces 64a and 64b and the flow paths (for example, pipes) 9 and 13 for communicating the inner spaces 64b with the outside. The pipes 9 and 13 acting as the flow paths are connected to the inner spaces 64b of the presser members 64 in a direction approximately at right angles to the fluid (refrigerant) flow direction in the main body 61 so as to cause the orifice 23 to communicate with the outside. With this arrangement, the disposition and arrangement of the second flow controller 6 described with reference to FIGS. 2 to 4 and the disposition and arrangement of the throttle device 6 in the air conditioning apparatus are made flexible, and thus the positions of the throttle device and the pipes can be selected according to the places where they are disposed.

Then, the dimension of the orifice 23 is determined according to a necessary amount of throttling within the range of an inside diameter of 0.5 mm to 2 mm and a length of 1 mm to 4 mm. The positioning projections 61b, which are formed into, for example, a ring shape, are disposed in the main body 61 in the fluid (refrigerant) flow direction so as to define the predetermined gaps 61c between the orifice 23 and the porous permeable members 20. The area where the fluid (refrigerant) passes through the porous permeable members 20 can be largely and effectively utilized by the provision of the predetermined gaps 61c, whereby even if foreign matters are mixed in the fluid (refrigerant), durability to clogging due to the foreign matters can be improved. The provision of the positioning projections 61b permits the porous permeable members 20 and the presser members 62 to be positioned easily and reliably, and thus an assembling performance can be improved. Further, it is not necessary to separately provide a filter in the refrigerant circuit, and thus a reliable refrigerating cycle apparatus can be obtained at low cost.

The height of the positioning projections 61b is set such that the inside diameter of the ring-shaped positioning projection 61b is set to 10 mm to 20 mm and the gap 61c between each porous permeable member and the orifice 23 is set to 5 mm or less. The porous permeable members 20 are pressed against, inserted into and fixed to the main body 61 by the presser members 64 inserted into the main body 61 from the fluid (refrigerant) flow direction in a manner that they are sandwiched between the positioning projections 61b. The porous permeable members 20 have the vent holes whose diameter is set to 100 μm to 500 μm and the thickness of 1 mm to 10 mm, and foamed metal composed of Ni, Ni—Cr, or stainless steel is used for the porous permeable members 20. Further, the main body 61 and the presser members 64 are made by cutting or forging metal such as copper, brass, aluminum, stainless steel, or the like.

Figure 24:
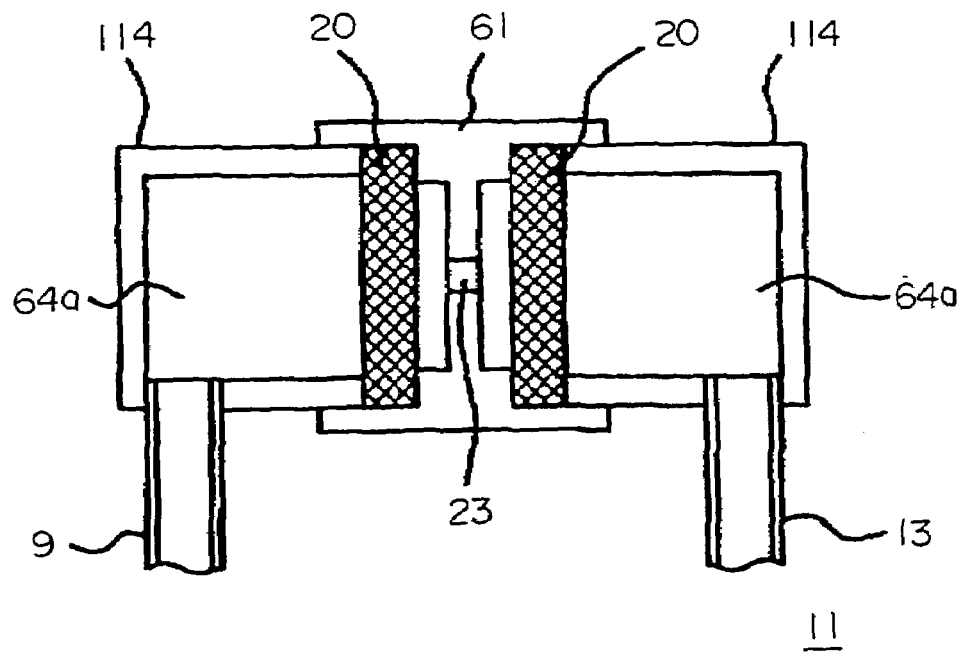
FIG. 24 is a sectional view of the throttle device according to the embodiment 1 of the present invention.
Figure 25:
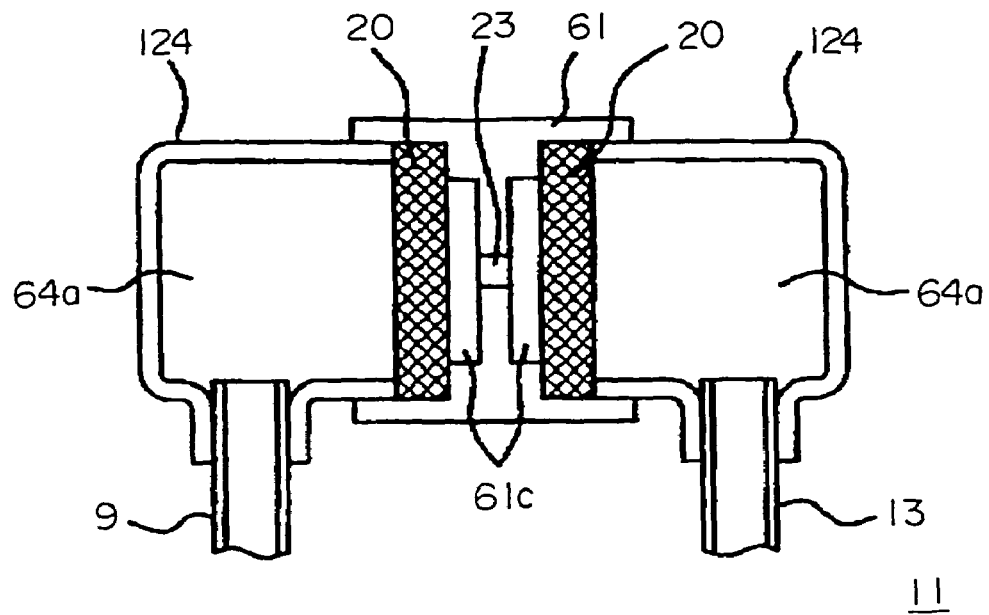
FIG. 25 is a sectional view of the throttle device according to the embodiment 1 of the present invention.
Figure 26:
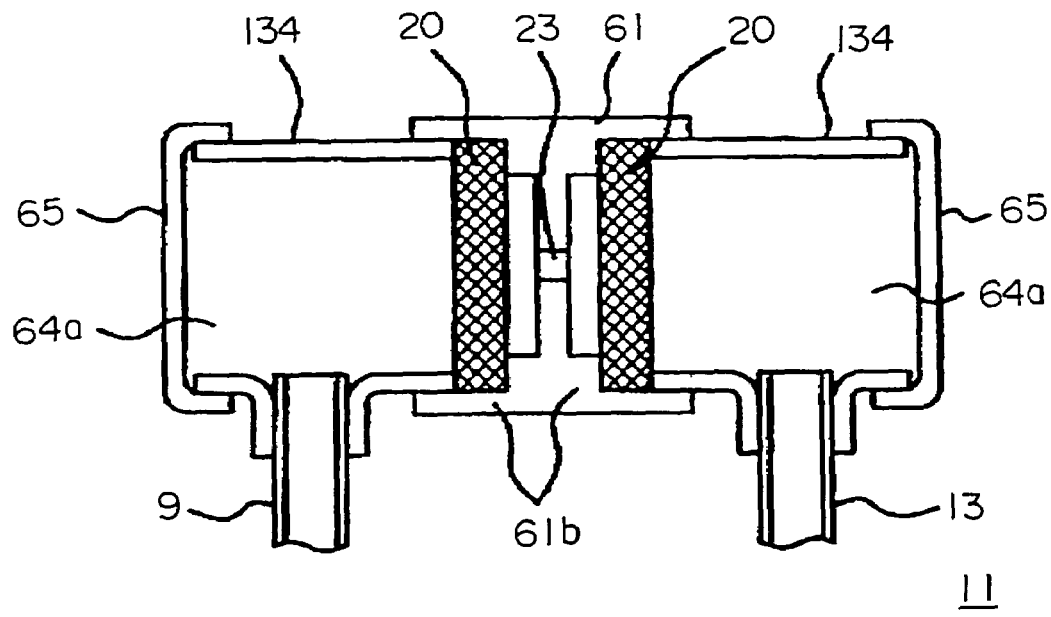
FIG. 26 is a sectional view of the throttle device according to the embodiment 1 of the present invention.

Further, the inner spaces 64b may be omitted, as shown in FIG. 24. In the figure, numeral 114 denotes presser members, and the throttle device 11 has such a structure that the pipes 9 and 13 acting as the flow paths directly communicate with inner spaces 64a. The inner spaces 64a as shown in FIG. 23 need not be provided, and this permits a processing time to be reduced; whereby a less expensive throttle device can be obtained. Further, the flow paths may be formed by burring as shown in FIG. 25. In the figure, 124 denotes presser members, and the portions thereof connected to the pipes 9 and 13 acting as the flow paths are formed by burring.

Accordingly, since the presser members 124 can be easily made by a press, and the like, a less expensive throttle device can be obtained. Further, in FIG. 26, numeral 134 denotes the presser members to which the pipes 9 and 13 acting as the flow paths are connected, and 65 denotes lids. As shown in the figure, since cylindrical pipe members are used as the presser members 134 and the lids 15 are joined thereto, commercially available pipes can be used, and thus a less expensive throttle device can be obtained. Further, the same effect can be obtained by the provision of the lids 65 or the pipes 9 and 13.

Figure 27:
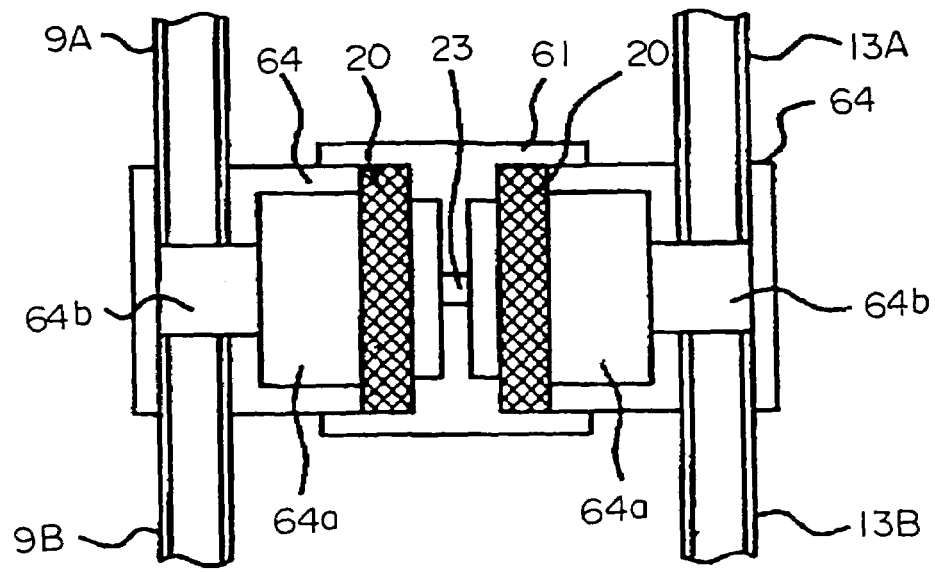
FIG. 27 is a sectional view of the throttle device according to the embodiment 1 of the present invention.
Figure 28:
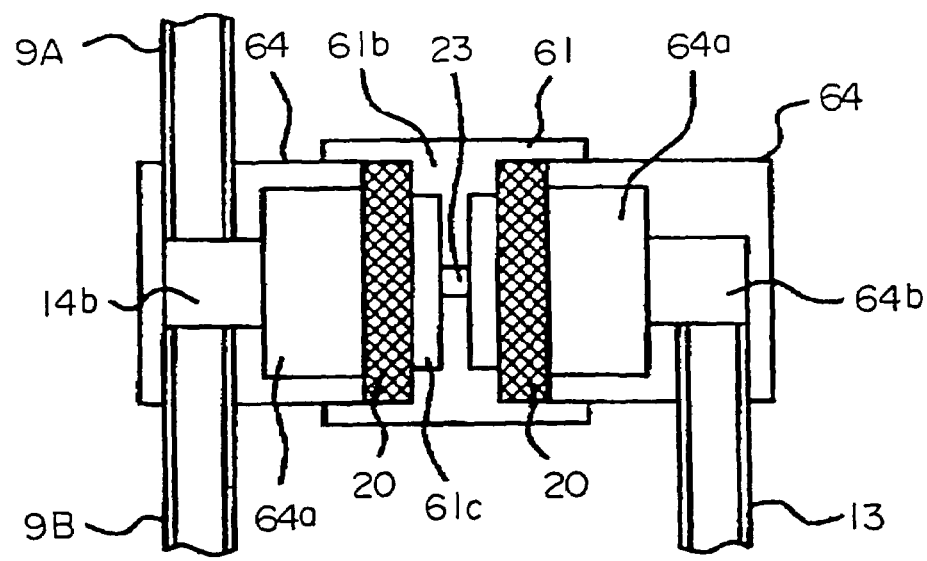
FIG. 28 is a sectional view of the throttle device according to the embodiment 1 of the present invention.

Further, while each one flow path is disposed at the inlet and the outlet in this structure, a plurality of flow paths may be provided thereat as shown in FIGS. 27 and 28. FIGS. 27 and 28 are sectional views of the throttle device 11 showing examples of another structures. In FIG. 27, 9A, 9B, 13A, and 13B denote the pipes acting as the flow paths, and 64 denotes the presser members to which the pipes 9A to 13B are connected. The pipes 13A and 13B are connected to the inner spaces 64b of the presser members 64 approximately at right angles to the fluid (refrigerant) flow direction in the main body 61, and the throttle path 23 communicates with the pipes 9A to 13B.

The porous permeable members 20 are sandwiched between the presser members 64 and the positioning projections 61b and pressed against and fixed to the main body 61 by the presser members 64 in the fluid (refrigerant) flow direction in the main body. Further, while the four pipes 9 and 13 are provided in FIG. 27, the three pipes 9A, 9B, and 13B may be provided, as shown in FIG. 28. With the above arrangement, even if the heat exchanger has a plurality inlet pipes and outlet pipes, they can be connected to the throttle device 11 as they are, which can reduce a processing and assembling time because it is not necessary to purposely arrange the respective inlet pipes and outlet pipes as a single inlet and outlet.

Note that the same effect can be obtained even if the porous permeable members 20 are composed of the sintered metal made by sintering metal powder, the porous permeable member composed of ceramics, the metal wiring netting, the member formed by superimposing the plurality of metal wiring nettings, and the sintered metal wire nettings made by sintering the plurality of superimposed metal wire nettings, in addition to the foamed metal.

The porous permeable members 20 need not be formed into the disc shape, and the same effect can be obtained even if they are formed into the polygonal shape. Further, the same effect can be obtained even if the presser members 64 are formed into the polygonal cylindrical shape instead of the cylindrical shape.

Figure 29:
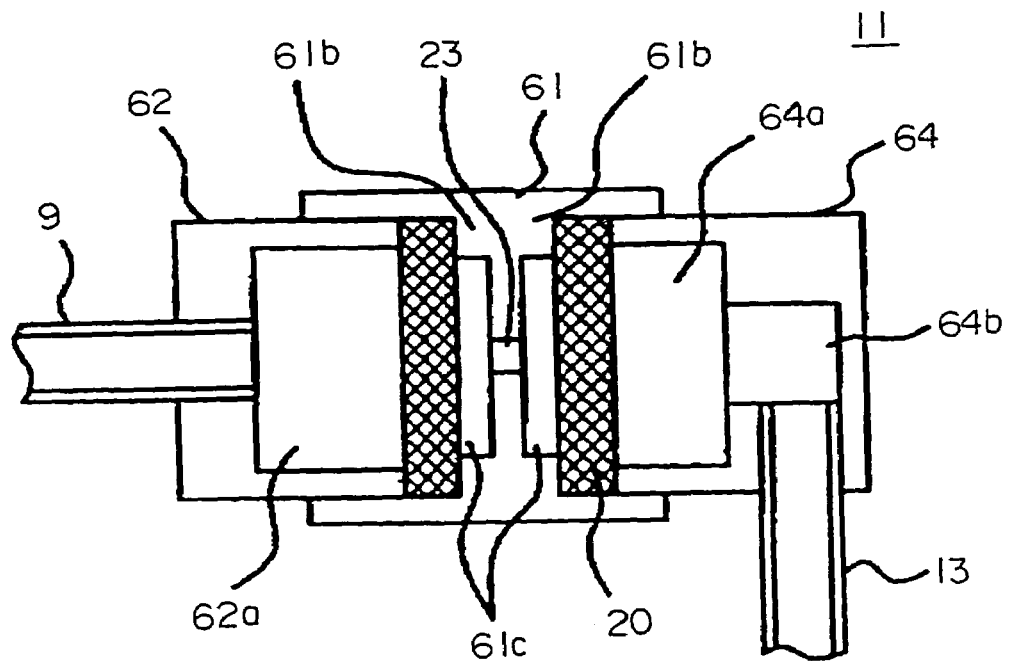
FIG. 29 is a sectional view of the throttle device according to the embodiment 1 of the present invention.

FIGS. 29, 30, 31, and 32 are sectional views of the throttle device having another structures, wherein the same components as those described above are denoted by the same reference numerals and the description thereof is omitted. In FIG. 29, 20 denotes the porous permeable members, 61 denotes the cylindrical main body integral with a disc-shaped plate having the throttle path 23 acting as the orifice, 62 denotes presser members inserted into the main body 61, the pipe 9 acting as the flow path is connected to one of the presser members 62 approximately in parallel with the fluid (refrigerant) flow direction in the main body 61, and the pipe 13 is connected to the other of the presser members 64 approximately at right angles to the fluid (refrigerant) flow direction in the main body 61. With this arrangement, the layout of the throttle device can be simplified.

In the main body 61, the ring-shaped positioning projections 61b are disposed before and behind the throttle path 23 in the flow direction such that the predetermined gaps 61c are defined between the throttle path 23 and the porous permeable members 20. The ring-shaped positioning projections 61b have an inside diameter set to 10 mm to 20 mm. Further, the inside diameter of the orifice 23 is set to 0.5 mm to 2 mm, the length thereof is set to 1 mm to 4 mm, and the dimension of the orifice is determined within the above ranges according to a necessary amount of throttling of the fluid (refrigerant). The amount of projection of the positioning projections 61b is set such that the gaps 61c between the porous permeable members 20 and the orifice 23 are set within the range of 5 mm or less. In an experiment, a noise reducing effect was obtained when the gaps 61c were set within the above range.

The porous permeable members 20 are positioned in the fluid (refrigerant) flow direction by being abutted against the ring-shaped positioning projections 61b. Further, the porous permeable members 20 are fixed in the state in which they are pressed-against the ring-shaped positioning projection 61b sides by the presser members 62 and 64 having the flow paths 9 and 13 on the surface thereof on the orifice 23 side and the surface thereof on the side opposite to the orifice 23. The presser members 62 and 64 have the spaces 62a each having an inside diameter larger than the inside diameter of the flow paths 9 and 13 and a predetermined length, are inserted into and joined to the main body 61, and also fix the porous permeable members in place 20. The foamed metal composed of Ni, Ni—Cr, or stainless steel, which has the vent holes whose average diameter is set from about 100 μm to 500 μm and has the thickness of about 1 mm to 10 mm, is used for the porous permeable members 20. Further, the main body 61 and the presser member 62 are made by cutting or forging metal such as copper, brass, aluminum, stainless steel, or the like.

Figure 30:
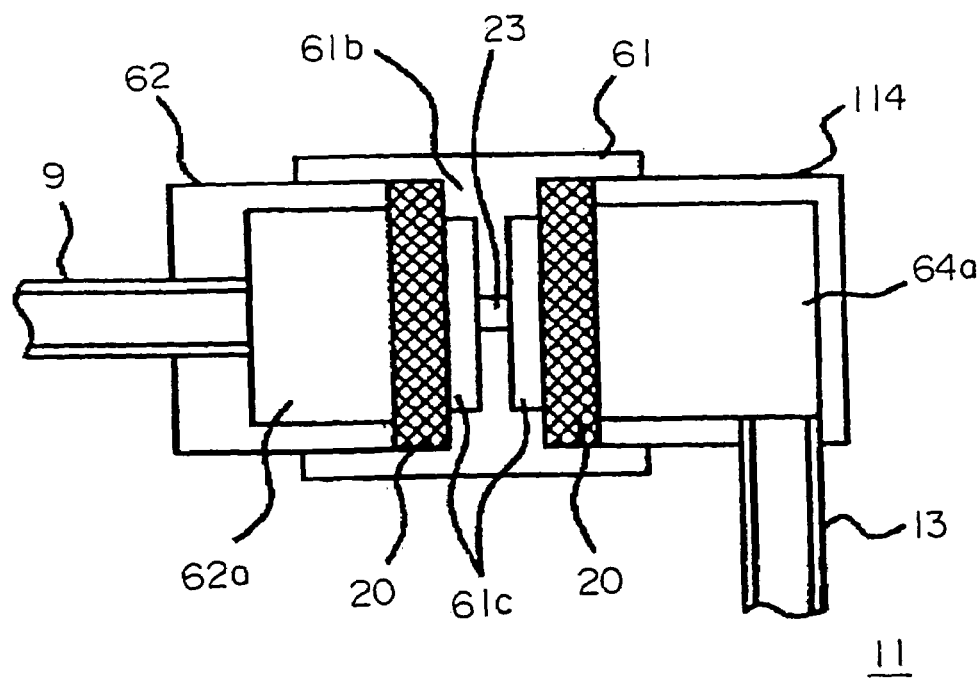
FIG. 30 is a sectional view of the throttle device according to the embodiment 1 of the present invention.
Figure 31:
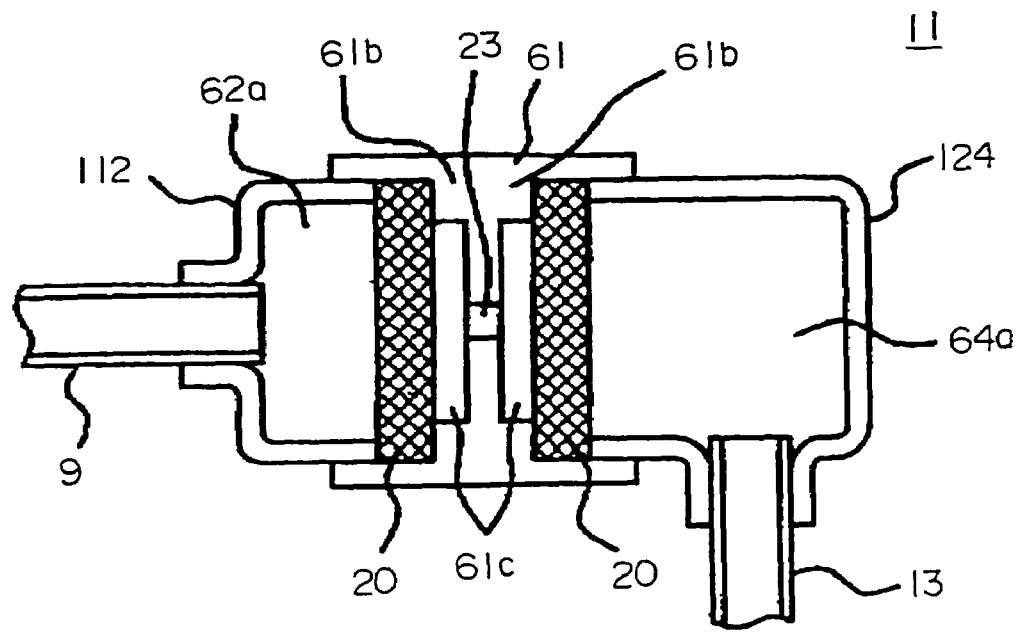
FIG. 31 is a sectional view of the throttle device according to the embodiment 1 of the present invention.

The inner space 64b shown in FIG. 29 may be omitted, as shown in FIG. 30. In FIG. 30, numeral 114 denotes the presser member having such a structure that the pipe 13 acting as the flow path directly communicates with the inner space 64a, which makes the inner space 64b shown in FIG. 29 unnecessary. Thus, a less expensive throttle device can be obtained because a processing time can be reduced. Further, the presser members 112 and 124 shown in FIG. 31 may be used. In the figure, 112 and 124 denote the presser members which are made by press molding or drawing with the portions thereof connected to the pipes 9 and 13 being subjected to burring. Since the portions of the presser members 112 and 124 connected to the pipes 9 and 13 are subjected to the burring, the presser members 112 and 124 can be easily made by a press or the like, and thus a less expensive throttle device can be obtained.

Figure 32:
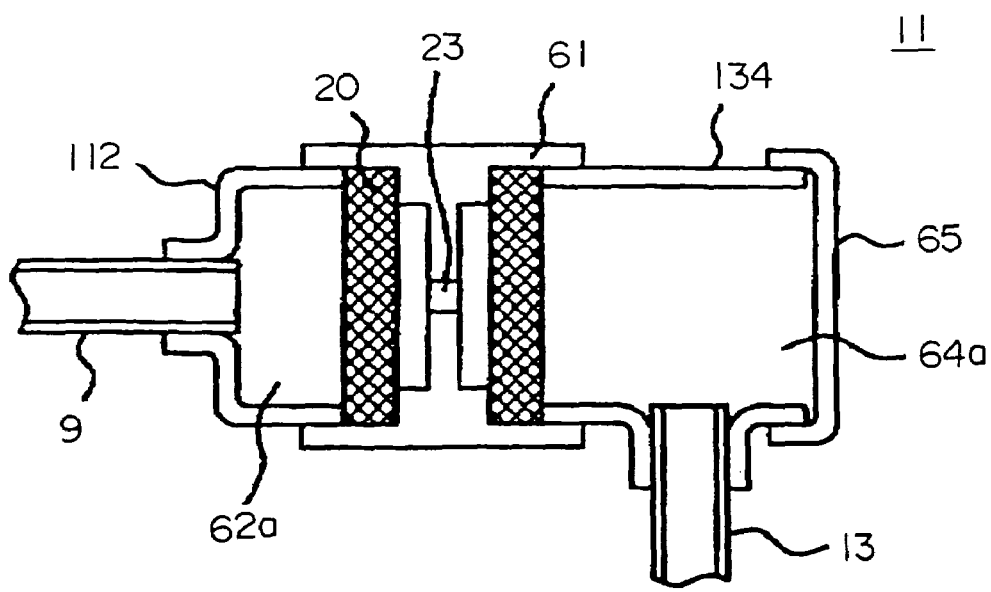
FIG. 32 is a sectional view of the throttle device according to the embodiment 1 of the present invention.

In FIG. 32, numeral 112 denotes the presser member to which the pipe 9 acting as the flow path is connected approximately in parallel with the flow direction of the main body, 134 denotes the presser member to which the pipe 13 acting as the flow path is connected approximately at right angles to the flow direction of the main body, and 65 denotes the lid. As shown in the figure, since the lid 65 is joined to the presser member 134 made of a cylindrical pipe, or the like, commercially available pipes can be used, and thus a less expensive throttle device can be obtained. Further, the same effect can be obtained by the provision of the lids 15 on the pipes 9 and 13.

Figure 33:
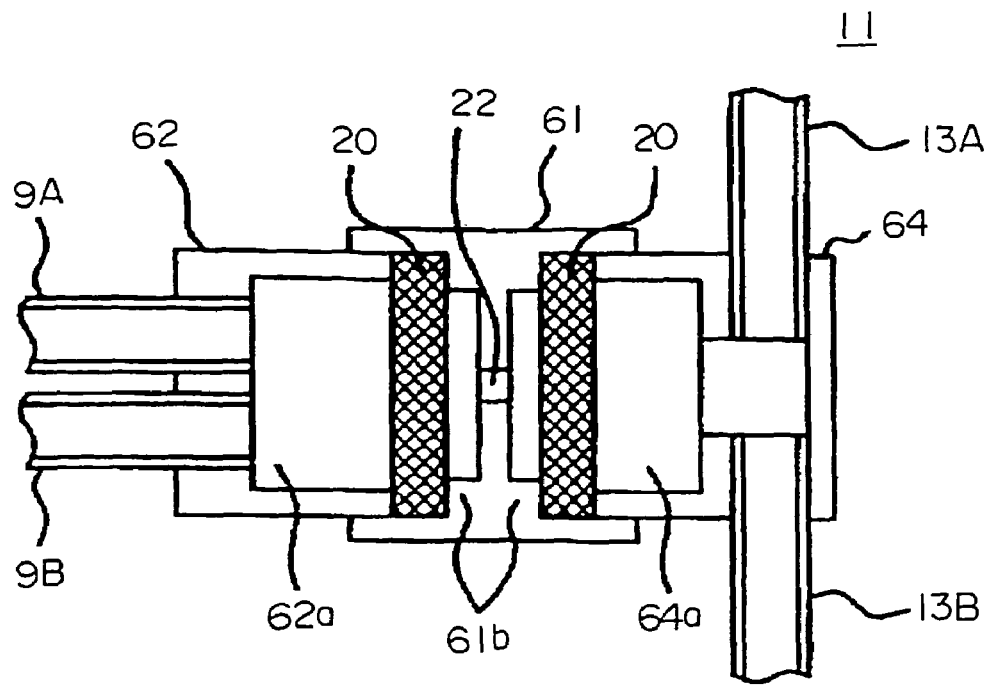
FIG. 33 is a sectional view of the throttle device according to the embodiment 1 of the present invention.
Figure 34:
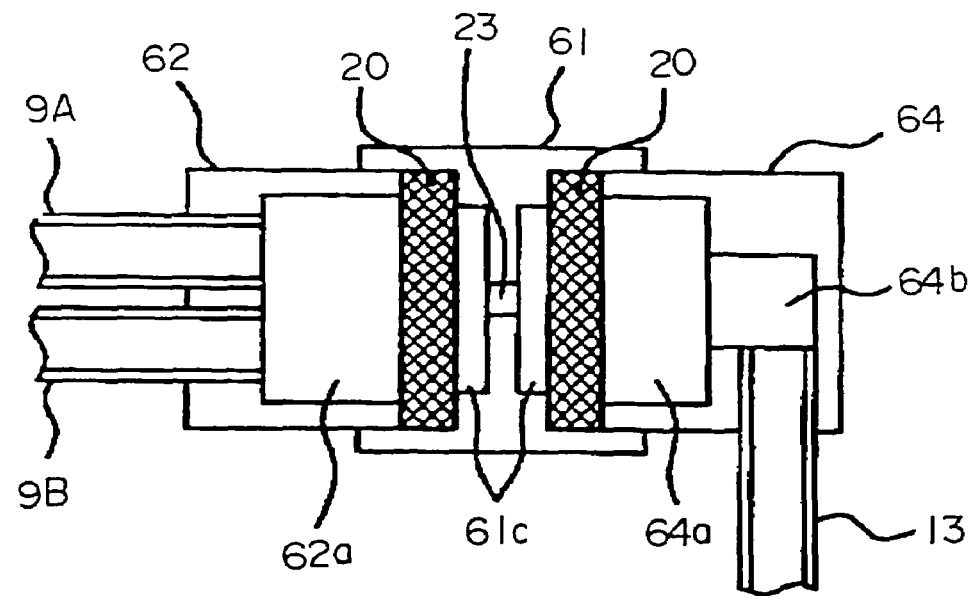
FIG. 34 is a sectional view of the throttle device according to the embodiment 1 of the present invention.
Figure 35:
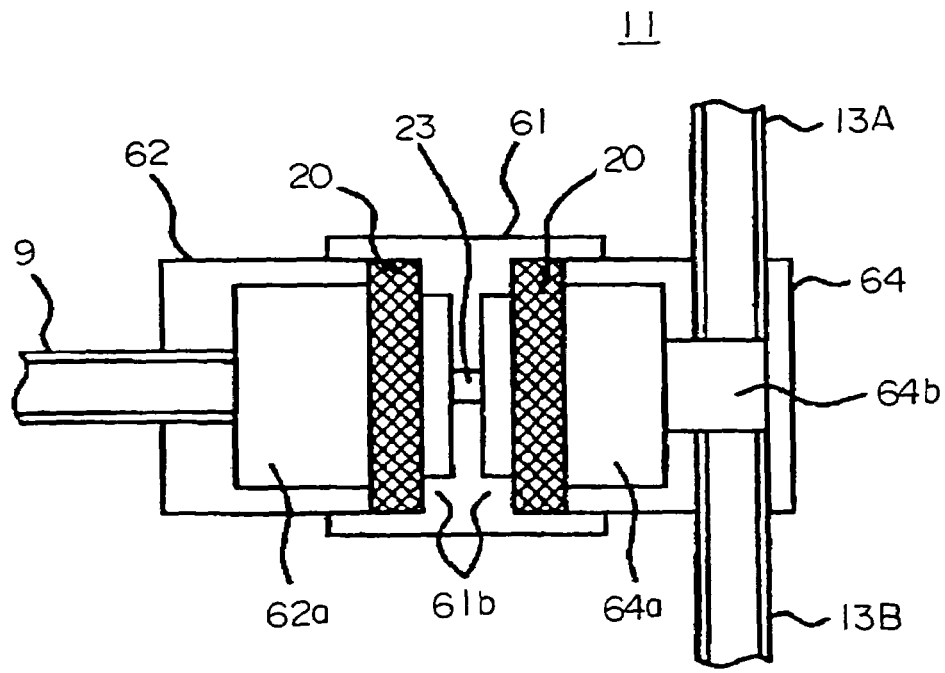
FIG. 35 is a sectional view of the throttle device according to the embodiment 1 of the present invention.

Further, the inlet and the outlet of the fluid (refrigerant) to the throttle device 11 is disposed at each one position in this example. However, the inlet and the outlet may be disposed at a plurality of positions, as shown in FIGS. 33, 34 and 35. FIGS. 33, 34, and 35 are sectional views of the throttle device showing another structures, wherein the same components as those described above are denoted by the same reference numerals and the description thereof is omitted. In FIG. 33, 9A, 9B, 13A, and 13B denote the pipes acting as the flow paths, 62 denotes the presser members to which the pipes 9A and 9B are connected, and 64 denotes the presser member to which the pipes 13A and 13B are connected. The pipes 9A and 9B are connected to the inner space 62a of the presser member 62 approximately in parallel with the fluid (refrigerant) flow direction in the main body 61, the pipes 13A and 13B are connected to the inner space 64b of the presser member 64 approximately at right angles to the fluid (refrigerant) flow direction in the main body 61, and the throttle path 23 communicates with the pipes 9A, 9B, 13A, and 13B.

The porous permeable members 20 are sandwiched between the presser members 62 and 64 and the positioning projections 61b and pressed against and fixed to the main body 61 by the presser members 62 and 64 in the fluid (refrigerant) flow direction in the main body 61. Further, while the four pipes 9 and 13 are provided in FIG. 33, the three pipes 9A, 9B, and 13 may be provided, as shown in FIG. 34 or the three pipes 9, 13A, and 13B may be provided, as shown in FIG. 35. With the above arrangement, even if the heat exchanger has a plurality of inlet pipes and outlet pipes, they can be connected to the throttle device 11 as they are, and this can reduce a processing and assembling time because it is not necessary to purposely arrange these pipes as a single pipe.

Note that the same effect can be obtained even if the porous permeable members 20 are composed of the sintered metal made by sintering metal powder, the porous permeable member composed of ceramics, the metal wire netting, the members formed by superimposing the plurality of metal wire nettings, and the sintered metal wire netting made by sintering the plurality of superimposed metal wire nettings, in addition to the foamed metal.

Further, the porous permeable members 20 need not be formed into the disc shape, and the same effect can be obtained even if they are formed into the polygonal shape. Further, the same effect can be obtained even if the presser members 62 and 64 and the main body 61 are formed into the polygonal cylindrical shape, or the like in place of the cylindrical shape.

As described above, the flow paths 9 and 13 of the pipes communicating with the two spaces 62a and 64a can be taken out from any of the direction approximately in parallel with the fluid (refrigerant) flow direction in the main body 61 and the direction approximately at right angles thereto. Accordingly, the throttle device can be easily assembled to any of the apparatuses such as the refrigerating cycle apparatus without the need of bending the assembly pipes, and this can reduce an assembly time.

Figure 36:
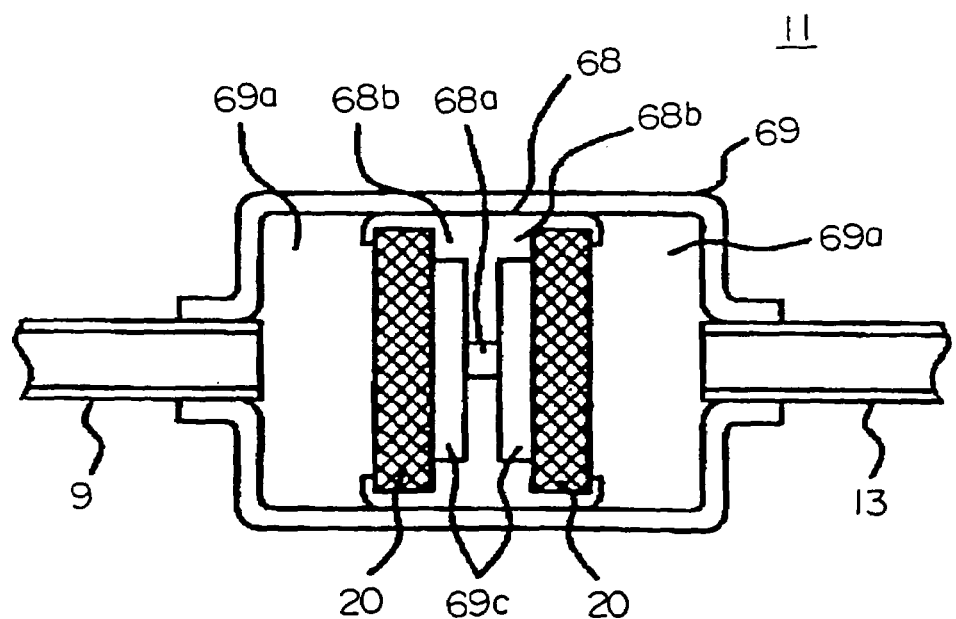
FIG. 36 is a sectional view of the throttle device according to the embodiment 1 of the present invention.
Figure 37:
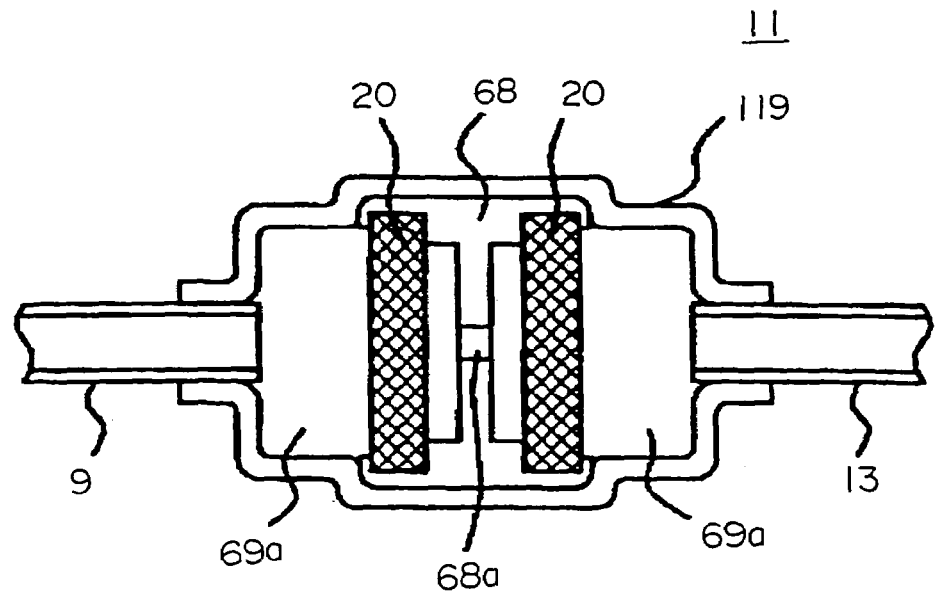
FIG. 37 is a sectional view of the throttle device according to the embodiment 1 of the present invention.

FIGS. 36 and 37 are sectional views of the throttle device having different structures, which is connected to the refrigerating circuit similar to that described above. In the figures, numeral 20 denotes the porous permeable members, numeral 68 denotes an orifice component having a throttle path 68a acting as the orifice and formed into, for example, a cylindrical shape, and the porous permeable members 20 are inserted into and fixed to both the sides of the throttle path 68a by press fitting, caulking, or the like. The dimension of the orifice 68a is determined according to a necessary amount of throttling within the range of an inside diameter of 0.5 mm to 2 mm and a length of 1 mm to 4 mm.

Note that the positioning projections 68b formed into, for example, the ring shape are disposed before and behind the throttle path 68a of the orifice component 68 in the fluid (refrigerant) flow direction to define the predetermined gaps 68c between the orifice 68a and the porous permeable members 20. The inside diameter of the positioning projections 68b is set to 10 mm to 20 mm, and the height of the positioning projections 68b is set such that the gaps 68c between the porous permeable member 20s and the orifice 68a are set to 5 mm or less. Then, the orifice component 68 to which the porous permeable members 20 are fixed integrally therewith is fixed to the main body 69 formed into, for example, a pipe shape by press fitting, shrinkage fit, or the like, and the interior of the main body 69 is divided into two spaces 69a and 69a. The ring-shaped positioning projections 68b may be arranged integrally with or separately from the orifice component 68. Accordingly, the orifice 68a and the porous permeable members 20 can be assembled to the main body in a previously assembled state, which improves an assembly performance as well as a reliable apparatus can be obtained.

Further, flow paths are formed in the main body 69 by drawing both the ends thereof after the orifice component 68 has been inserted into and fixed in the main body 69, and the pipes 9 and 13 are connected to the flow paths approximately in parallel with the fluid (refrigerant) flow direction. At the time, the spaces between the porous permeable members 20 and the pipes 9 and 13 have a predetermined distance and a predetermined inside diameter. Note that a foamed metal composed of Ni, Ni—Cr, or stainless steel, which has the vent holes whose diameter is set from 100 μm to 500 μm and has the thickness of 1 mm to 10 mm, is used for the porous permeable members 20. Further, the orifice component 68 is made by cutting or forging copper, brass, aluminum, or stainless steel.

As shown in FIG. 37, after the orifice component 68 is inserted into the main body 69, the main body 69 may be drawn as shown in FIG. 37 and the orifice component 68 may be fixed thereto. In the figure, 20 denotes the porous permeable members, 68 denotes the orifice component having the porous permeable members 20 fixed before and behind the orifice 68a, and 69 denotes the main body made slightly larger than the outside diameter of the orifice component 68. Then, after the orifice component 68 has been inserted into the main body 69, the main body 69 is drawn at the positions thereof corresponding to both the ends of the orifice component 68 to thereby fix the orifice component 68 to the main body 69.

Accordingly, since the orifice component 68 can be simply inserted into the main body 69 without the need of press fitting or shrinkage fit, which improves the assembling performance as well as reduces the manufacturing time of the throttle device. Further, while the inlet and outlet of the fluid (refrigerant) are disposed at each one position in this structure, it is sufficient that both the inlet and outlet are disposed at least each one position, as described above, and may be disposed at a plurality of positions exceeding one position. Further the inlet and outlet may be disposed in a reverse flow direction.

Figure 38:
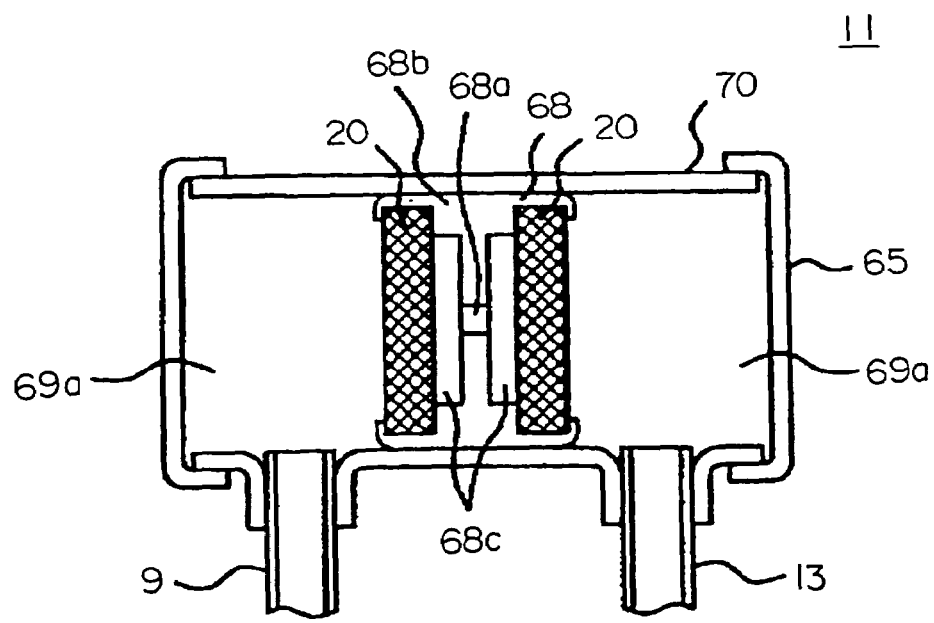
FIG. 38 is a sectional view of the throttle device according to the embodiment 1 of the present invention.
Figure 39:
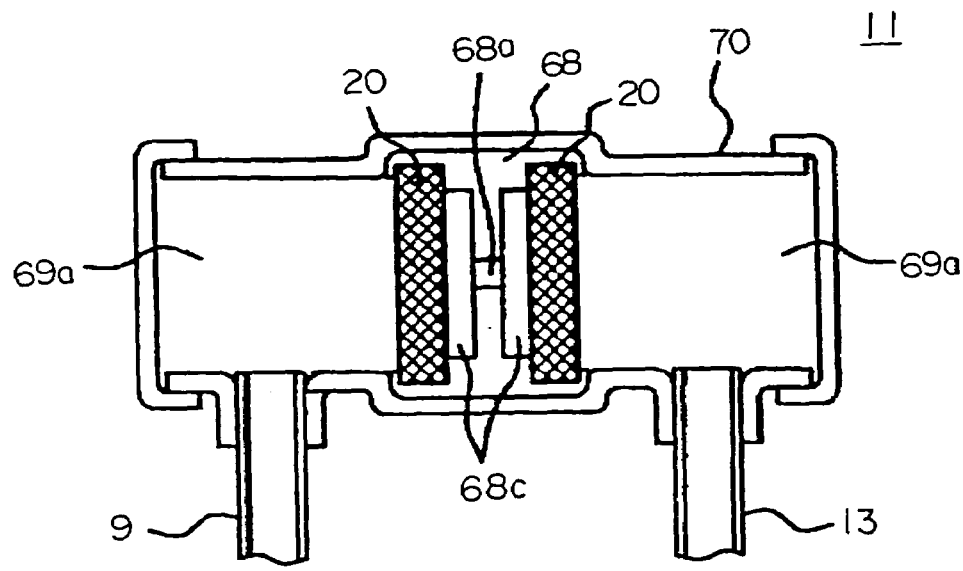
FIG. 39 is a sectional view of the throttle device according to the embodiment 1 of the present invention.

FIGS. 38 and 39 are sectional views of different throttle devices that are connected to the refrigerating circuit similar to that described above. In the figures, numeral 20 denotes the porous permeable members, 68 denotes the orifice component having the throttle path 68a acting as the orifice and formed into, for example, the cylindrical shape, and the porous permeable members 20 are inserted into and fixed to both the sides of the throttle path 68a by press fitting, caulking, or the like. The dimension of the orifice 68a is determined according to a necessary amount of throttling within the range of the inside diameter of 0.5 mm to 2 mm and the length of 1 mm to 4 mm.

Note that the positioning projections 68b formed into, for example, the ring shape are disposed before and behind the throttle path 68a of the orifice component 68 in the fluid (refrigerant) flow direction to define the predetermined gaps 68c between the orifice 68a and the porous permeable members 20. The inside diameter of the positioning projections 68b is set to 10 mm to 20 mm, and the height of the positioning projections 68b is set such that the gaps 68c between the porous permeable member 20 and the orifice 68a are set to 5 mm or less. Then, the orifice component 68, to which the porous permeable members 20 are fixed integrally therewith, is fixed to a main body 70 formed into, for example, a pipe shape by press fitting, shrinkage fit, or the like. The ring-shaped positioning projections 68b may be arranged integrally with or separately from the orifice component 68.

After the orifice component 68 has been inserted into and fixed to the main body 70, the lids 65 are airtightly joined to both the ends of the main body 70. The flow paths are formed in the main body 70 in a direction approximately at right angles to the fluid (refrigerant) flow direction in the main body 70 by subjecting the main body 70 to burring, and the pipes 9 and 13 are connected to the flow paths at approximately right angles to the fluid (refrigerant) flow direction. At the time, the spaces between the porous permeable members 20 and the pipes 9 and 13 have a predetermined distance and a predetermined inside diameter. Note that the foamed metal composed of Ni, Ni—Cr, or stainless steel, which has the vent holes whose diameter is set from 100 μm to 500 μm and has the thickness of 1 mm to 10 mm, is used for the porous permeable members 20. The orifice component 68 is made by cutting or forging copper, brass, aluminum, or stainless steel.

Further, as shown in FIG. 39, after the orifice component 68 is inserted into the main body 70, the main body 70 may be drawn and the orifice component 68 may be fixed thereto. In the figure, numeral 20 denotes the porous permeable members, 68 denotes the orifice component having the porous permeable members 20 fixed before and behind the orifice 68a, and 70 denotes the main body made slightly larger than the outside diameter of the orifice component 68. Then, after the orifice component 68 is inserted into the main body 70, the main body 70 is drawn at the positions thereof corresponding to both the ends of the orifice component 68 to thereby fix the orifice component 68 to the main body 70.

Accordingly, since the orifice component 68 can be simply inserted into the main body 70 without the need of press fitting or shrinkage fit, which improves the assembling performance as well as reduces the manufacturing time of the throttle device. Further, while the inlet and outlet of the fluid (refrigerant) are disposed at each one position, it is sufficient that both the inlet and outlet are disposed at least one position, as described above and may be disposed at a plurality of positions exceeding one position. Further the inlet and outlet may be disposed in a reverse flow direction.

Figure 40:
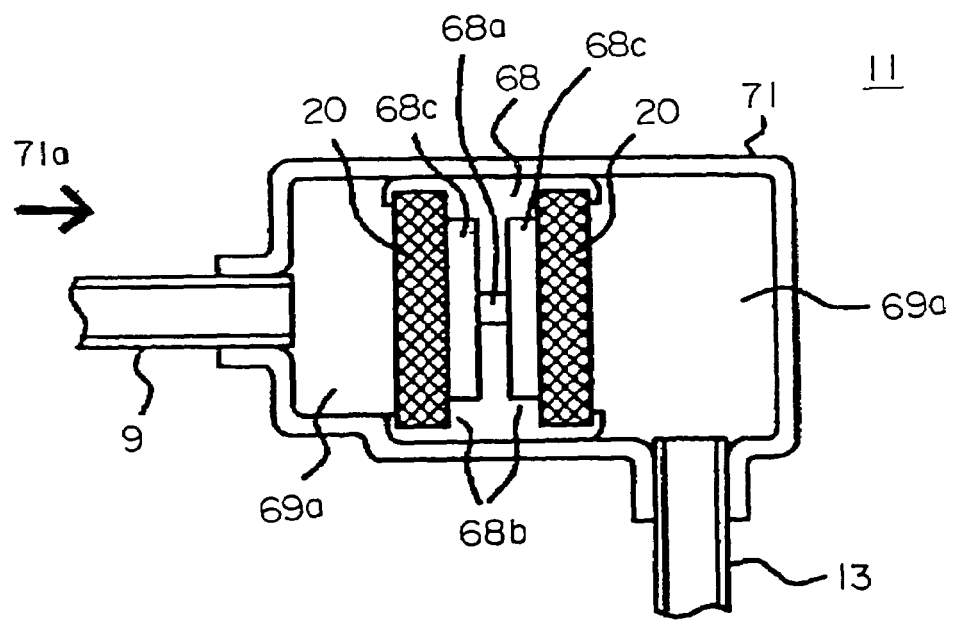
FIG. 40 is a sectional view of the throttle device according to the embodiment 1 of the present invention.

FIGS. 40, 41, 42, and 43 are sectional views of different throttle devices connected to the fluid (refrigerant) circuit similar to that described above. In FIG. 40, numeral 20 denotes the porous permeable members, 68 denotes the orifice component having the throttle path 68a acting as the orifice and formed into, for example, the cylindrical shape, and the porous permeable members 20 are inserted into and fixed to both the sides of the throttle path 68a by press fitting, caulking, or the like. The dimension of the orifice 18a is determined according to a necessary amount of throttling within the range of the inside diameter of 0.5 mm to 2 mm and the length of 1 mm to 4 mm.

Note that the positioning projections 68b formed into, for example, the ring shape are disposed before and behind the orifice 68a of the orifice component 68 in the fluid (refrigerant) flow direction to define the predetermined gaps 68c between the orifice 68a and the porous permeable members 20. The inside diameter of the positioning projections 68b is set to 10 mm to 20 mm, and the height of the positioning projections 68b is set such that the predetermined gaps 68c between the porous permeable members 20 and the orifice 68a are set to 5 mm or less. Then, the orifice component 68 to which the porous permeable members 20 are fixed integrally therewith is fixed to a main body 71 formed into, for example, the pipe shape by press fitting, shrinkage fit, or the like. The ring-shaped positioning projections 68b may be arranged integrally with or separately from the orifice component 68.

After the orifice component 68 has been inserted into the main body 71 from a direction denoted by 71a on the left side of the figure and fixed thereto, the main body 71 is drawn in a direction approximately parallel to the fluid (refrigerant) flow direction in the main body, and the pipe 9 acting as the flow path is connected to the main body 71. Further, the main body 71 is closed on the right side thereof in the figure and subjected to burring in a direction approximately at right angles to the fluid (refrigerant) flow direction, and the pipe 13 acting as the flow path is connected to the main body 71. At the time, the space between the porous permeable member 20 and the pipe 13 has a predetermined distance and inside diameter. Note that the foamed metal composed of Ni, Ni—Cr, or stainless steel, which has the vent holes whose diameter is set to 100 μm to 500 μm and the thickness of 1 mm to 10 mm, is used for the porous permeable members 20. Further, the orifice component 68 is made by cutting or forging copper, brass, aluminum, or stainless steel.

Figure 41:
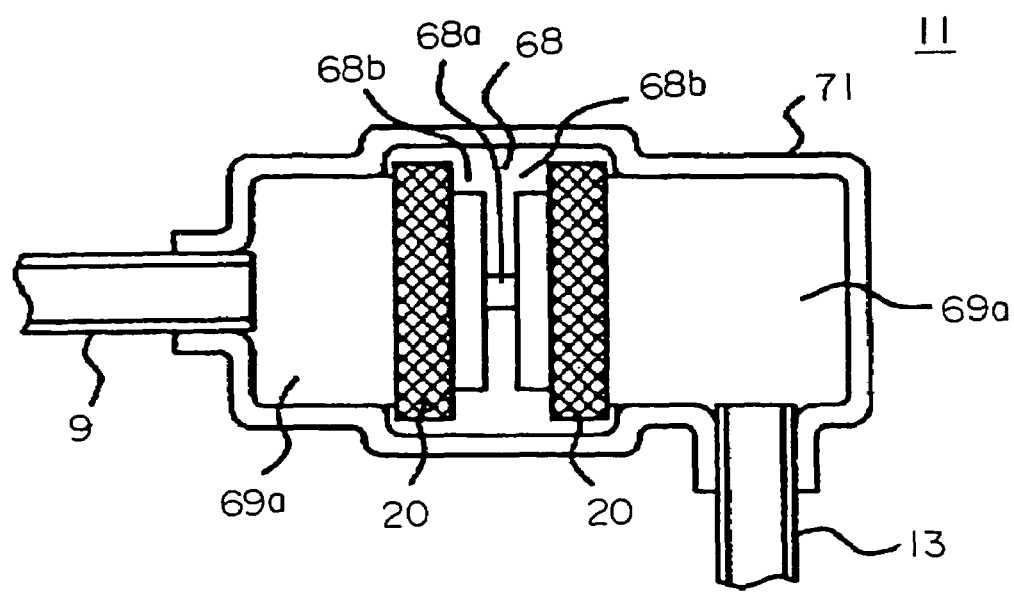
FIG. 41 is a sectional view of the throttle device according to the embodiment 1 of the present invention.

As shown in FIG. 41, after the orifice component 68 is inserted into the main body 71, the positions of the main body 71 corresponding to both the ends of the orifice component 68 may be drawn and the orifice component 68 may be fixed thereto. In the figure, numeral 20 denotes the porous permeable members, 68 denotes the orifice component having the porous permeable members 20 fixed before and behind the orifice 68a, and 71 denotes the main body made slightly larger than the outside diameter of the orifice component 68. Then, after the orifice component 68 has been inserted into the main body 71, the main body 71 is drawn at the positions thereof corresponding to both the ends of the orifice component 68 to thereby fix the orifice component 68 to the main body 71.

Figure 42:
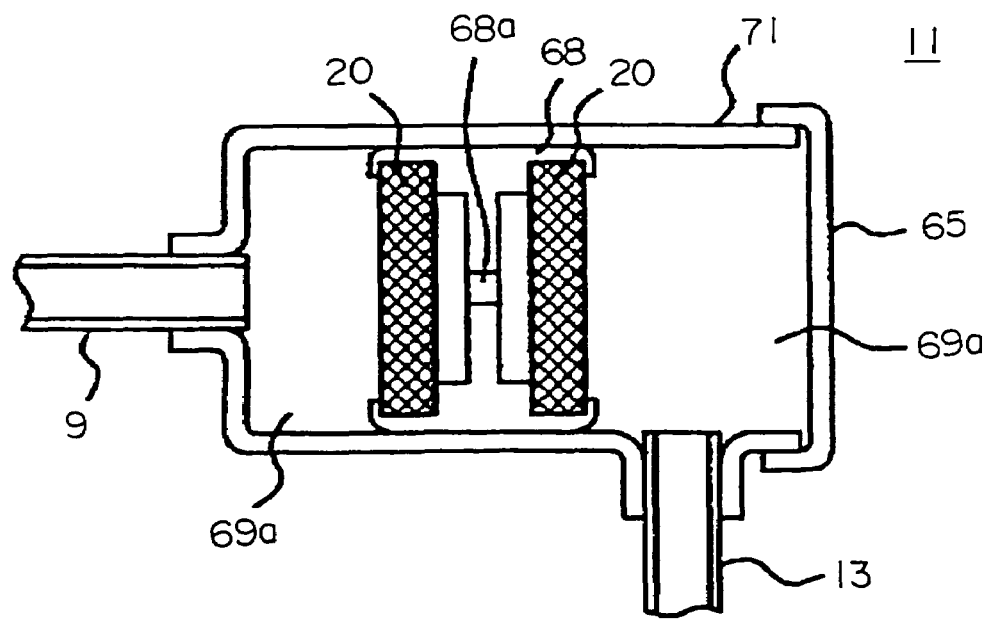
FIG. 42 is a sectional view of the throttle device according to the embodiment 1 of the present invention.
Figure 43:
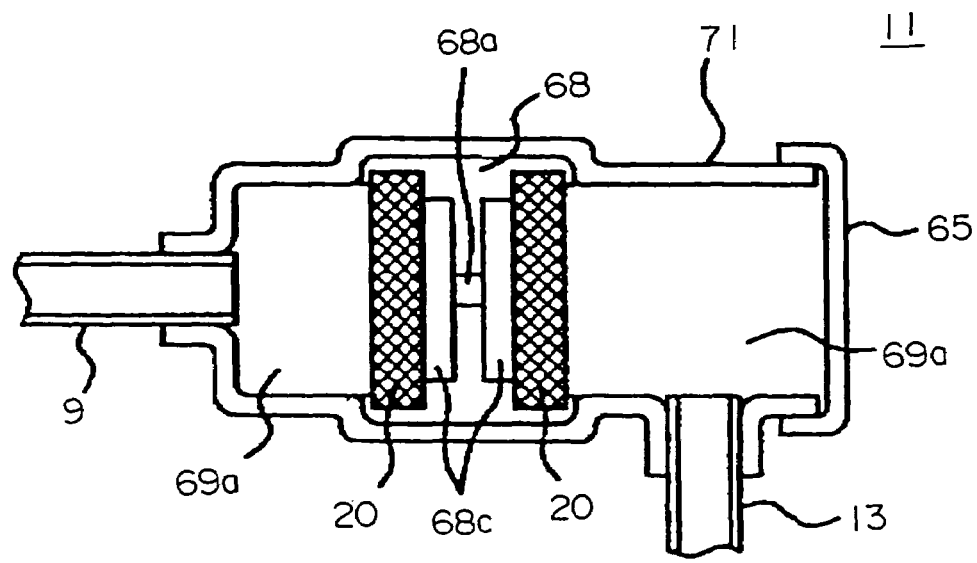
FIG. 43 is a sectional view of the throttle device according to the embodiment 1 of the present invention.

Accordingly, since the orifice component 68 can be simply inserted into the main body 71 without the need of press fitting or shrinkage fit, it is possible to improve the assembling performance as well as reduce the manufacturing time of the throttle device. The same effect can be obtained even if the lid 65 is airtightly joined to one end of the main body 71, as shown in FIGS. 42 and 43. Further, while the inlet and outlet of the fluid (refrigerant) are disposed at each one position, it is sufficient that both the inlet and outlet are disposed at least one position and may be disposed at a plurality of positions or more than one position. Further the inlet and outlet may be disposed in a reverse flow direction.

Similarly to the above description, the same effect can be obtained even if the porous permeable members 20 are composed of sintered metal made by sintering metal powder, a porous permeable member composed of ceramics, a metal wire netting, a member formed by superimposing a plurality of metal wire nettings, a sintered metal wire netting obtained by sintering a plurality of superimposed metal wire nettings, in addition to the foamed metal. Further, the porous permeable members 20 need not be formed into the disc shape, and the same effect can be obtained even if they are formed into the polygonal shape. The same effect can be obtained even if the orifice component 68 and the main body 71 are formed into the polygonal cylindrical shape in place of the cylindrical shape. Further, while the predetermined gaps 61c are defined between the porous permeable members 20 and the orifice 23 or 68a as described above, they need not be defined as already described. With this arrangement, a less expensive throttle device can be obtained because it is not necessary to provide the positioning projections 62b.

Figure 44:
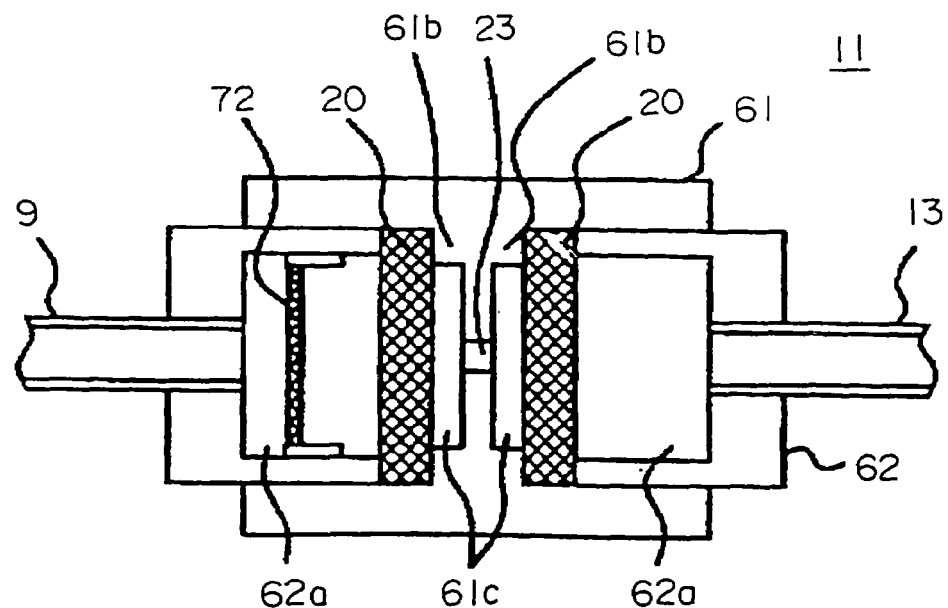
FIG. 44 is a sectional view of the throttle device according to the embodiment 1 of the present invention.

FIGS. 44, 45, 46, 47, and 48 are sectional views of different throttle devices that are arranged such that a filter 72 is provided in the throttle devices described above. FIGS. 49, 50, 51, and 52 are perspective views of the filter 72. The same components are denoted by the same reference numerals, and the description thereof is omitted. Further, the throttle devices 11 are each connected to the same refrigerant circuit as that described above. Reference numeral 72 denotes the filter arranged such that a mesh 72a is fixed to, for example, a ring-shaped fixing component 72b, and the filter 72 is fixed to the inner wall of the presser member 62 of the throttle device 11 by press fitting, as shown in FIG. 44. The mesh 72a of the filter 72 is composed of a metal wire netting, and the like having vent holes whose diameter is smaller than that of the vent holes of the porous permeable members 20.

The circuit of the refrigerating cycle is arranged similarly to that described above. However, when foreign materials are produced in the fluid (refrigerant) flowing through the refrigerating cycle, they are held on the filter 72 when the size thereof is larger than the diameter of the vent holes of the mesh 72a of the filter 72 and do not reach the porous permeable member 20. In contrast, when the size of the foreign materials is smaller than the diameter of the vent holes of the mesh 72a of the filter 72, they pass through the filter 72 and reach the porous permeable member 20. However, the diameter of the vent holes of the porous permeable member 20 is larger than the diameter of the vent holes of the mesh 72a of the filter 72, they also pass through the porous permeable member 20. As a result, the porous permeable member 20 is not clogged with the foreign material, and thus the durability to clogging is improved. Further, it is possible to prevent the deterioration of performance due to an increase in pressure loss caused by the clogging of the porous permeable members 20, and thus a reliable throttle device can be obtained. Further, when the filter 72 is interposed between the porous permeable member 20 and the throttle path 23 acting as the orifice, the porous permeable member 20 is not clogged with foreign material even if a reverse flow direction is used, and thus the durability to clogging is improved.

Figure 45:
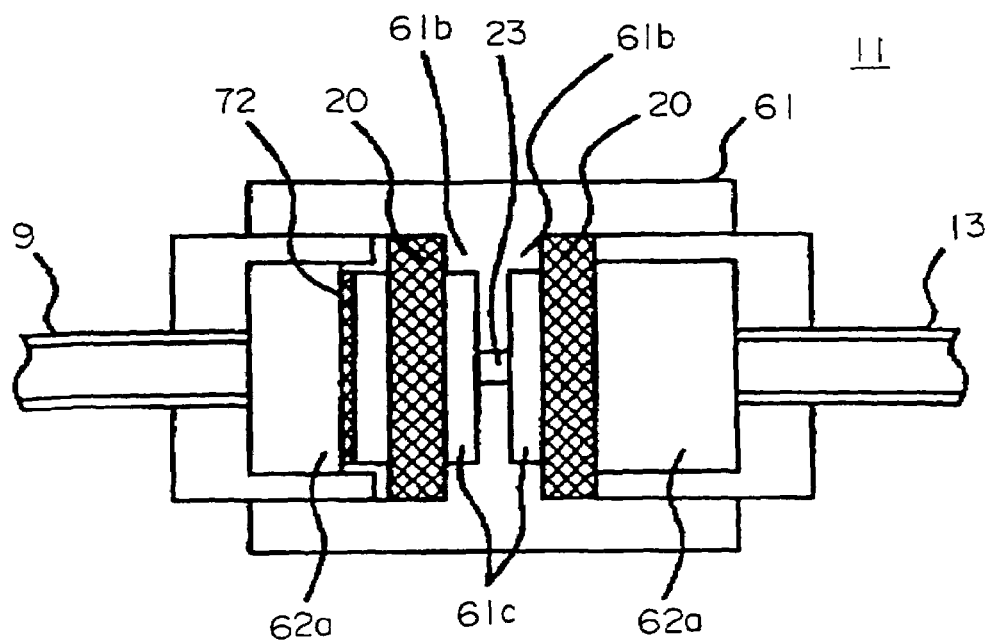
FIG. 45 is a sectional view of the throttle device according to the embodiment 1 of the present invention.
Figure 46:
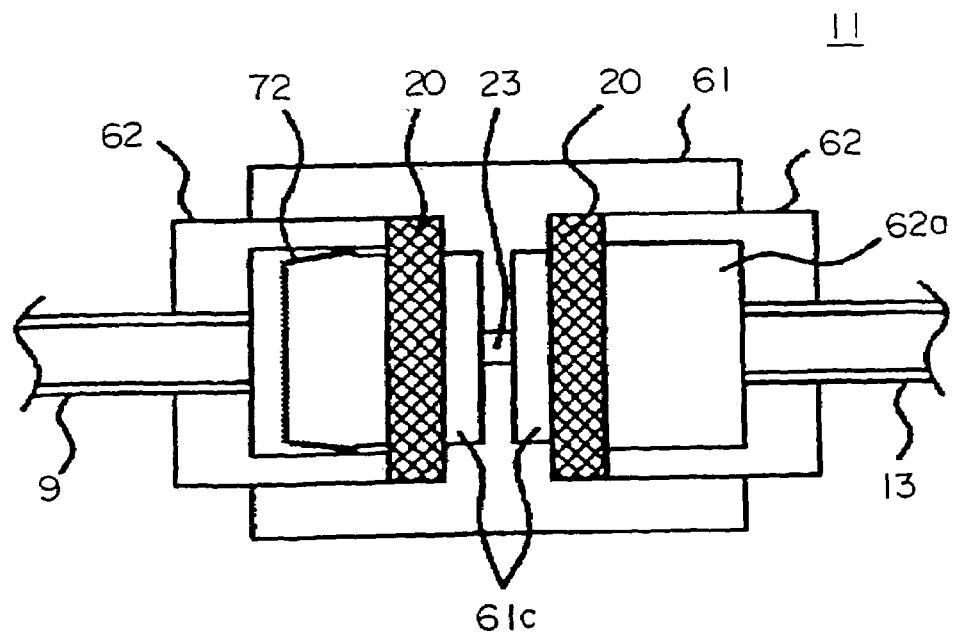
FIG. 46 is a sectional view of the throttle device according to the embodiment 1 of the present invention.
Figure 47:
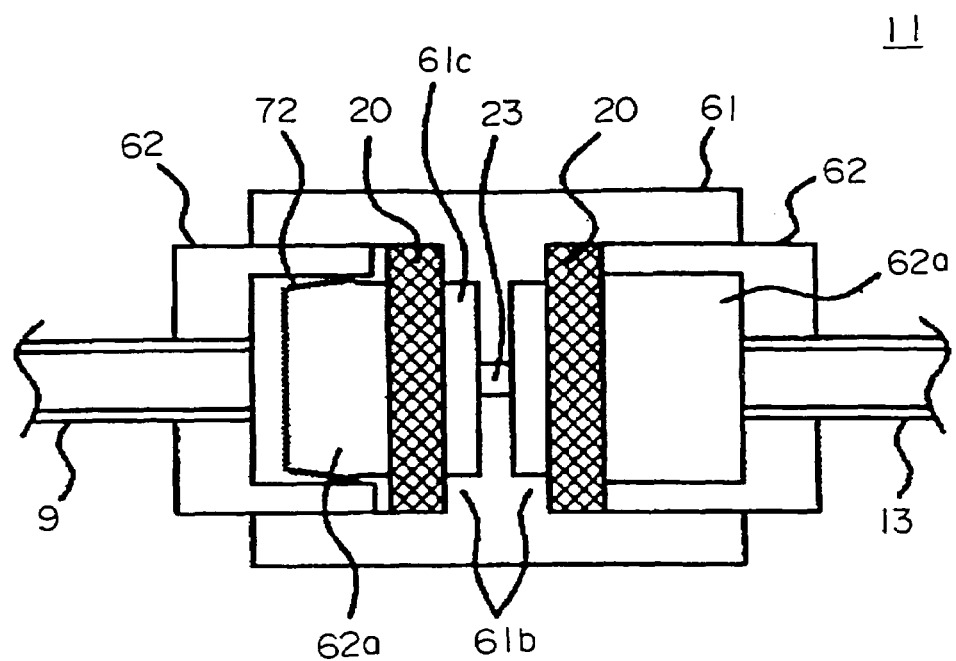
FIG. 47 is a sectional view of the throttle device according to the embodiment 1 of the present invention.
Figure 50:
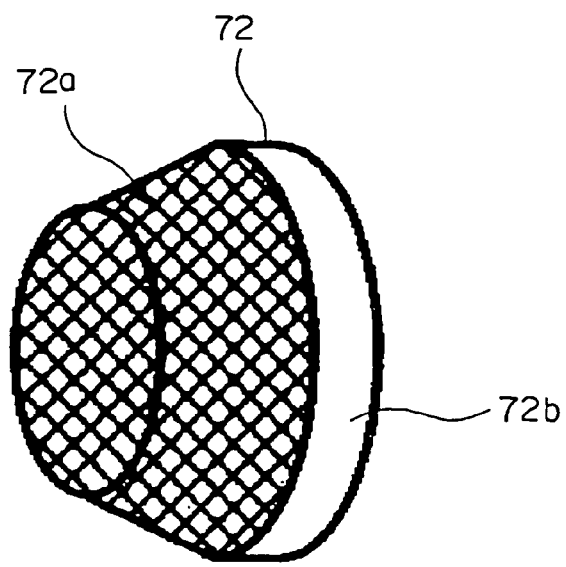
FIG. 50 is a perspective view of another filter according to the embodiment 1 of the present invention.
Figure 51:
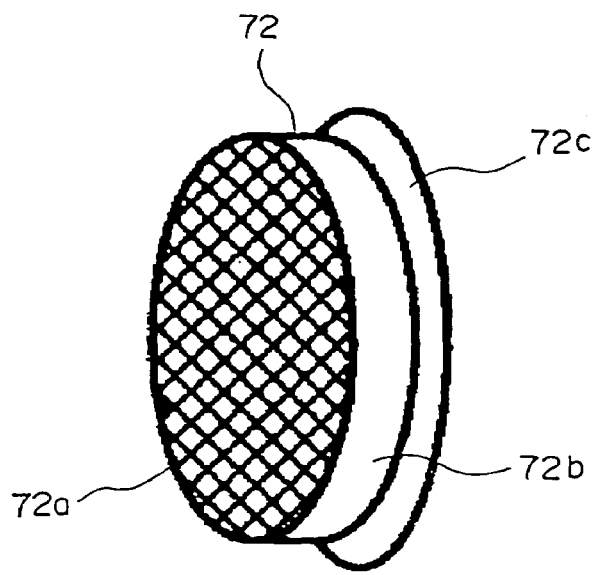
FIG. 51 is a perspective view of another filter according to the embodiment 1 of the present invention.
Figure 52:
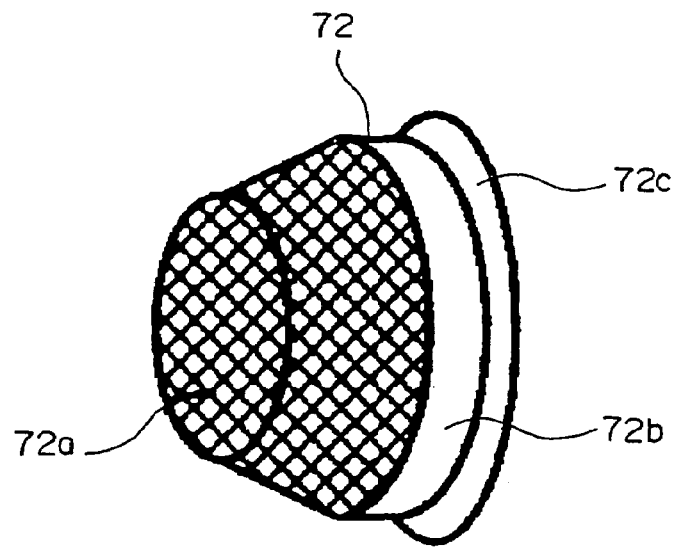
FIG. 52 is a perspective view of another filter according to the embodiment 1 of the present invention.

Further, when a fixing component 72b of the filter 72 having the mesh 72a whose surface area is increased as shown in FIG. 50, is fixed to the inner wall of the presser member 62 by press fitting or the like, as shown in FIG. 45, the amount of foreign materials that can be held by the filter 72 can be increased, and thus the durability to clogging can be more improved. The same effect can be obtained even if the filter 72 has such structure that a fixing extension portion 72c is formed on the fixing component 72b for fixing the mesh 72a, as shown in FIG. 51, and the fixing extension portion 72c is sandwiched between the presser member 62 and the porous permeable member 20 so as to fix the filter 72 as shown in FIG. 46. Further, the same effect can be obtained even if the surface area of the filter 72 is increased as shown in FIG. 52 and further the fixing component 72b is provided with the fixing extension portion 72c, and the fixing extension portion 72c is sandwiched between the presser member 62 and the porous permeable member 20 so as to fix the filter 72 as shown in FIG. 47.

Figure 48:
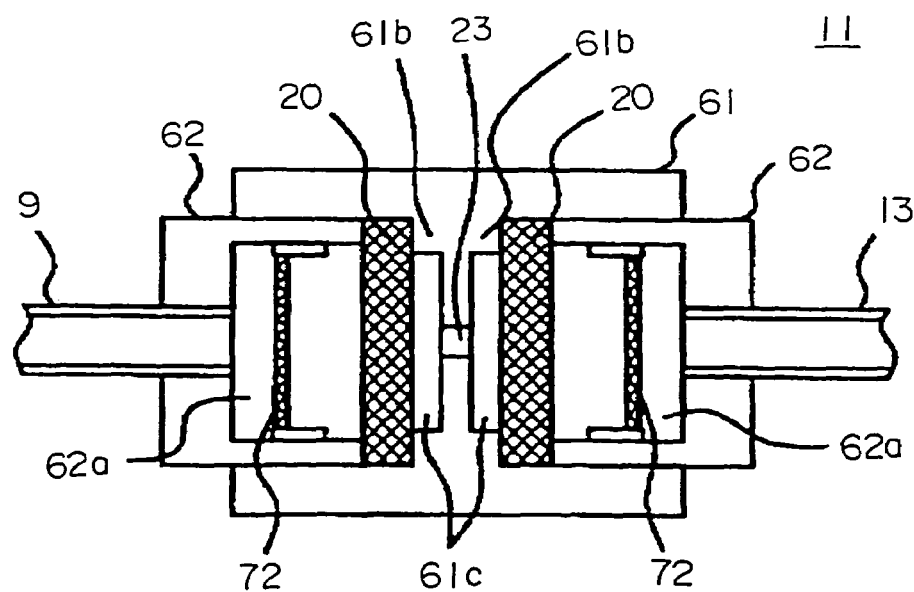
FIG. 48 is a sectional view of the throttle device according to the embodiment 1 of the present invention.
Figure 49:
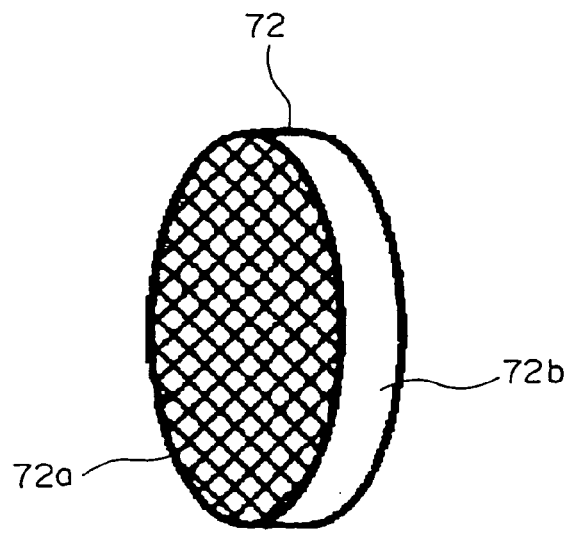
FIG. 49 is a perspective view of a filter according to the embodiment 1 of the present invention.

While one unit of the filter 72 is disposed, a plurality of them may be disposed. Further, while the filter 72 is disposed only on one side of the throttle path 23, it may be disposed to each side thereof as shown in FIG. 48. The filter 72 of the embodiment may be used in any of the throttle devices 11 having been described heretofore, and thus a reliable throttle device and refrigerating cycle apparatus having improved durability to clogging can be obtained.

While the metal wire netting is used as the component constituting the filter 72, the same effect can be obtained even if the filter 72 is composed of the foamed metal, the sintered metal made by sintering metal powder, the porous permeable member composed of ceramics, the member made by superimposing the plurality of metal wire nettings, the sintered metal wire netting made by sintering the several superimposed metal wire nettings, and laminated metal wire nettings.

Figure 53:
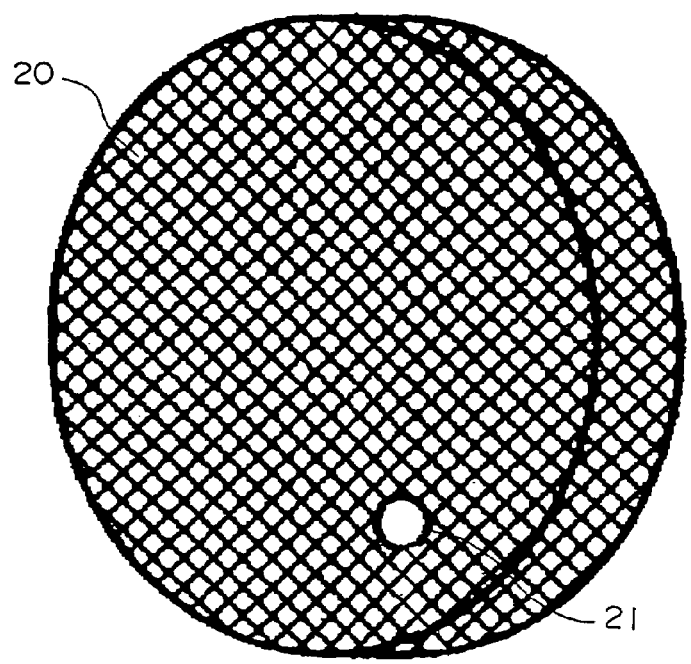
FIG. 53 is a perspective view of another porous permeable member according to the embodiment 1 of the present invention.
Figure 54:
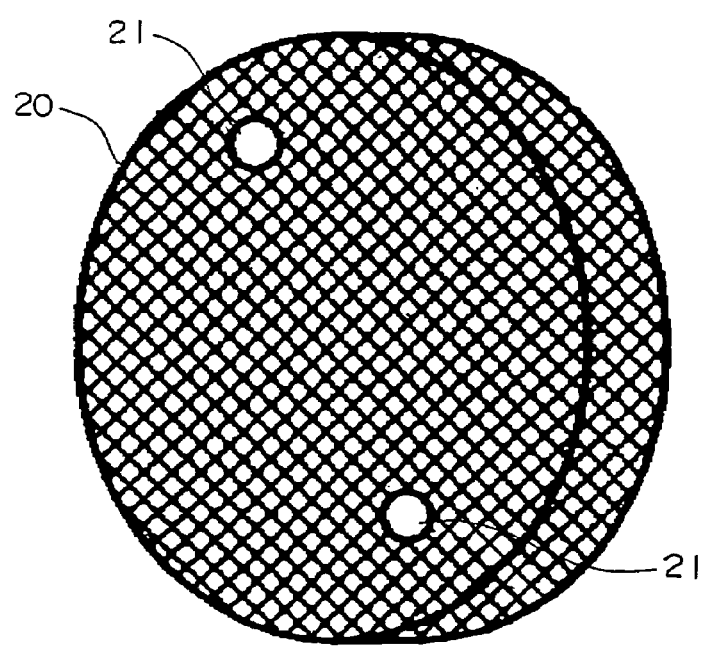
FIG. 54 is a perspective view of another porous permeable member according to the embodiment 1 of the present invention.

Further, through holes may be formed through the porous permeable members 20 described above, as shown in FIGS. 53 and 54. FIGS. 53 and 54 are perspective views of the porous permeable member. In the figures, numeral 20 denotes the porous permeable member, and 21 denotes the through hole defined at a position offset from the position of the throttle path 23 in the axial direction thereof. A reliable clogging device having an improved durability to clogging can be obtained without losing a function of reducing flow noise by forming the through hole 21 of 1 mm to 3 mm (larger than the inside diameter of the orifice) at one position offset from the throttle path 23 with respect to the flow direction of the porous permeable member 20.

Since the through hole 21 is offset from the throttle path 23 with respect to the fluid (refrigerant) flow direction and the porous permeable member 20 exists at the portion where the fluid (refrigerant) easily flows into the throttle path 23, then the durability to clogging of the porous permeable member 20 can be improved without losing the function of reducing flow noise. Further, since the porous permeable member has a large porosity, the fluid (refrigerant) does not concentrate to the through hole 21, and thus the porous permeable member 20 does not lose the above function. Further, the same effect can be obtained even if the through holes 21 are disposed at two positions, as shown in FIG. 54, or disposed at three positions.

Further, the above description has been made with reference to the case in which the refrigerant is used as the fluid used in the refrigerating cycle apparatus and R410A is used as the refrigerant. The R410A refrigerant is an ozone-friendly HFC refrigerant suitable for the conservation of global environment as well as has a smaller refrigerant pressure loss as compared with R22 that has been heretofore used as the refrigerant. Thus, an effect of reducing refrigerant flow noise can be obtained as compared with the case in which the R22 refrigerant is used.

The refrigerant used in the refrigerating cycle apparatus is not limited to R410A, and R407C, R404A, and R507A that are HFC refrigerants may be used. Further, R32 alone, R152a alone, a mixed refrigerant of R32/R134a, and the like as FHC refrigerants having a small global warming coefficient may be used from the view point of preventing global warming. Further, HC refrigerants such as propane, butane, isobutene, etc., natural refrigerants such as ammonia, carbon dioxide, ether, and the like, and mixed refrigerants made by mixing them may be used. The throttle device of the present invention can be applied not only to refrigerating and air conditioning apparatus but also to dehumidifiers having a unit construction evaporator and condenser and a heat exchanger whose interior is partitioned for use and to refrigerators and window air conditioners in which a refrigerating cycle is closed only within a room. The throttle device of the present invention is not used only in the refrigerating cycle apparatus but may be used in any apparatus that needs a throttling. Further, any fluid may be used in the throttle device.

As described above, the present invention includes the main body having the two spaces therein that communicate with each other through the throttle path acting as the orifice and are disposed on the approximately linear line with respect to the fluid flow direction, the flow paths for causing the two spaces in the main body to communicate with the outside of the main body, respectively, and the porous permeable member that is fixed in the main body so as to be disposed on the approximately linear line with respect to the two spaces in the main body and partitions at least one of the two spaces to the throttle path side and to the flow path side. Accordingly, a fluid in a vapor state and a fluid in a liquid state can simultaneously pass through the throttle path as a uniform gas/liquid two-phase flow, whereby the velocities of the fluids do not fluctuate, a pressure does not also fluctuate, and noise is unlike to be produced.

Further, the present invention includes the main body having the two spaces therein, which communicate with each other through the throttle path acting as the orifice and are disposed on the approximately linear line with respect to the fluid flow direction, the porous permeable member, which is disposed to cause the fluid to pass in the fluid flow direction in at least one of the two spaces and partitions at least one of the spaces to the throttle path side space and to the opposite side space, the positioning projections, which are interposed between the porous permeable member and the throttle path and position the porous permeable member in the fluid flow direction, and the presser component, which has the flow path disposed to cause the opposite side space to communicate with the outside and is disposed to press the porous permeable member from the opposite side of the throttle path. Then, the porous permeable member is positioned by being abutted against the positioning projection. Accordingly, the porous permeable member can be simply and reliably positioned when it is assembled, and an assembly time is reduced, whereby a less expensive throttle device can be obtained.

Since the present invention defines the gap between the orifice and the porous permeable member, the area of the porous permeable member through which the fluid passes can be largely and effectively utilized. As a result, even if foreign materials are mixed in the fluid, durability to clogging due to foreign materials is improved and a reliable throttle device can be obtained. Since the orifice integral with the porous permeable member is fixed in the main body such that the throttle path partitions the interior of the main body into the two spaces, the throttle path and the porous permeable member can be assembled to the main body after they are assembled previously, whereby an assembling performance can be improved as well as a reliable throttle device can be obtained. Since the through hole having the diameter larger than that of the throttle path is defined through the porous permeable member at the position offset from the position of the throttle path on the axial line in the flow direction, the durability to clogging of the porous permeable member can be improved without losing the function thereof for reducing flow noise.

Since the filter having the mesh whose mesh diameter is smaller than that of the vent holes of the porous permeable member is disposed at the position between the throttle path and the porous permeable member or at the position between the porous permeable member and the flow path, the porous permeable member is not clogged with foreign materials, the durability to clogging is improved and the deterioration of performance due to an increase in pressure loss due to the clogging can be prevented, whereby a reliable throttle device can be obtained. Since two or more flow paths composed of the pipes are disposed in one space, even if a plurality of inlet and outlet pipes are disposed in the heat exchanger, these pipes can be connected to the throttle device as they are. Accordingly, it is not necessary to purposely arrange these pipes as a single pipe, and thus a throttle device capable of reducing a processing and assembling time can be obtained. Further, since the flow paths are taken out for one space in the direction approximately in parallel with or at right angles to the fluid flow direction in the main body, it is not necessary to bend assembly pipes when the throttle device is assembled to any of the apparatuses such as the refrigerating cycle apparatus, and the like, and thus the throttle device can be easily assembled, whereby a throttle device capable of reducing an assembly time can be obtained.

The throttle device, which includes the main body having the two spaces therein, which communicate with each other through the throttle path acting as the orifice and are disposed on the approximately linear line with respect to the fluid flow direction, the flow path, which causes the two spaces in the main body to communicate with the outside, respectively, and the porous permeable member, which is fixed in the main body so as to be disposed on the approximately linear line with respect to the two spaces in the main body and partitions at least one of the two spaces to the throttle path side and to the flow path side, is disposed in the vicinity of the heat exchanger constituting part of the refrigerating cycle apparatus or in the refrigerating circuit in the room. Accordingly, a countermeasure, which is required in the conventional apparatus, for winding a noise insulating material and a damping material around the throttle device is not necessary, and thus a less expensive and low noise refrigerating cycle apparatus can be obtained.

The throttle device, which includes the main body having the two spaces therein, which communicate with each other through the throttle path and are disposed on the approximately linear line with respect to the flow direction of the refrigerant, the porous permeable member, which is disposed to cause the refrigerant to pass in the refrigerant flow direction in at least one of the two spaces and partitions at least the one space to the throttle path side space and to the opposite side space, the positioning projections, which are interposed between the porous permeable member and the throttle path and form the gap between the porous permeable member and the throttle path, and the presser component, which has the flow path disposed to cause the opposite side space to communicate with the outside and disposed to press the porous permeable member from the opposite side of the throttle path, is disposed in the vicinity of the heat exchanger constituting part of the refrigerating cycle apparatus or in the refrigerating circuit in the room. Accordingly, it is not necessary to separately dispose a filter in the refrigerant circuit, and thus a less expensive, low noise and reliable refrigerating cycle apparatus can be obtained.

Further, the air conditioning apparatus includes the indoor machine, which has the heat exchanger disposed in the cabinet so as to exchange heat with indoor air and the controller disposed in the vicinity of the heat exchanger that is disposed in the cabinet. Then, the throttle device of the present invention is interposed between the heat exchanger and the controller. Accordingly, a less expensive refrigerating cycle apparatus can be obtained which requires no noise insulating material, because the throttle device operates with low noise and can be installed in any place, and in which the throttle device has a large degree of freedom of installation. Further, the indoor machine having the heat exchanger disposed in the cabinet for exchanging heat with indoor air is provided, and the throttle device is interposed between the heat exchanger and the controller. Accordingly, a less expensive refrigerating cycle apparatus can be obtained which requires no noise insulating material, because the throttle device operates with low noise and can be installed in any place, and in which the throttle device has a large degree of freedom of installation.

Embodiment 2

In the embodiment 1, the structure of the second flow controller has been mainly described with reference to the examples of the throttle device used in parallel with the multi-directional valve and to the applied examples thereof. In the second embodiment, however, the structure of a throttle device integral with a valve will be described. Accordingly, in the following description, the operation of a refrigerating cycle and the operation and arrangement of an air conditioning apparatus are the same as those of the embodiment 1 except the portions having specific structures. A multi-directional valve is assembled to the throttle device integrally therewith, or it is examined to arrange them more compact so as to obtain a throttle device and a flow controller that are smaller in size and lighter in weight.

Figure 55:
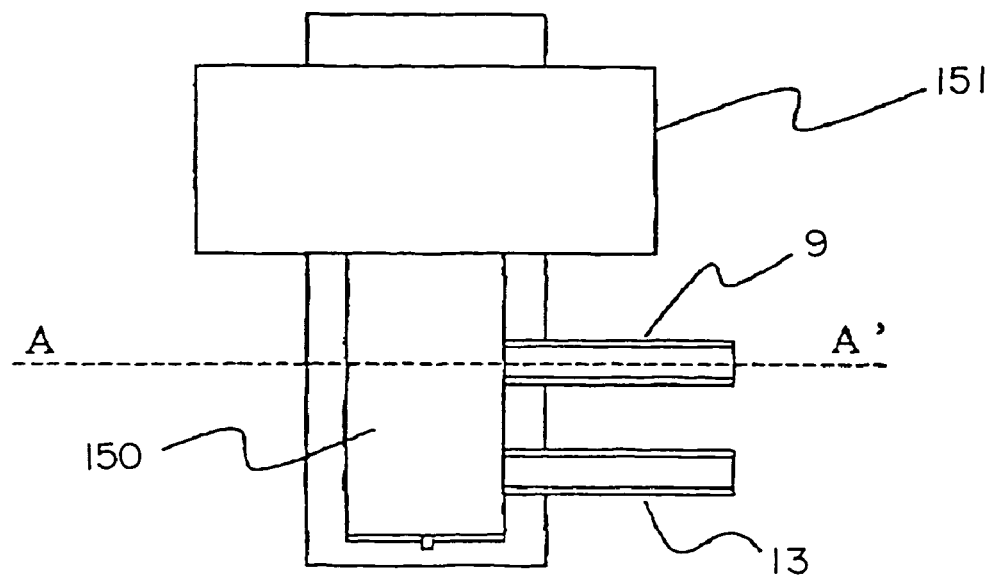
FIG. 55 is a sectional view showing the arrangement of a throttle device according to an embodiment 2 of the present invention.

FIG. 55 is a sectional view showing the arrangement of the second flow controller of the air conditioning apparatus shown in FIG. 1. In the figure, numeral 9 denotes the pipe connected to the first indoor heat exchanger 5 and acts as a refrigerant flow inlet, 13 denotes the pipe connected to the second indoor heat exchanger 7 and acts as a refrigerant flow outlet, and 150 denotes a main valve body formed into a columnar shape and rotatable in a peripheral direction about the center of a column as an axis while sliding. Reference numeral 151 denotes a stepping motor for driving the main valve body 150, and the main valve body 150 is adjusted by driving the stepping motor 151 in response to a command from a controller which is not shown.

Figure 56:
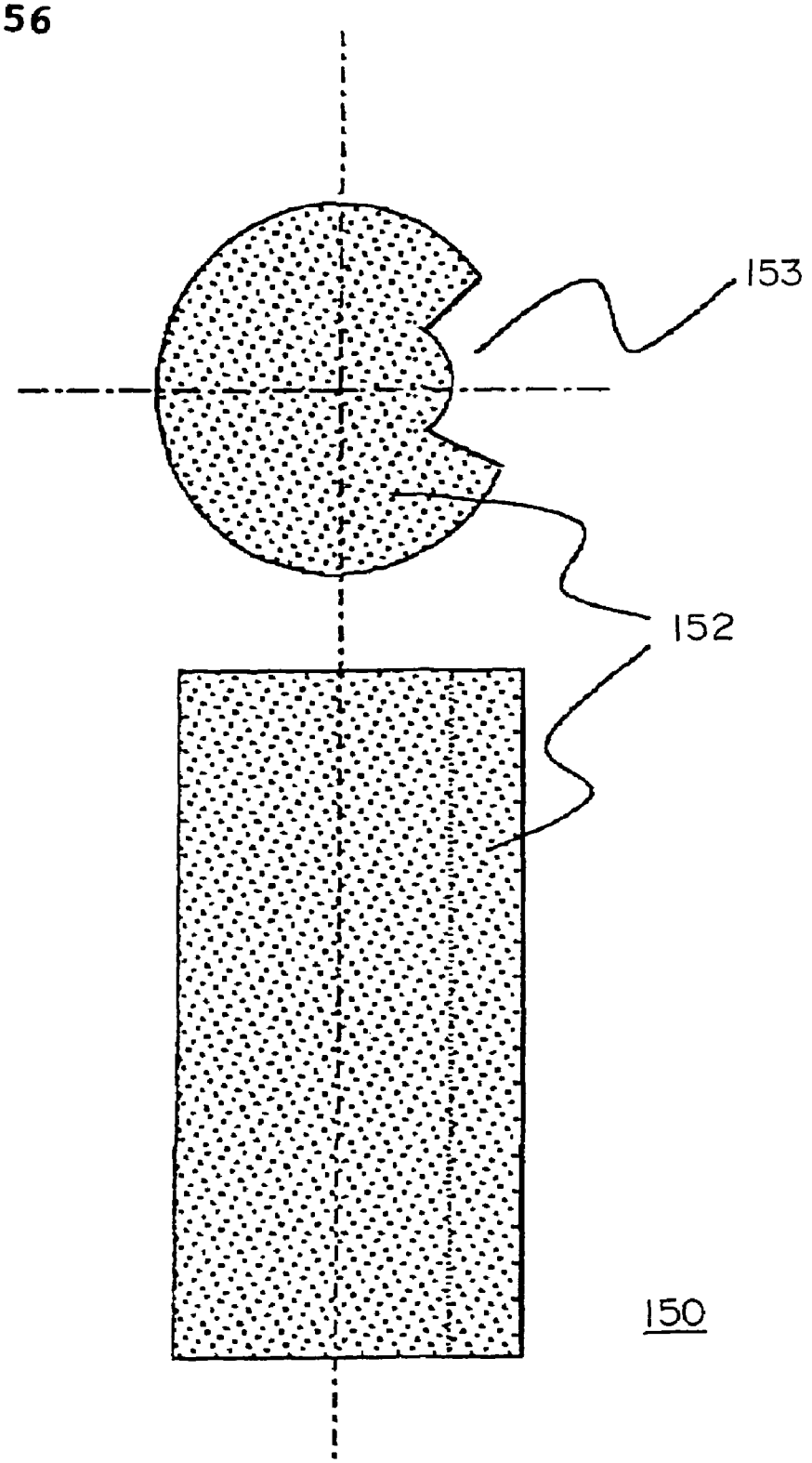
FIG. 56 is a detailed view of a main valve body of the throttle device according to an embodiment 2 of the present invention.

FIG. 56 is a sectional view of the main valve body 150 of the second flow controller 6 shown in FIG. 55. In the figure, 153 denotes a groove formed in the main valve body 150 and acting as a passing-through flow path through which a refrigerant can pass with almost no flow path resistance applied thereto. The main valve body 150 is formed of a porous permeable member in its entirety, and the porous permeable member is composed of sintered metal (hereinafter, referred to as a porous member 152 or a sintered metal) whose vent holes (the vent holes on the surface and inside of the porous member through which a fluid can pass) have an average diameter of 40 micrometers. The sintered metal is made by molding metal powder or alloy powder in a mold under pressure and sintering the resultant molded powder at a temperature lower than a melting point.

Figure 57:
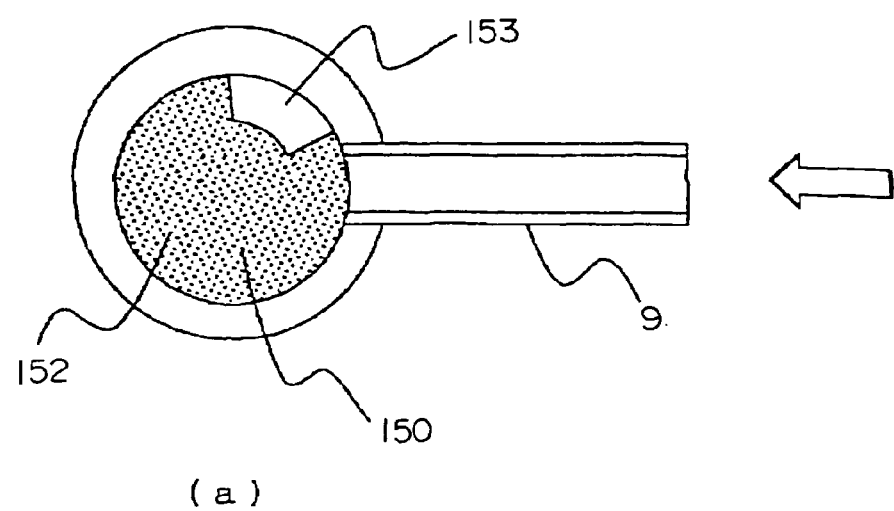
FIG. 57 depicts views showing operation of the throttle device according to the embodiment 2 of the present invention.
Figure 57:
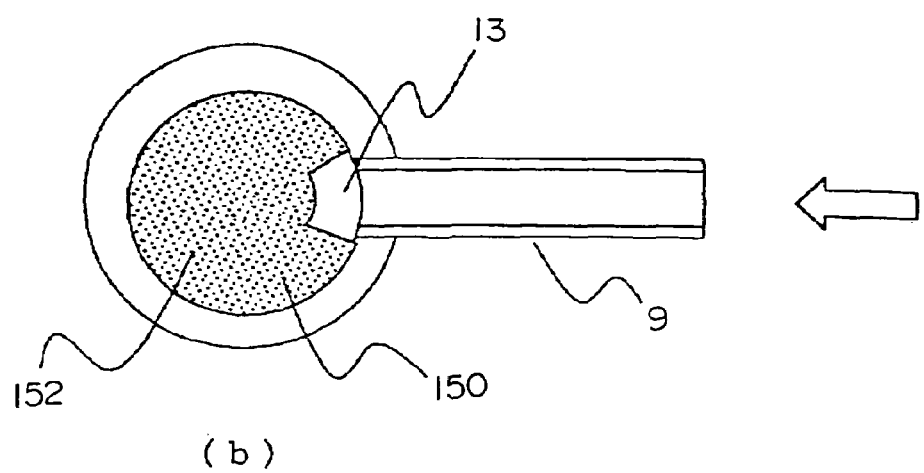

The groove 153 formed in the main valve body has a cross sectional area larger than that of the pipe 9 connected to the second flow control valve 6 and the first indoor heat exchanger 5 and that of the pipe 13 connected to the second indoor heat exchanger 7. Driving the stepping motor 151 causes the groove 153 of the main valve body to move to the position of the pipe 9 connected to the second flow control valve and the first indoor heat exchanger 5 and to the position of the pipe 13 connected to the second indoor heat exchanger 7, as shown in FIG. 57(*b*), and thus the pipes can be connected thereto in a state in which almost no pressure loss is produced. Further, driving the stepping motor 151 in the same way causes the pipe 8 connected to the first indoor heat exchanger 5 to be connected to the pipe 9 connected to the second indoor heat exchanger 7 through the porous member 12 of the main valve body 10.

Next, operation of the refrigerating cycle of the air conditioning apparatus according to this embodiment will be described. In FIG. 1, solid line arrows show a refrigerant flow in a cooling operation. The cooling operation is divided into an ordinary cooling operation corresponding to a case in which both the air conditioning sensible heat load and the air conditioning latent heat load in a room are high at start, in summer, and the like and a dehumidifying operation corresponding to a case in which the latent heat load is large while the air conditioning sensible heat load is low as in an intermediate season, a rainy season, and the like. In the ordinary cooling operation, driving the stepping motor 151 of the second flow controller 6 causes the groove 153 of the main valve body 150 to be fixed to the position of the pipe 9 connected to the second flow controller and the first indoor heat exchanger 5 and to the position of the pipe 13 connected to the second indoor heat exchanger 7.

At this time, a high temperature and high pressure vapor refrigerant ejected from the compressor 1 operating at the number of revolutions corresponding to an air conditioning load passes through the 4-way valve 2, is condensed and liquefied in the outdoor heat exchanger 3, reduced in pressure in a first flow controller 4 and made into a low pressure two-phase refrigerant, which flows into the first indoor heat exchanger 5 and is evaporated and gasified therein, passes through the second flow controller 6 without a large pressure loss, is evaporated and gasified again in the second indoor heat exchanger 7, and returns to the compressor 1 through the 4-way valve 2 again as a low pressure vapor refrigerant.

In the second flow controller, the groove 153 of the main valve body 150 is located at the position of the pipe 9 connected to the second flow controller and the first indoor heat exchanger 5 and at the position of the pipe 13 connected to the second indoor heat exchanger 7, as shown in FIG. 57(*b*). Thus, the refrigerant passing through the second flow controller has almost no pressure loss, and thus the cooling capacity and efficiency are not reduced. Further, the first flow controller is controlled such that the degree of superheat of the refrigerant is set to 10° C. at, for example, the intake of the compressor 1. In this refrigerating cycle, the heat is drawn from the inside of a room by evaporating the refrigerant in the first indoor heat exchanger 5, and the room is cooled by releasing the heat drawn from the inside of the room to the outside of the room by condensing the refrigerant in the outdoor heat exchanger 3.

Next, the dehumidifying operation will be explained using the pressure-enthalpy graph shown in FIG. 6. Note that the alphanumeric characters shown in FIG. 6 correspond to those shown in FIG. 1. In the dehumidifying operation, the controller (not shown) drives the stepping motor of the second flow controller, and the portion of the main valve body 150 other than the groove 153 is located at the position where it is in intimate contact with the end of the pipe 9 connected to the second flow controller and the first indoor heat exchanger 5 and the end of the pipe 13 connected to the second indoor heat exchanger 7, as shown in FIG. 57(*a*).

At this time, the high pressure and high temperature vapor refrigerant (point A) ejected from the compressor 1 operating at the number of revolutions corresponding to the air conditioning load passes through the 4-way valve 2, exchanges heat with the outside air in the outdoor heat exchanger 3, and is condensed so as to be made into a condensed gas/liquid two-phase refrigerant (point B). The high pressure two-phase refrigerant is somewhat reduced in pressure in the first flow controller 4 and flows into the first indoor heat exchanger 5 as an intermediate pressure gas/liquid two-phase refrigerant (point C). The intermediate pressure gas/liquid two-phase refrigerant flowed into the first indoor heat exchanger 5 exchanges heat with the air in the room, and is further condensed (point D). The gas/liquid two-phase refrigerant ejected from the first indoor heat exchanger flows into the second flow controller 6.

In the second flow controller 6, the main valve body 150 is located at the position where it is in close contact with the end of the pipe 9 connected to the second flow controller and the first indoor heat exchanger 5 and the end of the pipe 13 connected to the second indoor heat exchanger 7, as shown in FIG. 57(*a*), which causes the refrigerant to flow into the second indoor heat exchanger 7 through the vent holes of the porous permeable member constituting the main valve body 150. Since the vent holes of the main valve body 150 have a diameter of about 40 micrometers, the refrigerant passing through the vent holes is reduced in pressure and made into a low pressure gas/liquid two-phase refrigerant which flows into the second indoor heat exchanger 7 (point E). The refrigerant flowed into the second indoor heat exchanger 7 is evaporated by drawing the sensible and latent heat of the air in the room. The low pressure vapor refrigerant ejected from the second indoor heat exchanger returns to the compressor 1 again through the 4-way valve 2. Since the air in the room is heated in the first indoor heat exchanger 5 and cooled and dehumidified by the second indoor heat exchanger 7 it is possible to execute dehumidification while preventing the reduction of a room temperature.

Note that, in the dehumidifying operation, it is possible to control a blowing-out air temperature in a wide range by adjusting the rotational frequency of the compressor 1 and the number of revolutions of the fan of the outdoor heat exchanger 3 to control its amount of heat exchange and by controlling the heating amount of the air in the room heated by the first indoor heat exchanger 5. Further, it is also possible to control the heating amount of the air in the room heated by the first indoor heat exchanger 5 by controlling the condensing temperature of the first indoor heat exchanger by controlling the degree of opening of the first flow controller 4 and the number of revolutions of the indoor fan. Further, the second flow controller 6 is controlled such that the degree of superheat of the intake refrigerant of the compressor is set to, for example, 10° C.

In this embodiment, refrigerant flow noise produced when the gas/liquid two-phase refrigerant passes through the main valve body 150 can be greatly reduced because it is composed of the sintered metal. When the gas/liquid two-phase refrigerant passes through an ordinary orifice type flow controller, large refrigerant flow noise is produced. It is known that large noise is produced when the gas/liquid two-phase refrigerant flows particularly in a slag flow mode. This is because that when the flow mode of the gas/liquid two-phase refrigerant is the slag flow as described above, a vapor refrigerant intermittently flows in a flow direction, and when the vapor slags or vapor bubbles having a size larger than the flow path of a throttle section, the vapor slags or vapor bubbles upstream of the flow path of the throttle section are broken and vibrated and that since a vapor refrigerant and a liquid refrigerant alternately pass through the throttle section, the speed of the refrigerant is fast when the vapor refrigerant passes and slow when the liquid refrigerant passes, and the pressure of the refrigerant is also fluctuated thereby. Further, in a conventional second flow controller 6, since outlet flow paths are disposed at one to four positions at the outlet of the controller 6, the refrigerant has a fast flow speed, and swirls are produced at the outlet portion of the controller 6 so that jet stream noise is increased thereat.

In the second flow controller 6 shown in FIG. 55, the gas/liquid two-phase refrigerant and the liquid refrigerant pass through an infinite number of fine vent holes of the main valve body 150 composed of the sintered metal and are reduced in pressure. Accordingly, vapor slags and vapor bubbles are not broken. Further, since a vapor refrigerant and a liquid refrigerant simultaneously pass through the throttle section, the speed of the refrigerant is not fluctuated and the pressure thereof is not also fluctuated. A conventional orifice has a flow path at one position. However, since the flow paths in sintered metal are formed intricately, the pressure of the refrigerant is reduced in the sintered metal. A porous member such as the sintered metal has such an effect that the fluctuation of flow speed of the refrigerant is repeated as the pressure fluctuation thereof in the interior of the porous member, and the pressure fluctuation is made constant with a part thereof being converted into thermal energy. This is generally referred to as a noise absorbing effect that is contemplated as a noise eliminating mechanism. Further, since the flow velocity of the refrigerant is sufficiently reduced in the porous member and made constant, no swirl is produced in the flow of the refrigerant at the outlet of the throttle section, and jet stream noise is also reduced.

As a result, the cost can be reduced because the countermeasure required in the conventional apparatus for winding the noise insulating material and the damping material around the throttle device 6 is not necessary, and further the recycling performance of the air conditioning apparatus can be improved. Note that since the problem of the refrigerant flow noise due to the gas/liquid two-phase refrigerant described above is not limited to the air conditioning apparatus and is a general problem common to general refrigerating cycles such as a refrigerator, and the like, the same effect can be obtained by widely applying the throttle device of this embodiment to these general refrigerating cycles.

The flow characteristics of the second flow controller 6 in the cooling/dehumidifying operation (the relationship between the flow amount of refrigerant and pressure loss) can be adjusted by adjusting the diameter of the porous member used in the main valve body 150, the length of the flow path thereof through which the refrigerant passes, and the porosity of the porous member (the volume of pores per unit volume). That is, when a certain flow amount of refrigerant is flowed with a small pressure loss, it is sufficient to increase the diameter of the vent holes of the porous member (to increase the size of the element of the porous member), to decrease the length of the flow path thereof (to decrease the length of a valve main body), or to use a porous member having a large porosity. Inversely, when a certain flow amount of refrigerant is flowed with a large pressure loss, it is sufficient to decrease the diameter of the vent holes of the porous member (to decrease the size of the element of the porous member), to increase the length of the flow path thereof (to increase the length of the valve main body), or to use a porous member having a small porosity. The diameter of the vent holes of the porous member used in a main valve body and the shape of the valve main body are optimally designed at the time of design of equipment.

Sintered metal (made by molding metal powder or alloy powder in a mold under pressure and sintering the resultant molded powder at a temperature lower than a melting point), ceramic, foamed metal, foamed resin, and the like are used as the element of the porous member used in the main valve body.

Since the main valve body 150 can be driven by the stepping motor 151, even if the main valve body 150 at the inlet of the throttle section is clogged with foreign materials in a cycle, the deterioration of performance of the main valve body 150 due to clogging can be prevented by moving a new surface thereof to the inlet by driving the motor. Further, even if the inlet portion of the porous member of the entire surface of the main valve body is clogged, the groove 153 formed in the main valve body 150 permits the function of the main valve body as the throttle device to be maintained by driving the main valve body 150 with the motor to such position that the inlet of the throttle section partly include the groove. Since the main valve has sufficient reliability as the throttle device, it is possible to provide an air conditioning apparatus having sufficient reliability.

Next, an operation control method of the air conditioning apparatus of this embodiment will be described. A preset temperature and humidity, for example, are set for the air conditioning apparatus when it is operated in order to set a temperature and humidity environment preferred by an inhabitant in a room. Note that the inhabitant may directly input the respective set values of the preset temperature and humidity from a remote controller of an indoor unit. Further, an optimum temperature and humidity value table, which is determined for respective inhabitants who are sensitive to the heat and cold, children, elderly persons, and the like, may be stored in the remote controller of the indoor unit so that they can directly input any stored optimum values. Further, the indoor unit 34 is provided with sensors for detecting the temperature and humidity of the intake air of the indoor unit to detect the room temperature and humidity.

When the air conditioning apparatus is started, the difference between a preset temperature and an intake air temperature of the room and the difference between a preset humidity and an intake air humidity of the room are calculated as a temperature difference and a humidity difference, respectively, and the rotational frequency of the compressor 1, the number of revolutions of the outdoor fan, the number of revolutions of the indoor fan, the degree of throttle opening of the first flow control valve 4, and the opening/closing of the second flow control valve 6 of the air conditioning apparatus are controlled such that these differences are finally set to zero or within predetermined values. At this time, when the temperature and humidity differences are controlled to zero or within the predetermined values, the air conditioning apparatus is controlled giving priority to the temperature difference over the humidity difference.

That is, when both the temperature and humidity differences are large at the start of the air conditioning apparatus, a controller instructs the second flow control valve 6 such that the groove 153 of the main valve body 150 is located at the position of the pipe 9 connected to the second flow controller and the first indoor heat exchanger 5 and at the position of the pipe 13 connected to the second indoor heat exchanger 7, as shown in FIG. 57(b). Since the refrigerant passing through the second flow controller has almost no pressure loss, neither the cooling capacity nor the cooling efficiency is reduced. As described above, the second flow controller valve 6 is set to the open state, and the air conditioning apparatus is operated first such that the temperature difference in the room is preferentially set to zero or within the predetermined value in an ordinary cooling operation. When the cooling capacity of the air conditioning apparatus agrees with the heat load of the room and the temperature difference is set to zero or within the predetermined value, the humidity difference is detected. When the humidity difference is set to zero or within the predetermined value at this time, the operation of the air conditioning apparatus will be continued as it is.

When the temperature difference is zero or within the predetermined value and the humidity difference at the time still has a large value, the second flow control valve 6 is located at such a position that the portion of the main valve body 150 other than the groove 153 is in intimate contact with the end of the pipe 9 connected to the second flow controller and the first indoor heat exchanger 5 and with the end of the pipe 13 connected to the second indoor heat exchanger 7, as shown in FIG. 57(a). As described above, the operation of the air conditioning apparatus is switched to a cooling/dehumidifying operation by throttling the second flow control valve 6. In the cooling/dehumidifying operation, the heating amount of the second indoor heat exchanger 7 is controlled such that the temperature difference in the room can be maintained at zero or within the predetermined value as well as the cooling/dehumidifying amount of the first indoor heat exchanger 5 is controlled such that the humidity difference is set to zero or within the predetermined value. The control of the heating amount of the second indoor heat exchanger 7 is adjusted by the number of revolutions of the fan of the outdoor heat exchanger 3, the degree of opening of the first flow control valve 4, and the like. Further, the cooling/dehumidifying amount of the first indoor heat exchanger 5 is controlled by the rotational frequency of the compressor 1, the number of revolutions of the indoor fan 41 of the indoor unit 34, and the like.

As described above, it is possible in this embodiment to control the temperature and humidity environment in a room to an optimum state according to the preference of an inhabitant by switching the refrigerant circuit between the ordinary cooling operation and the cooling/dehumidifying operation according to the load of the room in the cooling operation. Further, even if the state of phase of the refrigerant passing through the throttle device and the mixing ratio of gas and liquid in the refrigerant are changed by the change of modes such as cooling, dehumidifying, heating, and the like and the change of an air conditioning load, the refrigerant can stably flow through the sintered metal of the porous member 152 at a low noise level.

The air conditioning apparatus of the present invention will be described below. This description relates to a heating operation, and a refrigerant circuit constituting the air conditioning apparatus is similar to that of, for example, the embodiment 1 shown in FIG. 1, and the structure of the second flow control valve 6 is the same as that shown in FIG. 55. Operation of the air conditioning apparatus in heating will be described. In FIG. 1, the flow of the refrigerant in the heating is shown by broken arrows. In an ordinary heating operation, the controller instructs the second flow control valve 6 such that the groove 153 of the main valve body 150 is located at the position of the pipe 9 connected to the second flow controller and the first indoor heat exchanger 5 and at the position of the pipe 13 connected to the second indoor heat exchanger 7, as shown in FIG. 57(b).

At this time, the high temperature and high pressure refrigerant vapor ejected from the compressor 1 flows into the second indoor heat exchanger 7 and the first indoor heat exchanger 5 through the 4-way valve 2, exchanges heat with the indoor air and is condensed and liquefied. Note that since the pipe 9 is connected to the pipe 13 through a large opening area as shown in FIG. 57(b), the refrigerant has almost no pressure loss when it passes through the valve, and thus no decrease in the heating capacity and efficiency is caused by the pressure loss. The high pressure liquid refrigerant ejected from the first indoor heat exchanger 5 is reduced in pressure by the first flow controller 4 and made into a gas/liquid two-phase refrigerant, which exchanges heat with the outdoor air in the outdoor heat exchanger 3 and is evaporated. The low pressure vapor refrigerant ejected from the outdoor heat exchanger 3 returns to the compressor 1 again through the 4-way valve 2. The degree of opening of the first flow control valve 4 in the ordinary cooling operation is controlled such that the degree of superheat of the refrigerant at the outlet of the outdoor heat exchanger 3 is set to, for example, 5° C.

Next, operation of the air conditioning apparatus in heating/dehumidifying will be explained in correspondence to the alphanumeric characters shown in FIG. 1. In the heating/dehumidifying operation, the controller instructs the second flow control valve 6 such that the main valve body 150 is located at the position where it is in intimate contact with the end of the pipe 9 connected to the second flow controller and the first indoor heat exchanger 5 and at the position where it is in intimate contact with the end of the pipe 13 connected to the second indoor heat exchanger 7, as shown in FIG. 57(a). At this time, the high temperature and pressure vapor refrigerant ejected from the compressor 1 flows into the second indoor heat exchanger 7 through the 4-way valve 2, exchanges the heat with indoor air, and is condensed (point E). The high pressure liquid refrigerant or the gas/liquid two-phase refrigerant flows into the second flow control valve 6.

In the second flow control valve 6, since the main valve body 150 is in intimate contact with the end of the pipe 9 connected to the second flow controller and the first indoor heat exchanger 5 and with the end of the pipe 13 connected to the second indoor heat exchanger 7, as shown in FIG. 57(a), the refrigerant flowed into the valve flows into the first indoor heat exchanger 5 through the vent holes in the main valve body 150 composed of the sintered metal. Since the vent holes of the main valve body 150 have a diameter of about 40 micrometers, the refrigerant passing through the vent holes is reduced in pressure and made into an intermediate pressure gas/liquid two-phase refrigerant which flows into the first indoor heat exchanger 5 (point D). The saturation temperature of the refrigerant flowed into the first indoor heat exchanger 5 is equal to or less than the dew point temperature of the indoor air, and the refrigerant is evaporated by drawing the sensible heat and the latent heat of the indoor air (point C). The intermediate pressure gas/liquid two-phase refrigerant ejected from the first indoor heat exchanger 5 flows into the first flow control valve 4, is reduced in pressure, further flows into the outdoor heat exchanger 3, and exchanges heat with the outdoor air and is evaporated. The low pressure vapor refrigerant ejected from the outdoor heat exchanger 4 returns to the compressor 1 again through the 4-way valve 2.

In the heating/dehumidifying operation, since the indoor air is heated in the second indoor heat exchanger 7 as well as cooled and dehumidified in the first indoor heat exchanger 5, it is possible to dehumidify the room while heating it. Further, in the heating/dehumidifying operation, it is possible to control a blowing-out air temperature in a wide range by controlling the heat exchange amount of the outdoor heat exchanger 3 by adjusting the rotational frequency of the compressor 1 and the number of revolutions of the fan of the outdoor heat exchanger 3 and by controlling the heating amount of indoor air heated by the first indoor heat exchanger 5. Further, it is also possible to control the dehumidifying amount of the indoor air dehumidified by the first indoor heat exchanger 5 by controlling the evaporating temperature of the first indoor heat exchanger 5 by adjusting the degree of opening of the first flow controller 4 and the number of revolutions of the indoor fan. The degree of opening of the first flow control valve 4 is controlled such that the degree of supercooling of the refrigerant at the outlet of the second indoor heat exchanger 7 is set to, for example, 10° C.

As described above, this embodiment employs the second flow control valve using sintered metal as the valve main body, which permits the dehumidifying operation when heating is carried out as well as can prevent the occurrence of refrigerant flow noise in the heating/dehumidifying operation, whereby a comfortable space can be realized from the standpoint of temperature and humidity environment and noise.

Further, at the start of heating, and the like, the second flow control valve 6 is controlled such that the main valve body 150 is caused to come into intimate contact with the end of the pipe 9 connected to the second flow controller and the first indoor heat exchanger 5 and with the end of the pipe 13 connected to the second indoor heat exchanger 7 and throttled, as shown in FIG. 57(*a*), thereby it is possible to increase the temperature of heating blowing-out air. That is, the above heating and dehumidifying cycle is formed at the start of heating, and the evaporating temperature of the first indoor heat exchanger 5 is controlled by the second flow control valve such that it is made approximately the same as the temperature of indoor intake air. Since the evaporating temperature of the first indoor heat exchanger 5 is approximately the same as the temperature of the intake air of the room, almost no cooling and dehumidifying are carried out in the first indoor heat exchanger 5. As a result, the heat transfer area of the condenser in heating is made about one half that in the ordinary heating operation, and thus a condensing temperature is increased as compared with that in the ordinary heating operation, whereby the blowing-out temperature can be increased. Further, even if the high temperature air is blown out in the heating operation, no refrigerant flow noise is produced in the second flow control valve 6 and thus no problem is caused from noise point of view.

Next, an example of a specific heating operation control method of the air conditioning apparatus of this embodiment will be described. As described in the embodiment 1, a preset temperature, a preset humidity, and an intake air temperature and humidity have been input to the air conditioning apparatus. The air conditioning apparatus carries out a high temperature air blowing out operation for a predetermined period of time, for example, five minutes at the start of heating and then shifts to the ordinary heating operation. Thereafter, switching between the ordinary heating operation and the heating/dehumidifying operation is controlled according to the temperature difference and the humidity difference of the room.

At the start of heating operation, the second flow control valve 6 is controlled such that the main valve body 150 is caused to come into intimate contact with the end of the pipe 9 connected to the second flow controller and the first indoor heat exchanger 5 and with the end of the pipe 13 connected to the second indoor heat exchanger 7 and throttled, as shown in FIG. 57(*a*); then the compressor 1 is started. At this time, the evaporating temperature of the first indoor heat exchanger 5 is controlled to be equal to the intake air temperature by adjusting the number of revolutions of the fan of the outdoor heat exchanger 3, the degree of opening of the first flow control valve 4, and the like such that the cooling and dehumidifying capacity in the first indoor heat exchanger 5 is set to zero. When the five minutes as the predetermined period of time from the start of the compressor have passed, the air conditioning apparatus shifts to the ordinary heating operation by setting the second flow control valve 6 to the open state, as shown in FIG. 57(*b*).

At this time, the rotational frequency of the compressor 1, the number of revolutions of the indoor fan, and the number of revolutions of the outdoor fan are adjusted such that the temperature difference is set to zero or within a predetermined value. When the temperature difference is set to zero or within the predetermined value by the ordinary heating operation, the humidity difference is detected. When the humidity difference is set to zero or within a predetermined value or when humidifying is necessary even if the humidity difference is equal to or larger than the predetermined value, the ordinary heating operation is continued. In contrast, when the humidity difference is zero or equal to or larger than the predetermined value and dehumidifying is necessary, the heating/dehumidifying operation is carried out by setting the second flow control valve 6 to the throttled state, as shown in FIG. 57(*a*).

In the heating/dehumidifying operation, the heating amount of the second indoor heat exchanger 7 is controlled such that the temperature difference in the room can be maintained at zero or within the predetermined value and also the cooling/dehumidifying amount of the first indoor heat exchanger 5 is controlled such that the humidity difference is set to zero or within the predetermined value. The heating amount of the second indoor heat exchanger 7 is controlled by the rotational frequency of the compressor 1, the number of revolutions of the fan of the indoor unit 34, and the like. Further, the control of the cooling/dehumidifying amount of the first indoor heat exchanger 5 is adjusted by the number of revolutions of the fan of the outdoor heat exchanger 3, the degree of opening of the first flow control valve 4, and the like.

As described above, it is possible in this embodiment to control the temperature and humidity environment in the room to an optimum state according to the preference of an inhabitant by switching the refrigerant circuit from one to another of the heating/high temperature air blowing out operation, the ordinary heating operation, and the heating/dehumidifying operation according to the operating time and the load based on the room in the heating operation.

Figure 58:
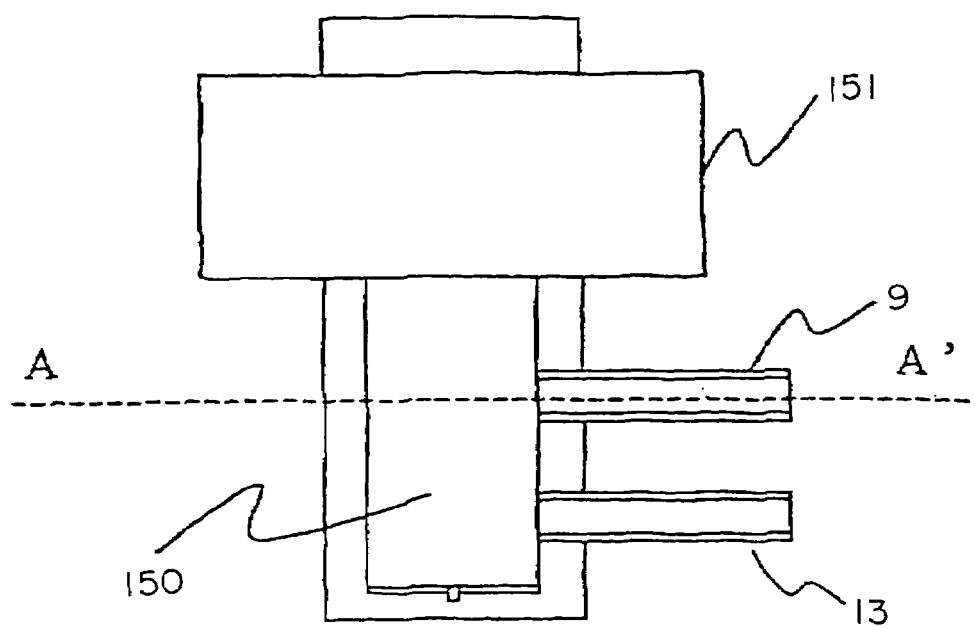
FIG. 58 is a sectional view of the arrangement of the throttle device according to the embodiment 2 of the present invention.
Figure 59:
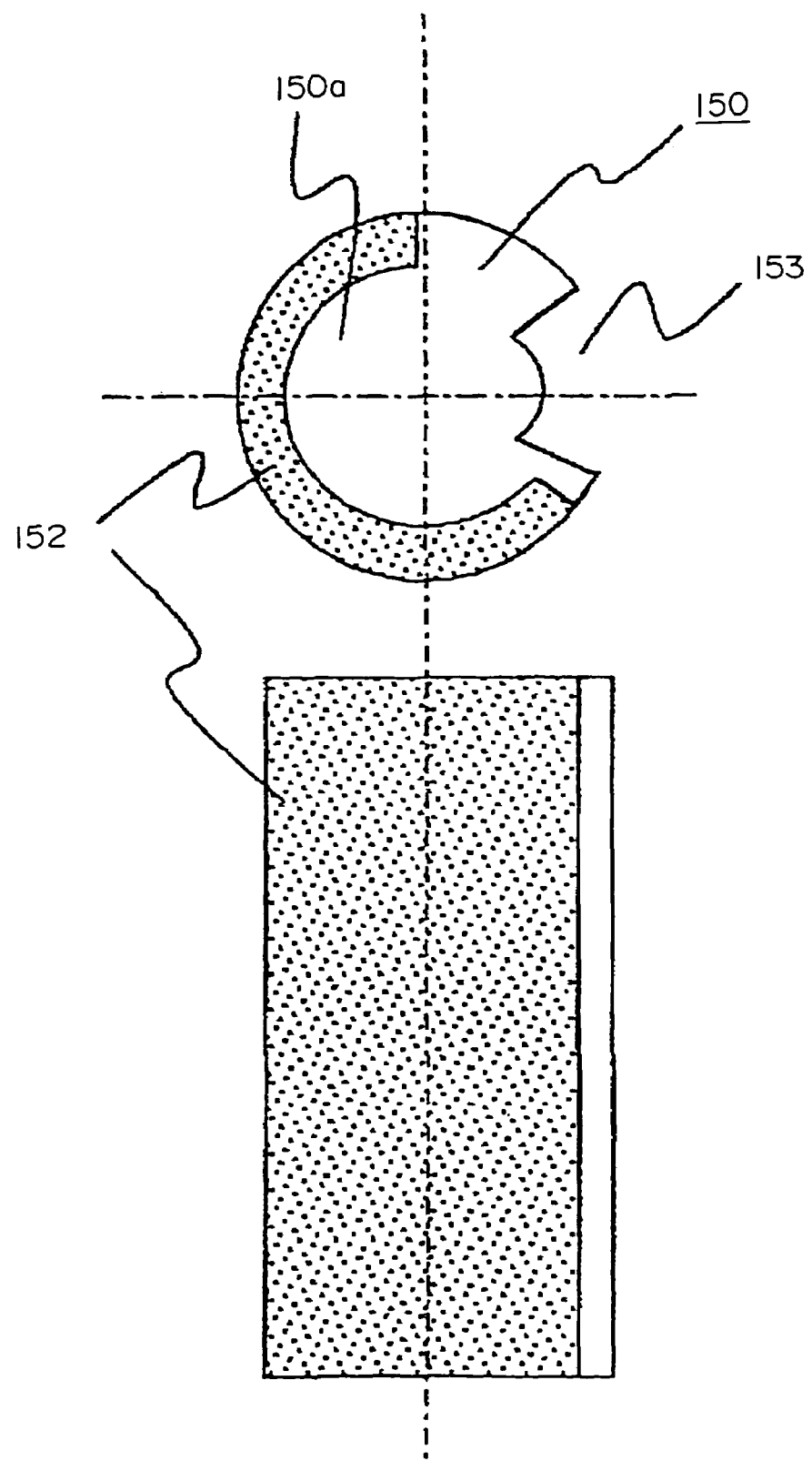
FIG. 59 is a detailed view of a main valve body of the throttle device according to the embodiment 2 of the present invention.

FIG. 58 is a sectional view of the arrangement of the second flow controller of the air conditioning apparatus showing another example thereof, and FIG. 59 is a sectional view of the main valve body 150 of the second flow controller shown in FIG. 58, wherein the constitutional components that are the same as or similar to those shown in FIGS. 55 and 56 are denoted by the same reference numerals, and the duplicate description thereof is omitted. In this embodiment, the main valve body 150 is arranged such that the porous member 152 is assembled to a core portion 150*a* of resin or metal that is ordinarily used.

Figure 60:
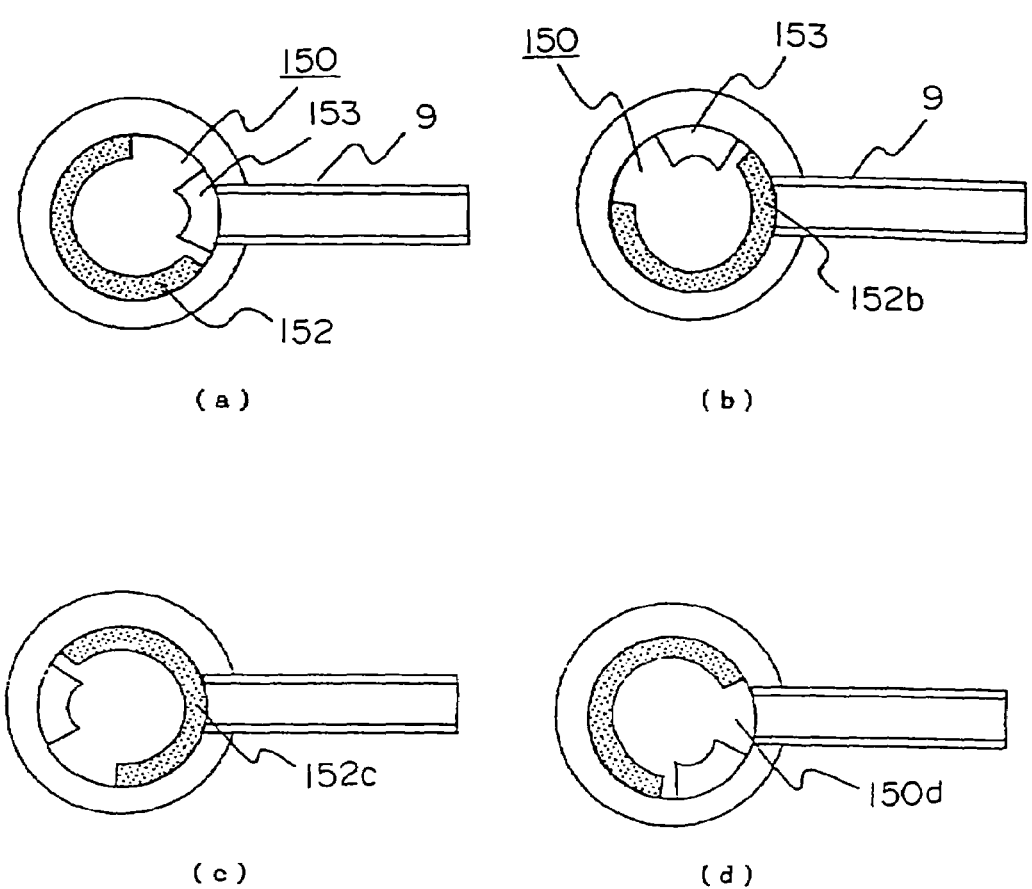
FIG. 60 depicts sectional views of the arrangement of the throttle device according to the embodiment 2 of the present invention.

Driving the stepping motor 151 in response to a command from the controller (not shown) causes the main valve body 150 to be located at the position shown in FIG. 60(*a*), whereby the pipe 9 connected to the first indoor heat exchanger 5 can be connected to the pipe 13 connected to the second indoor heat exchanger 7 with almost no pressure loss through the groove 153 of the main valve body. Driving the stepping motor 151 in the same way causes the porous member 152 of the main valve body 150 to face the pipe 9 connected to the first indoor heat exchanger 5 and the pipe 13 connected to the second indoor heat exchanger 7 at the position of 152b, as shown in FIG. 60(b), whereby these pipes are connected to each other through the vent holes. Further, driving the stepping motor 151 in the same way causes the porous member 152 of the main valve body 150 to face the pipe 98 connected to the first indoor heat exchanger 5 and the pipe 13 connected to the second indoor heat exchanger 7 at the position of the porous member 152c, as shown in FIG. 60(c), whereby these pipes are connected to each other through the vent holes. Driving the stepping motor 151 in the same way causes the shut-off portion 150d of the main valve body 150 to face the pipe 9 connected to the first indoor heat exchanger 5 and the pipe 13 connected to the second indoor heat exchanger 7, as shown in FIG. 60(d), whereby the shut-off portion 150d shuts off the flow path.

The second flow controller 6 in which no refrigerant flow noise is produced can be obtained at a less expensive material cost by molding a part of the main valve body 150 of the sintered metal as shown in this embodiment rather than molding the overall main valve body 150 of the sintered metal as shown in FIG. 56. The core portion 150a prevents the groove 153 from communicating with the porous permeable member 152. Accordingly, the refrigerant does not flow into the porous permeable member 152 in the open state shown in FIG. 60(a), and thus the durability of the porous permeable member 152 can be improved.

Further, when the compressor 1 is intermittently operated such as when it is repeatedly started and stopped in a case such that the air conditioning load is smaller than the capacity of the compressor 1 of the air conditioning apparatus even if the number of revolutions thereof is minimized, the pressure in the outdoor heat exchanger 3 and the pressure in the indoor heat exchanger 5 are kept in the state during operation when the compressor is stopped by totally closing the pipes 9 and 13 by causing the shut-off portion 150d having a resin or metal surface similarly to the main valve body 150 to face the pipes as shown in FIG. 60(d) and the starting-up performance of the compressor 1 is improved when it is started next, whereby energy saving operation can be realized.

Figure 61:
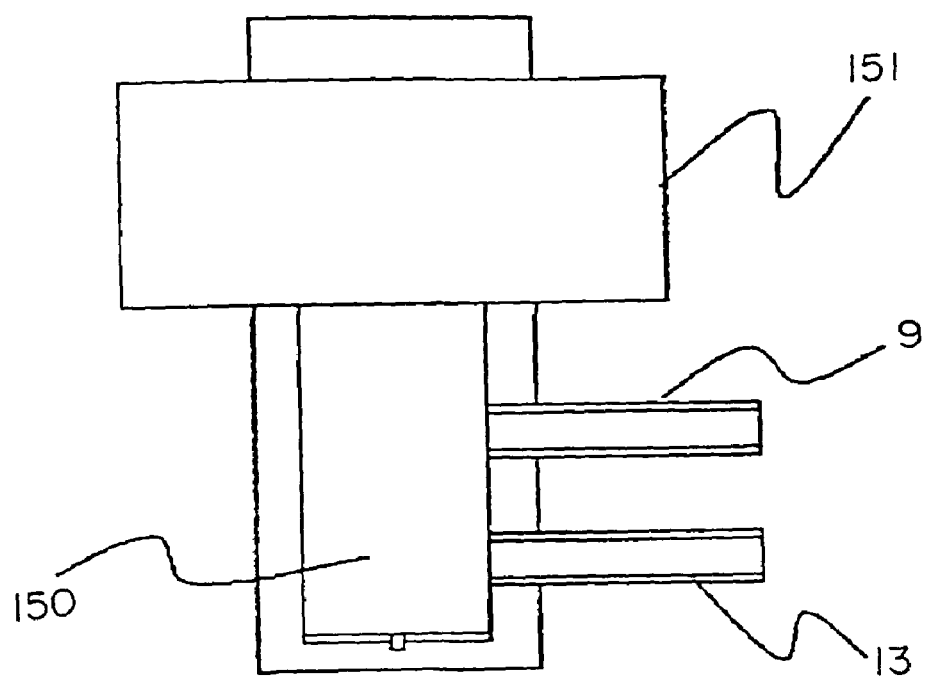
FIG. 61 is a sectional view of the arrangement of the throttle device according to the embodiment 2 of the present invention.
Figure 62:
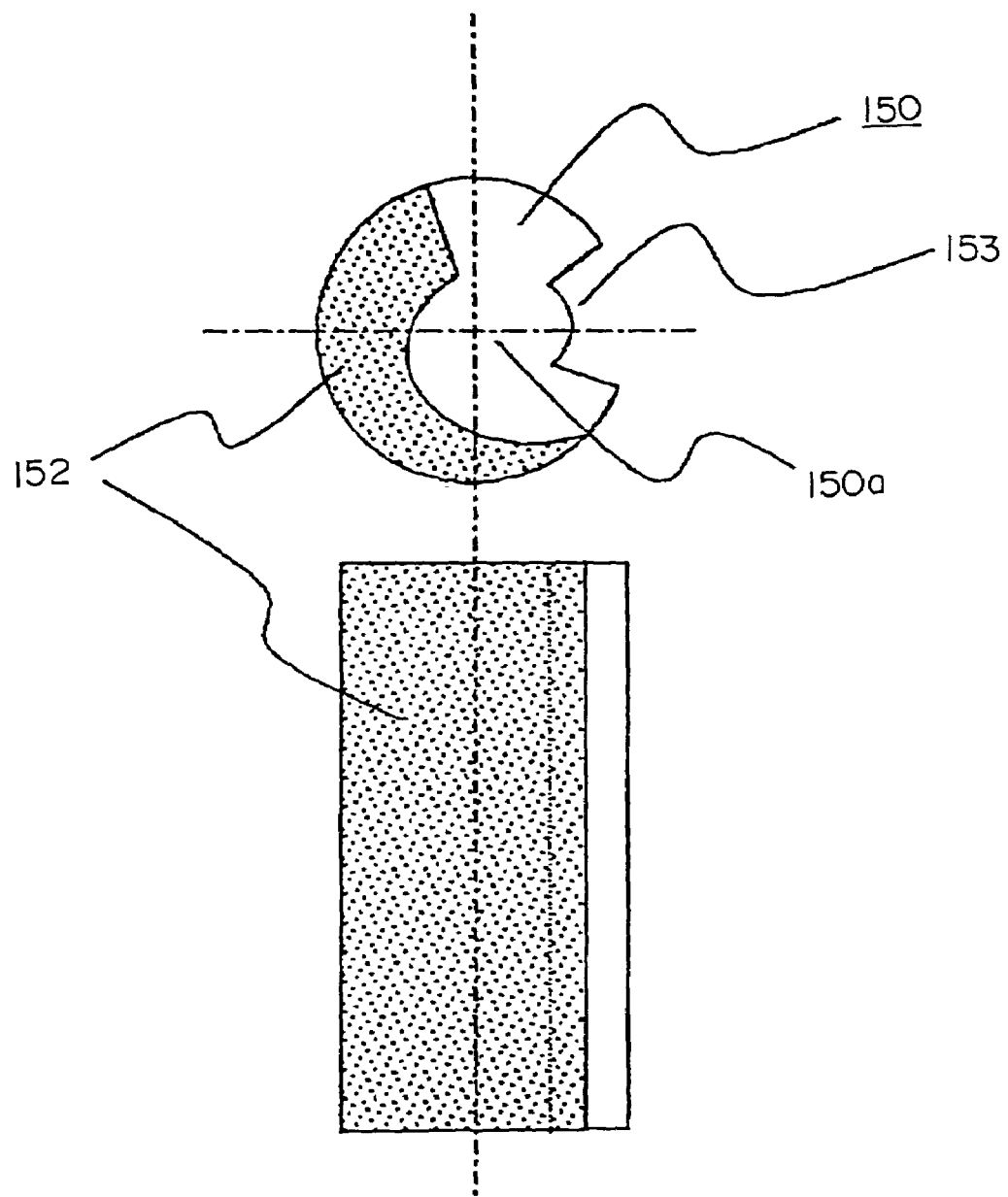
FIG. 62 is a sectional view of the arrangement of the throttle device according to the embodiment 2 of the present invention.

FIG. 61 is a sectional view of the arrangement of the second flow controller of the air conditioning apparatus showing another example of the present invention, and FIG. 62 is a sectional view of the main valve body 150 of the second flow controller showing another example of the present invention, wherein the constitutional components that are the same as or similar to those shown in FIGS. 55 and 56 are denoted by the same reference numerals, and the duplicate description thereof is omitted. In this embodiment, the main valve 15 is arranged such that sintered metal is assembled to ordinarily used resin or metal so that the thickness thereof is continuously increased with respect to the center of a valve disc.

Figure 63:
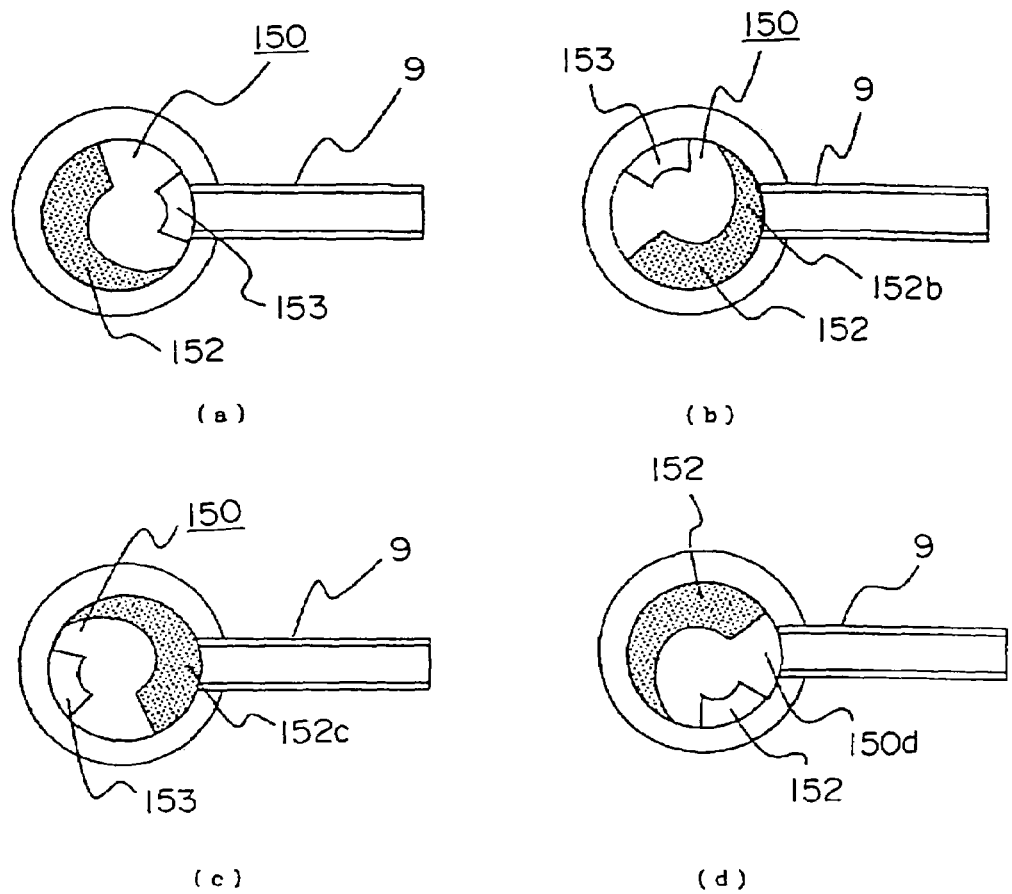
FIG. 63 depicts sectional views of the arrangement of the throttle device according to the embodiment 2 of the present invention.

Driving the stepping motor 151 in response to a command from the controller (not shown) causes the groove 153 of the main valve body 150 to be located at a position where a connecting flow path for connecting the pipe 9 connected to the first indoor heat exchanger 5 to the pipe 13 connected to the second indoor heat exchanger 7 is formed, as shown in FIG. 63(a). In this state, they can be connected to each other with almost no pressure loss. Driving the stepping motor 151 in the same way causes the porous member 152 of the main valve body 150 to be located at the position where the pipe 9 connected to the first indoor heat exchanger 5 and the pipe 13 connected to the second indoor heat exchanger 7 face the thin wall portion 152b of the porous member 152 having a large flow resistance, as shown in FIG. 63(b) to thereby connect them through the vent holes.

Further, driving the stepping motor 151 in the same way causes the porous member 152 of the main valve body 150 to be located at the position where the pipe 9 connected to the first indoor heat exchanger 5 and the pipe 13 connected to the second indoor heat exchanger 7 face the thick wall portion 152c of the porous member 152 having a small flow resistance, as shown in FIG. 63(c) to thereby connect them through the vent holes. Further, driving the stepping motor 151 causes the shut-off portion 150d of the main valve body 150 to face the pipe 9 connected to the first indoor heat exchanger 5 and the pipe 13 connected to the second indoor heat exchanger 7, as shown in FIG. 152(d), and thus a refrigerant flow path is shut off.

The second flow controller 6 in which no refrigerant flow noise is produced can be obtained at a less expensive material cost by molding a part of the main valve body 150 of the sintered metal as shown in this structure rather than molding the whole main valve body 150 of the sintered metal as shown in FIG. 56. Further, when the number of revolutions of the compressor 1 of the air conditioning apparatus is adjusted according to an air conditioning load, the pressure difference between the first indoor heat exchanger 5 and the second indoor heat exchanger 7 can be adjusted by moving the valve disc by the stepping motor 151 of the second flow controller 6 to operate the refrigerating cycle most effectively. Continuously forming the sintered metal permits the main valve body 150 to be processed simply. Further, the main valve body 150 can be reduced in size because the portion where the porous member 152 directly faces the pipes 9 and 13 and the portion in the vicinity thereof can be arranged as a flow path.

Figure 64:
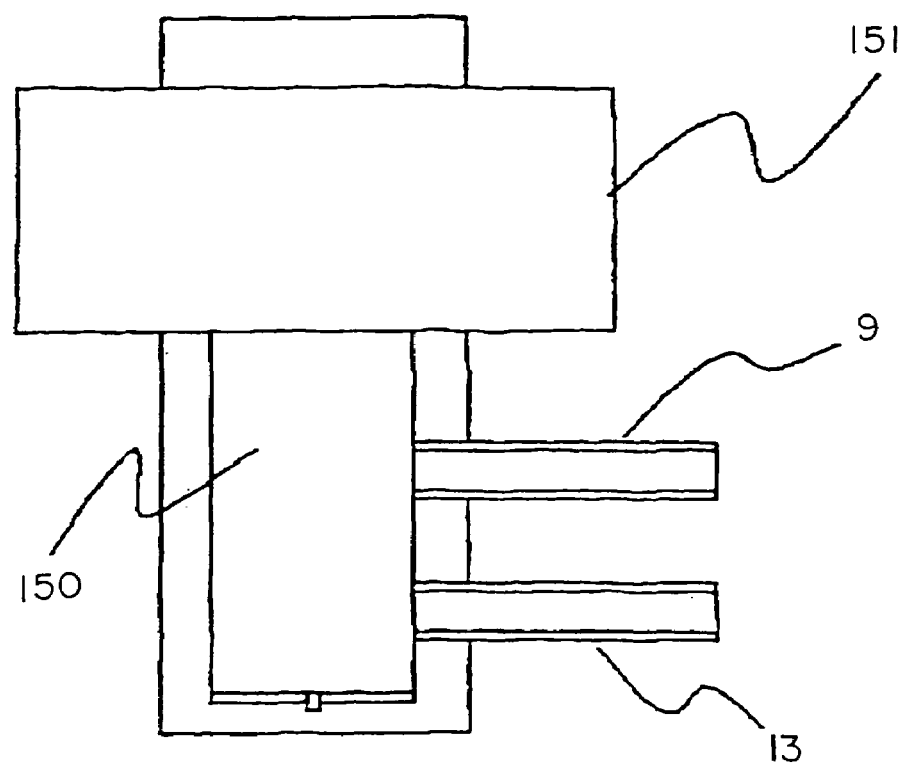
FIG. 64 is a sectional view of the arrangement of the throttle device according to the embodiment 2 of the present invention.
Figure 65:
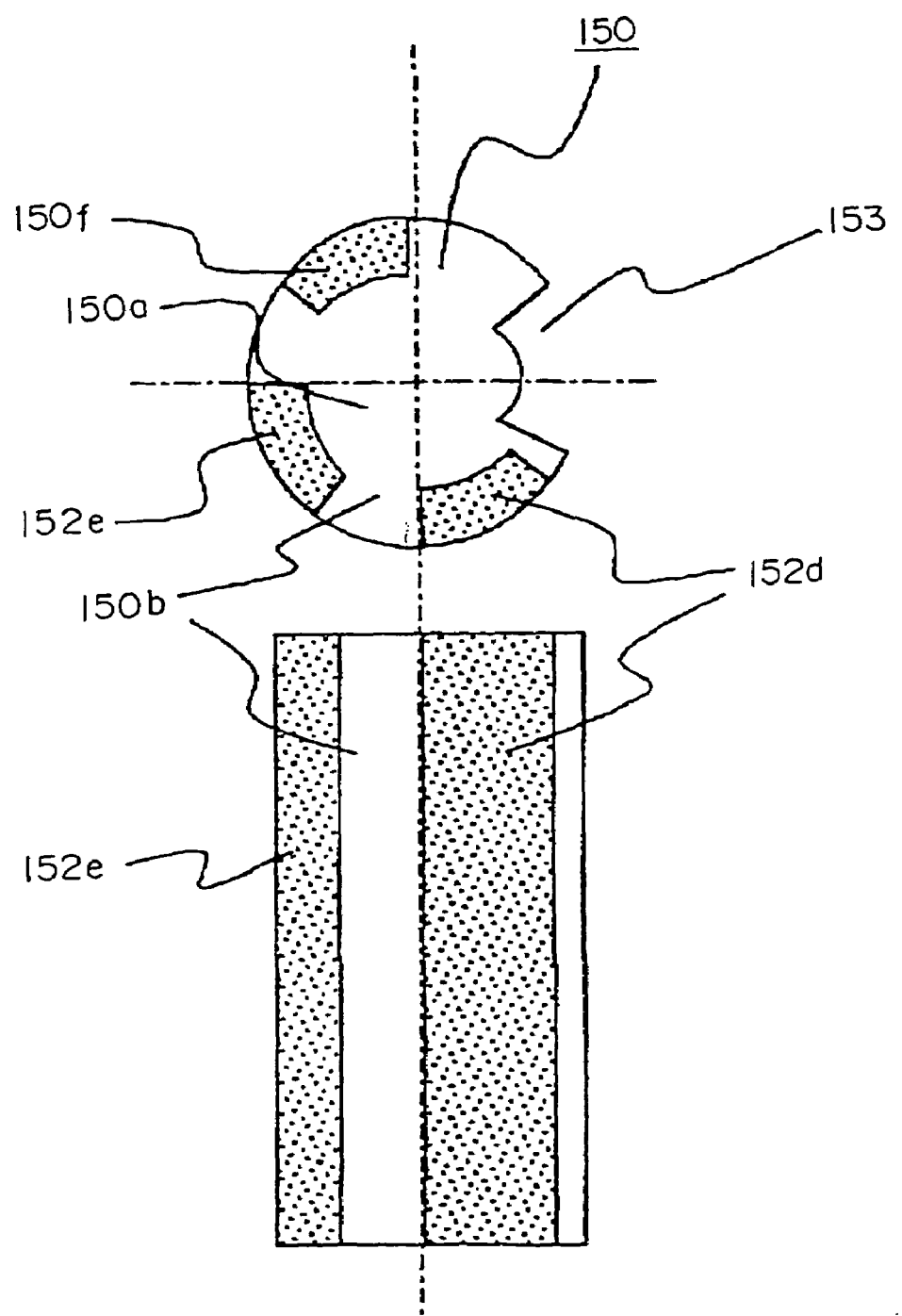
FIG. 65 is a sectional view of the arrangement of the throttle device according to the embodiment 2 of the present invention.

FIG. 64 is a sectional view of the arrangement of the second flow controller of the air conditioning apparatus, and FIG. 65 is a sectional view of the main valve body 150 of the second flow controller, wherein the constitutional components that are the same as or similar to those shown in FIGS. 55 and 56 are denoted by the same reference numerals, and the duplicate description thereof is omitted. In this embodiment, the core portion 150a of the main valve body 150 is composed of ordinarily used resin or metal, and three types of porous members 152d, 152e, and 152f composed of sintered metal and having vent holes with different average diameters are assembled and disposed in the core portion 150a in the order of the flow resistances thereof; the respective porous members are partitioned from each other by partitions 150b composed of the same material as that of the core portion 150a.

Driving the stepping motor 151 in response to a command from the controller (not shown) causes the groove 153 of the main valve body 150 to be connected to the pipe 9 connected to the first indoor heat exchanger 5 and to the pipe 13 connected to the second indoor heat exchanger 7 with almost no pressure loss, as shown in FIG. 66(a). Driving the stepping motor 151 in the same way causes the porous member 152d, having a small flow resistance, of the main valve body 150 to face the pipe 9 connected to the first indoor heat exchanger 5 and the pipe 13 connected to the second indoor heat exchanger 7, as shown in FIG. 66(b) to thereby connect them through the vent holes.

Figure 66:
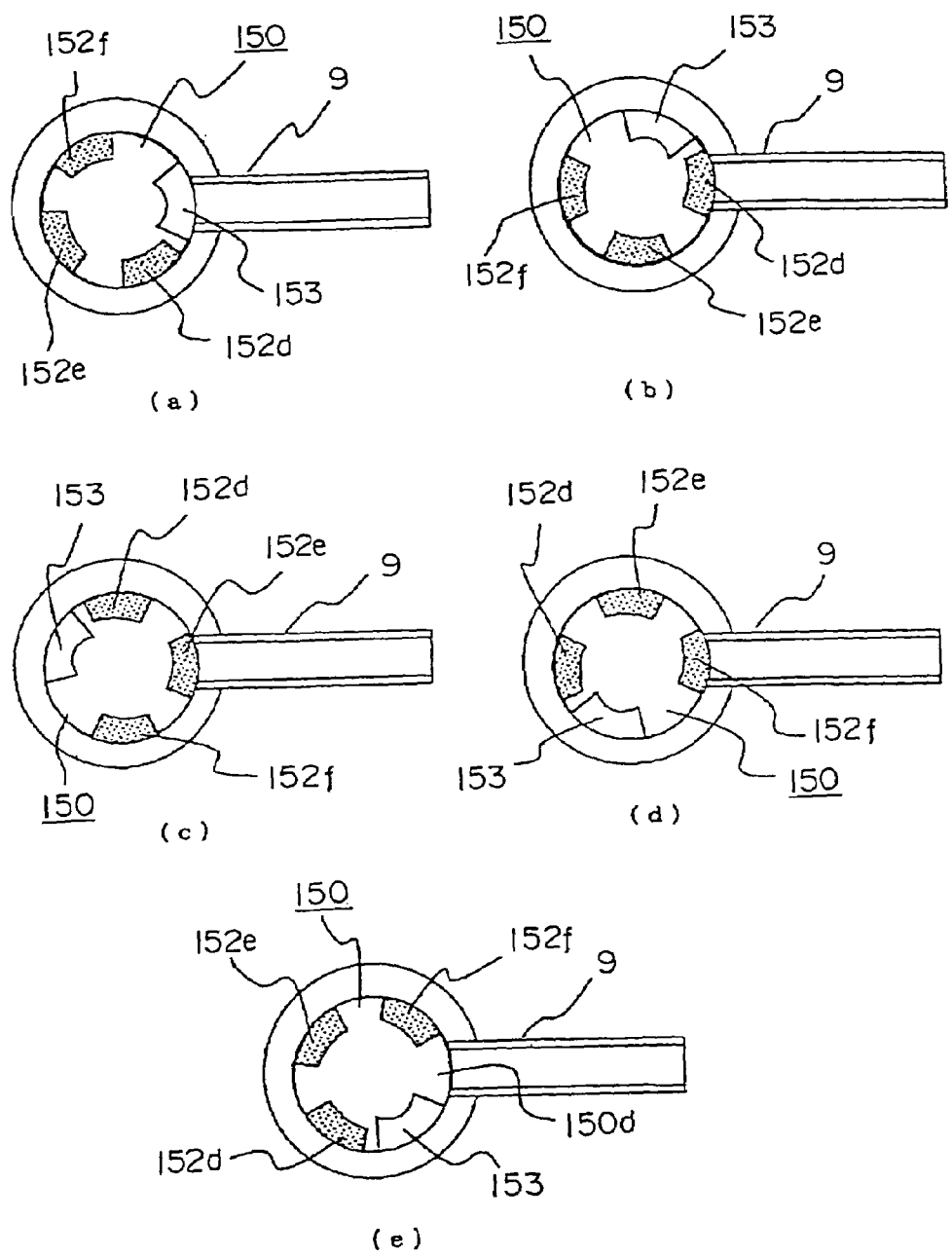
FIG. 66 depicts sectional views of the arrangement of the throttle device according to the embodiment 2 of the present invention.

Driving the stepping motor 151 in the same way causes the porous member 152e having an intermediate flow resistance to face the pipe 9 connected to the first indoor heat exchanger 5 and the pipe 13 connected to the second indoor heat exchanger 7, as shown in FIG. 66(*c*) to thereby connect them through the vent holes. Driving the stepping motor 151 in the same way causes the porous member 152c having a large flow resistance to face the pipe 9 connected to the first indoor heat exchanger 5 and the pipe 13 connected to the second indoor heat exchanger 7, as shown in FIG. 66(*d*) to thereby connect them through the vent holes. Further, driving the stepping motor in the same way causes the shut-off portion 150d of the main valve body 150 to face the pipe 9 connected to the first indoor heat exchanger 5 and the pipe 13 connected to the second indoor heat exchanger 7, as shown in FIG. 66(*e*) to thereby shut off the refrigerant flow path.

The second flow controller 6 in which no refrigerant flow noise is produced can be obtained with easy processing at a less expensive material cost by forming the main valve body 150 by assembling the three types of sintered metals whose vent holes have the different average diameters to the ordinarily used resin or metal at the three positions of the main valve body 150 as shown in FIG. 65 rather than molding the main valve body 150 by assembling the sintered metal to the ordinarily used resin or metal such that the thickness of the sintered metal is continuously increased with respect to the center of the valve disc as shown in FIG. 61. The cross sectional areas of the flow paths of the plurality of porous members 152 can be precisely partitioned from each other by partitioning them by the partitions 150b, and thus the flow rate can be controlled precisely. In particular, the refrigerant can be prevented from flowing into the porous member having the small flow resistance by partitioning the porous members each having the different flow resistance by the partitions 150d as in this embodiment.

Figure 67:
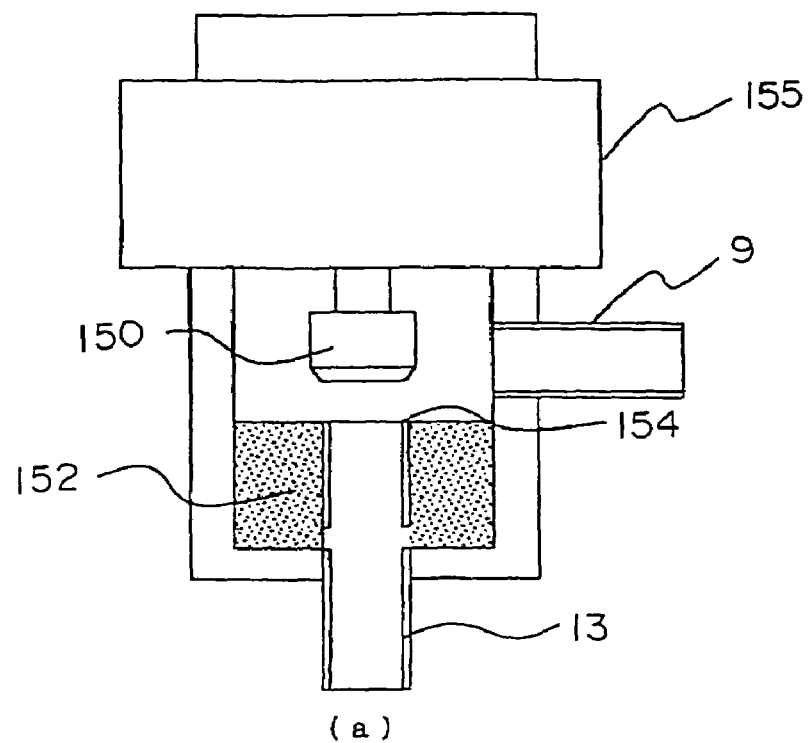
FIG. 67 depicts sectional views of the arrangement of the throttle device according to the embodiment 2 of the present invention.
Figure 67:
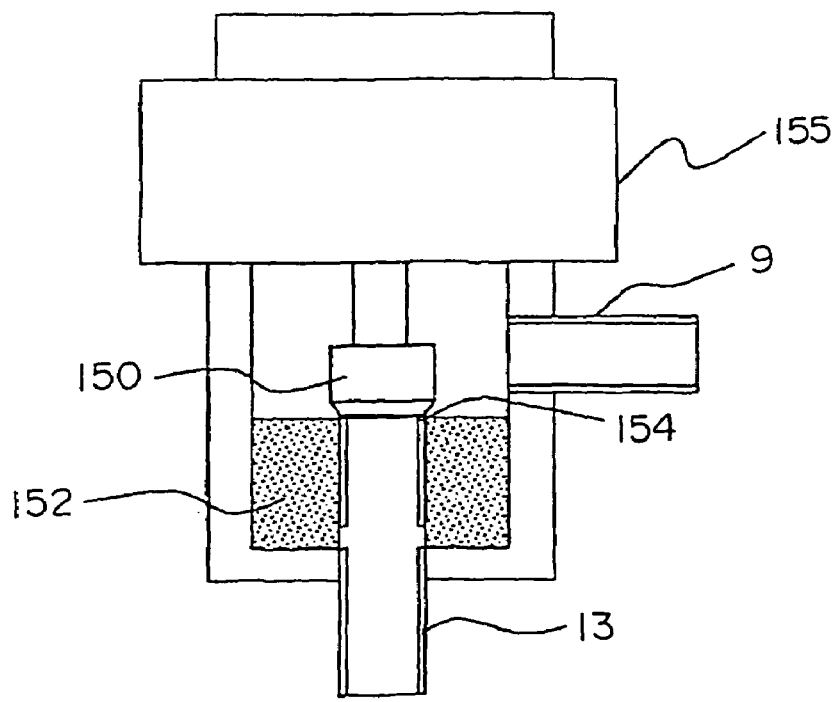

FIG. 67 is a sectional view of the arrangement of the second flow controller 6 of the air conditioning apparatus of the present invention, wherein the constitutional components that are the same as or similar to those shown in FIG. 55 are denoted by the same reference numerals, and the duplicate description thereof is omitted. In this embodiment, the main valve body 150 is composed of the ordinarily used resin or metal, and the space of the refrigerant flow path formed by the main valve body 150 and a valve seat 154 in a valve chamber is filled with the porous member 152 formed into a columnar shape. The sintered metal has vent holes whose average-diameter is 0.5 micrometer to 200 micrometers. The valve seat 154 forms a communication port for causing the porous member 152 in the periphery thereof to communicate with the pipe 13 on the pipe 13 side in the valve chamber.

Deenergizing an electromagnetic coil 155 causes the main valve body 150 to be separated from the valve seat 154, and thus the pipe 9 connected to the first indoor heat exchanger 5 can be connected to the pipe 13 connected to the second indoor heat exchanger 7 with almost no pressure loss because they are connected to each other through a large opening area, as shown in FIG. 67(*a*). Further, when the electromagnetic coil 155 is energized, the pipe 9 connected to the first indoor heat exchanger 5 and the pipe 13 connected to the second indoor heat exchanger 7 are connected to the throttle flow path of the porous member 152 of the sintered metal, which is formed by causing the main valve body 150 to come into intimate contact with the valve seat 154, through the vent holes of the porous member 152, as shown in FIG. 67(*b*).

In this embodiment, a low noise throttle device can be realized at lower cost as compared with the throttle device using the stepping motor because the main valve body 150 is driven by the electromagnetic coil 155. Since the porous member is formed into the columnar shape, it can be easily processed. Further, the durability to clogging of the porous member is greatly improved because the refrigerant inlet of the porous member can be increased in size. While the porous member is formed into the columnar shape in this embodiment, it is sufficient to form the porous member into any shape formed according to the space formed by the main valve body 150 and the valve seat 154.

Figure 68:
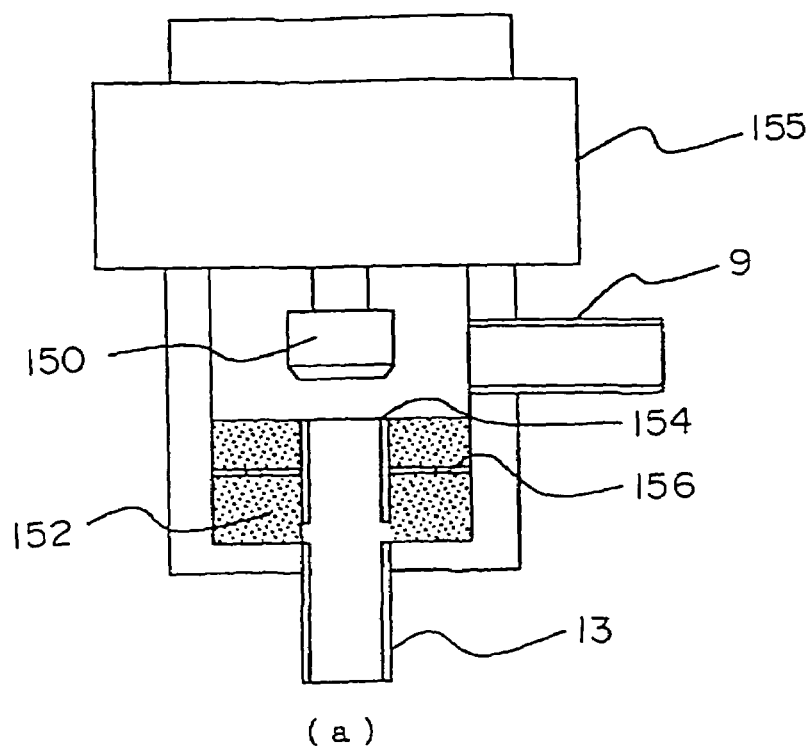
FIG. 68 depicts sectional views of the arrangement of the throttle device according to the embodiment 2 of the present invention.
Figure 68:
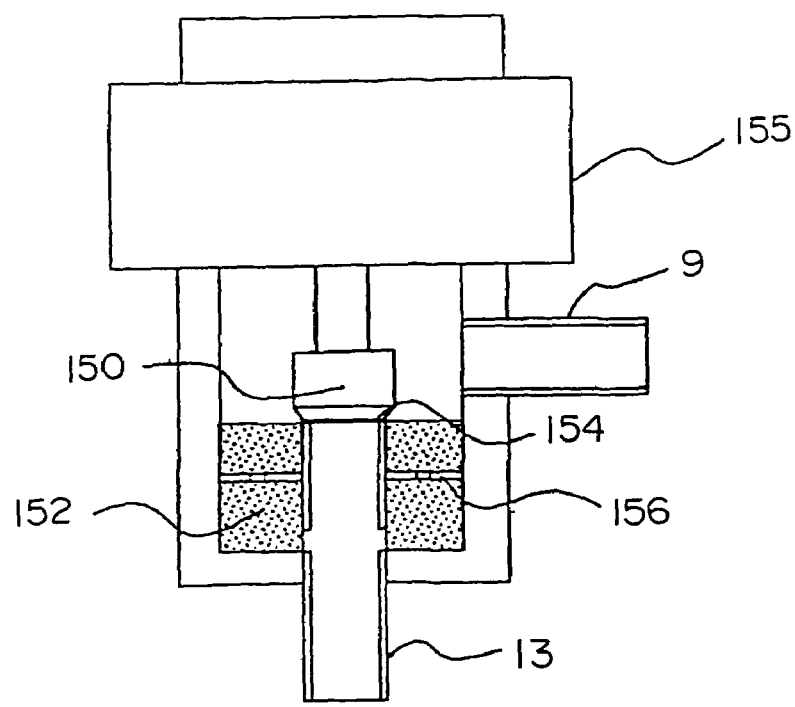
Figure 69:
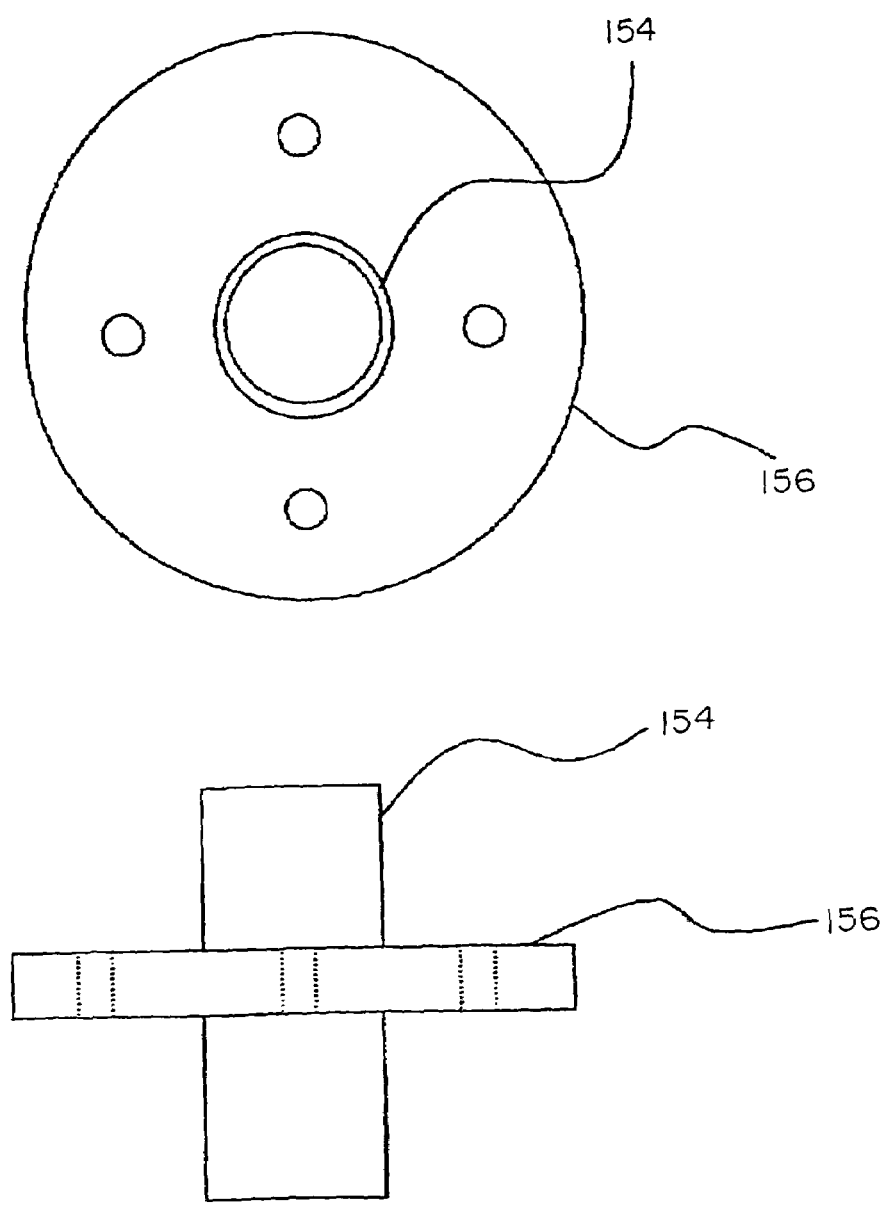
FIG. 69 is a detailed view of an orifice used in the throttle device according to the embodiment 2 of the present invention.

FIG. 68 is a sectional view of the arrangement of the second flow controller 6 of the air conditioning apparatus of the present invention, wherein the constitutional components that are the same as or similar to those shown in FIG. 55 are denoted by the same reference numerals, and the duplicate description thereof is omitted. Further, FIG. 69 is a detailed view of the orifices 156 used in the flow controller. The main valve body 150 and the valve seat 154 are formed of the ordinarily used resin or metal, and the main valve body 150 is moved in a vertical direction in the valve chamber by energizing and deenergizing the electromagnetic coil 155. The refrigerant flow path that reaches the pipe 13 bypassing the valve seat 154 is formed around the columnar valve seat 154 in the valve chamber formed by the main valve body 150 and the valve seat 154.

The porous members 152 composed of the sintered metal whose vent holes have a diameter of from 100 micrometers to 500 micrometers are uniformly disposed in the refrigerant flow path so as to be approximately flush with the upper end of the valve seat 154. Further, the orifices 156 each having an inside diameter of 0.5 mm and a thickness of 1 mm are equally disposed at four positions between the porous members 152 in the flow direction of the refrigerant. The orifices 156 are sandwiched between the upper and lower porous members 152 and fitted to the side wall of the valve chamber as well as the lower porous member 152 (located downstream of the refrigerant flow) is abutted against the bottom of the valve chamber so as to be fixed at a given position. The valve seat 154 is not abutted against the lower portion of the valve chamber (on the pipe 9 side), and a predetermined gap is formed to cause the refrigerant flow path to communicate with the pipe 13. However, since the valve seat 154 is fixed to the orifices 156 or formed integrally therewith, the above gap is held by the orifices 156 fixed in the vertical direction.

Deenergizing the electromagnetic coil 155 causes the main valve 150 to be separated from the valve seat 154, so that the pipe 9 connected to the first indoor heat exchanger 5 can be connected to the pipe 13 connected to the second indoor heat exchanger 7 with almost no pressure loss because they are connected to each other through the large opening area that uses the inside of the valve seat 154 as a path, as shown in FIG. 68(*a*). Further, when the electromagnetic coil 155 is energized, the refrigerant flow path around the valve seat 154 that is formed by causing the main valve body 150 to come into close contact with the valve seat 154 is connected to the pipe 9 connected to the first indoor heat exchanger 5 and to the pipe 13 connected to the second indoor heat exchanger 7 through the vent holes of the porous members 152 composed of the sintered metal and the orifices 156, as shown in FIG. 68(*b*).

The orifices 156 and the porous members 152 function as the throttle section together. The orifices 156 are in intimate contact with the porous members 152 located thereon and thereunder. The porous member 152 located on the upper side of the orifices 156 (upstream of the refrigerant flow) causes a gas/liquid two-phase refrigerant to pass therethrough in a mixed state and further prevents a pressure fluctuation produced by the orifices 156 from being transmitted upstream. The porous member 152 located on the lower side of the orifices 156 (downstream of the refrigerant flow) prevents the pressure fluctuation produced by a jet stream on the outlet side from being transmitted downstream, while it has no pressure drop produced by the orifices 156. The refrigerant flow in the refrigerating cycle is stable, and thus the air conditioning apparatus can realize a target air conditioning environment in a short time.

The pipe 9 acting as the refrigerant inlet is connected to the side of the valve chamber and the refrigerant flows in from the side of the valve chamber through the pipe 9. At the time, the main valve body 150 is positioned at the center of the valve chamber in the vertical direction and acts as a diffusion member for diffusing the inflow refrigerant. The inflow refrigerant from the pipe 9 impinges on the main valve body 150 and is diffused thereby, which prevents the refrigerant from impinging on the opposite wall in the valve chamber and partially flowing into the porous member 152 opposite to the pipe 9 in the valve chamber so as to effectively use the refrigerant flow path. Further, when the gas/liquid two-phase refrigerant impinges on the wall of the valve chamber and is diffused, it is separated to the liquid and the gas on the side where the refrigerant impinges in the valve chamber and on the pipe side (the side where the diffused refrigerant flows into the porous members 152), and, thus the phase state of the refrigerant flowing in the throttle section is not made uniform. However, since the main valve body 150 diffuses the inflow refrigerant at the center of the valve chamber, the refrigerant flows into the porous members 152 in a more uniform phase state.

Since the upper end of the valve seat 154 is approximately flush with the upper surface of the porous member 152, when the valve is opened (a state in which the main valve body 150 is moved upward and separated from the valve seat 154), the refrigerant from the pipe 9 smoothly flows into the valve seat 154. Further, the height in the valve chamber can be reduced by making the upper end of the valve seat 154 to be approximately flush with the upper surface of the porous member 152. When the valve is closed (a state in which the main valve body 150 is abutted against the valve seat 154), the main valve body 150 is not abutted against the porous member 152 because the peripheral corner of the main valve body 150 abutted against the valve seat 154 is chamfered. Therefore, it is not necessary for the porous members 152 to be provided with strength and durability capable of withstanding the abutment thereof against the main valve body 150. Since the valve seat 154 is integral with the orifices that are in intimate contact with the porous members 152, the positional relationship between the valve seat 154 and the porous members 152 is kept constant. Thus, the main valve body 150 is not abutted against the upper porous member 152 even if they are used for a long period of time.

Since a main throttle section is composed of the orifices 156 in this structure, the diameter of the vent holes of the porous members 152 composed of the sintered metal and acting as an auxiliary throttle section can be increased, which can more improve the durability to clogging of the porous members 152. Since the valve seat 154 is molded integrally with the orifices 156, the valve seat 154 can be easily positioned. Since the porous members 152 are disposed just before and behind the orifices 156, they can cause even the gas/liquid two-phase refrigerant to continuously pass therethrough, and thus refrigerant flow noise can be reduced. Further, while the embodiment shows the example in which the orifices 156 are disposed at the four positions, they may be disposed at any of one position to an infinite number of positions because the inside diameter and thickness of the orifices are designed optimally according to the flow characteristics thereof when the orifices are designed.

Figure 70:
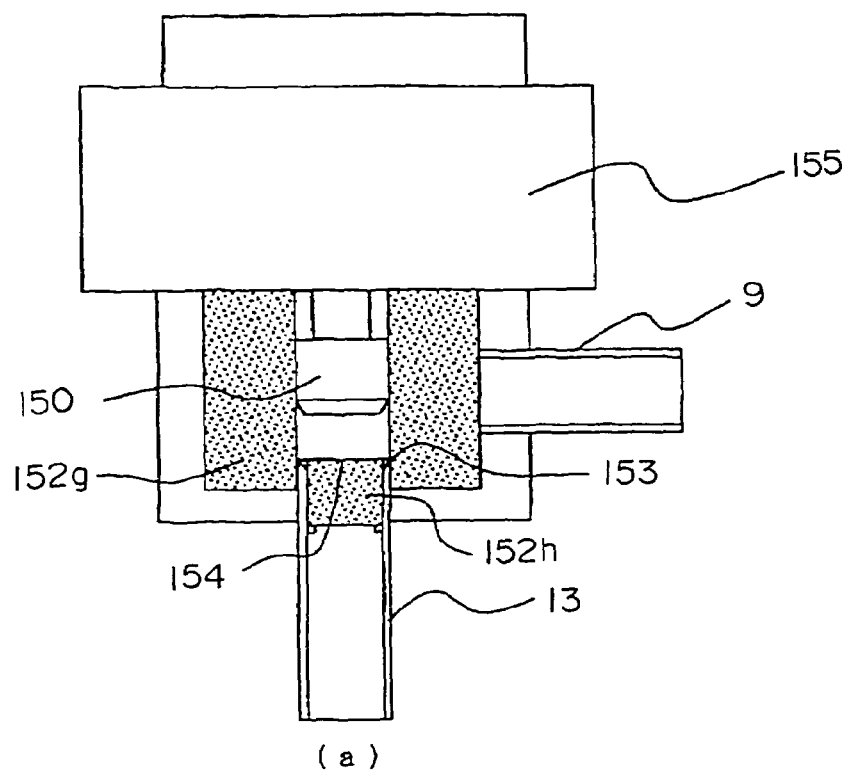
FIG. 70 depicts sectional views of the arrangement of the throttle device according to the embodiment 2 of the present invention.
Figure 70:
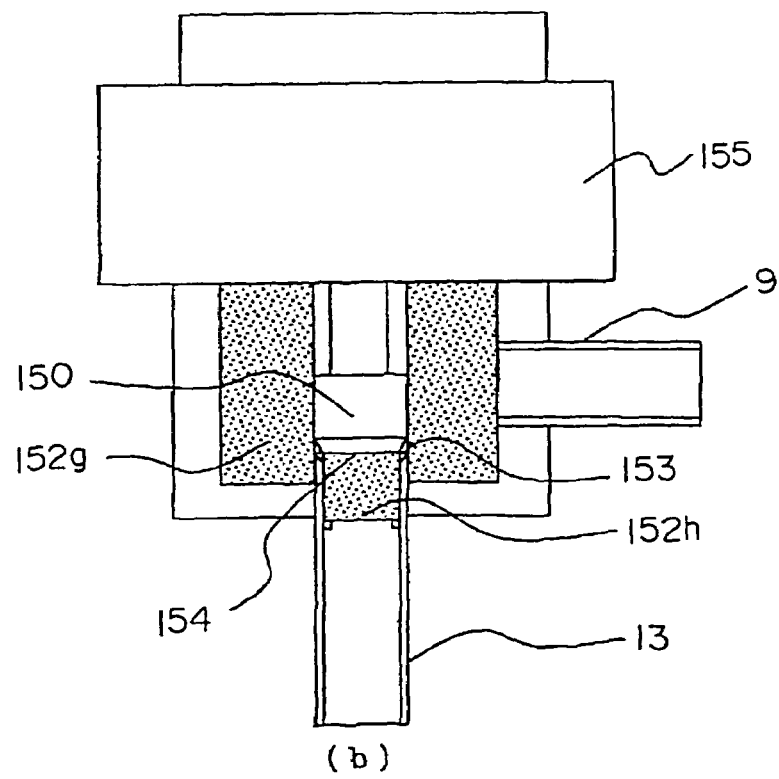

FIG. 70 is a sectional view of the arrangement of the second flow controller 6 of the air conditioning apparatus showing another example of the present invention, wherein the constitutional components that are the same as or similar to those shown in FIG. 55 are denoted by the same reference numerals, and the duplicate description thereof is omitted. In this embodiment, the main valve body 150 and the valve seat 154 are formed of ordinarily used resin or metal. Porous members 152*i* and *h* are composed of the sintered metal and have vent holes whose diameter is set from 100 micrometers to 500 micrometers and a function as an auxiliary throttle section. The porous members 152*i* and *h* are disposed in the refrigerant flow path in the valve chamber, which is formed by the main valve body 150 and the valve seat 154, and just behind the outlet side of the throttle section. The average diameter of the vent holes of the sintered metal is set from 100 micrometers to 500 micrometers so as to reduce the flow resistance of the refrigerant passing therethrough.

The peripheral corner of the extreme end of the main valve body 150 is chamfered and has a groove 153 formed therearound. The valve seat 154, which faces the main valve body 150, is positioned lower than the abutting surface of the porous member 152*h*, which is contained in the valve seat 154, where it is abutted against the main valve body 150. As a result, the flow path is formed through the groove 153 in a state in which the main valve body 150 is abutted against the porous member 152*h*. This flow path constitutes the orifice section acting as the main throttle section because it is narrow and has a large flow path resistance.

When the main valve 150 is separated from the valve seat 154 by deenergizing the electromagnetic coil 155, the pipe 9 connected to the first indoor heat exchanger 5 is connected to the pipe 13 connected to the second indoor heat exchanger 7 through the large opening area, as shown in FIG. 70(*a*), which permits the refrigerant flow path to be connected to the pipes with a pressure loss not larger than that of the porous members 152 composed of the sintered metal. Further, when the electromagnetic coil 155 is energized, the main valve body 150 is caused to be in intimate contact with the valve seat 154, which permits the vent holes of the porous members 152 composed of the sintered metal and the groove 153 formed in the valve seat to create the orifice section, as shown in FIG. 70(*b*). Thus, the pipe 9 connected to the first indoor heat exchanger 5 is connected to the pipe 13 connected to the second indoor heat exchanger 7 through the orifice section.

Since the orifice 156 acts as the main throttle section in this structure, the diameter of the vent holes of the porous members 152, which are composed of the sintered metal and act as the auxiliary throttle section, can be increased, and thus the durability to clogging of the porous members 152 can be improved.

Figure 71:
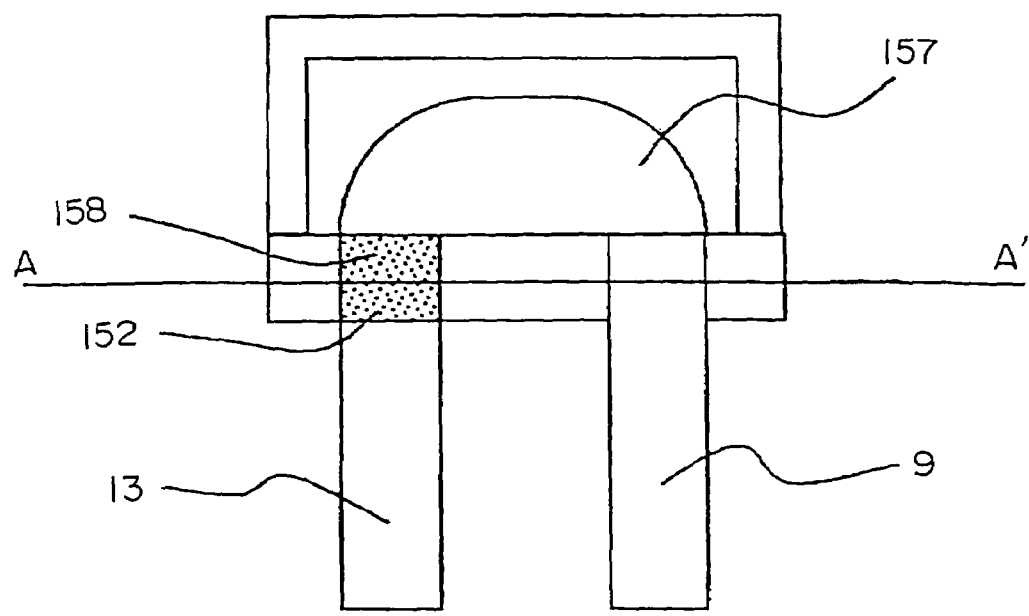
FIG. 71 is a sectional view of the arrangement of the throttle device according to the embodiment 2 of the present invention.
Figure 72:
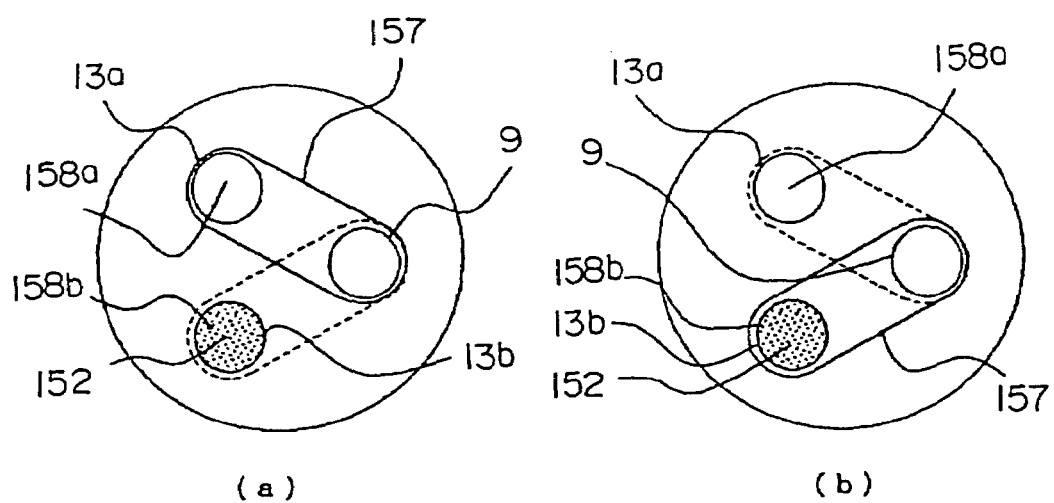
FIG. 72 depicts views showing operation of the throttle device according to the embodiment 2 of the present invention.

FIG. 71 is a sectional view of the arrangement of the second flow controller of the air conditioning apparatus of the present invention. Further, FIG. 72 is a sectional view taken along the line A-A' of FIG. 71 and shows the operation of a switching flow path. In the figures, the constitutional components that are the same as or similar to those shown in FIG. 55 are denoted by the same reference numeral, and the duplicate description thereof is omitted. Reference numeral 157 denotes a switching flow path driven by the electromagnetic coil or the stepping motor. Reference numeral 158 denotes a plurality of second flow controller outlet flow paths formed in the rotational direction of the switching flow path 157, that is, a passing through hole 158a for introducing the refrigerant to the pipe 9 without a flow resistance, and a throttle section 158b containing the porous member 152 acting as a flow resistance to introduce the refrigerant to the pipe 13 while reducing the pressure thereof.

When the switching flow path 157 driven by the stepping motor 151 is connected to the passing through hole 158a acting as the second flow controller outlet flow path, the pipe 9 connected to the first indoor heat exchanger 5 can be connected to the pipe 13 connected to the second indoor heat exchanger 7 with almost no pressure loss (FIG. 72(a)). Further, when the switching flow path 157 is connected to the throttle section 158b acting as the second flow controller outlet flow path by driving the switching flow path 157 by the stepping motor in the same way, the pipe 9 connected to the first indoor heat exchanger 5 is connected to the pipe 13 connected to the second indoor heat exchanger 7 through the vent holes of the porous member 152 composed of the sintered metal, as shown in FIG. 72(b).

In this structure, since the porous member 152 is formed into a columnar shape according to the shape of the throttle section 158b, it can be easily processed, and thus a low noise flow controller can be realized at less expensive cost. Further, since the shape of the refrigerant inlet of the porous member 152 can be easily changed, the design can be easily changed according to flow characteristics. While the porous members are described as the columnar shape in this structure, they may be formed into any shape according to the shape of the valve seat 154.

Figure 73:
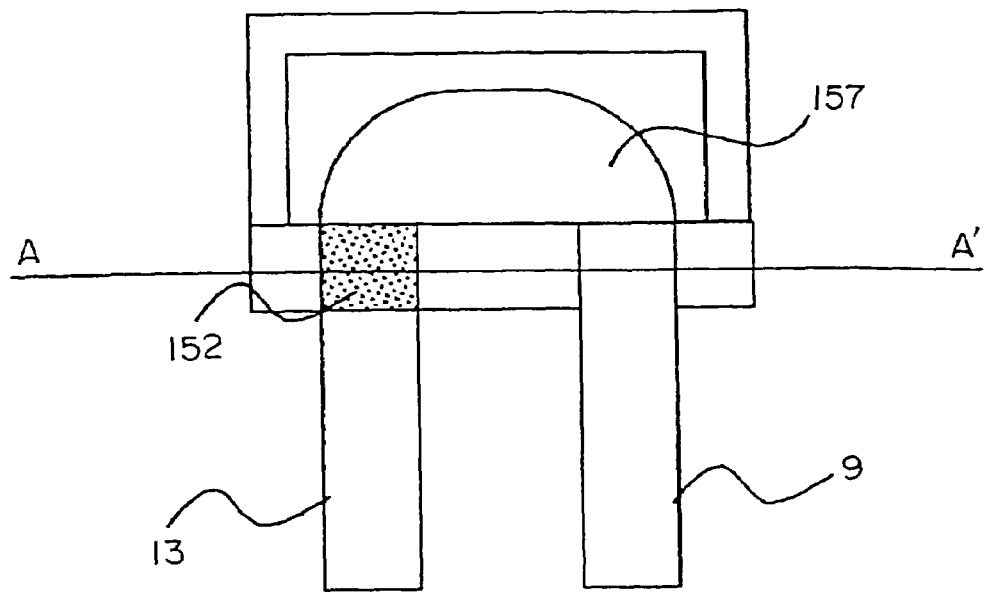
FIG. 73 is a sectional view of the arrangement of the throttle device according to the embodiment 2 of the present invention.
Figure 74:
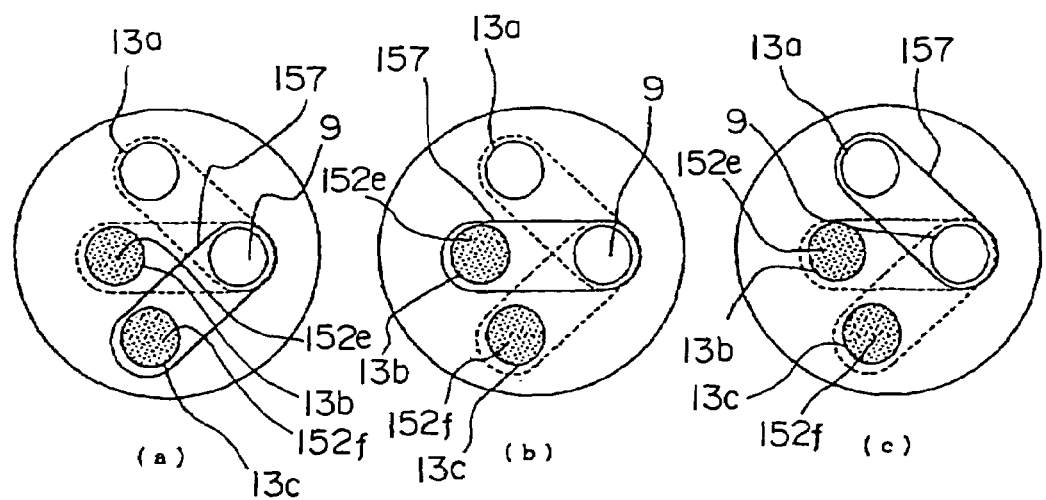
FIG. 74 depicts views showing operation of the throttle device according to the embodiment 2 of the present invention.

FIG. 73 is a sectional view of the arrangement of the second flow controller 6 of the air conditioning apparatus of the present invention. The constitutional components that are the same as or similar to those shown in FIGS. 71 and 72 are denoted by the same reference numerals, and the duplicate description thereof is omitted. Further, FIG. 74 depicts sectional views similar to the A-A sectional view of FIG. 72 and showing the operation of the switching flow path. In this embodiment, porous members 152e and 152f composed of the sintered metal and having the vent holes with different diameters (different flow path resistances) are assembled to the throttle sections 158b and 158c of the outlet flow paths of the second flow controller.

When the switching flow path 157 driven by the stepping motor is connected to the passing through hole 158a of the second flow controller outlet flow paths, the pipe 9 connected to the first indoor heat exchanger 5 can be connected to the pipe 13 connected to the second indoor heat exchanger 7 with almost no pressure loss (FIG. 74(a). Further, when the switching flow path 157 is connected to the throttle section 158b, which has a small flow path resistance, of the second flow controller outlet flow paths by driving the switching flow path 157 by the stepping motor in the same way as shown in FIG. 72(b), the pipe 9 connected to the first indoor heat exchanger 5 is connected to the pipe 13 connected to the second indoor heat exchanger 7 through the vent holes of the porous member 152 composed of the sintered metal. Further, when the switching flow path 157 is connected to the throttle section 158c, which has a large flow path resistance, of the second flow controller outlet flow paths by driving the switching flow path 157 by the stepping motor as shown in FIG. 72(c), the pipe 9 connected to the first indoor heat exchanger 5 is connected to the pipe 13 connected to the second indoor heat exchanger 7 through the vent holes of the porous member 152 composed of the sintered metal whose flow resistance is larger than that of the throttle section 158b.

In this example, the second flow controller outlet flow paths 158 are located at three positions, and the vent holes of the porous members disposed at the two positions thereof have different diameters, which permits the flow rate of the refrigerant to be controlled according to an air conditioning load so as to adjust the refrigerating capacity. As a result, a more comfortable dehumidifying operation can be carried out.

The above structures have been described using the porous member whose vent holes have the diameter set from 0.5 micrometer to 100 micrometers. However, the throttle section may be composed of a porous member whose vent holes have a diameter from 100 micrometers to 500 micrometers with an orifice having an inside diameter from 0.5 mm to 3 mm held in the midway of the porous member.

Figure 75:
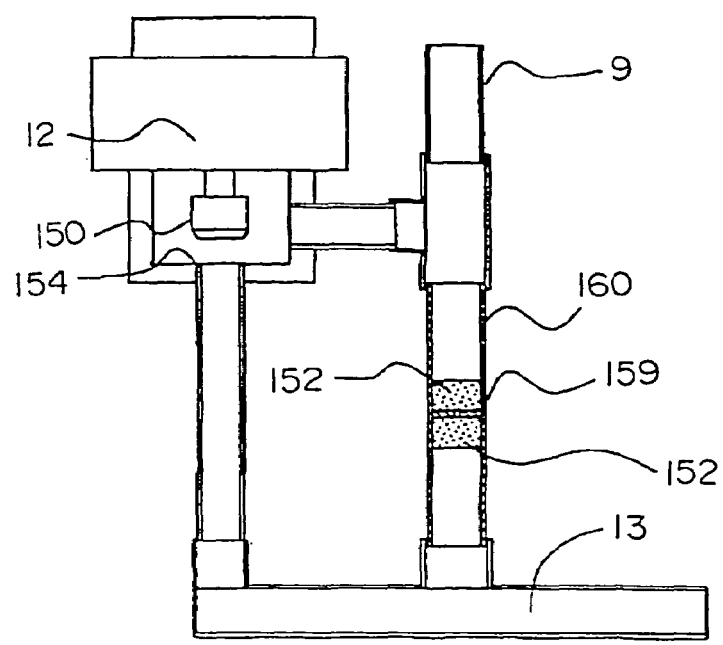
FIG. 75 depicts sectional views of the arrangement of the throttle device according to the embodiment 2 of the present invention.
Figure 75:
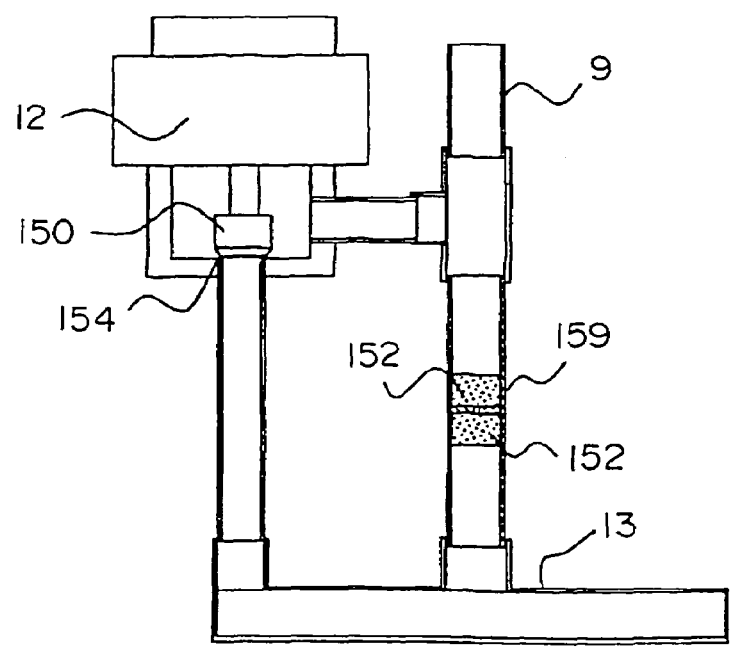
Figure 76:
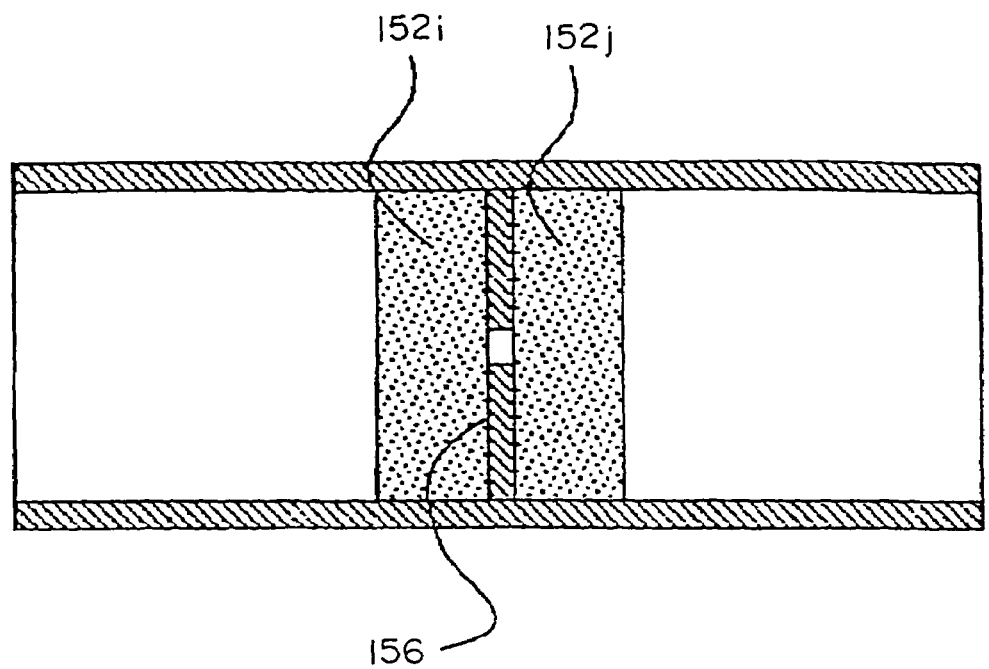
FIG. 76 is a detailed view of the throttle device according to the embodiment 2 of the present invention.
Figure 77:
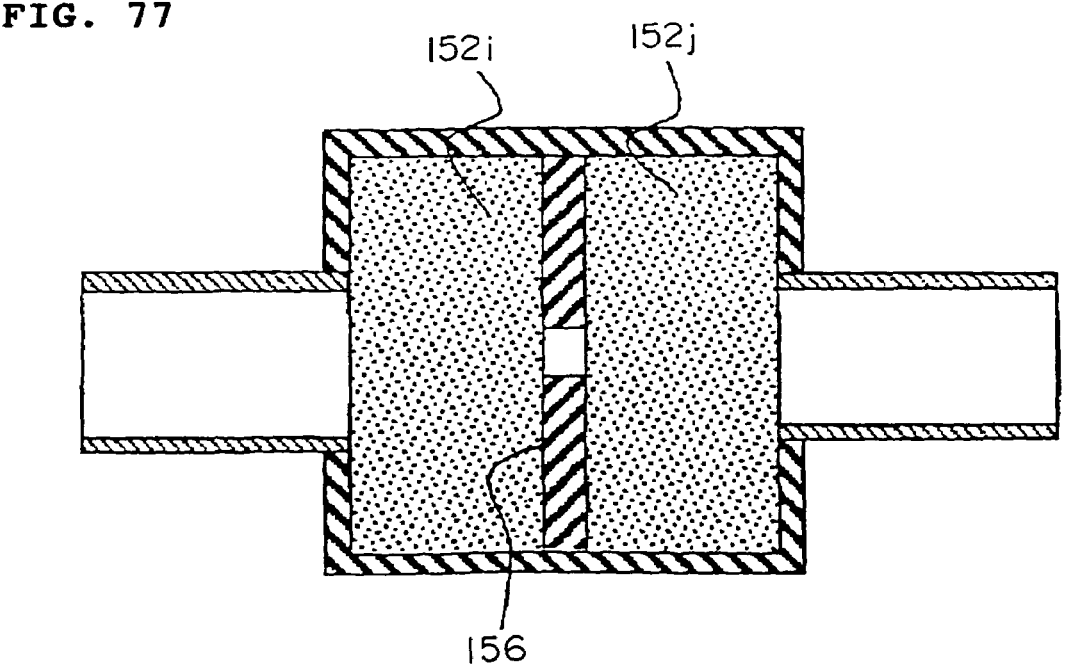
FIG. 77 is a detailed view of the throttle device according to the embodiment 2 of the present invention.

FIG. 75 depicts views showing the arrangement of the second flow controller 6 of the air conditioning apparatus showing another example of the present invention, wherein numeral 12 denotes a two-way valve, 159 denotes the throttle section formed in a pipe 160 acting as a bypass flow path for bypassing the 2-way valve 12. This example shows such an arrangement that the two-way valve is located adjacent to the throttle section and connected thereto through the pipe. Further, FIG. 75 depicts detailed views of the throttle section 159, and FIG. 76 is a detailed view of another throttle section. In FIG. 75, numeral 152 denotes the porous members, 156 denotes the orifice, and 160 denotes the pipe. The porous members 152 are force-fitted into the pipe 160 in the state in which the orifice 156 is sandwiched therebetween without leaving any gap. The porous members 152 are composed of the sintered metal having vent holes whose diameter is set from 100 micrometers to 500 micrometers and the thickness set from 1 mm to 100 mm, and the orifice 156 having an inside diameter of 1.0 mm and a thickness of 1 mm is disposed at one position between the porous members 152.

Deenergizing the electromagnetic coil 155 causes the main valve 150 to be separated from the valve seat 154, as shown in FIG. 75(a), and thus the pipe 9 connected to the first indoor heat exchanger 5 can be connected to the pipe 13 connected to the second indoor heat exchanger 7 with almost no pressure loss because they are connected to each other through the large opening area. Further, energizing the electromagnetic coil 155 causes the main valve body 150 to come into intimate contact with the valve seat 154, as shown in FIG. 75(b), so that the pipe 9 connected to the first indoor heat exchanger 5 is connected to the pipe 13 connected to the second indoor heat exchanger 7 through the vent holes of the porous members 152 composed of the sintered metal and formed in the throttle section 159.

In this structure, since the throttle device is combined with the two-way valve, the structure of the throttle section 159 is simplified, and thus a low noise throttle can be realized at low cost. Since the porous members 152 and the orifice 156 are disposed in the pipe 160 without leaving any gap therebetween, it is possible to flow the gas/liquid two-phase refrigerant into the orifice in a uniformly mixed state, which can suppress a pressure fluctuation and reduce refrigerant flow noise. Further, while the orifice 156 is disposed at the single position in the example, the orifice may be disposed at any of one position to an infinite number of positions and may be formed in any thickness because the inside diameter and thickness of the orifice is designed optimally according to the flow characteristics thereof when it is designed.

Further, the case in which R410A is used as the refrigerant of the air conditioning apparatus has been described above. The refrigerant R410A is an ozone-friendly HFC refrigerant suitable for the conservation of global environment. Further, since R410A has a smaller refrigerant pressure loss as compared with R22 that has been heretofore used as the refrigerant, it permits to reduce the size of the vent holes of the porous member used in the throttle section of the second flow control valve 6. Thus, a higher refrigerant flow noise reducing effect can be obtained by R410A.

The refrigerant of the air conditioning apparatus is not limited to R410A, and R407C, R404A, and R507A that are HFC refrigerants may be used. Further, R32 alone, R152a alone, a mixed refrigerant of R32/R134a, and the like as HFC refrigerants having a small global warming coefficient may be used from the view point of preventing global warming. Further, HC refrigerants such as propane, butane, isobutene, etc., natural refrigerants such as ammonia, carbon dioxide, ether, and the like, and mixed refrigerants made by mixing them may be used.

As described above, in the refrigerating cycle apparatus of the present invention to which assembled is the throttle device having the columnar or disc-shaped movable section rotating in the peripheral direction and the throttle section formed in the movable section and composed of the porous member that is caused to communicate in the refrigerant flow direction by the above rotation, the throttle section permits the gas/liquid two-phase refrigerant to pass therethrough, which prevents the occurrence of refrigerant flow noise by preventing the breakage of refrigerant vapor slags and refrigerant bubbles, whereby an effect of reducing noise can be obtained.

Since the passing-through flow path, which is formed in the movable section and caused to communicate in the refrigerant flow direction by the above rotation, is provided, there can be obtained an effect of selecting between a throttled state in which noise is reduced by preventing the occurrence of refrigerant flow noise and an open state in which almost no flow resistance is produced.

Since the shut-off section, which is formed in the movable section and shuts off the refrigerant flow by the above rotation, is provided, there can be obtained an effect of selecting the throttled state in which noise is reduced by preventing the occurrence of refrigerant flow noise and the closed state in which no refrigerant flows.

Since the plurality of throttle sections are provided, the throttle sections each composed of the porous permeable member can be selectively used, and thus an effect of increasing the life of the throttle device as well as stably maintaining the performance of the refrigerating cycle can be obtained.

Since the throttle section having the different flow resistances that can be selected by the rotation of the movable section is provided, there can be obtained an effect of realizing a low noise refrigerating cycle while minutely controlling the refrigerant flow rate.

Further, since the throttle sections having the different flow resistances are disposed in the rotational direction of the movable section in the sequence of the flow resistances, there can be obtained an effect of preventing the refrigerating cycle from being made unstable by any flow resistance that is unexpectedly changed to a direction opposite to a desired direction when the throttling is controlled.

The gas/liquid two-phase refrigerant is passed through the throttle section in the refrigerating cycle to which assembled is the throttle device having the main valve seat and the main valve body that can be opened and closed in the valve chamber by coming into contact with and being separated from each other, the bypass flow path for bypassing the closed portion in the valve chamber when the main valve seat and the main valve body are closed, and the throttle section composed of the porous permeable members and disposed in the bypass flow path so as to communicate in the refrigerant flow direction. Accordingly, the occurrence of refrigerant flow noise can be prevented by preventing the breakage of refrigerant vapor slags and refrigerant bubbles, and moreover the throttle section can be made excellent in durability to clogging, wherby an effect of reducing noise and increasing the life of the refrigerating cycle can be obtained.

Since the orifice is provided in the bypass flow path, the throttle section can be made excellent in durability to clogging while maintaining a high throttling capability, and thus an effect of increasing the life of the refrigerating cycle while maintaining a high performance and low noise can be obtained.

Since the porous permeable member is disposed just before the orifice, it is possible to prevent the pressure fluctuation produced by the orifice from being transmitted upstream of the refrigerating cycle, and thus an effect of reducing noise in the refrigerating cycle and stabilizing it can be obtained.

Further, since the porous permeable member is disposed just behind the orifice, it is possible to prevent the pressure fluctuation produced by a jet stream passing through the orifice from being transmitted downstream, and thus an effect of reducing noise in the refrigerating cycle and stabilizing it can be obtained.

The gas/liquid two-phase refrigerant is passed through the throttle section in the refrigerating cycle to which assembled is the throttle device having the orifice having the throttling function and the porous permeable member disposed just before or just behind the orifice and having the throttling function. Accordingly, the occurrence of refrigerant flow noise can be prevented by preventing the breakage of refrigerant vapor slags and refrigerant bubbles, and moreover the transmission of the pressure fluctuation produced by the orifice into the refrigerating cycle can be reduced as well as the occurrence of turbulence and noise between the orifice and the porous permeable member can be prevented, whereby an effect of reducing noise in the refrigerating cycle and stabilizing it can be obtained.

The gas/liquid two-phase refrigerant is passed through the throttle section in the refrigerating cycle to which assembled is the throttle device having the valve main body including the first flow path opened to the side wall of the valve chamber, the main valve seat having the second flow path opened to the bottom of the valve chamber, and the main valve body disposed in the valve chamber and capable of closing the main valve seat, in which the main throttle section is composed of the main valve body and the main valve seat, and the auxiliary throttle section using the porous permeable member is arranged just before or just behind the main throttle section. Accordingly, the occurrence of refrigerant flow noise can be prevented by preventing the breakage of refrigerant vapor slags and refrigerant bubbles, and moreover the passing-through diameter of the porous permeable member can be increased so as to improve the durability to clogging, whereby an effect of providing a low noise refrigerating cycle which has a high performance and the life of which is increased can be obtained.

The gas/liquid two-phase refrigerant is passed through the throttle section in the refrigerating cycle to which assembled is the throttle device having the two-way valve and the throttle section composed of the porous permeable members communicating in the refrigerant flow direction with the two-way valve being connected in parallel with the throttle section. Accordingly, the occurrence of refrigerant flow noise can be prevented by preventing the breakage of refrigerant vapor slags and refrigerant bubbles, and moreover the structure of the throttle section can be simplified, whereby an effect of providing a low noise and reliable refrigerating cycle can be obtained.

Since the orifice is provided in the throttle section, the throttle section can be made excellent in durability to clogging while maintaining a high throttling capability, and thus an effect of increasing the life of the refrigerating cycle while maintaining a high performance and low noise can be obtained.

Since the refrigerant is composed of the non-azeotropic refrigerant, it is possible to stably control the flow resistance of the refrigerant with low noise and to pass it even if the refrigerant changes to various phase states such as a liquid, a gas, and a two-phase, and thus an effect of obtaining a stable refrigerating cycle can be obtained.

Since the refrigerant having the refrigerant pressure loss smaller than that of the R22 refrigerant is used, an effect of reducing the size of a throttle device can be obtained.

The second flow controller is composed of the throttle device including the columnar or disc-shaped movable section rotating in the peripheral direction and the throttle section formed in the movable section and composed of the porous permeable member that is caused to communicate in the refrigerant flow direction by the above rotation in the air conditioning apparatus having the refrigerating cycle in which the compressor, the outdoor heat exchanger, the first flow controller, the first indoor heat exchanger, the second flow controller, and the second indoor heat exchanger are sequentially connected. Accordingly, even if the phase state and the liquid/gas ratio of the refrigerant are changed by the fluctuation of an air conditioning load, and the like, the throttle section composed of the porous permeable member can prevent the occurrence of refrigerant flow noise by preventing the breakage of refrigerant vapor slags and refrigerant bubbles and the refrigerant flow is also stabilized, whereby an effect of providing a low noise and comfortable air conditioning environment can be obtained.

Since the throttle device is provided with the passing-through flow path formed in the movable section and caused to communicate in the refrigerant flow direction by the above rotation, it is possible to select various air conditioning operations including the throttled state in which noise is reduced by preventing the occurrence of refrigerant flow noise and the open state in which almost no flow resistance is produced. Accordingly, an effect of providing a low noise and comfortable air conditioning environment can be obtained.

Since the throttle device is provided with the shut-off section formed in the movable section for shutting off the refrigerant flow by the above rotation, it is possible to select the throttled state in which noise is reduced by preventing the occurrence of refrigerant flow noise and the closed state in which no refrigerant flows. Accordingly, an effect of providing a low noise and comfortable air conditioning environment by shutting off the unnecessary refrigerant flow can be obtained.

Since the plurality of throttle sections each composed of the porous permeable member are provided, the life of the throttle device can be increased by selectively using the throttle sections. Accordingly, an effect of preventing the deterioration of performance of the air conditioning apparatus can be obtained.

Since the throttle sections each having a different flow resistance that can be selected by the rotation of the movable section are provided, the flow resistances can be changed according to an air conditioning mode and a load, thereby an effect of realizing minute air conditioning control with low noise can be obtained.

Since the throttle sections each having a different flow resistance are disposed in the rotational direction of the movable section in the sequence of the flow resistances, the refrigerating cycle can be prevented from being made unstable by any flow resistance that is unexpectedly changed to a direction opposite to a desired direction when the throttling is controlled. Accordingly, an effect of preventing the room environment from being temporarily disturbed and of making it to tend toward the comfortable one can be obtained.

The second flow controller is composed of the throttle device including the main valve seat and the main valve body that can be opened and closed in the valve chamber by coming into contact with and being separated from each other, the bypass flow path for bypassing the closed portion in the valve chamber when the main valve seat and the main valve body are closed, and the throttle section composed of the porous permeable members and disposed in the bypass flow path so as to communicate in the refrigerant flow direction in the air conditioning apparatus having the refrigerating cycle in which the compressor, the outdoor heat exchanger, the first flow controller, the first indoor heat exchanger, the second flow controller, and the second indoor heat exchanger are sequentially connected. Accordingly, even if the phase state and the liquid/gas ratio of the refrigerant are changed by the fluctuation of an air conditioning load, and the like, the throttle section composed of the porous permeable members can prevent the occurrence of refrigerant flow noise by preventing the breakage of refrigerant vapor slags and refrigerant bubbles and the refrigerant flow is also stabilized, whereby a low noise and comfortable air conditioning environment can be provided. Moreover, the throttle section can be made excellent in durability to clogging, and thus an effect of reducing noise while preventing the drop of an air conditioning performance can be obtained.

Since the bypass flow path is provided with the orifice, the throttle section can be made excellent in durability to clogging while maintaining a high throttling capability, and thus an effect of achieving a high performance and low noise while preventing the drop of air conditioning performance can be obtained.

Since the porous permeable member is disposed just before the orifice, it is possible to prevent the pressure fluctuation produced by the orifice from being transmitted upstream of the refrigerating cycle and the refrigerating cycle can be stably operated, and thus a low noise and comfortable air conditioning environment can be provided.

Since the porous permeable members are disposed just behind the orifice, it is possible to prevent the pressure fluctuation produced by a jet stream passing through the orifice from being transmitted downstream and the refrigerating cycle including the respective simple devices such as the compressor, and the like can be stably operated, whereby an effect of providing the low noise and comfortable air conditioning environment can be provided.

The second flow controller is composed of the throttle device including the orifice having the throttling function and the porous permeable member disposed just before or just behind the orifice and having the throttling function in the air conditioning apparatus having the refrigerating cycle in which the compressor, the outdoor heat exchanger, the first flow controller, the first indoor heat exchanger, the second flow controller, and the second indoor heat exchanger are sequentially connected. Accordingly, even if the phase state and the liquid/gas-ratio of the refrigerant are changed by the fluctuation of an air conditioning load, and the like, the throttle section composed of the porous permeable member can prevent the occurrence of refrigerant flow noise by preventing the breakage of refrigerant vapor slags and refrigerant bubbles, and the refrigerant flow is also stabilized; moreover the transmission of the pressure fluctuation produced by the orifice into the refrigerating cycle can be reduced as well as the occurrence of turbulence and noise between the orifice and the porous permeable member can be prevented, whereby an effect of providing a low noise and comfortable air conditioning environment can be provided.

The valve main body including the first flow path opened to the side wall of the valve chamber, the main valve seat having the second flow path opened to the bottom of the valve chamber, and the main valve body in the valve chamber capable of closing the main valve seat are provided, and the second flow controller is composed of the throttle device including the main throttle section, which is composed of the main valve body and the main valve seat, and the auxiliary throttle section which uses the porous permeable member just before or just behind the main throttle section in the air conditioning apparatus having the refrigerating cycle in which the compressor, the outdoor heat exchanger, the first flow controller, the first indoor heat exchanger, the second flow controller, and the second indoor heat exchanger are sequentially connected. Accordingly, even if the phase state and the liquid/gas ratio of the refrigerant are changed by the fluctuation of an air conditioning load, and the like, the throttle section composed of the porous permeable member can prevent the occurrence of refrigerant flow noise by preventing the breakage of refrigerant vapor slags and refrigerant bubbles and the refrigerant flow is also stabilized; thus, a low noise and comfortable air conditioning environment can be provided. Moreover, since the passing-through diameter of the porous permeable member can be increased so as to improve the durability to clogging, there can be obtained an effect of preventing the drop of air conditioning performance while maintaining a high performance and low noise.

The two-way valve and the throttle section composed of the porous permeable members communicating in the refrigerant flow direction are provided, and the second flow controller is composed of the throttle device including the two-way valve connected in parallel with the throttle section in the air conditioning apparatus having the refrigerating cycle in which the compressor, the outdoor heat exchanger, the first flow controller, the first indoor heat exchanger, the second flow controller, and the second indoor heat exchanger are sequentially connected. Accordingly, even if the phase state and the liquid/gas-ratio of the refrigerant are changed by the fluctuation of an air conditioning load, and the like, the throttle section composed of the porous permeable members can prevent the occurrence of refrigerant flow noise by preventing the breakage of refrigerant vapor slags and refrigerant bubbles and the refrigerant flow is also stabilized; thus, a low noise and comfortable air conditioning environment can be provided. Moreover, since the structure of the throttle section can be simplified, an effect of providing a low noise and reliable air conditioning apparatus can be provided.

Since the orifice is provided in the throttle section, the throttle section can be made excellent in durability to clogging while maintaining a high throttling capability, and thus an effect of preventing the drop of air conditioning performance while maintaining a high performance and low noise can be obtained.

Since the controller for controlling such that the throttle section is used as the refrigerant flow path in the operation for reducing a latent heat ratio is provided, a temperature can be controlled in a wide range while reducing refrigerant flow noise, and thus an effect of performing comfortable dehumidification can be obtained.

Since the controller for controlling such that the throttle section is used as the refrigerant flow path in the cooling or dehumidifying as well as heating operations is provided, there can be obtained an effect of executing comfortable dehumidification while effectively reducing refrigerant flow noise even if the phase state of the refrigerant is changed depending on the different operation modes.

Since the controller for controlling such that the throttle dection is used as the refrigerant flow path at the start of heating operation is provided, an effect of executing comfortable heating with an enhanced feeling of quick warming can be obtained by blowing out high temperature air.

Since the controller for controlling such that the throttle dection is used as the refrigerant flow path when the difference between a preset temperature and the room temperature is equal to or larger than a predetermined value in the heating operation is provided, it is possible to blow out high temperature air when the room temperature is sufficiently lower than the preset temperature. Accordingly, an effect of executing comfortable heating with an enhanced feeling of quick warming can be obtained.

Since the refrigerant is composed of the non-azeotropic refrigerant, it is possible to stably control the flow resistance of the refrigerant with low noise and to pass it even if the phase state of the refrigerant changes to various states of a liquid, gas, and two-phase. Accordingly, an effect of executing stable air conditioning control with low noise can be obtained.

Since the refrigerant having the refrigerant pressure loss smaller than that of the R22 refrigerant is used, an effect of reducing the size of the throttle device and reducing the size of a user's apparatus can be obtained.

The throttle device, which includes the columnar or disc-shaped movable section rotating in the peripheral direction and the throttle section formed in the movable section and composed of the porous permeable member caused to communicate in the refrigerant flow direction by the above rotation, is provided as described above. Accordingly, an effect of reducing noise by preventing the occurrence of refrigerant flow noise can be obtained.

The passing-through flow path formed in the movable section and caused to communicate in the refrigerant flow direction by the above rotation is provided. Accordingly, there can be obtained an effect of selecting between the throttled state in which noise is reduced by preventing the occurrence of refrigerant flow noise the open state in which a flow resistance is not almost produced.

The shut-off section formed in the movable section for shutting off the refrigerant flow by the above rotation is provided. Accordingly, there can be obtained an effect of selecting between the throttled state in which noise is reduced by preventing the occurrence of refrigerant flow noise and the closed state in which no refrigerant flows.

Since the peripheral wall of the passing-through flow path is formed of the porous permeable member, an effect of securing the refrigerant flow path by the passing-through flow path and the porous member can be obtained.

Since the refrigerant flow inlet and the refrigerant flow outlet are disposed on the peripheral surface side of the movable section, the area of the portions of the movable section corresponding to the inlet and the outlet can be adjusted on the peripheral surface side. Accordingly, an effect of reducing the diameter of the movable section can be obtained.

Since the refrigerant flow inlet and the refrigerant flow outlet are disposed in the rotational axis direction of the movable section, an effect of flowing the refrigerant linearly and uniformly into the throttle section can be obtained.

Since the plurality of throttle sections are provided, the porous members can be selectively used, and thus an effect of increasing the life of the porous members can be obtained.

Since only the throttle section of the movable section is composed of the porous permeable member, an effect of reducing the cost and making the flow resistance of the throttle section accurate can be obtained.

Since the whole movable section is composed of the porous permeable member, an effect of easily molding the movable section and reducing the size thereof can be obtained.

Since the throttle sections having the different flow resistances which can be selected by the rotation of the movable section are provided, an effect of making the flow resistance variable can be obtained.

Since the throttle sections having the different flow resistances are disposed in the rotational direction of the movable section in the sequence of the flow resistances, when the movable section is rotated, it can be set at the position of the desired flow resistance in the sequence of the flow resistances. Accordingly, an effect of preventing the flow resistance from being reduced unexpectedly can be obtained.

Since the throttle section having the different flow resistances is molded continuously, an effect of easily molding the porous permeable member and reducing the size of the movable section can be obtained.

Since the throttle sections having the different flow resistances are disposed intermittently, the flow resistances of the respective throttle sections are made independent of one another. Accordingly, an effect of improving the accuracy of the flow resistance can be obtained.

Since the partitions are interposed between the throttle sections having the different flow resistances, the distance between the throttle sections having the different flow resistances can be shortened. Accordingly, an effect of reducing the size of the throttle sections can be obtained.

Since the movable section is driven into rotation by the stepping motor, the refrigerant flow inlet and the refrigerant flow outlet can be accurately aligned with the throttle section. Accordingly, an effect of reducing the size of the movable section can be obtained.

The main valve seat and the main valve body that can be opened and closed in the valve chamber by coming into contact with and being separated from each other, the bypass flow path for bypassing the closed portion in the valve chamber when the main valve seat and the main valve body are closed, and the porous permeable members disposed in the bypass flow path and communicating in the refrigerant flow direction are provided, and the throttle section is composed of the porous permeable members, whereby an effect of making the throttle section excellent in durability to clogging can be obtained.

Since the orifice is provided in the bypass flow path, an effect of making the throttle section excellent in durability to clogging while maintaining a high throttle capability can be obtained.

Since the porous permeable member is disposed just before the orifice, an effect of preventing the pressure fluctuation produced by the orifice from being transmitted upstream can be obtained.

Since the porous permeable member is disposed just behind the orifice, an effect of preventing the pressure fluctuation produced by a jet stream passing through the orifice from being transmitted downstream can be obtained.

Since the end of the main valve seat against which the main valve body is abutted is made approximately flush with the porous permeable member, an effect of smoothly flowing the refrigerant into the main valve seat when the valve is opened can be obtained.

Since the throttle section is disposed so as to surround the main valve seat, an effect of smoothing the refrigerant flow when the valve is opened and throttled can be obtained.

Since the refrigerant flow inlet formed on the side of the valve chamber so as to be vertical to the direction in which the main valve body moves and the diffusion member for diffusing the refrigerant flow supplied from the refrigerant flow inlet are provided, an effect of impartially introducing the refrigerant into the throttle section in the valve chamber can be obtained.

Since the main valve body is composed of the diffusion member, an effect of impartially introducing the refrigerant into the throttle section in the valve chamber without the need of a special component can be obtained.

Since the orifice having the throttling function and the porous permeable member disposed just before or just after the orifice and having the throttling function are provided, an effect of reducing the pressure fluctuation transmitted by the orifice as well as preventing the occurrence of turbulence and noise between the orifice and the porous permeable member can be obtained.

The valve main body including the first flow path opened to the side wall of the valve chamber, the main valve seat having the second flow path opened to the bottom of the valve chamber, and the main valve body disposed in the valve chamber and capable of closing the main valve seat are provided, whereby the main throttle section is composed of the main valve body and the main valve seat, and the auxiliary throttle section using the porous permeable member is arranged just before or just behind the main throttle section. Accordingly, an effect of increasing the passing-through diameter of the porous permeable member and improving the durability to clogging thereof can be obtained.

Since the auxiliary throttle section abutted against the main valve body is disposed in the flow path on the main valve seat side, an effect of preventing the occurrence of turbulence and noise between the main throttle section and the auxiliary throttle section can be obtained.

The peripheral corner of the main valve body is chamfered at the extreme end thereof, and the orifice section is composed of the main valve body and the main valve seat when the main valve body is abutted against the auxiliary throttle section. Accordingly, there can be obtained such an effect that the auxiliary throttle section can prevent the pressure fluctuation from being transmitted by the main throttle section and that the occurrence of turbulence and noise between the main throttle section and the auxiliary throttle section can be prevented.

Since the two-way valve and the throttle section composed of the porous permeable members communicating in the refrigerant flow direction are provided and the two-way valve is connected in parallel with the throttle section, an effect of simplifying the structure of the throttle section can be obtained.

Since the orifice is provided in the throttle section, an effect of making the refrigerant flowing into the orifice uniform and reducing the pressure fluctuation transmitted by the orifice can be obtained.

Since the diameter of the vent holes of the porous permeable member is set within the range of 200-0.5 micrometer, an effect of preventing the occurrence of refrigerant flow noise produced when the liquid refrigerant or the gas/liquid two-phase refrigerant passes through the porous permeable members can be obtained.

Since the porous permeable member is composed of sintered metal, an effect of making the throttle device excellent in durability can be obtained.

Figure 78:
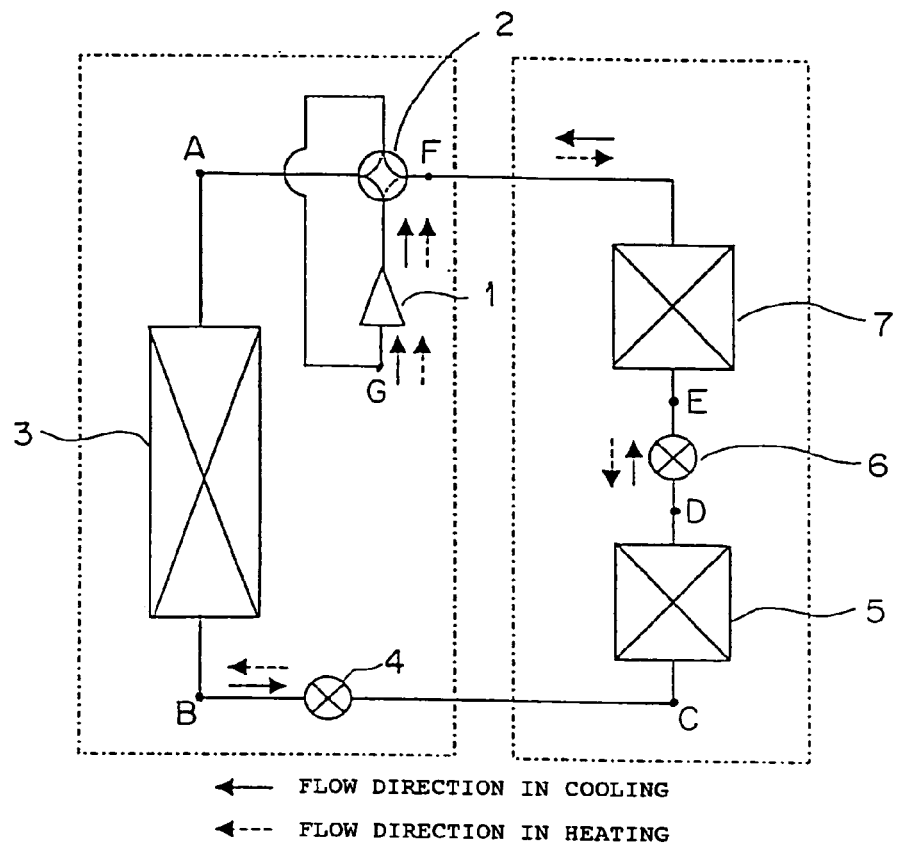
FIG. 78 is a refrigerant circuit diagram according to the embodiment 2 of the present invention.

FIG. 78 is a refrigerant circuit diagram of the air conditioning apparatus showing an example of the embodiment 2 of the present invention, wherein the same components as those shown in FIG. 1 are denoted by the same reference numerals. In FIG. 78, 1 denotes the compressor, 2 denotes the flow-path switching means, for example, the 4-way valve for switching the refrigerant flow between the cooling operation and the heating operation, 3 denotes the outdoor heat exchanger, 4 denotes the first flow controller, 5 denotes the first indoor heat exchanger, 6 denotes the second flow controller acting as the throttle device, and 7 denotes the second indoor heat exchanger, and these components are sequentially connected through the pipes and constitute the refrigerating cycle. R410A that is a mixed refrigerant composed of, for example, R32 and R125 is used as the refrigerant of this refrigerating cycle, and alkylbenzene oil is used as ice machine oil. The second flow controller is composed of the on-off valve and the throttle device arranged integrally with each other so as to control a flow rate also in the arrangement of FIG. 78.

Figure 79:
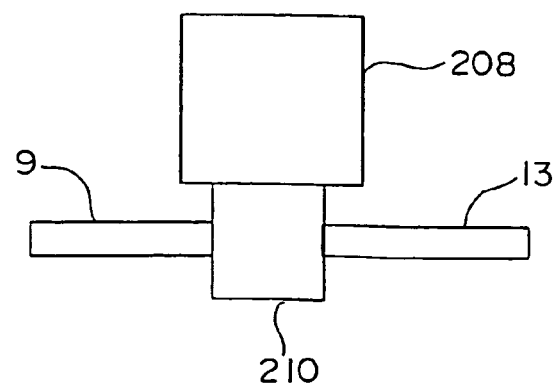
FIG. 79 is an external appearance view of a flow controller according to the embodiment 2 of the present invention.
Figure 80:
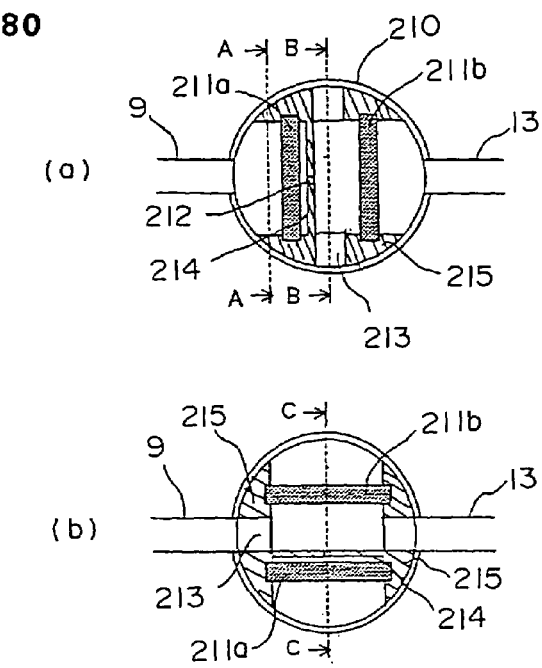
FIG. 80 depicts sectional views of the flow controller according to the embodiment 2 of the present invention.
Figure 81:
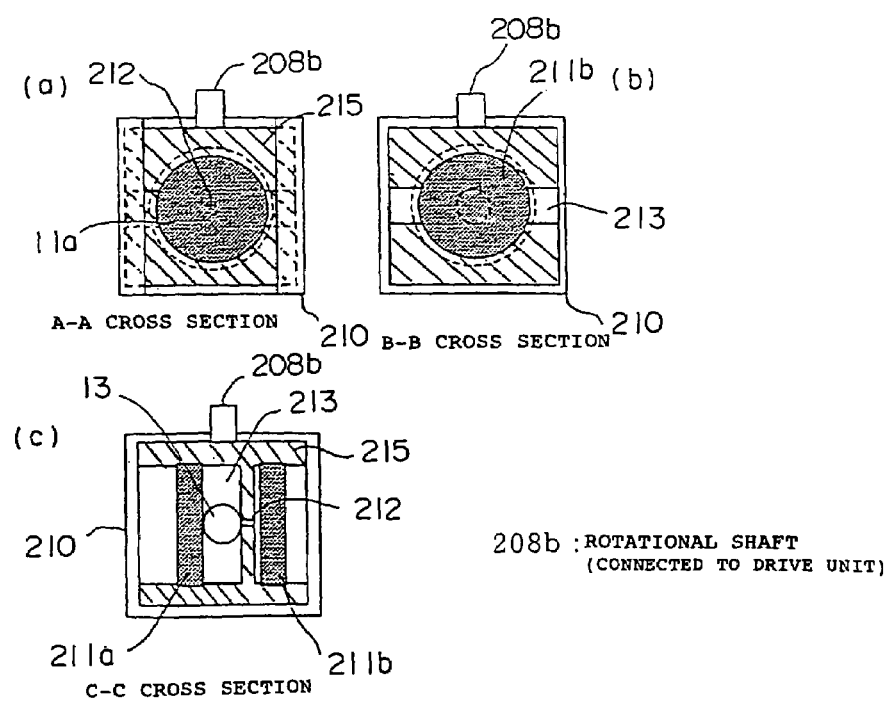
FIG. 81 depicts sectional views of the flow controller according to the embodiment 2 of the present invention.

FIG. 79 is an external appearance view of the second flow controller 6 described in FIG. 78. In FIG. 79, numeral 208 denotes the rotary drive unit, 9 denotes the first flow path connecting pipe, and 13 denotes the second flow path connecting pipe. Further, FIG. 80 depicts detailed sectional views of the second flow controller 6, wherein (a) and (b) show its operating states, respectively. Reference numeral 211a denotes the first porous permeable member, 212 denotes the orifice as a small hole, and the second porous permeable member 211b is disposed across a communicating flow path 213 having a certain degree of width. A step is formed to define a predetermined gap 214 between the first porous permeable member 211a and the orifice 212 as the small hole. The predetermined gap 214 is set between 0 to 3 mm. The thickness of the porous permeable members 211a and 211b is set to 1 mm-5 mm and the passing-through area thereof is set to 70 mm²-700 mm²; they are fixed to the rotatable valve disc 215. The small hole as the orifice is also supported by the rotatable valve disc 215, integratally formed therewith, or fixed thereto as a separate component. Then, the throttle section is formed by the combination of the first porous permeable member 211a, the orifice 212 as the small hole, and the second porous permeable member 211b. Further, FIG. 81 depicts sectional explanatory views for explaining the cross sections viewed from the arrows A-A, B-B, and C-C shown in FIG. 80 with reference to (a), (b), and (c). FIG. 81 explains the cross section of the valve main body viewed from the first flow path connecting pipe 9 side. Note that the above numerals show only an example, and it is needless to say that an effect can be obtained by numerals outside of the above ranges depending upon the conditions of the refrigerating cycle.

In FIG. 80, when the second flow controller is rotated and set as shown in FIG. 80(a), the refrigerant flows through the throttle section in which the first porous permeable member 211a, the orifice 212, and the second porous permeable member 211b are formed, and the pressure thereof is reduced when it passes through the orifice. When the second flow controller is rotated and set as shown in FIG. 80(b), the refrigerant flows through the communicating flow path 213, and almost no pressure loss is produced between the first indoor heat exchanger 5 and the second indoor heat exchanger 7. Note that the valve disc 215 is driven into rotation by the DC motor or the stepping motor acting as the rotary drive unit 208 through a reducer. As shown in FIG. 81(a), the flow path of the refrigerant from the first flow path connecting pipe is closed by the valve disc 215 except the first porous permeable member 211a. The orifice 212 is shown by a broken line. As shown in FIG. 81(b), the refrigerant ejected from the orifice 212 passes through the second porous permeable member 211b. FIG. 81(c) shows a state in which the second flow controller 6 is rotated to the position of the valve disc by a rotary shaft 208b so as to smoothly flow the refrigerant.

Next, operation of the refrigerating cycle of the air conditioning apparatus will be described. In FIG. 78, solid arrows show the refrigerant flow on cooling. The cooling operation is divided into an ordinary cooling operation that corresponds to a case in which both the air conditioning sensible heat load and the air conditioning latent heat load in a room are high at start, in summer, and the like and into a dehumidifying operation in a case in which the latent heat load is large while the air conditioning sensible heat load is low in an intermediate season, a rainy season, and the like. In the ordinary cooling operation, the second flow controller is rotated as shown in FIG. 80(b) so as to connect the first indoor heat exchanger 5 to the second indoor heat exchanger 7 in a state in which almost no pressure loss exists therebetween.

At this time, the high temperature and high pressure vapor refrigerant ejected from the compressor 1 operating at the number of revolutions corresponding to an air conditioning load passes through the 4-way valve 2, is condensed and liquefied in the outdoor heat exchanger 3, reduced in pressure in the first flow controller 4, and made into a low pressure two-phase refrigerant, which flows into the first indoor heat exchanger 5 and is evaporated and gasified therein, passes through the throttle device 6 acting as the second flow controller 6 with almost no pressure loss, is evaporated and gasified again in the second indoor heat exchanger 7, and returns to the compressor 1 again passing through the 4-way valve 2 as a low pressure vapor refrigerant.

Since the second flow controller is in the state in which almost not pressure loss exists, the cooling capacity and efficiency are not reduced. Further, the first flow controller is controlled such that the degree of superheat of the refrigerant is set to 10° C. at, for example, the intake of the compressor 1. In this refrigerating cycle, the heat is drawn from the inside of the room by evaporating the refrigerant in the indoor heat exchangers 5 and 7, and the inside of the room is cooled by releasing the heat drawn from the inside of the room to the outside thereof by condensing the refrigerant in the outdoor heat exchanger 3.

Figure 82:
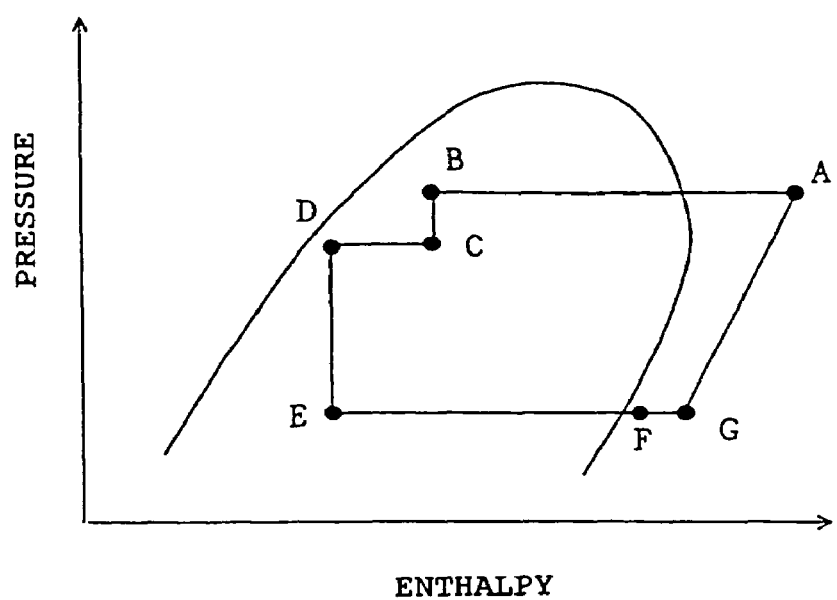
FIG. 82 is a characteristic diagram showing an operating state of the air conditioning apparatus according to the embodiment 2 of the present invention in a cooling/reheating/dehumidifying operation.

Next, the operation in cooling/dehumidification will be described using a pressure-enthalpy graph shown in FIG. 82. Note that the alphanumeric characters shown in FIG. 82 correspond to those shown in FIG. 78. In the cooling/dehumidifying operation, the valve disc 215 of the second flow controller is rotated as shown in FIG. 80(*a*).

At this time, the high pressure and high temperature vapor refrigerant (point A) ejected from the compressor 1 operating at the number of revolutions corresponding to an air conditioning load passes through the 4-way valve 2, exchanges heat with the outside air in the outdoor heat exchanger 3 and is condensed and made into a condensed gas/liquid two-phase refrigerant (point B). The high pressure two-phase refrigerant is somewhat reduced in pressure in the first flow controller 4 and flows into the first indoor heat exchanger 5 as an intermediate pressure gas/liquid two-phase refrigerant (point C). The intermediate pressure gas/liquid two-phase flowed into the first indoor heat exchanger 5 exchanges heat with the indoor air, and is further condensed (point D). The gas/liquid two-phase refrigerant ejected from the first indoor heat exchanger flows into the second flow controller 6.

The refrigerant passes through the second flow controller and flows into the second indoor heat exchanger 7. At this time, the refrigerant passing through the orifice 212 of the second flow controller is reduced in pressure and made into a low pressure gas/liquid two-phase refrigerant which flows into the second indoor heat exchanger 7 (point E). The refrigerant flowed into the second indoor heat exchanger 7 is evaporated by drawing the sensible and latent heat of the indoor air. The low pressure vapor refrigerant ejected from the second indoor heat exchanger 7 returns to the compressor 1 again through the 4-way valve 2. Since the indoor air is heated by in the first indoor heat exchanger 5 and cooled and dehumidified in the second indoor heat exchanger 7, it is possible to carry out dehumidification while preventing the reduction of a room temperature.

Note that, in the dehumidifying operation, it is possible to control a blowing-out air temperature in a wide range by controlling the heat exchanging amount of the outdoor heat exchanger 3 by adjusting the rotational frequency of the compressor 1 and the number of revolutions of the fan of the outdoor heat exchanger 3 and by controlling the heating amount of the indoor air heated by the first indoor heat exchanger 5. Further, it is also possible to control the heating amount of the indoor air heated by the first indoor heat exchanger 5 by controlling the condensing temperature of the first indoor heat exchanger 5 by controlling the degree of opening of the first flow controller 4 and the number of revolutions of the indoor fan. Further, the throttle amount of the second flow controller 6 is set such that the degree of superheat of the intake refrigerant of the compressor is set to, for example, 10° C. The efficiency of the refrigerating cycle is improved by setting the throttle composed of the porous permeable member and the orifice to such degree of superheat.

In FIG. 78, dotted arrows show the refrigerant flow in the heating operation which is divided into the ordinary heating operation and the heating/dehumidifying operation. In the ordinary heating operation, the second flow controller 6 is rotated as shown in FIG. 80(*b*), and the first indoor heat exchanger 5 is connected to the second indoor heat exchanger 7 in the state in which almost no pressure loss exists therebetween.

At this time, the high temperature and high pressure vapor refrigerant ejected from the compressor 1 operating at the number of revolutions corresponding to an air conditioning load passes through the 4-way valve 2, is condensed and liquefied in the indoor heat exchanger 3, passes through the second flow controller 6 with almost no pressure loss, is liquefied again in the second indoor heat exchanger 7, reduced in pressure in the first flow controller 4 and made into a low pressure two-phase refrigerant, which flows into the outdoor heat exchanger 3 and evaporated and gasified therein, and returns to the compressor 1 again as a low pressure vapor refrigerant through the 4-way valve 2.

Since the second flow controller 6 is in the state in which almost no pressure loss exists, the heating capacity and efficiency are not reduced. Further, the first flow controller 4 is controlled such that the degree of superheat of the refrigerant is set to, for example, 10° C. at the intake of the compressor 1. In this refrigerating cycle, the heat is drawn from the outside of the room by evaporating the refrigerant in the outdoor heat exchanger 3, and the inside of the room is heated by releasing the heat drawn from the outside of the room to the inside of the room by condensing the refrigerant in the indoor heat exchangers 7 and 5.

Figure 83:
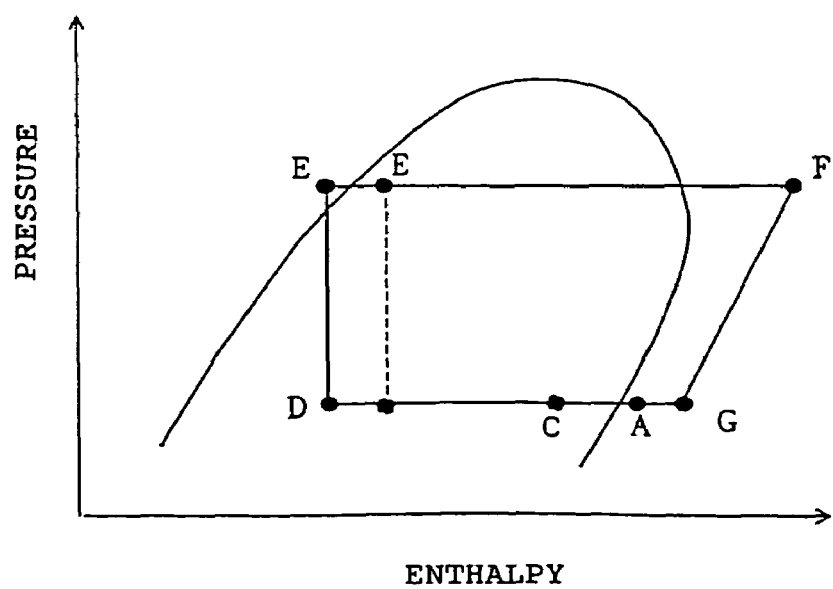
FIG. 83 is a characteristic diagram showing an operating state of the air conditioning apparatus according to the embodiment 2 of the present invention in a heating/reheating/dehumidifying operation.
Figure 84:
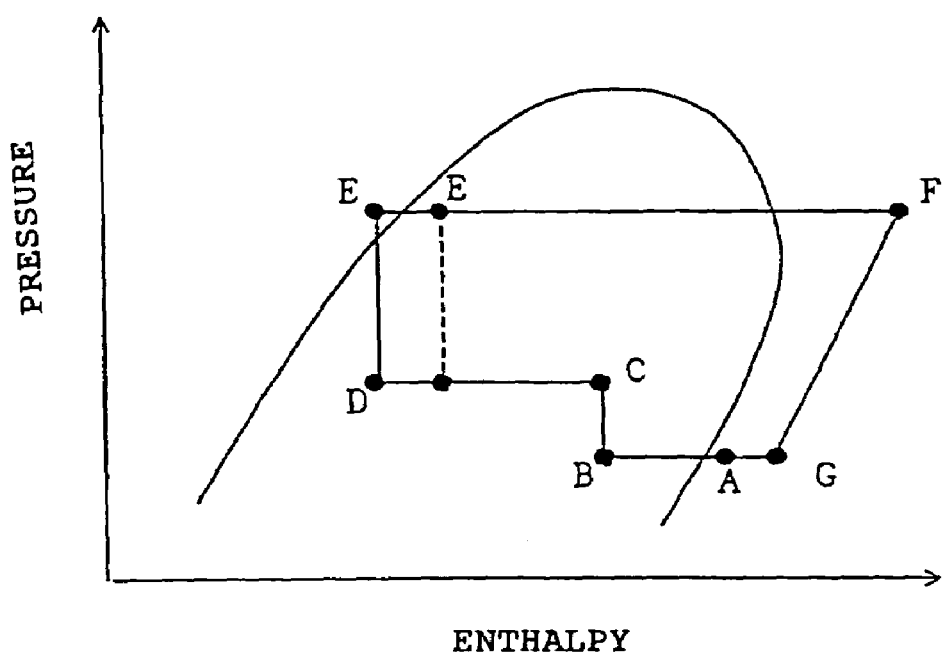
FIG. 84 is a characteristic diagram showing an operating state of the air conditioning apparatus according to the embodiment 2 of the present invention in the heating/reheating/dehumidifying operation.

Next, the operation in heating/reheating/dehumidification will be described using a pressure-enthalpy graph shown in FIG. 83. A-G in FIG. 83 correspond to A-G in the refrigerant circuit of FIG. 78, respectively. The refrigerant ejected from the compressor 1 and passed through the two-way valve 2 is condensed in the second indoor heat exchanger 7 in the process from the point F to the point E, is reduced in pressure in the second flow control valve 6 and flows to the point D, and then flows into the first indoor heat exchanger 5. At this time, the second indoor heat exchanger 7 acts as a reheater, and the first indoor heat exchanger 5 acts as an evaporator. Thereafter, the refrigerant flows through such a refrigerating cycle that it passes through the point C and the first flow control valve 4 and then returns to the intake F of the compressor 1. Note that while this example explains the state in which supercooling is executed at the point E, it may not be executed depending upon the operating state, which is shown by a dotted line in FIG. 83. At this time, the first flow control valve 4 is fully opened so as to eliminate a pressure loss. At this time, the refrigerant is evaporated in the first indoor heat exchanger 5, and the temperature thereof must be set equal to or less than the dew point of the indoor air to execute dehumidification. Thus, it is necessary to set the refrigerant to a temperature equal to or less than the dew point of the indoor air by adjusting the amount of air of an indoor fan and the number of revolutions of the compressor so as to control the evaporating temperature of the refrigerant. With this operation, the indoor unit blows out the mixed air including the air cooled and dehumidified in the first indoor heat exchanger 5 and the air heated in the second indoor heat exchanger 7 regardless of outside air conditions. Further, when the evaporating temperature in the first indoor heat exchanger 5 is made excessively low and the temperature of air blown into the room is excessively reduced in the case of FIG. 83, the evaporating temperature can be adjusted by adjusting the first flow control valve as shown in FIG. 84. While the operation in FIG. 84 is the same as that of FIG. 83, a pressure difference is produced between B and C because the first flow control valve 4 is controlled.

Therefore, dehumidification without the drop of room temperature or dehumidification executed while increasing a room temperature can be carried out by executing the heating/reheating/dehumidifying operation. That is, when the cooling/reheating/dehumidifying operation and the heating/reheating/dehumidifying operation are interchangeably carried out according to a required air conditioning load regardless of outside air conditions, a cooling season, and a heating season, dehumidification can be carried out while controlling a room temperature (so as to decrease it, to keep it in the same level, and to increase it).

In the second flow control valve 6 of this example, the first porous permeable member 211*a*, the orifice 212, and the second porous permeable member 211*b* that constitute the throttle device are rotated together so as to switch the refrigerant between the flow passing through the throttle device and the flow bypassing the throttle device. Accordingly, it is possible to control the flow rate of refrigerant even if its flow direction is reversed, which permits the single flow controller to realize both the cooling/reheating/dehumidifying operation and the heating/reheating/dehumidifying operation, whereby a refrigerating cycle having the smaller number of components can be realized.

At this time, the refrigerant flow noise produced by the gas/liquid two-phase refrigerant passing through the orifice 212 can be greatly reduced by the porous permeable members 211*a* and 211*b* disposed before and behind the orifice. Accordingly, the cost can be reduced because the countermeasure, which is required in a conventional apparatus, for winding the noise insulating material and the damping material around the second flow controller 6 is not necessary, and further the recycling performacne of the air conditioning apparatus can be improved.

The porous permeable members 210 have the vent holes whose diameter is set to 100 μm to 500 μm and the thickness set to 1 mm to 10 mm, and the foamed metal composed of Ni, Ni—Cr, or stainless steel is used for the porous permeable members. A pressure of 2-8 K is applied to the second flow controller 6 as a pressure difference due to condensing and evaporating temperatures. The pressure loss corresponds to the thickness of the porous permeable members as well as an increase in thickness increases a noise eliminating effect and improves the durability to clogging. Accordingly, it is preferable to make the porous permeable members as thick as possible and the thickness of at least 1-3 mm is necessary. A smaller device can be made by a smaller thickness. The porous permeable member may be formed by laminating a plurality of porous permeable sheets. Further, since the porous permeable member is subjected to erosion by a jet stream from the outlet position of the orifice to the porous permeable member, a slight gap of, for example, 2-3 mm is defined therebetween. The diameter of the orifice is set to a size by which a pressure loss necessary for the refrigerating cycle can be obtained and set to about 0.5 to 2 mm because when the diameter is too small such as 0.1 mm, a problem arises in accuracy and mass-productivity when a product is made.

Further, the diameter of the vent holes of the porous permeable members 211*a* and 211*b* is set to 100 μm-500 μm that is larger than that of a filter used in an ordinary refrigerating circuit so as to execute a stable operation by preventing the clogging of foreign materials in the refrigerating circuit. The porous permeable members are disposed on both the sides of the orifice to finely rectify the refrigerant of the liquid and gas phases distributed on the inlet side of the refrigerant and to suppress a blowing-out air flow and to absorb noise on the outlet side of the refrigerant. The porous permeable members having a larger area is preferable because the problem of clogging can be solved, the pressure loss can be reduced, and noise can be suppressed thereby. However, since the apparatus is increased in this case, the diameter thereof is set to about three times that of the flow path connecting pipes.

The flow control valve may be disposed with respect to the refrigerant flow by any of methods of disposing it horizontally, vertically, obliquely, and the like, and the same effect can be obtained thereby. When the flow control valve is disposed vertically or obliquely, the refrigerant may be flowed from any direction, that is, in an upward direction from a lower side or in a downward direction from an upper side. A frame member 210 is composed of a strong material such as, iron, stainless steel, copper, or the like, and the valve disc 215 rotating in the frame member 210 integrally with the porous permeable members is made of brass, stainless steel, resin, or the like. The portion of the valve disc 215 in contact with the frame member is made free of leakage as well as is coated with fluorine resin such that it is not worn and does not produce chips because it is rotated in contact with the frame member.

The flow control valve of this example can be reduced in size and has an effect of increasing the degree of freedom of installation because it is integral with the flow control mechanism, the valve drive mechanism, and the noise eliminating mechanism. Thus, the flow control valve can be easily disposed in and attached to the indoor machine of an air conditioner.

Note that the same effect can be obtained even if the porous permeable members are composed of the sintered metal made by sintering metal powder, the porous permeable member composed of ceramics, the metal wire netting, the member made by superimposing the plurality of metal wire nettings, the sintered metal wire netting made by sintering the plurality of superimposed metal wire nettings, in addition to the foamed metal.

Figure 96:
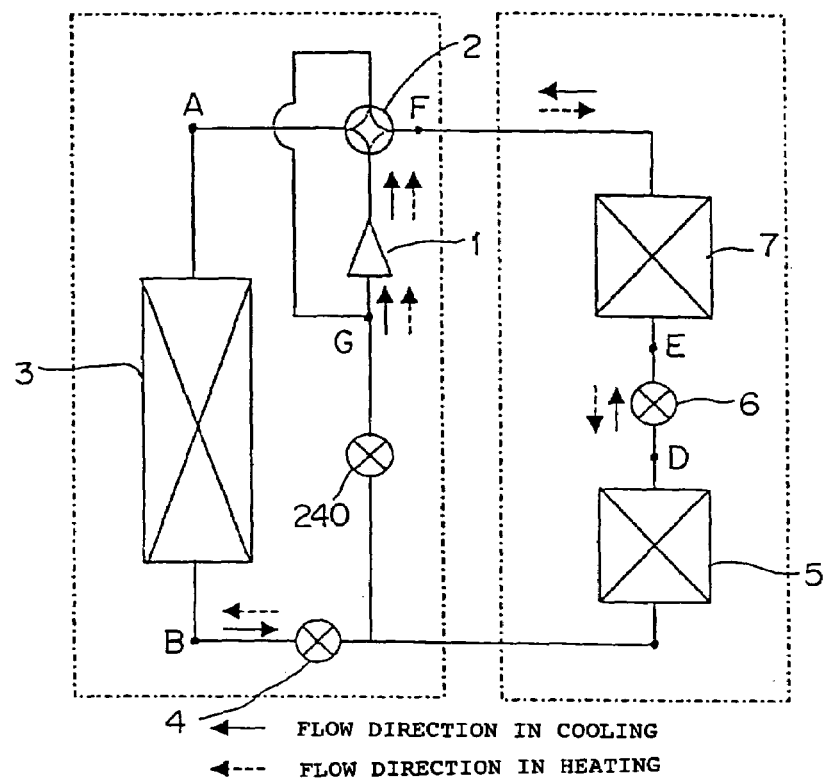
FIG. 96 is a refrigerant circuit diagram according to the embodiment 2 of the present invention.
Figure 97:
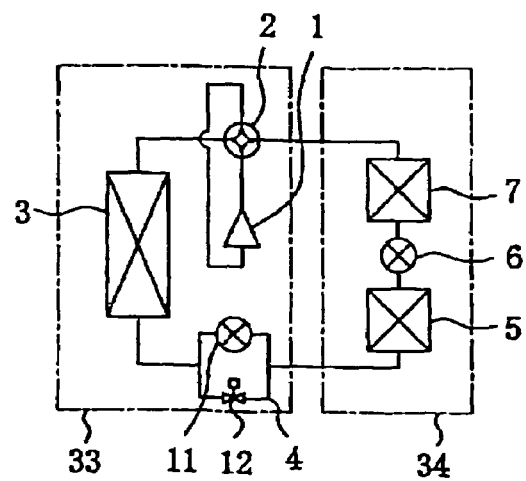
FIG. 97 is a refrigerant circuit diagram showing a conventional air conditioning apparatus.
Figure 98:
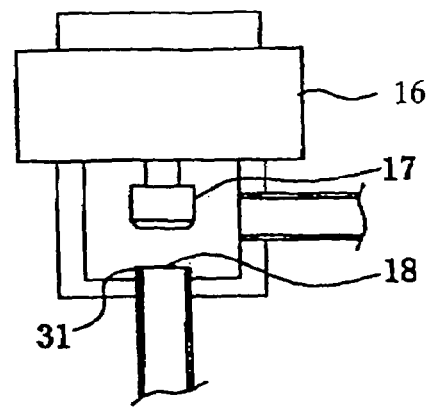
FIG. 98 is a sectional view of the arrangement of a conventional throttle device.
Figure 99:
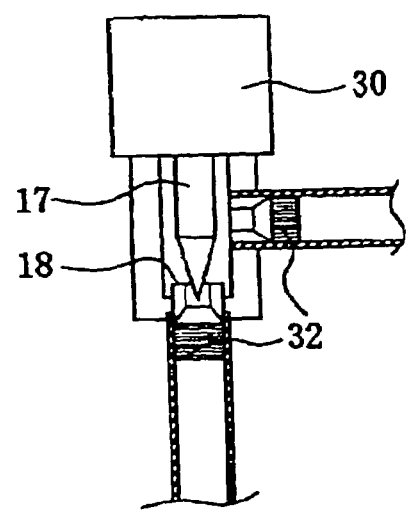
FIG. 99 is a sectional view showing the arrangement of another example of the conventional throttle device.
Figure 100:
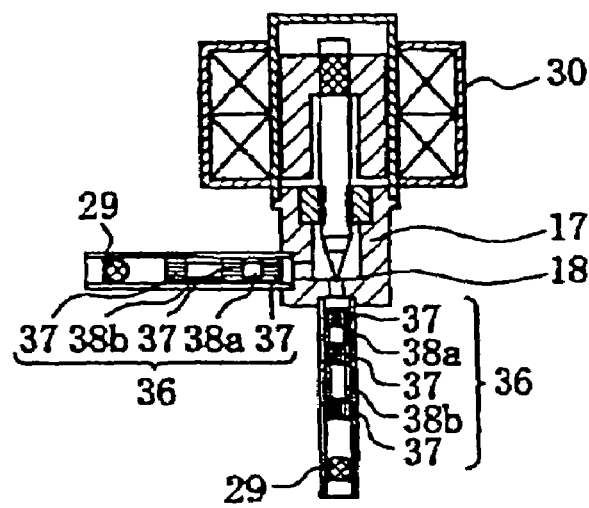
FIG. 100 is a sectional view showing the arrangement of another example of the conventional throttle device.
Figure 101:
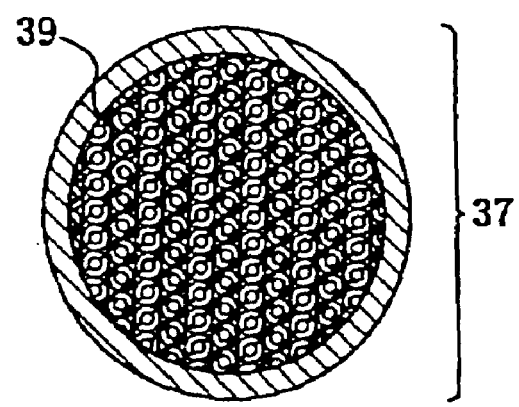
FIG. 101 is a sectional view of the noise eliminating section of the throttle device shown in FIG. 100.

Note that, in the embodiment, the arrangement for flowing the refrigerant also to the outdoor heat exchanger in the heating/reheating/dehumidifying operation has been described. However, a bypass circuit provided with a switching valve 240 may be added such that the refrigerant ejected from the indoor heat exchangers is directly sucked into the compressor bypassing the outdoor heat exchanger, as shown in FIG. 96. The first flow controller 4 is closed and the switching valve 240 of the bypass circuit is opened in the dehumidifying operation, and the switching valve 240 of the bypass circuit is closed in the ordinary operation. The addition of the bypass circuit permits the evaporating temperature of the first indoor heat exchanger to be controlled without depending upon an outside temperature, and thus the dehumidifying capacity can be more stably controlled. As a result, the stability of the refrigerating cycle can be obtained without reducing the ejecting temperature of the compressor.

Figure 85:
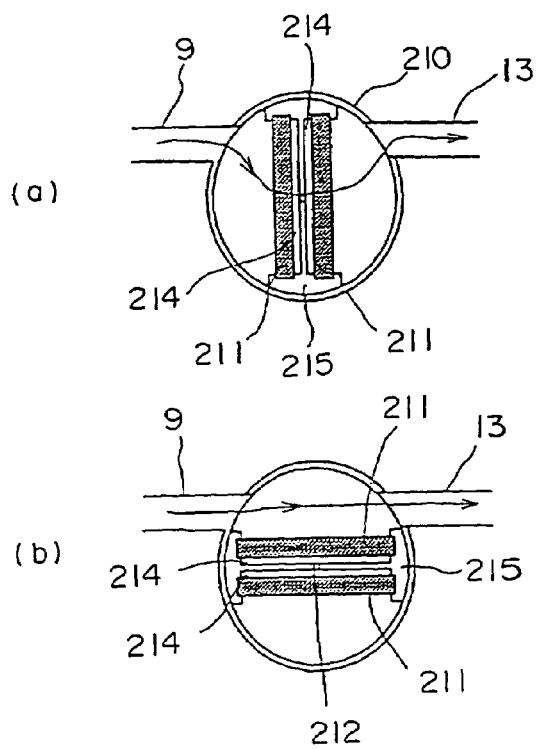
FIG. 85 depicts sectional views of the throttle device according to the embodiment 2 of the present invention.

FIG. 85 depicts sectional views of another structure of the second flow controller 6, wherein numeral 9 denotes the first flow path connecting pipe, 13 denotes the second flow path connecting pipe, and 210 denotes the valve frame, the orifice 212 is interposed between the porous permeable members 211, and the gaps 214 are defined between the porous permeable members 211 and the orifice to provide given intervals therebetween. Each of the gaps 214 is set between 0 to 3 mm. Each of the porous permeable members has a thickness set to 1 mm-5 mm and a passing-through area set to 70 $mm^2$-700 $mm^2$, and is fixed to the valve disc 215 rotating in the frame member 210. The orifice 212 is also rotated together with the rotatable valve disc 215. The first flow path connecting pipe 9 and the second flow path connecting pipe 13 are disposed at positions spaced apart from the center of rotation of the valve disc 215. Note that the drive unit of the valve disc is the same as that of the flow controller described previously. Further, FIG. 86 depicts sectional views of the structure, which are the same as those shown in FIG. 85, of the valve main body, when it is viewed from the first flow path connecting pipe 9 side.

In FIG. 85, a pedestal acting as the valve disc 215 of the flow controller is rotated in the valve frame 210 and set as shown in FIG. 85(*a*). In the cooling operation, the refrigerant flows through the first flow path connecting pipe 9, the porous permeable member 211, the orifice 212, the porous permeable member 211, and the second flow path connecting pipe 13 in this sequence, and the refrigerant is reduced in pressure between the first indoor heat exchanger 5 and the second indoor heat exchanger 7. When the pedestal of the throttle device is rotated and set as shown in FIG. 85(*b*), the refrigerant flows through the space in the valve frame 210 in front of the first flow path connecting pipe 9 and the second flow path connecting pipe 13 without passing the pipe 9 and the porous permeable member 211, and thus almost no pressure loss is produced between the first indoor heat exchanger 5 and the second indoor heat exchanger 7. The valve disc 215 is driven into rotation by the DC motor or the stepping motor through the reducer. Note that the refrigerant flow is reversed in the heating operation and the heating/reheating/dehumidifying operation.

Figure 86:
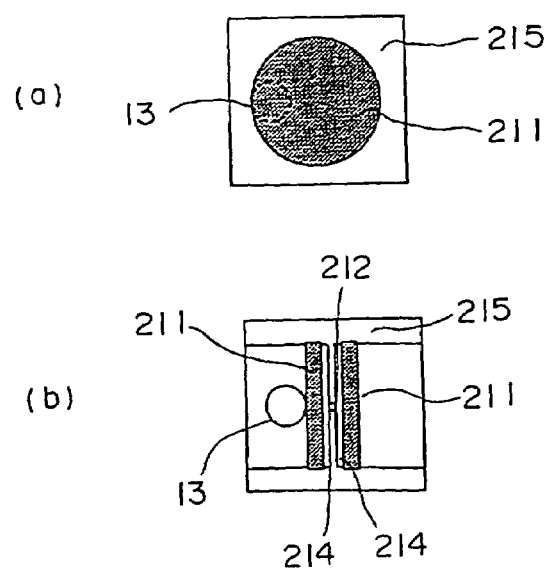
FIG. 86 depicts sectional views of the throttle device according to the embodiment 2 of the present invention.

FIG. 86(*a*) is a view when FIG. 85(*a*) is viewed from the first flow path connecting pipe 9, wherein the porous permeable members 211 acting as the refrigerant flow path exists at the center thereof. In contract, FIG. 86(*b*) is a view when FIG. 85(*b*) is viewed from the first flow path connecting pipe 9, and the functional effect of this structure is the same as that described above. However, since the space formed by rotating the valve disc 215 of the second flow controller in the frame member 210 is utilized, no waste is caused when the valve is opened, that is, in the circuit bypassing the orifice 12, whereby the device can be reduced in size.

Figure 87:
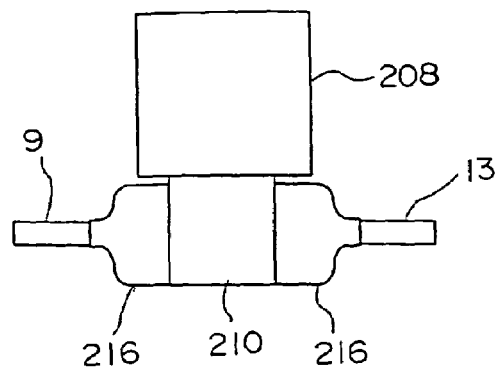
FIG. 87 is an external appearance view of the throttle device according to the embodiment 2 of the present invention.
Figure 88:
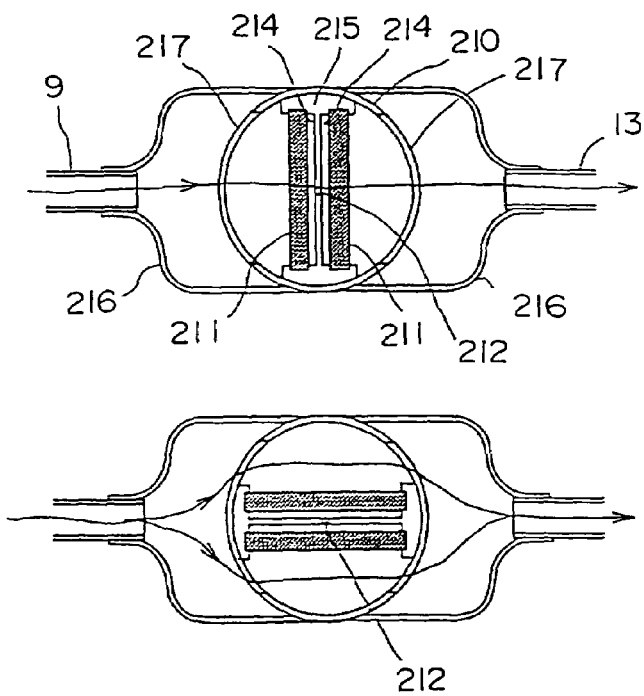
FIG. 88 depicts sectional views of the throttle device according to the embodiment 2 of the present invention.

FIGS. 87 and 88 are an external shape view of the throttle device having another structure and views explanatory of the cross-sections thereof. In the figures, numeral 208 denotes the rotary drive unit, 9 denotes the first flow path connecting pipe 9, 13 denotes the second flow path connecting pipe, 210 denotes the frame member 210, and 216 denotes mufflers, and the first flow path connecting pipe 9 and the second flow path connecting pipe 13 are connected to the mufflers, respectively. FIG. 88 depicts detailed sectional views of FIG. 87, wherein 211 denotes the porous permeable members, with the orifice 212 interposed between the two porous permeable members, and the gaps 214 are defined so as to form predetermined intervals between the porous permeable members 211 and the orifice 212. Each of the gaps 214 is set between 0-3 mm. Each of the porous permeable members has a thickness set to 1 mm-5 mm and a passing-through area set to 70 mm$^2$-700 mm$^2$, and is fixed to the rotatable valve disc 215. The orifice is also fixed to the rotatable valve disc 215 integrally therewith or fixed thereto as a separate component. The valve frame 210 has openings 217. Further, the valve frame 210 has such a structure that the mufflers 216 are attached and fixed thereto.

In FIG. 88, when the valve disc 215 of the flow controller is rotated and set as shown in FIG. 85(*a*), the refrigerant flows through the first flow path connecting pipe 9, the muffler 216, the opening 217, the porous permeable member 211, the orifice 212, the porous permeable member 211, the opening 217, the muffler 216, and the second flow path connecting pipe 31 in this sequence, and is reduced in pressure between the first indoor heat exchanger 5 and the second indoor heat exchanger 7. When the valve disc 215 acting as the pedestal of the throttle device is rotated and set as shown in FIG. 88(*b*), the refrigerant flows through the first flow path connecting pipe 9, the muffler 216, the opening 217, the space before the porous permeable members 211, the opening 217, the muffler 216, and the second flow path connecting pipe 31, and almost no pressure loss is produced between the first indoor heat exchanger 5 and the second indoor heat exchanger 7. At this time, the valve disc 215 is driven into rotation by the DC motor or the stepping motor through the reducer. Note that the refrigerant flow is reversed in the heating operation and the heating/reheating/dehumidifying operation.

While the functional effect of this structure is the same as that described above, noise can be more reduced because the mufflers are used. That is, since the mufflers are provided, it is possible to obtain a refrigerant noise reducing effect in the mufflers, in addition to the refrigerant noise reducing effect obtained by the rectifying action of the porous permeable members 211. Further, the openings 217 of the valve frame 210 can be widened with respect to the throttle section by using the mufflers 216, as shown in FIG. 88(*b*). Accordingly, almost no pressure drop is produced in the circuit bypassing the throttle section.

Figure 89:
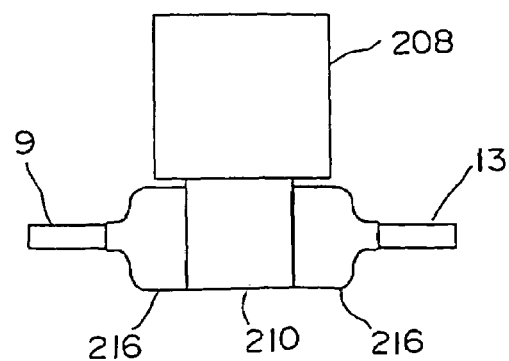
FIG. 89 is an external appearance view of the throttle device according to the embodiment 2 of the present invention.
Figure 90:
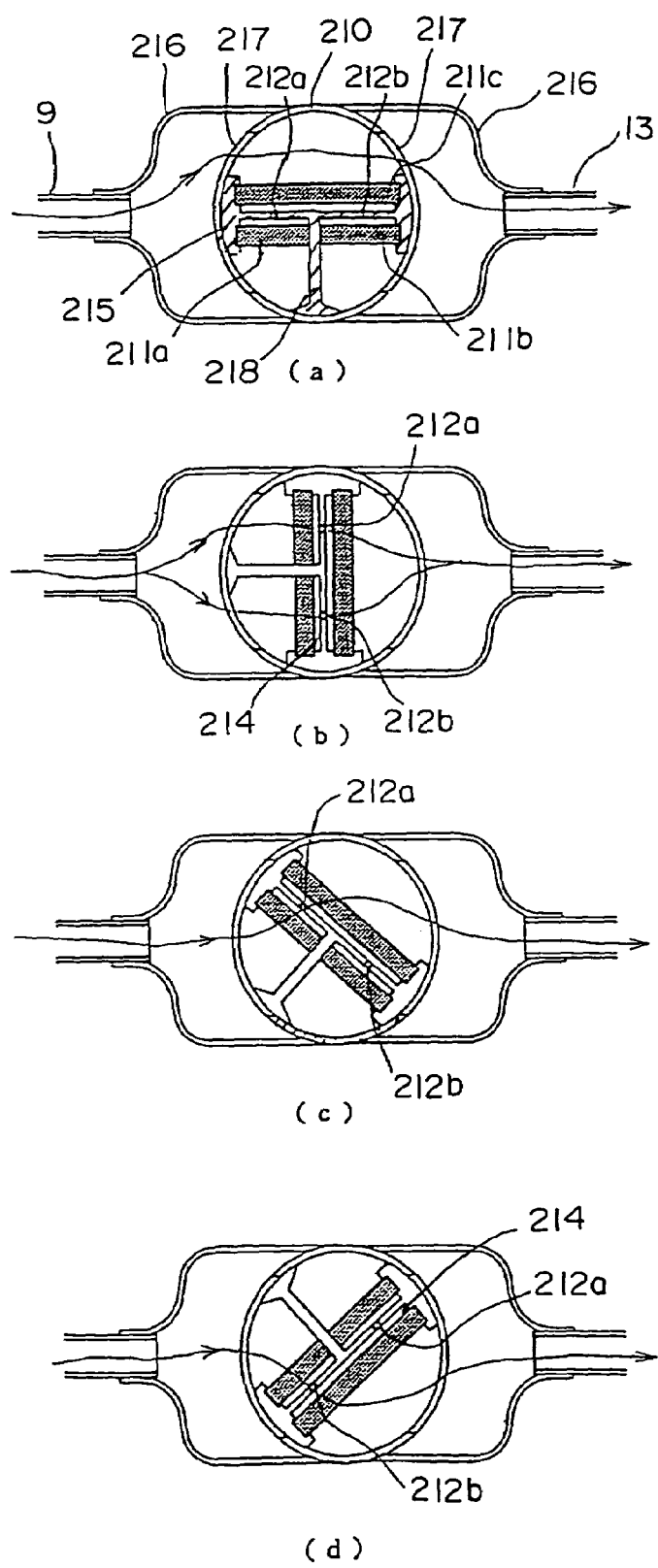
FIG. 90 depicts sectional views of the throttle device according to the embodiment 2 of the present invention.

FIGS. 89 and 90 are an external shape view of the flow controller having another structure and views explanatory of the cross sections thereof. In the figures, numeral 208 denotes the rotary drive unit, 9 denotes the first flow path connecting pipe, 31 denotes the second flow path connecting pipe, 210 denotes the valve frame, and 216 denotes the mufflers. Further, FIG. 90 depicts detailed sectional views of FIG. 89, wherein 211 denotes the porous permeable members, with a partition 218 interposed between the porous permeable member 211*a* and the porous permeable member 211*b* on one side, and two spaces are formed on both the sides of the partition. Orifices 212*a* and 212*b* are formed so as to be connected to the spaces, and the porous permeable member 211*c* on the opposite side is disposed behind the orifices 212*a* and 212*b*. The gaps 214 are defined between the respective porous permeable members 211*a*, 211*b*, and 211*c* and the respective orifices 212*a*, and 212B, so as to form given intervals therebetween. Each of the gaps 214 is set between 0-3 mm. Each of the porous permeable members 211 has a thickness set to 1 mm-5 mm, and each of the porous permeable members 211 on the one side has a passing-through area set to 70 mm$^2$-700 mm$^2$ and is fixed to the rotatable valve disc 215. The orifices 212*a* and 212*b* are also fixed to the rotatable valve disc 215 integrally therewith or fixed thereto as separate components. Further, the frame member 210 is provided with the openings 217 to which the mufflers 216 are attached.

In FIG. 90, when the valve disc 215 of the flow controller is rotated as shown in FIG. 90(*a*), the refrigerant flows through the first flow path connecting pipe 9, the muffler 216, the opening 217, the space without partition behind the porous permeable members 211 on both the sides, the opening 217, the muffler 216, and the second flow path connecting pipe 31. Since the refrigerant flows through the open space without passing through the throttle, almost no pressure loss is produced between the first indoor heat exchanger 15 and the second indoor heat exchanger 7. Next, when the valve disc 215 of the flow controller is rotated and set as shown in FIG. 90(*b*), the refrigerant flows through the first flow path connecting pipe 9, the muffler 216, the opening 217, the two spaces partitioned from the opening 217 by the partition 218, respectively, and flows through the porous permeable members 211a and 211b disposed in the respective spaces, the orifices 212a and 212b, the porous permeable member 211c, the opening 217, the muffler 216, and the second flow path connecting pipe 31 in this sequence. Since the refrigerant flows through the throttle section, it is reduced in pressure between the first indoor heat exchanger 5 and the second indoor heat exchanger 7. Further, when the valve disc 215 is rotated as shown in FIG. 90(c), the refrigerant flows through only the one space partitioned by the partition 218 this time. Accordingly, the refrigerant is reduced in pressure in a larger amount as compared with the case of FIG. 90(b) because the refrigerant flows through only the one orifice 212a. Next, when the valve disc acting as the pedestal is rotated as shown in FIG. 90(d), the refrigerant flows through only the other space partitioned by the partition 218 this time. Accordingly, the refrigerant flows through only the one orifice 212b. Thus, when the inside diameter of the orifice 212a is changed from that of the orifice 212b, it is possible to adjust the refrigerant such that it is reduced in pressure in an amount different from that of FIG. 90(c). At this time, the valve disc 215 is driven into rotation by the DC motor or the stepping motor through the reducer. Note that the refrigerant flow is reversed in the heating operation and the heating/reheating/dehumidifying operation.

The functional effect in the example of this structure is the same as that described above. In the cooling/dehumidifying operation, the refrigerant is in a gas/liquid two-phase state at the inlet of the second flow controller 6 (D) as shown in the pressure-enthalpy curve of FIG. 82. In the heating/dehumidifying operation, however, there is also a case in which the refrigerant is in a liquid state at the inlet of the second flow controller 6 (E), as shown in the pressure-enthalpy curve of FIG. 83. When the refrigerant passes through an orifice having the same sectional area, the refrigerant in the liquid state has a less pressure loss as compared with the refrigerant in the gas/liquid two-phase state. Accordingly, when a predetermined amount of the refrigerant is flowed, the amount of throttling in the heating/dehumidifying operation must be set larger than that in the cooling/dehumidifying operation. The second flow control valve 6 of this structure can set the amount of pressure reduction of refrigerant to 2-3 levels according to angles through which the valve disc 215 is rotated with respect to the valve frame 210. Accordingly, it is possible to change the throttling amount bentwen the cooling/dehumidifying operation and the heating/dehumidifying operation, whereby an optimum dehumidifying operation can be carried out. When it is assumed, for example, that the sectional areas of the orifices are (orifice 212a+orifice 212b)>(orifice 212a)>(orifice 212b), the flow controller is set to the state shown in FIG. 90(a) in the ordinary cooling operation and the heating operation in which almost no pressure loss is produced. Next, the flow controller is set to the state shown in FIG. 90(b) in the cooling/reheating/dehumidifying operation. At this time, the sectional area of the orifice 212a+the orifice 212b is set such that the evaporating temperature of the refrigerant in the second indoor heat exchanger 7 is optimized, that is, the sectional area achieves an optimum throttling amount on cooling in the cooling/reheating/dehumidifying operation. Next, the flow controller is set to the state shown in FIG. 90(d) in the heating/reheating/dehumidifying operation. At this time, the sectional area of the orifice 212b is set such that the evaporating temperature of the refrigerant is optimized, that is, the sectional area achieves an optimum throttling amount on cooling in the heating/reheating/dehumidifying operation. When it is desired to decrease the evaporating temperature in the second indoor heat exchanger 7 in such a case in which it is desired to increase the amount of dehumidification in the cooling/reheating/dehumidifying operation, the flow controller is set to the state of FIG. (c) or FIG. (d) so as to increase the throttling amount of refrigerant as compared with that shown in FIG. (b). Further, when it is desired to decrease the amount of dehumidification and to increase the evaporating temperature of refrigerant in the first indoor heat exchanger 5 also in the heating/reheating/dehumidifying operation, the flow controller is set to the state of FIG. (b) or FIG. (c) so as to decrease the throttling amount of refrigerant as compared with the state of FIG. (d).

As described above, the evaporating temperature of the indoor evaporator is set to 2° C. or more at which dehumidification is possible and drain water is not frozen and which is equal to or less than the dew point temperature of a room temperature also in the cooling/dehumidifying operation and the heating/dehumidifying operation. When it is desired to increase the dehumidifying amount in the above range, the evaporating temperature is reduced. When it is desired to reduce the dehumidifying amount, the throttling amount can be controlled to keep the evaporating temperature of the indoor evaporator optimum by, for example, increasing the evaporating temperature.

Since the mufflers are provided in the example of this structure, it is possible to obtain the refrigerant noise reducing effect in the mufflers, in addition to the refrigerant noise reducing effect obtained by the rectifying action of the porous permeable members 211. Further, the example of FIG. 90 explains the case in which the single partition is provided for the single set of openings of the frame member 210. However, it is possible to change the throttling amount in steps increased several-fold by changing the numbers of them and by providing a partition whose rotational axis is modified in a direction other than a linear direction, whereby dehumidification can be controlled more finely.

Figure 91:
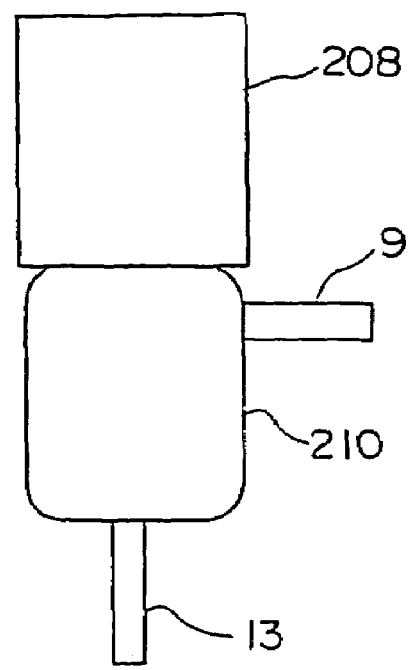
FIG. 91 is an external appearance view of the throttle device according to the embodiment 2 of the present invention.
Figure 92:
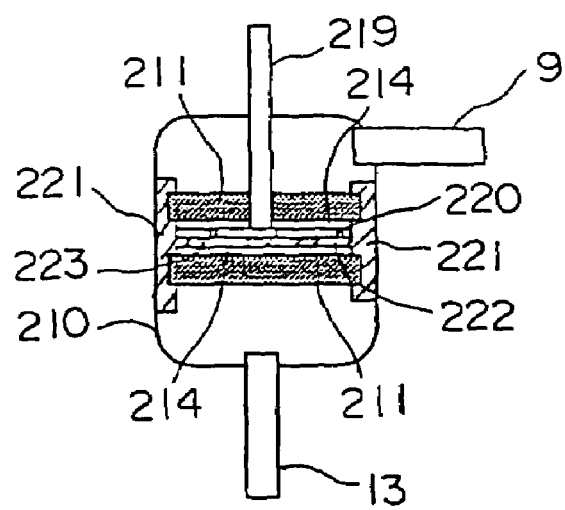
FIG. 92 is a sectional view of the throttle device according to the embodiment 2 of the present invention.

FIGS. 91 and 92 are an external shape view of the throttle device having another structure and a view explanatory of the cross section thereof. In the figures, numeral 208 denotes the rotary drive unit, 9 denotes the first flow path connecting pipe, 31 denotes the second flow path connecting pipe, and 210 denotes the valve disc. FIG. 92 is a detailed sectional view of FIG. 91, wherein 211 denotes the porous permeable members, 220 denotes a disc-shaped plate having a plurality of orifices on the front surface thereof and making a rotational motion, 222 denoted a plate having a hole defined therethrough and having a diameter larger than the inside diameter of the connecting pipes, and 221 denotes members for fixing the porous permeable members 211, and the plate 222 having the hole is integral with the members 221. Reference numeral 219 denotes a shaft for rotating the disc-shaped plate, and the shaft is connected to the drive unit 208. The disc-shaped plate 220 and the plate 222 having the hole are sandwiched between the porous permeable members 211, and predetermined gaps 214 are defined between the disc-shaped plate 220 and the plate 222 and the porous permeable members 210. Each of the predetermined gaps 214 is set between 0 to 3 mm. Each of the porous permeable members 11 has a thickness set to 1 mm-5 mm and a passing-through area set to 70 mm$^2$-700 mm$^2$. Reference numeral 223 denotes a communication hole.

Figure 93:
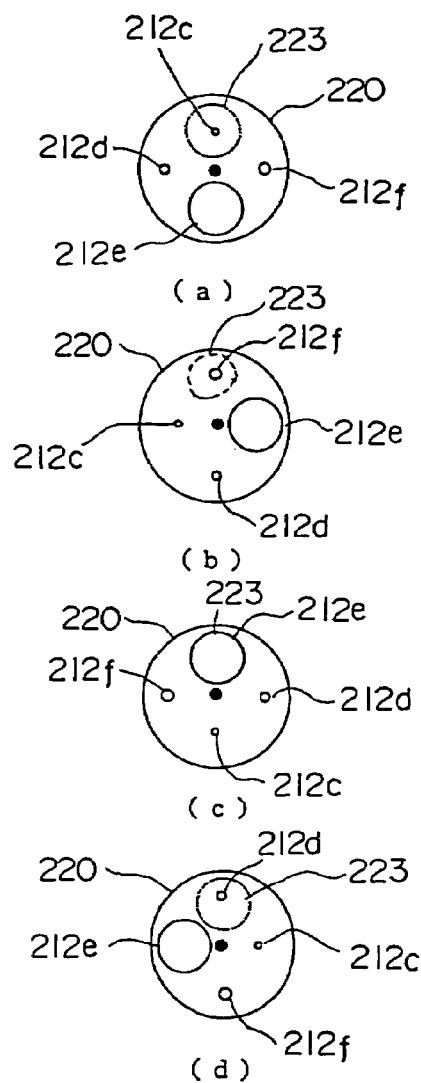
FIG. 93 depicts views explanatory of an orifice section of the throttle device according to the embodiment 2 of the present invention.

FIG. 93 is a series of views explanatory of the orifices when the disc-shaped plate 220, which has the plurality of orifices on the front surface thereof and makes a rotational motion, and the plate 222, which is fixed to the valve frame 210 and has the hole 223, are viewed by being taken out and superimposed, wherein numerals 212c, 212d, 212e, and 212f denote the orifices, and 223 denotes the hole formed through the plate 222. In FIG. 93(a), the refrigerant passes through the first flow path connecting pipe, the porous permeable member 211, the orifice 212c, and the porous permeable members 211, and then passes through the second flow path connecting pipe. When the disc-shaped plate 220 is rotated and set as shown in FIGS. 93(b), 93(c), and 93(d), the refrigerant flows to the orifice 212f in FIG. 93(b), to the orifice 212e in FIG. 93(c), and to the orifice 212d in FIG. 93(d). At this time, if the inside diameters of the orifices are changed, respectively, the amount of pressure reduction of the refrigerant can be changed in correspondence to as many as the number of orifices, whereby it is possible to adjust the pressure loss of refrigerant between the first indoor heat exchanger 5 and the second indoor heat exchanger 7. Further, when the inside diameters of the orifices are set equal to or larger than the inside diameter of the communication hole 223 of the plate 222, that is, when they are set equal to or larger than the inside diameter of the first and second flow path connecting pipes 9 and 31, the refrigerant flowing to the throttle device flows as it is without being reduced in pressure. At this time, almost no pressure loss is produced between the first indoor heat exchanger 5 and the second indoor heat exchanger 7. The disc-shaped plate 220 is driven by the DC motor or the stepping motor through the reducer. Note that the refrigerant flow is reversed in the heating operation and the heating/reheating/dehumidifying operation.

The example of this structure has the same effect as that described above because the amount of pressure reduction of the refrigerant can be set stepwise in correpondence to as many as the number of orifices. While FIG. 93 shows the example in which the four orifices are used, the same effect can be obtained even if two or three orifices or five or more orifices are used. Further, since only the rotary disc provided with the orifices is rotated in the example of the structure of FIGS. 92 and 93, not only the flow controller is reduced in size but also a driving force can be saved. Accordingly, the flow controller can be simply disposed in the indoor machine of the air conditioner and the like. That is, the flow controller of this example of the present invention is disposed in the valve main body in which the first flow path is connected to the second flow path, includes the rotatable disc having the plurality of small holes having different flow resistances and disposed at predetermined angular positions, the porous permeable members disposed at intervals so as to sandwich the disc therebetween, and the drive mechanism for driving the disc, and selectively connects the small holes for communicating the first flow path with the second flow path by rotating the disc. Accordingly, the flow controller can control the flow resistance in many steps. Note that, inversely to this example of the flow controller, the flow controller may have such a structure that the disc 222 having the communication hole 223 defined therethrough is rotated, and the disc-shaped plate having the plurality of orifices is fixed to the members 221 to which the porous permeable members 211 are fixed. With this arrangement, there can be obtained a structure that is disposed in the valve main body in which the first flow path is connected to the second flow path and that includes the rotatable disc having the hole whose area is equal to or larger than the flow path area of the first and second flow path, the orifice support member fixed to the valve main body in contact with the disc and having the plurality of small holes having the different flow resistances and the hole whose inside diameter is equal to or larger than the hole of the disc, these holes being disposed at predetermined angular positions, and the porous permeable members disposed at the intervals so as to sandwich the disc and the orifice support member therebetween. When the disc having the communication hole is rotated and the communication hole thereof aligns with one of the small holes 212, which have the different flow resistances, of the fixed member, the refrigerant flows based on the throttling of the small hole depending upon an angle at which they are in alignment with each other. As a result, it is possible to select the desired flow path through which the first flow path communicates with the second flow path based on the throttling of the small hole.

Figure 94:
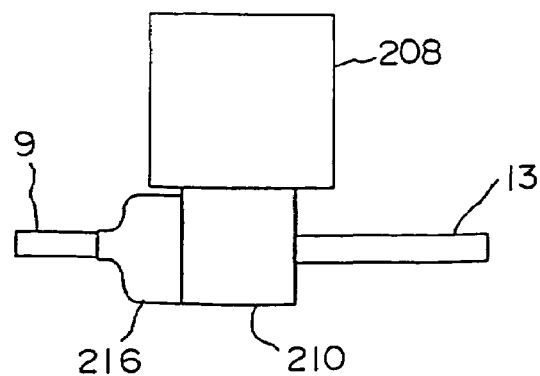
FIG. 94 is an external appearance view of the throttle device according to the embodiment 2 of the present invention.
Figure 95:
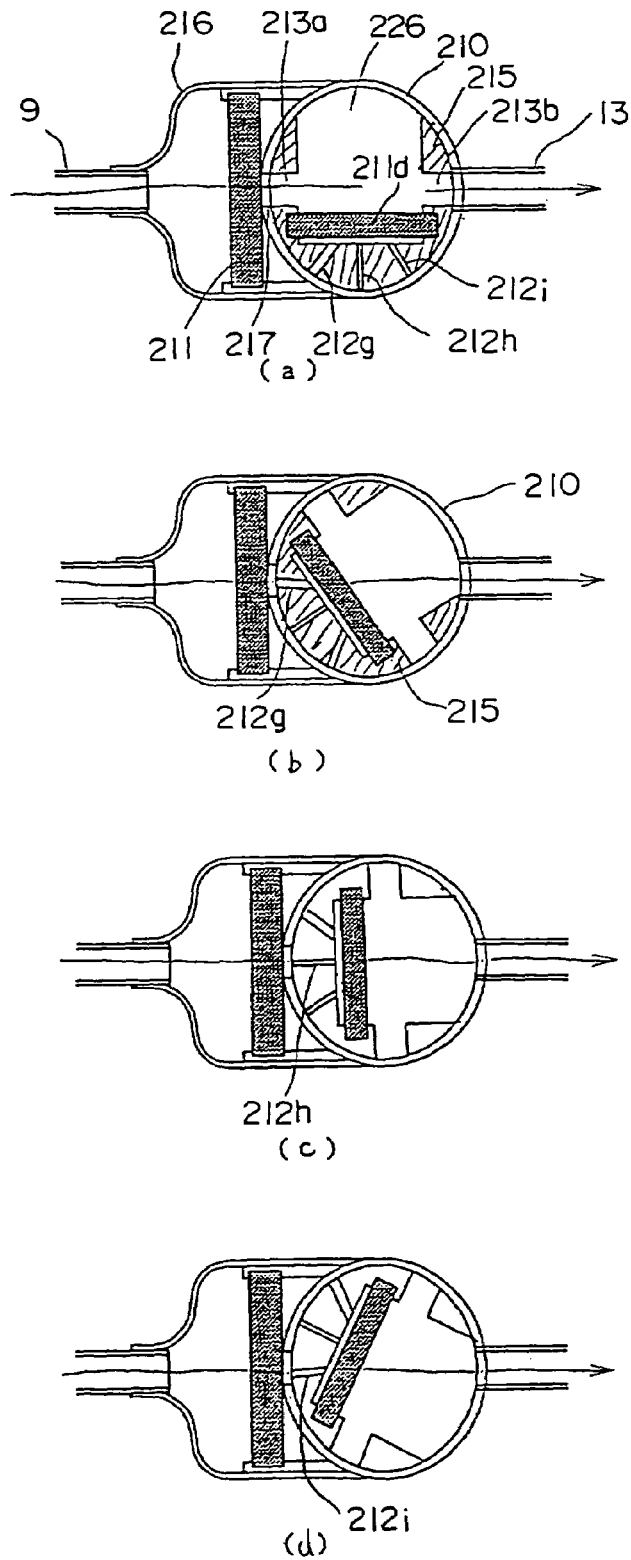
FIG. 95 depicts sectional views of the throttle device according to the embodiment 2 of the present invention.

FIGS. 94 and 95 are an external shape view of a different throttle device and a series of views explanatory of the cross-sections thereof. In FIG. 94, numeral 208 denotes the rotary drive unit, 9 denotes the first flow path connecting pipe, 31 denotes the second flow path connecting pipe, 210 denotes the valve disc, and 216 denotes the muffler. Further, FIG. 95 is a series of detailed sectional views of FIG. 94, wherein 211 denotes the porous permeable member fixed to the muffler 216 through the fixing members 221. The muffler 216 is fixed to the valve frame 210. The valve frame 210 has the opening 217 defined therethrough and having a diameter equal to or larger than the inside diameters of the connecting pipes. Reference numerals 212g, 212h, and 212i denotes the orifices defined through the valve disc 215 so as to form holes, and 211d denotes the porous permeable member fixed to the valve disc 215. The orifices 212g, 212h, and 212i are integral with the valve disc 215 or arranged as separate components fixed to the valve disc 215, and they are rotated according to the rotation of the valve disc. The predetermined gaps 214 are defined between the orifices 212g, 212h, and 212i and the porous permeable members and set between 0-3 mm. Further, the valve disc 215 includes the communicating flow paths 213a and 213b each having an opening area equal to or larger than the cross sectional area of the first and second flow path connecting pipes 9 and 31, and a space 226. Each of the porous permeable members 211 and 211d has a thickness set to 1 mm-5 mm and a passing-through area set to 70 mm$^2$-700 mm$^2$.

In FIG. 95, when the valve disc 215 of the flow controller is rotated and set as shown in FIG. 95(a), the refrigerant flows through the first flow path connecting pipe 9, the muffler 216, the porous permeable member 211, the opening 217, the communicating flow path 213a, the space 226, the communicating flow path 213b, and the second flow path connecting pipe 31, and thus almost no pressure loss is produced between the first indoor heat exchanger 5 and the second indoor heat exchanger 7. Next, when the valve disc 215 is set as shown in FIG. 95(b), the refrigerant flows through the first flow path connecting pipe 9, the muffler 216, the porous permeable member 211, the opening 217, the orifice 212g, the porous permeable member 211d, the space 226, and the second flow path connecting pipe 31, and thus the refrigerant is reduced in pressure between the first indoor heat exchanger 5 and the second indoor heat exchanger 7. Further, when the valve disc is rotated as shown in FIG. (c), the refrigerant flows through the orifice 212h in place of the orifice 12g of FIG. (b). Likewise, when the valve disc 214 is rotated as shown in FIG. (d), the refrigerant flows through the orifice 212i. At this time, when the inside diameters of the orifices 212g, 212h, and 212i are changed, the amount of pressure reduction of the refrigerant can be changed correspondingly in the respective states, whereby the amount of pressure reduction of the refrigerant can be varied between the first indoor heat exchanger 5 and the second indoor heat exchanger 7. At this time, the valve disc 215 is driven into rotation by the DC motor or the stepping motor through the reducer. Note that the refrigerant flow is reversed in the heating operation and the heating/reheating/dehumidifying operation.

Since the flow control valve shown in FIG. 95 can also adjust the amount of pressure drop in three different ways, the same effect as that described above can be obtained. While FIG. 95 shows the example in which three orifices are used, the same effect can be obtained even if two or four or more orifices are used.

According to the present invention, the throttle section composed of the porous permeable member 211 and the small hole is disposed in the valve main body to which the first flow path and the second flow path are connected and the valve disc capable of rotating in the valve main body is provided. In this arrangement, it is possible to switch between a case in which the first flow path is caused to communicate with the second flow path through the throttle section composed of the porous permeable member and the small hole and a case in which they are caused to communicate with each other without passing through the throttle section by rotating the valve disc. Accordingly, the cooling/reheating/dehumidifying operation and the heating/reheating/dehumidifying operation can be realized as well as a small and low noise flow control valve can be obtained.

According to the present invention, a small and low noise flow control valve having such a feature that the porous permeable members are disposed upstream and downstream of the small holes can be obtained. In this flow control valve, the throttle section is composed of the porous permeable members and the plurality of small holes whose flow resistances are different from that of the porous permeable members. When the first flow path is caused to communicate with the second flow path through the throttle section composed of the porous permeable members and the small holes, it is possible to change the flow resistance between the first flow path and the second flow path by selectively connecting the small holes through which the refrigerant passes. Accordingly, flow control optimum to the cooling/reheating/dehumidifying operation and the heating/reheating/dehumidifying operation can be realized as well as a small and low noise flow control valve can be obtained.

The rotatable valve disc, in which sequentially disposed are the disc-shaped or polygonal porous permeable members each having a thickness, the small hole, the communication flow path, and the disc-shaped or polygonal porous permeable member having a thickness, is provided in the valve main body in which the first flow path is connected to the second flow path, and the drive mechanism for rotating the valve disc is provided. This arrangement has such a feature as to make it possible to switch between a case in which the first flow path is caused to communicate with the second flow path through the throttle section composed of the porous permeable members and the small hole and a case in which the first flow path is caused to communicate with the second flow path through only the communication flow path. Accordingly, the cooling/reheating/dehumidifying operation and the heating/reheating/dehumidifying operation are realized as well as the structure of a small and low noise flow control valve can be obtained.

The rotatable valve disc, in which disposed are the disc-shaped or polygonal porous permeable members each having a thickness so as to sandwich the small hole therebetween, is disposed in the valve main body in which the first flow path is connected to the second flow path, and the drive mechanism for driving the valve disc is provided. This arrangement has such a feature as to make it possible to switch between a case in which the first flow path is caused to communicate with the second flow path through the throttle section composed of the porous permeable members and the small hole and a case in which the first flow path is caused to communicate with the second flow path through the front surface portion of the throttle section. Accordingly, the cooling/reheating/dehumidifying operation and the heating/reheating/dehumidifying operation are realized as well as the structure of a small and low noise flow control valve can be obtained.

The rotatable valve disc, in which disposed are the disc-shaped or polygonal porous permeable members each having a thickness so as to sandwich the small hole therebetween, is disposed in the valve main body in which the first flow path is connected to the second flow path through the mufflers, and the drive mechanism for driving the valve disc is provided. This arrangement has such a feature as to make it possible to switch between a case in which the first flow path is caused to communicate with the second flow path through the throttle section composed of the porous permeable members and the small hole and a case in which the first flow path is caused to communicate with the second flow path through the front surface portion of the throttle section. Accordingly, the cooling/reheating/dehumidifying operation and the heating/reheating/dehumidifying operation are realized as well as the structure of a small and low noise flow control valve can be obtained.

The rotatable valve disc, that has the respective spaces in which the disc-shaped or polygonal porous permeable member having a thickness is partitioned, the space which is located adjacent to the spaces and in which the small holes acting as the throttles are partitioned, and further the disc-shaped or polygonal porous permeable member having a thickness and disposed through the small holes and the flow path through which the refrigerant flows, is disposed in the valve main body in which the first flow path is connected to the second flow path, and the drive mechanism for driving the valve disc is provided. This arrangement has such a feature as to make it possible to select one of a case in which the first flow path is connected to the second flow path through one of the partitioned spaces composed of the porous permeable members and the small holes, a case in which they are connected to each other through both the partitioned spaces, and a case in which they are connected to each other bypassing the porous members and the small holes according to an angle through which the pedestal is rotated. Accordingly, the cooling/reheating/dehumidifying operation and the heating/reheating/dehumidifying operation are realized as well as the structure of a small and low noise flow control valve can be obtained.

The rotating disc having the plurality of small holes each having a different inside diameter is disposed in the valve main body in which the first flow path is connected to the second flow path, the disc-shaped or polygonal porous permeable members each having a thickness are disposed so as to sandwich the disc therebetween, and the drive mechanism for rotating the disc is provided. In this arrangement, the small holes through which the first flow path communicates with the second flow path can be selectively connected by rotating the disc. Accordingly, the cooling/reheating/dehumidifying operation and the heating/reheating/dehumidifying operation are realized as well as the structure of a small and low noise flow control valve can be obtained. The rotatable valve disc, which has the plurality of small holes and the disc-shaped or polygonal porous permeable member having a certain thickness and disposed just behind the small holes, is disposed in the valve main body to which the first flow path and the second flow path are connected, the disc-shaped or polygonal porous permeable member having a certain space and a certain thickness is disposed just before the valve disc, and the drive mechanism for rotating its valve seat is provided. This arrangement has such a feature as to make it possible to switch between a case in which the first flow path communicates with the second flow path through selected one of the small holes and a case in which the first flow path communicates with the second flow path bypassing the small holes by rotating the rotatable valve disc. Accordingly, the cooling/reheating/dehumidifying operation and the heating/reheating/dehumidifying operation are realized as well as the structure of a small and low noise flow control valve can be obtained.

In the refrigerating cycle in which the compressor, the outdoor heat exchanger, the first flow control valve, the first indoor heat exchanger, the second flow control valve, and the second indoor heat exchanger are sequentially connected, the throttle section composed of the porous permeable members and the small hole is disposed in the valve main body, and the valve disc rotatable in the valve main body is provided. This refrigerating cycle has such a feature that the flow control valve, which is arranged to make it possible to switch between a case in which the first heat exchanger is caused to communicate with the second heat exchanger through the throttle section composed of the porous permeable members and the small hole and a case in which the first heat exchanger is caused to communicate with the second heat exchanger bypassing the throttle section by rotating the valve disc, is employed as the second flow control valve. Accordingly, a low noise air conditioning apparatus capable of executing the cooling/reheating/dehumidifying operation and the heating/reheating/dehumidifying operation can be obtained. Further, a low noise air conditioning apparatus capable of executing the cooling/reheating/dehumidifying operation and the heating/reheating/dehumidifying operation can be obtained by such a feature that the porous permeable members are disposed upstream and downstream of the small hall in the second flow control valve in the flow direction thereof.

In the refrigerating cycle in which the compressor, the outdoor heat exchanger, the first flow control valve, the first indoor heat exchanger, the second flow control valve, and the second indoor heat exchanger are sequentially connected, the throttle section composed of the porous permeable members and the small hole is disposed in the valve main body, and the valve disc rotatable in the valve main body is provided. The refrigerating cycle has such a feature that the flow control valve, which is arranged to make it possible to switch between a case in which the first indoor heat exchanger is caused to communicate with the second indoor heat exchanger through the throttle section composed of the porous permeable members and the small hole and a case in which the first indoor heat exchanger is caused to communicate with the second indoor heat exchanger bypassing the throttle section by rotating the valve disc, is employed as the second flow control valve. In addition to the above feature, the refrigerating cycle has such a feature that the throttle section is composed of the porous permeable members and the plurality of small holes each having a different flow resistance, and when the first indoor heat exchanger is caused to communicate with the second indoor heat exchanger through the throttle section composed of the porous permeable members and the small holes, the flow resistance between the first indoor heat exchanger and the second indoor heat exchanger can be changed by selectively connecting the small holes through which the refrigerant passes. Accordingly, there can be obtained a low noise air conditioning apparatus capable of executing the cooling/reheating/dehumidifying operation and the heating/reheating/dehumidifying operation as well as executing optimum control of the respective operations.

The refrigerating cycle, in which the compressor, the outdoor heat exchanger, the first flow control valve, the first indoor heat exchanger, the second flow control valve, and the second indoor heat exchanger are sequentially connected has such a feature that it executes the cooling/reheating/dehumidifying operation, in which the refrigerant is circulated in the sequence of the compressor, the outdoor heat exchanger, the first flow control valve, the first indoor heat exchanger, the second flow control valve, and the second indoor heat exchanger, and the heating/reheating/dehumidifying operation, in which the refrigerant is circulated in the sequence of the compressor, the second indoor heat exchanger, the second flow control valve, the first indoor heat exchanger, the first flow control valve, and the outdoor heat exchanger. Further, the refrigerating cycle has such a feature that the flow resistance of the second flow control valve is changed between the cooling/reheating/dehumidifying operation and the heating/reheating/dehumidifying operation. Accordingly, there can be obtained a low noise air conditioning apparatus capable of executing the cooling/reheating/dehumidifying operation and the heating/reheating/dehumidifying operation as well as executing optimum control on the respective operations.

The flow controller of the present invention includes the valve main body to which the first flow path and the second flow path are connected, the orifice rotatably disposed in the valve main body for throttling the refrigerant flow, and the porous permeable members disposed in the vicinity of the orifice integrally therewith so as to form the throttle section for rectifying the refrigerant passing through the orifice, wherein switching between the throttle flow path for causing the first flow path to communicate with the second flow path through the throttle section and the open flow path for causing the first flow path to communicate with the second flow path through the inside of the main valve body bypassing the throttle section can be effected by rotating the orifice. Accordingly, a low noise flow control valve can be obtained.

The flow controller of the present invention includes the porous permeable members disposed upstream and the downstream of the orifice in the flow direction thereof, whereby a lower noise apparatus can be obtained by reducing noise on the inlet and outlet sides of the orifice.

The flow controller of the present invention includes the orifice disposed in the valve main body, to which the first flow path and the second flow path are connected, having the area smaller than the flow path area of the first flow path or the second flow path, and throttling the refrigerant flow, the orifice support member supporting the orifice and capable of changing the position thereof with respect to the valve main body by being driven, the porous permeable members disposed in the main valve body in the vicinity of the orifice upstream and downstream in the flow direction thereof, respectively, and the open flow path disposed in the valve main body for connecting the first flow path to the second flow path through between the two porous permeable members or through the outside thereof, wherein the first flow path is caused to communicate with the second flow path by effecting switching between the open flow path, and the throttle flow path that passes through the orifice and the porous permeable members by changing the position of the orifice support member. Accordingly, a low noise apparatus which is small in size can be obtained.

The flow controller of the present invention includes the plurality of orifices disposed in the valve main body, to which the first flow path and the second flow path are connected, each having the area smaller than the flow path area of the first flow path or the second flow path, and throttling the refrigerant flow, the orifice support member supporting the orifices and capable of changing the position thereof with respect to the valve main body by being driven, the porous permeable members disposed in the valve main body in the vicinity of the orifices upstream and downstream in the flow direction thereof, respectively, and the open flow path in the valve main body for connecting the first flow path to the second flow path so as to flow the refrigerant in the area equal to or larger than the flow path area of the first flow path or the second flow path through at least one of the porous permeable members, wherein the first flow path is caused to communicate with the second flow path by switching between the open flow path and the flow path that passes through an orifice by changing the position of the orifice support member. Accordingly, a low noise apparatus in which pressure is less reduced can be obtained.

In the flow controller of the present invention, the throttle flow path and the open flow path are selectively connected by rotating the orifice and at least one porous permeable member through a predetermined angle in the state in which they are fixed through the gap. Accordingly, a reliable apparatus can be obtained.

In the flow controller of the present invention, the orifice support member for supporting the orifice has the plurality of small holes each having a different flow resistance, wherein when the first flow path is caused to communicate with the second flow path through the throttle section composed of the porous permeable members and a selected one of the small holes, the flow resistance between the first flow path and the second flow path can be changed by selectively connecting the small holes through which the refrigerant passes by rotation. Accordingly, a low noise apparatus capable of executing flow control in steps can be obtained.

Since the flow controller of the present invention includes the muffler fixed to the valve main body and disposed upstream or downstream of the refrigerant flow passing through the two porous permeable members, the flow controller can more reduce noise.

The flow controller of the present invention includes the rotatable valve disc, to which the disc-shaped or polygonal porous permeable members having a certain thickness are disposed so as to sandwich the small holes therebetween, disposed in the valve main body, to which the first flow path and the second flow path are connected, wherein switching between a case in which the first flow path is caused to communicate with the second flow path through the throttle section composed of the porous permeable members and the small holes and a case in which the first flow path is caused to communicate with the second flow path through the space in the valve main body bypassing the throttle section can be effected. Accordingly, a small and low noise apparatus can be obtained at less expensive cost.

The flow controller of the present invention includes the rotatable disc disposed in the valve main body, to which the first flow path and the second flow path are connected, and having the plurality of small holes each having a different flow resistance and disposed therein at predetermined angular positions, the porous permeable members disposed at intervals so as to sandwich the disc therebetween, and the drive mechanism for driving the disc, wherein the small holes through which the first flow path is caused to communicate with the second flow path can be selectively connected by rotating the disc. Accordingly, a small and low noise apparatus requiring a small driving force can be obtained.

The flow controller of the present invention includes the rotatable disc disposed in the valve main body, to which the first flow path and the second flow path are connected, and having the hole disposed therein whose area is equal to or larger than the flow path area of the first flow path or second flow path, the orifice support member fixed to the valve main body in contact with the disc and having the plurality of small holes each having a different flow resistance and the hole whose inside diameter is equal to or larger than the hole of the disc, these holes being disposed at predetermined angular positions, and the porous permeable members disposed at intervals so as to sandwich the disc and the orifice support member therebetween, wherein it is possible to switch from one to the other of the flow paths through which the first flow path is caused to communicate with the second flow path by rotating the disc. Accordingly a small apparatus capable of reducing noise can be obtained at less expensive cost.

The air conditioning apparatus of the present invention having the refrigerating cycle, in which the compressor, the outdoor heat exchanger, the first flow control valve, the first indoor heat exchanger, the second flow control valve, and the second indoor heat exchanger are connected sequentially, includes the support member rotatably disposed in the valve main body of the second flow control valve and having the small hole for throttling the refrigerant flow, the porous permeable members disposed in the vicinity of the small hole so as to form the throttle section integrally therewith for rectifying the refrigerant passing through the small hole, whereby it is possible to effect switching between a case in which the first indoor heat exchanger is caused to communicate with the second indoor heat exchanger through the throttle section composed of the porous permeable members and the small hole and a case in which the first indoor heat exchanger is caused to communicate with the second indoor heat exchanger through the inside of the valve main body bypassing the throttle section by rotating the support member in the valve main body of the second flow control valve. Accordingly, a low noise and reliable apparatus can be obtained.

The throttle section of the air conditioning apparatus of the present invention includes the porous permeable members and the plurality of small holes each having a different flow resistance, whereby when the first indoor heat exchanger is caused to communicate with the second indoor heat exchanger through the throttle section composed of the porous permeable members and the small holes, the flow resistance between the first indoor heat exchanger and the second indoor heat exchanger can be changed by switching the small holes from one to another through which the refrigerant passes by rotating the support member. Accordingly, a multi-step control can be executed by a simple structure.

The air conditioning apparatus of the present invention can execute the cooling/reheating/dehumidifying operation, in which the refrigerant is circulated in the sequence of the compressor, the outdoor heat exchanger, the first flow control valve, the first indoor heat exchanger, the second flow control valve, and the second indoor heat exchanger, and the heating/reheating/dehumidifying operation, in which the refrigerant is circulated in the sequence of the compressor, the second indoor heat exchanger, the second flow control valve, the first indoor heat exchanger, the first flow control valve, and the outdoor heat exchanger, by switching the refrigerating cycle therebetween as well as the flow resistance of the second flow control valve is changed between the cooling/reheating/dehumidifying operation and the heating/reheating/dehumidifying operation. Accordingly, a convenient apparatus can be obtained.

In the air conditioning apparatus of the present invention, since the flow resistance of the second flow control valve in the heating/reheating/dehumidifying operation is set larger than that in the cooling/reheating/dehumidifying operation, an efficient apparatus can be obtained.

In the air conditioning apparatus of the present invention, the porous permeable members are disposed upstream and downstream of the small hole, and the muffler fixed to the valve main body is disposed on the upstream side or the downstream side of the refrigerant flow passing through the two porous permeable members. Accordingly, a low noise apparatus can be obtained.

The invention claimed is:

1. A refrigerating cycle apparatus in which a refrigerating cycle is connected circularly through a compressor, a condenser, a flow controller, and an evaporator, respectively, wherein the flow controller comprising a multi-directional valve connected in parallel with a throttle device having at least one porous permeable member communicating in a refrigerant flow direction in a flow path is disposed in a divided intermediate flow path of the evaporator, and a gas/liquid two-phase refrigerant is caused to pass through the throttle device.

2. A refrigerating cycle apparatus according to claim 1, wherein the throttle device comprises an orifice.

3. A refrigerating cycle apparatus according to claim 2, wherein the porous permeable member is disposed at least one of upstream and downstream of the orifice in the refrigerant flow direction.

4. A refrigerating cycle apparatus according to claim 3, wherein a space is defined between the orifice and the porous permeable member.

5. A refrigerating cycle apparatus according to claim 3, wherein a space is disposed at least one of upstream of the porous permeable member disposed upstream of the orifice and downstream of the porous permeable member disposed downstream of the orifice.

6. A refrigerating cycle apparatus according to claim 1, wherein the multi-directional valve is closed in a reheating/dehumidifying operation.

7. A refrigerating cycle apparatus, comprising: a throttle device disposed in the vicinity of a heat exchanger constituting part of a refrigerating cycle or in a refrigerating circuit in a room, wherein the throttle device comprises a main body having two spaces therein that communicate with each other through an orifice and are disposed on an approximately linear line with respect to a refrigerant flow direction, flow paths for causing the two spaces in the main body to communicate with the outside of the main body, respectively, and a porous permeable member having a bypass through hole and being fixed in the main body so as to be disposed on an approximately linear line with respect to the two spaces in the main body for partitioning at least one of the spaces to an orifice side and a flow path side.

8. A refrigerating cycle apparatus according to claim 7, further comprising an indoor machine having a heat exchanger disposed in a cabinet for exchanging the heat with indoor air, and the throttle device is interposed between the cabinet and the heat exchanger.

9. An air conditioning apparatus having a refrigerating cycle in which a compressor, an outdoor heat exchanger, a first flow controller, a first indoor heat exchanger, a second flow controller, and a second indoor heat exchanger are sequentially connected, wherein the second flow controller comprises a multi-directional valve connected in parallel with a throttle device having a porous permeable member communicating in a refrigerant flow direction in a flow path.

10. An air conditioning apparatus having a refrigerating cycle in which a compressor, an outdoor heat exchanger, a first flow controller, a first indoor heat exchanger a second flow controller, and a second indoor heat exchanger are circularly connected, wherein the second flow controller comprises a multi-directional valve connected in parallel with a throttle device having a porous permeable member communicating in a refrigerant flow direction in a flow path, wherein a refrigerant is caused to flow to the second flow controller in at least one of the following operations: (1) an operation in which a latent heat ratio is reduced; (2) a cooling or dehumidifying as well as heating operation; (3) at the start of a heating operation; and (4) in a case in which the difference between a preset temperature and a room temperature is equal to or larger than a set value in the heating operation.

11. A refrigerating cycle apparatus in which a refrigerating cycle is connected circularly through a compressor, a condenser, a flow controller, and an evaporator, respectively, wherein the flow controller comprises a throttle section composed of a columnar or disc-shaped movable section rotating in a peripheral direction and a porous permeable member formed in the movable section and caused to communicate in a refrigerant flow direction by the rotation, whereby a gas/liquid two-phase refrigerant is caused to pass through the throttle section.

12. A refrigerating cycle apparatus according to claim 11, wherein a passing-through flow path caused to communicate in the refrigerant flow direction by the rotation of the movable section or a shut-off section for shutting off the communication in the refrigerant flow direction is provided.

13. A refrigerating cycle apparatus in which a refrigerating cycle is connected circularly through a compressor, a condenser, a flow controller, and an evaporator, respectively, the flow controller comprising: a valve including a main valve seat and a main valve body that can be opened and closed by being in contact with and separated from each other in a valve chamber of the flow controller, said valve including a bypass flow path for bypassing a closed portion in the valve chamber when the main valve seat and the main valve body are closed, and a throttle section composed of a porous permeable member disposed in the bypass flow path and communicating in a refrigerant flow direction, whereby a gas/liquid two-phase refrigerant is caused to pass through the throttle section.

14. A refrigerating cycle according to claim 13, wherein the bypass flow path comprises an orifice and a porous permeable member.

15. A refrigerating cycle apparatus in which a refrigerating cycle is connected circularly through a compressor, a condenser, a flow controller, and an evaporator, respectively, the flow controller comprising: a valve main body having a first flow path opened to a side wall of a valve chamber of the flow controller, a main valve seat having a second flow path opened to a bottom of the valve chamber, and a main valve body disposed in the valve chamber and capable of closing the main valve seat, wherein a main throttle section comprises the main valve body, the main valve seat, and a first porous permeable member, an auxiliary throttle section using a second porous permeable member is arranged before or behind the main throttle section, and a gas/liquid two-phase refrigerant is caused to pass through the throttle section.

16. A refrigerating cycle apparatus in which a refrigerating cycle is connected circularly through a compressor, a condenser, a flow controller, and an evaporator, respectively, wherein the flow controller comprises a two-way valve and a throttle section comprising a porous permeable member connected in parallel to the two-way valve and communicating in a refrigerant flow direction, the flow controller being disposed between a first heat exchanger of the evaporator and a second heat exchanger of the evaporator, whereby a gas/liquid two-phase refrigerant is caused to pass through the throttle section.

17. A refrigerating cycle according to claim 16, wherein the throttle section comprises an orifice.

18. A refrigerating cycle apparatus according to at least one of claims 11 to 17, wherein a refrigerant used has a refrigerant pressure loss smaller than that of an R22refrigerant.

19. An air conditioning apparatus having a refrigerating cycle in which a compressor, an outdoor heat exchanger, a first flow controller, a first indoor heat exchanger, a second flow controller, and a second indoor heat exchanger are connected sequentially, the second flow controller comprising: a main valve seat and a main valve body that can be opened and closed by coming into contact with and separating from each other in a valve chamber of the flow controller, a bypass flow path for bypassing a closed portion in the valve chamber when the main valve seat and the main valve body are closed, and a throttle section composed of a porous permeable member disposed in the bypass flow path and communicating in a refrigerant flow direction.

20. An air conditioning apparatus having a refrigerating cycle in which a compressor, an outdoor heat exchanger, a first flow controller, a first indoor heat exchanger, a second flow controller, and a second indoor heat exchanger are connected sequentially and in which a refrigerant is circulated, wherein the second flow controller comprises a valve main body having a first flow path opened to a side wall or a bottom of a valve chamber, a main valve seat having a second flow path opened to the side wall or the bottom of the valve chamber at a position apart from the opening of the first flow path, a main valve body capable of closing the main valve seat in the valve chamber, a main throttle section formed of the main valve body, the main valve seat, and a first porous permeable member, and auxiliary throttle sections disposed before and behind the main throttle section in the vicinity thereof and secondarily throttling a refrigerant flow using second porous permeable members.

21. An air conditioning apparatus having a refrigerating cycle in which a compressor, an outdoor heat exchanger, a first flow controller, a first indoor heat exchanger, a second flow controller, and a second indoor heat exchanger are connected sequentially and in which a refrigerant is circulated, wherein the second flow controller comprises a two-way valve for opening and closing a refrigerant flow and a throttle section comprising a porous permeable member connected in parallel with the two-way valve and communicating in a refrigerant flow direction.

22. An air conditioning apparatus having a refrigerating cycle, in which a compressor, an outdoor heat exchanger, a first flow control valve, a first indoor heat exchanger, a second flow control valve, and a second indoor heat exchanger are connected sequentially, the apparatus comprising: a support member rotatably disposed in a valve main body of the second flow control valve and having at least one small hole for throttling a refrigerant flow, and at least one porous permeable member disposed in the vicinity of the small hole so as to form a throttle section integrally therewith for rectifying a refrigerant passing through the small hole, whereby switching is effected between a case in which the first indoor heat exchanger is caused to communicate with the second indoor heat exchanger through the throttle section composed of the porous permeable member and the small hole and a case in which the first indoor heat exchanger is caused to communicate with the second indoor heat exchanger through the inside of the valve main body bypassing the throttle section by rotating the support member in the main valve body of the second flow control valve.

23. An air conditioning apparatus according to claim 22, characterized in that the throttle section comprises the porous permeable member and a plurality of the small holes each having a different flow resistance, wherein when the first indoor heat exchanger is caused to communicate with the second indoor heat exchanger through the throttle section comprising the porous permeable member and the small holes, the flow resistance between the first indoor heat exchanger and the second indoor heat exchanger is changed by selectively connecting the small holes through which the refrigerant passes by rotating the support member.

24. An air conditioning apparatus according to claim 22 or 23, wherein the apparatus effects switching between a cooling/reheating/dehumidifying operation, in which the refrigerant is circulated in the sequence of the compressor, the outdoor heat exchanger, the first flow control valve, the first indoor heat exchanger, the second flow control valve, and the second indoor heat exchanger, and the heating/reheating/dehumidifying operation, in which the refrigerant is circulated in the sequence of the compressor, the second indoor heat exchanger, the second flow control valve, the first indoor heat exchanger, the first flow control valve, and the outdoor heat exchanger, by changing the refrigerating cycle, and that the flow resistance of the second flow control valve is changed between the cooling/reheating/dehumidifying operation and the heating/reheating/dehumidifying operation.

25. An air conditioning apparatus according to claim 22 or 23, wherein the two porous permeable members are respectively disposed upstream and downstream of the small hole, and a muffler fixed to the valve main body is disposed on the upstream side or on the downstream side of the refrigerant flow passing through the two porous permeable members.

* * * * *